US010256936B2

(12) United States Patent
Boduch et al.

(10) Patent No.: US 10,256,936 B2
(45) Date of Patent: Apr. 9, 2019

(54) METHOD AND APPARATUS FOR OPTICAL NODE CONSTRUCTION USING SOFTWARE PROGRAMMABLE ROADMS

(71) Applicants: Mark E. Boduch, Geneva, IL (US); Kimon Papakos, Evanston, IL (US)

(72) Inventors: Mark E. Boduch, Geneva, IL (US); Kimon Papakos, Evanston, IL (US)

( * ) Notice: Subject to any disclaimer, the term of this patent is extended or adjusted under 35 U.S.C. 154(b) by 0 days.

(21) Appl. No.: 15/850,340

(22) Filed: Dec. 21, 2017

(65) Prior Publication Data

US 2018/0139005 A1 May 17, 2018

Related U.S. Application Data

(63) Continuation-in-part of application No. 15/694,946, filed on Sep. 4, 2017, which is a continuation-in-part of application No. 14/485,970, filed on Sep. 15, 2014, now Pat. No. 9,788,088.

(60) Provisional application No. 61/880,860, filed on Sep. 21, 2013.

(51) Int. Cl.
*H04J 14/02* (2006.01)
*H04Q 11/00* (2006.01)

(52) U.S. Cl.
CPC ...... *H04J 14/0217* (2013.01); *H04J 14/0212* (2013.01); *H04J 14/0219* (2013.01); *H04Q 11/0005* (2013.01); *H04Q 2011/0016* (2013.01); *H04Q 2011/0052* (2013.01)

(58) Field of Classification Search
CPC ............... H04J 14/0217; H04J 14/0219; H04J 14/0212; H04Q 11/0005; H04Q 2011/0016; H04Q 2011/0052
See application file for complete search history.

(56) References Cited

U.S. PATENT DOCUMENTS

| | | | |
|---|---|---|---|
| 9,008,514 B2 | 4/2015 | Boduch et al. | |
| 9,276,695 B2 | 3/2016 | Boduch et al. | |
| 9,374,186 B1 | 6/2016 | Boduch et al. | |
| 9,667,374 B2 | 5/2017 | Boduch et al. | |
| 9,788,088 B2 | 10/2017 | Boduch et al. | |
| 2015/0055952 A1* | 2/2015 | Younce | H04J 14/0212 398/48 |
| 2017/0366291 A1 | 12/2017 | Boduch et al. | |

* cited by examiner

*Primary Examiner* — Casey L Kretzer

(57) ABSTRACT

Example embodiments of the present invention relate to a software programmable reconfigurable optical add drop multiplexer (ROADM) comprising of a plurality of wavelength switches and a plurality of waveguide switches, wherein when the plurality of waveguide switches are set to a first switch configuration, the software programmable ROADM provides n degrees of an n-degree optical node, and wherein when the waveguide switches are set to a second switch configuration, the software programmable ROADM provides k degrees of an m-degree optical node.

20 Claims, 81 Drawing Sheets

4600
4410b
DEG3
DEG4
ADD2
UNUSED
UNUSED
DEG3
UNUSED
DEG4
UNUSED
DROP2
4430a
4430b
4420a
4430c
4430d
4420b
4430e
4430f
4430g
4470a
4470b
4470c

5600

METHOD AND APPARATUS FOR OPTICAL NODE CONSTRUCTION USING SOFTWARE PROGRAMMABLE ROADMS

RELATED APPLICATION

This application is a continuation-in-part of U.S. application Ser. No. 15/694,946 filed Sep. 4, 2017, which is a continuation-in-part of U.S. application Ser. No. 14/485,970 filed Sep. 15, 2014, which claims the benefit of: U.S. Provisional Application No. 61/880,860, filed on Sep. 21, 2013.

The entire teachings of the above application are incorporated herein by reference.

BACKGROUND

As the bandwidth needs of end customers increases, larger amounts of optical bandwidth will need to be manipulated closer to the end customers. A new breed of optical processing equipment will be needed to provide high levels of optical bandwidth manipulation at the lower cost points demanded by the networks closest to the end customers. This new breed of optical processing equipment will require new levels of optical signal processing integration.

SUMMARY

A method and corresponding apparatus in an example embodiment of the present invention relates to providing a means of quickly creating application specific optical nodes using field programmable photonics (FPP) within software programmable Reconfigurable Optical Add Drop Multiplexers (ROADMs). The example embodiments include a light processing apparatus utilizing field programmable photonics and field programmable photonic devices, whose level of equipment redundancy matches the economics associated with the location of the apparatus within provider networks. Additionally, the example embodiments include a light processing apparatus utilizing application specific photonics and application specific photonic devices.

An optical signal processor is presented. The optical signal processor comprises: at least one wavelength equalizing array, a plurality of optical amplifying devices, and at least one field programmable photonic device. Within the optical signal processor, the plurality of optical amplifiers may comprise an optical amplifier array. Additionally, within the optical signal processor, the field programmable photonic device may comprise a plurality of optical coupler devices that are interconnected with broadband optical switches. The optical coupler devices and the broadband optical switches may be integrated together on a substrate. Additionally, the plurality of optical coupler devices may be interconnected to input and output ports with broadband optical switches.

The optical switches within the field programmable photonic device are configurable using software running on a digital microprocessor residing on or external to the optical signal processor. By reconfiguring (i.e., programming) the optical switches, the functionality of the optical signal processor may be altered. This allows the optical signal processor to emulate the behaviors of many different types of Reconfigurable Optical Add Drop Multiplexers (ROADMs). Therefore, the optical signal processor may also be referred to as a software programmable Reconfigurable Optical Add Drop Multiplexers (ROADM), or simply as a software programmable ROADM.

An optical node is presented. The optical node comprises: at least one wavelength equalizing array, a plurality of optical amplifying devices, and at least one field programmable photonic device. The optical node may comprise at least two optical degrees. The at least one wavelength equalizing array may be used to select wavelengths for the at least two optical degrees, and to perform directionless steering for add/drop ports. Alternatively, the optical node may comprise at least three optical degrees. Alternatively, the optical node may comprise at least four optical degrees. The optical node may further comprise a plurality of directionless add/drop ports.

A ROADM circuit pack is presented. The ROADM circuit pack comprises: at least one wavelength equalizing array, a plurality of optical amplifying devices, and at least one field programmable photonic device.

An optical signal processor is presented. The optical signal processor comprises: at least one wavelength equalizing array, a plurality of optical amplifying devices, and at least one application specific photonic device. The application specific photonic device comprises a plurality of optical coupler devices. The plurality of optical coupler devices are integrated together on a substrate. The optical signal processor may comprise at least two optical degrees. Alternatively, the optical signal processor may comprise at least three optical degrees. Alternatively, the optical signal processor may comprise at least four optical degrees. The optical signal processor may further comprise a plurality of directionless add/drop ports.

Several software programmable ROADMs are presented. The software programmable ROADMs can be programmed to perform the operations of several different types of optical nodes. A single software programmable ROADM can be programmed to perform the functions of an optical node of a first size. Two identical software programmable ROADMs may be interconnected and programmed to perform the functions of an optical node of a second size, wherein the second size is larger than the first size.

A ROADM containing several passively interconnected wavelength selective switches is presented. A single ROADM of this type may be used to perform the functions of an optical node of a first size. Two identical such ROADMs may be interconnected to perform the functions of an optical node of a second size, wherein the second size is larger than the first size.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 46A, 46B, 46C, and 45D illustrate the use of four FIG. 44 software programmable ROADMs to construct a six-degree optical node with four directionless add/drop ports;

DETAILED DESCRIPTION

A description of example embodiments of the invention follows.

Figure 1A:
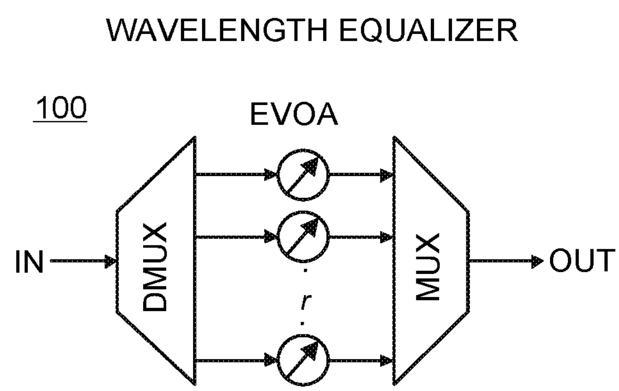
FIG. 1A is an illustration of a wavelength equalizer.

FIG. 1A is an illustration of a wavelength equalizer 100 consisting of; a wavelength de-multiplexer (DMUX) that is used to separate a composite Wavelength Division Multiplexed (WDM) signal into r number of individual wavelengths, a plurality of Electrical Variable Optical Attenuators (EVOAs) used to partially or fully attenuate the individual wavelengths, and a wavelength multiplexer (MUX) that is used to combine r number of individual wavelengths into a composite Wavelength Division Multiplexed (WDM) signal. In addition to its optical elements (MUX, DMUX, and EVOAs), the wavelength equalizer 100 contains electronic circuitry (not shown) used to control the EVOAs, and a user interface (not shown) that is used to program the electronic circuitry of the EVOAs. The optical processing of each individual wavelength may be independently controlled. The optical power level of each individual wavelength may be attenuated by a programmable amount by sending a command through the user interface. The command is used by the electronic circuitry to set the attenuation value of the appropriate EVOA. Additionally, each individual EVOA can be program to substantially block the light associated with an incoming optical wavelength. Controlled attenuation ranges for typical EVOAs are 0 to 15 dB, or 0 to 25 dB. Blocking attenuation is typically 35 dB or 40 dB.

Figure 1B:
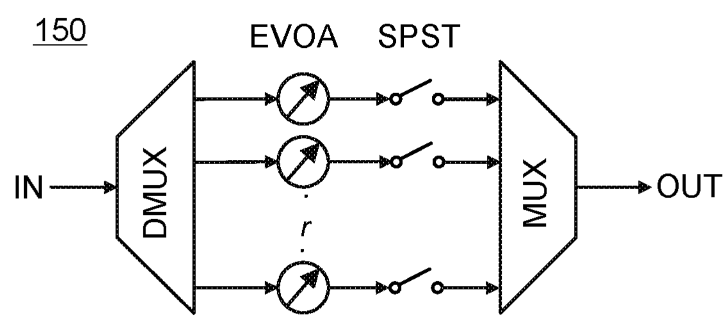
FIG. 1B is an illustration of a wavelength equalizer.
Figure 2:
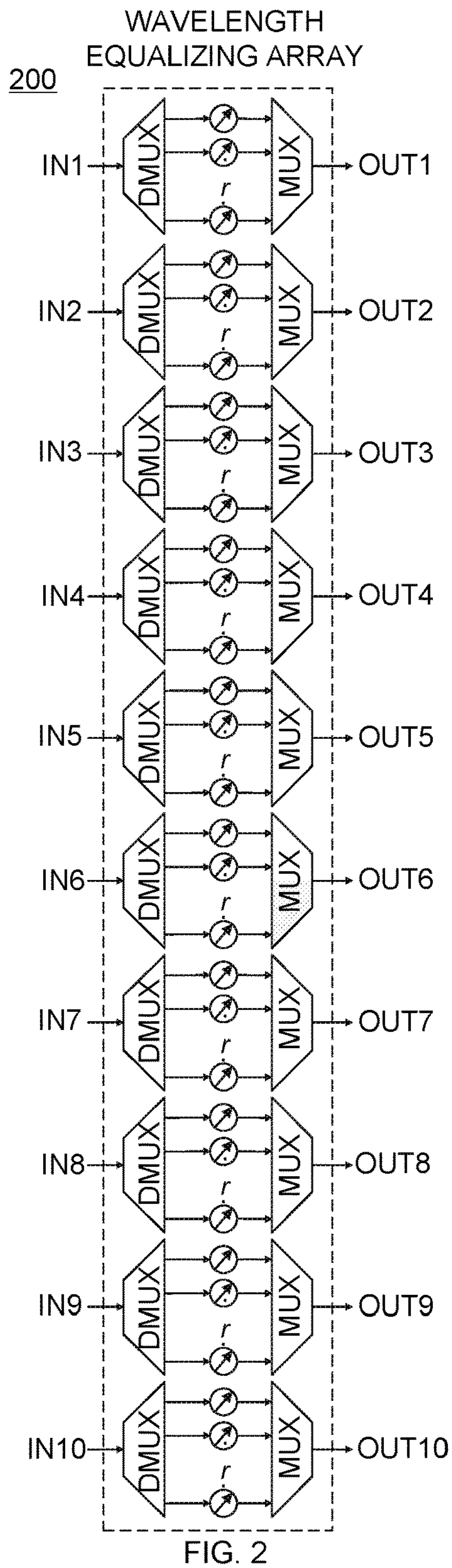
FIG. 2 is an illustration of a wavelength equalizing array containing ten wavelength equalizers.

FIG. 1B shows a wavelength equalizer 150 that illustrates an alternative way of viewing the wavelength equalizer 100 of FIG. 1A. In FIG. 1B each EVOA for each wavelength connects to a single pole single throw (SPST) optical switch. Each SPST optical switch provides the ability to either forward a given wavelength to the optical multiplexer (MUX) or prevent the forwarding of the given wavelength to the optical multiplexer. Each EVOA then needs to only operate over a limited attenuation range—the range required to equalize the optical power level of a given wavelength to optical power levels of other wavelengths. Given the structure of 150, the wavelength equalizer 150 can be thought of as a wavelength switch, in that it is able to selectively switch individual wavelengths. Equalizer 100 can also be thought of as a wavelength switch, as it is able to selectively switch individual wavelengths by either blocking or passing (i.e., not blocking) individual wavelengths, FIG. 2 is an illustration of a wavelength equalizing array 200 contained within a single device. The wavelength equalizing array contains ten wavelength equalizers that may be of the type 100 illustrated in FIG. 1A or of the type 150 illustrated in FIG. 1B.

The wavelength equalizing array 200 contains ten optical inputs (IN1-IN10) that are attached to the inputs of the wavelength equalizers, and ten optical outputs (OUT1-OUT10) that are attached to the outputs of the wavelength equalizers. The electronic circuitry (not shown) used to control the EVOAs may reside within the wavelength equalizing array device, or may reside external to the wavelength equalizing array device.

Figure 3:
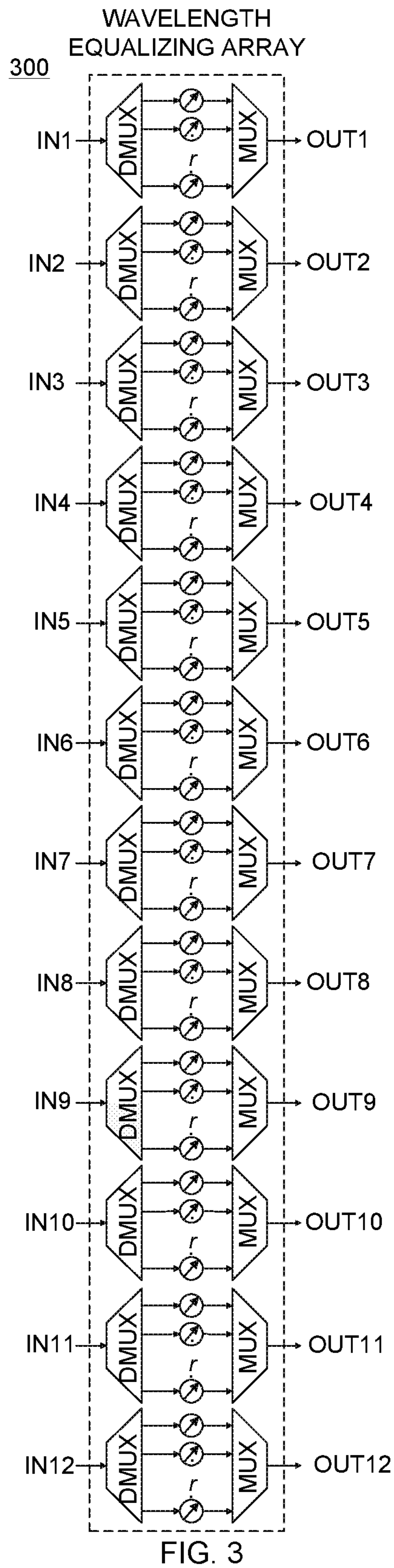
FIG. 3 is an illustration of a wavelength equalizing array containing twelve wavelength equalizers.

FIG. 3 is an illustration of a wavelength equalizing array 300 containing twelve wavelength equalizers that may be of the type 100 illustrated in FIG. 1A or of the type 150 illustrated in FIG. 1B. The array may be contained within a single physical device.

Although wavelength equalizing arrays 200 and 300 illustrate arrays with ten and twelve wavelength equalizers respectively, in general there is no limit to the number of wavelength equalizers that can be placed within a single device. Therefore, arrays with fifteen, sixteen, twenty-four, or thirty-two wavelength equalizers may be possible.

Multiple different technologies may be used to implement the wavelength equalizing arrays 200 and 300, including Planer Lightwave Circuit (PLC) technology and various free-space optical technologies such as Liquid Crystal on Silicon (LCoS). The Wavelength Processing Array (WPA-12) from Santec Corporation is an example of a commercially available wavelength equalizing array containing twelve wavelength equalizers. The wavelength equalizing arrays 200 and 300 may be implemented by placing PLC based EVOAs and multiplexers (Arrayed Waveguide Gratings (AWG)) on a single substrate.

Figure 4:
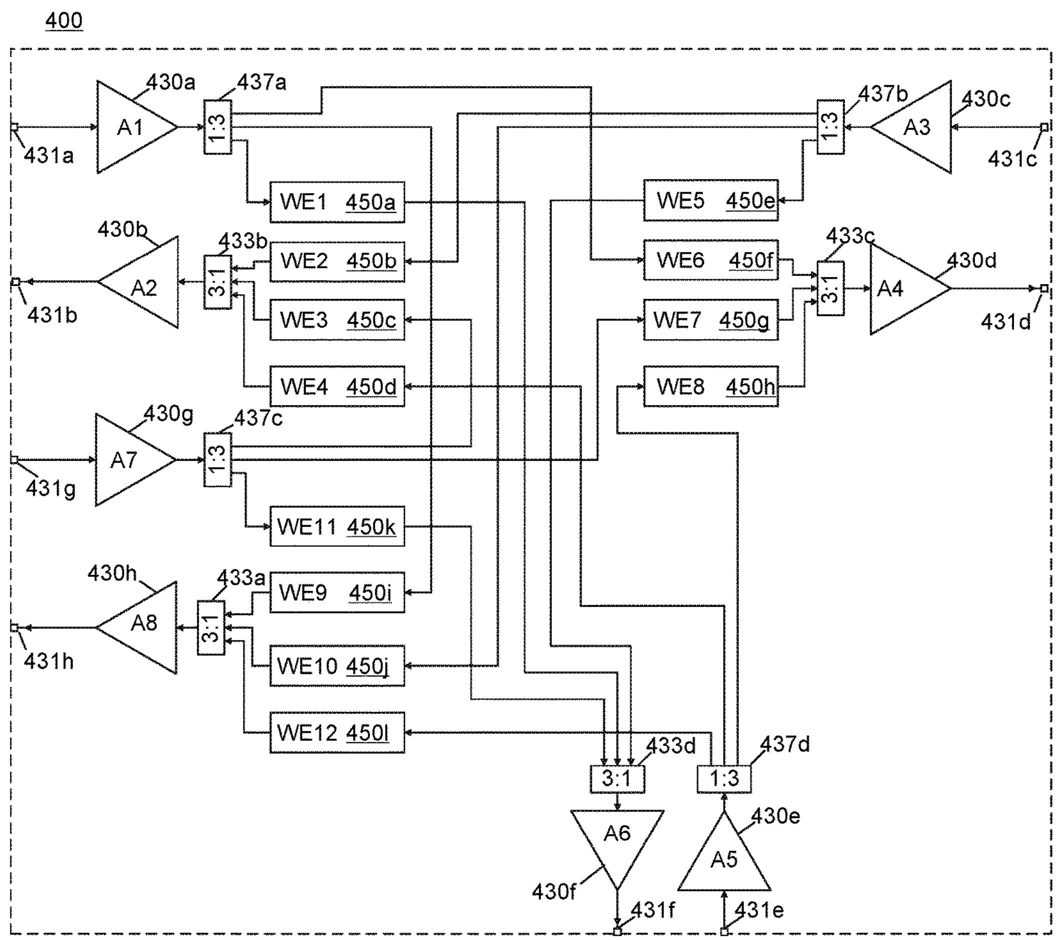
FIG. 4 is an illustration of an optical signal processor used to create a three-degree optical node.

FIG. 4 shows an optical signal processor (OSP) 400 consisting of eight optical amplifiers 430*a-h*, and twelve wavelength equalizers 450*a*-1 that may be contained within a single wavelength equalizing array 300. The wavelength equalizing array is a wavelength processing device. A wavelength processing device is defined as any optical device that optically operates on individual wavelengths of a WDM signal. For example, within a plurality of multiplexed wavelengths, the wavelength equalizing array can pass an individual wavelength unattenuated, pass an individual wavelength attenuated, or block an individual wavelength. Each of the wavelength equalizers 450*a*-1 is also a wavelength switching device, as each wavelength equalizer 450*a*-1 is operable to switch individual wavelengths, as depicted in FIG. 1B.

The optical signal processor 400 receives four WDM signals; one from each of the four interfaces 431*a*, 431*c*, 431*e*, and 431*g*. These four signals are then amplified by optical amplifiers 430*a*, 430*c*, 430*e*, and 430*g*. Following amplification, each of the four signals is broadcasted to three different wavelength equalizers 450*a*-1 using 1:3 couplers 437*a*-*d*. The wavelength equalizers 450*a*-1 can be configured to attenuate each individual wavelength by some programmable amount. Alternatively each of the wavelength equalizers 450*a*-1 can be configured to substantially block the individual wavelengths that pass through it. After passing through the wavelength equalizers, WDM signals are combined into groups of three using optical couplers 433*a*-*d*. The combined WDM signals are then amplified using optical amplifiers 430*b*, 430*d*, 430*f*, and 430*h*, before being outputted to optical interfaces 431*b*, 431*d*, 431*f*, and 431*h*.

The optical signal processor (OSP) 400 can be used to construct a three or four-degree WDM optical node. If the optical circuitry associated with the optical signal processor 400 is wholly placed on a single circuit pack, the circuit pack would contain a fully integrated three or four-degree ROADM. The ROADM circuit pack could serve as a four-degree ROADM with no add/drop ports by using each input/output port pair 431*a*-*b*, 431*c*-*d*, 431*e*-*f*, and 431*g*-*h* as an optical degree. Alternatively, if combined with some form of wavelength multiplexing/demultiplexing circuitry, the ROADM circuit pack could serve as a three-degree ROADM. For this case, input/output interface 431*e*-*f* may serve as the port used to interface to the wavelength multiplexing/demultiplexing circuitry. In order to complete the three-degree node, optical transponders would be attached to add and drop ports of the wavelength multiplexing/demultiplexing circuitry.

Alternatively, any of the other three input/output interfaces 431*a*-*b*, 431*c*-*d*, 431*g*-*h* may serve as the interface to the wavelength multiplexing/demultiplexing circuitry, as each input/output interface is identical with respect to the function of and interconnection to all other input/output interfaces.

When operating as a three-degree or four-degree ROADM, the wavelength equalizers are programmed to pass and/or block wavelengths in order to pass or block wavelengths between input/output port pairs. For example, a wavelength arriving at input port 431*a* could be passed to output port 431*d* by programming wavelength equalizer 450*f* to pass the wavelength. In a similar manner, a wavelength arriving at input port 431*g* could be blocked from output port 431*b* by programming wavelength equalizer 450*c* to block the wavelength.

If a circuit pack containing wavelength multiplexing/demultiplexing circuitry is attached to input/output interface 431*e*-*f*, then that circuit pack is able to add and drop wavelengths to and from any of the three other input/output interfaces (431*a*-*b*, 431*c*-*d*, and 431*g*-*h*). Because of this functionality, it can be said that input/output interface 431*e*-*f* supports directionless add/drop ports for the other three interfaces (i.e., the add/drop ports are not dedicated to a sole degree direction).

Figure 5A:
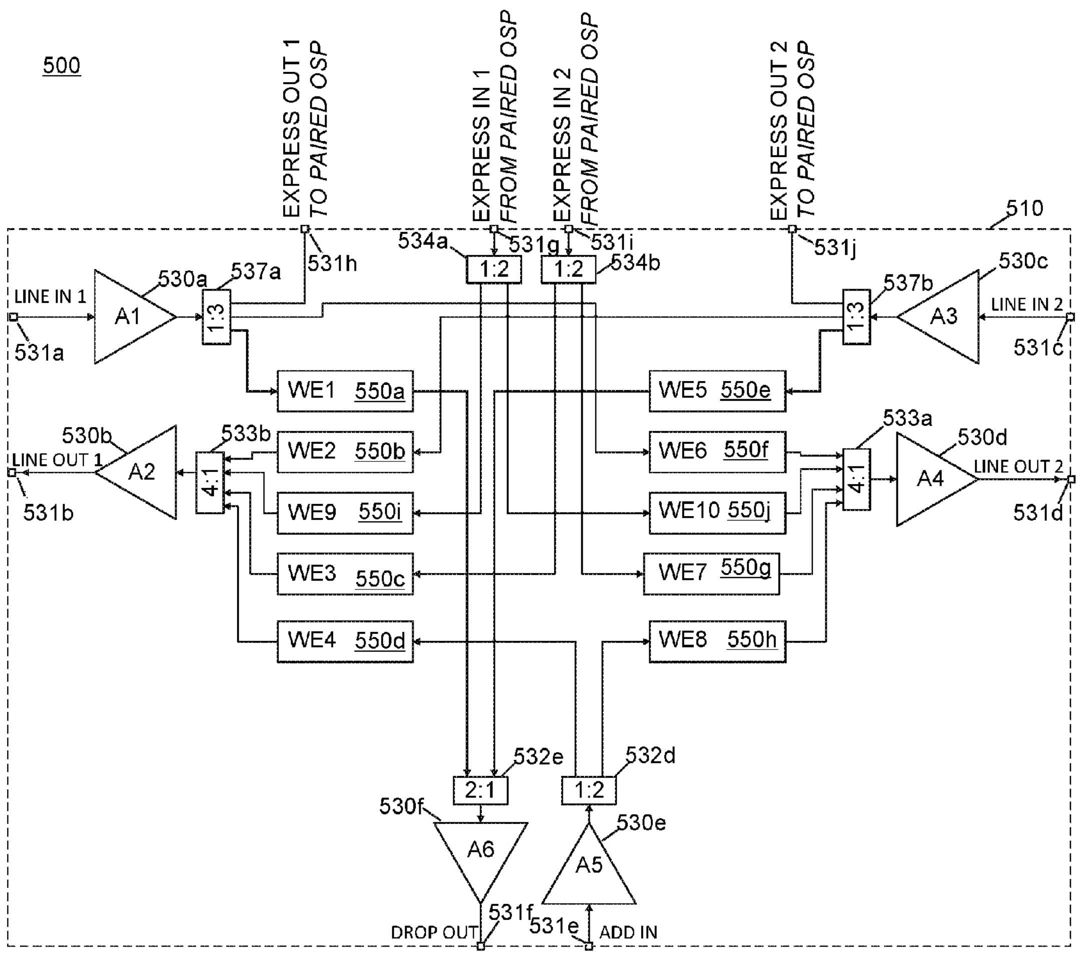
FIG. 5A is an illustration of an optical signal processor used to create a four-degree optical node.

FIG. 5A shows an optical signal processor (OSP) 510 consisting of six optical amplifiers 530*a*-*f*, and ten wavelength equalizers 550*a*-*h* that may be contained within a single wavelength equalizing array 200. The wavelength equalizing array is a wavelength processing device. A wavelength processing device is defined as any optical device that optically operates on individual wavelengths of a WDM signal. The optical signal processor 510 receives three WDM signals; one from each of the three interfaces 531*a*, 531*c*, and 531*e*. These three signals are then amplified by optical amplifiers 530*a*, 530*c*, and 530*e*. Following amplification, each of the three signals is broadcasted to two different wavelength equalizers 550*a*/550*f*, 550*b*/550*e*, and 550*d*/550*h* using couplers 537*a*, 537*b*, and 532*d*. In addition, the WDM signals on interfaces 531*a* and 531*c* are broadcasted to the interfaces 531*h* and 531*j* respectively. Also, the WDM signals on input interfaces 531*g* and 531*i* are broadcasted to wavelength equalizers 550*i*/550*j* and 550*c*/550*g* respectively using couplers 534*a* and 534*b*. The wavelength equalizers 550*a*-*h* can be configured to pass an individual wavelength unattenuated, or they can be configured to pass an individual wavelength attenuated by some programmable amount. Alternatively, each of the wavelength equalizers 550*a*-*h* can be configured to substantially block the individual wavelengths that pass through it. After passing through the wavelength equalizers, WDM signals are combined into two groups of four using optical couplers 533*a*-*b*, and one group of two using optical coupler 532*e*. The combined WDM signals are then amplified using optical amplifiers 530*b*, 530*d*, and 530*f*, before being outputted to optical interfaces 531*b*, 531*d*, and 531*f*.

Figure 5B:
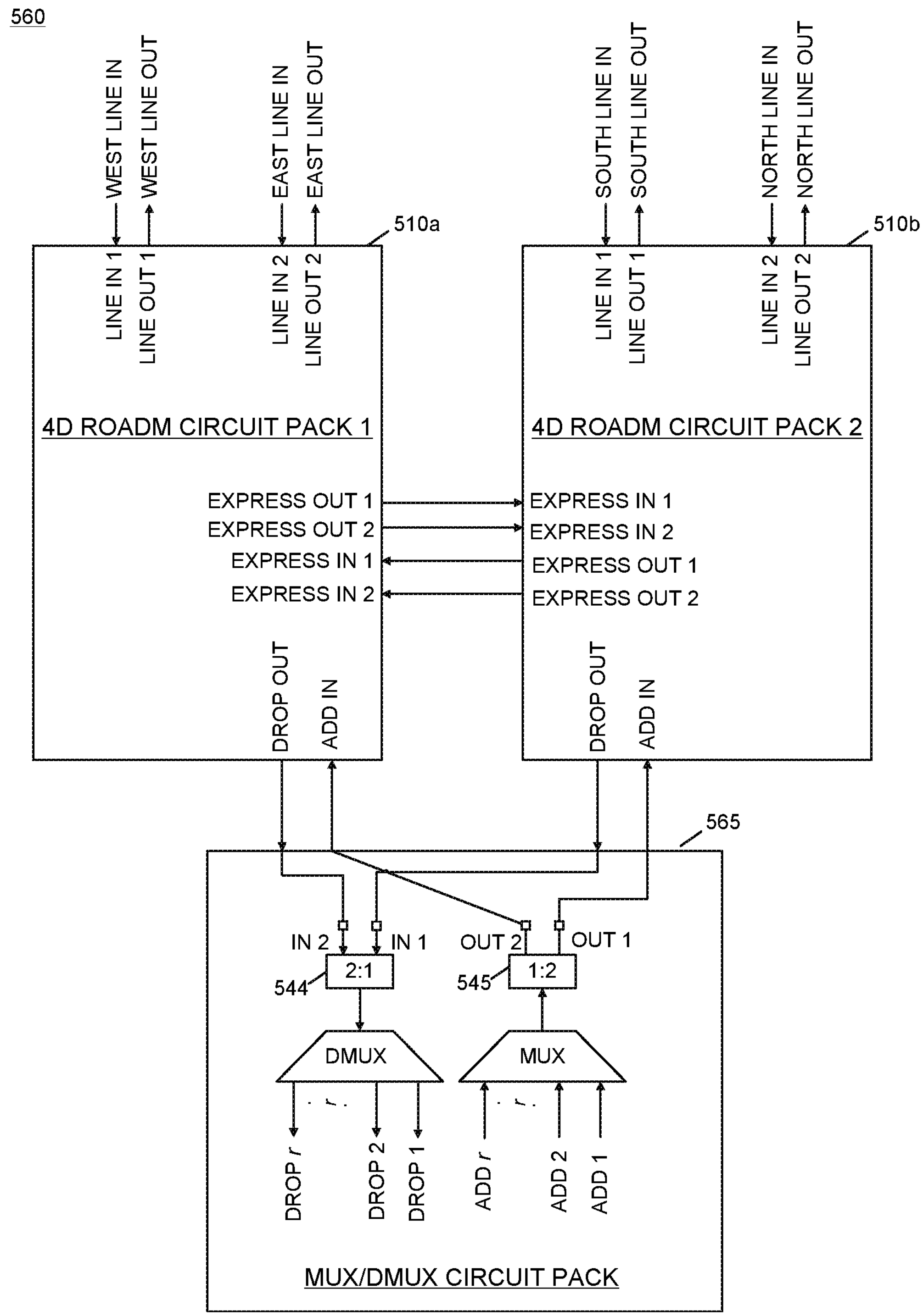
FIG. 5B is an illustration of a single multiplexing/de-multiplexing circuit pack attached to two four-degree ROADM circuit packs.
Figure 5C:
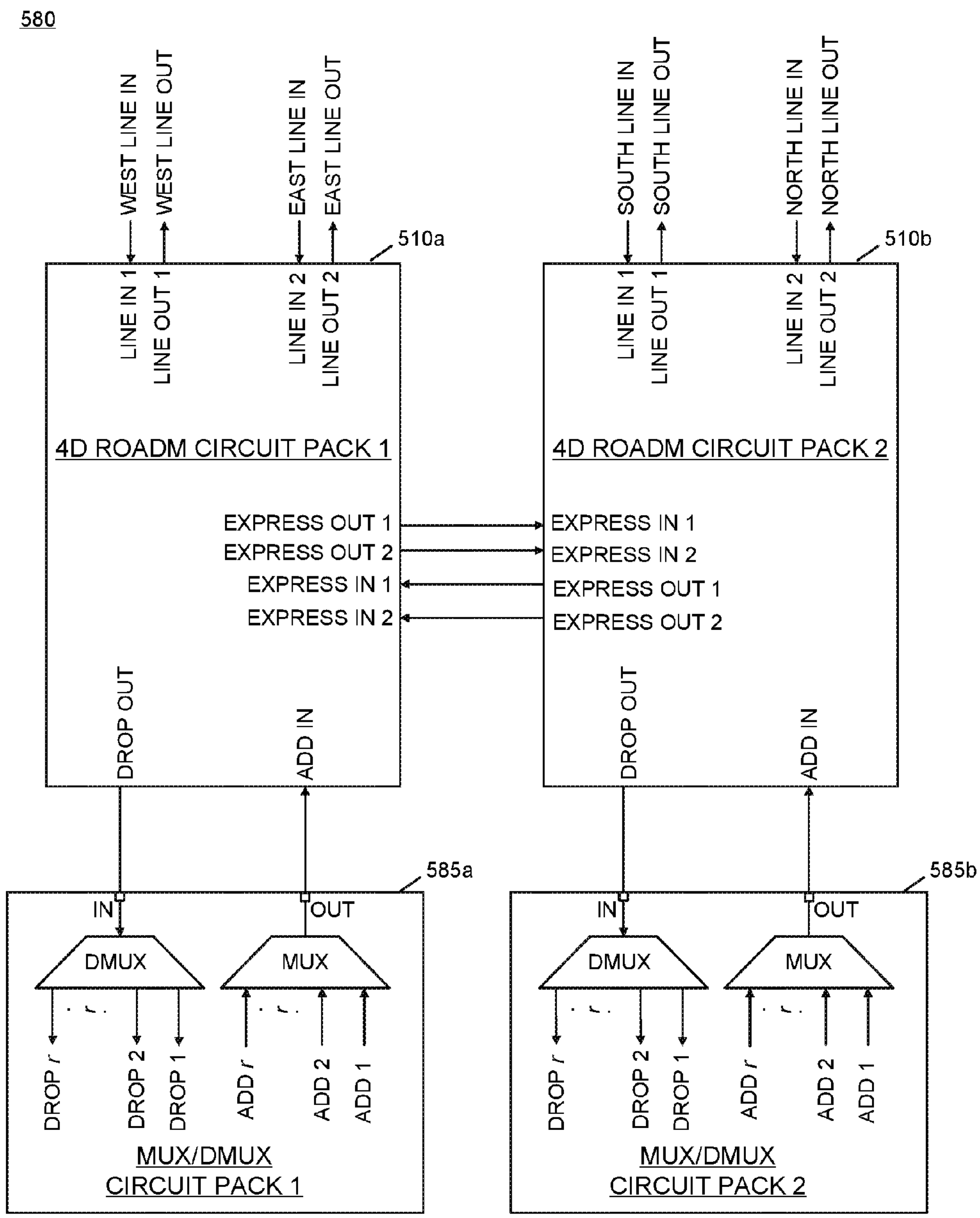
FIG. 5C is an illustration of two multiplexing/de-multiplexing circuit packs attached to two four-degree ROADM circuit packs.

The optical signal processor (OSP) 510 can be used to construct a two or four degree WDM optical node. If the optical circuitry associated with the optical signal processor 510 is wholly placed on a single circuit pack, the circuit pack would contain a fully integrated two degree node that can be expanded to support a four degree node if two such ROADMs are paired. If combined with some form of wavelength multiplexing/demultiplexing circuitry, the ROADM circuit pack could serve as a two degree ROADM node. For this case, input/output interface 531*e*-*f* may serve as the port used to interface to the wavelength multiplexing/demultiplexing circuitry. In order to complete the two-degree node, optical transponders would be attached to add and drop ports of the wavelength multiplexing/demultiplexing circuitry. If two of the ROADM circuit packs are paired, by optically connecting Express Out 1 and Express Out 2 on the first ROADM circuit pack to Express In 1 and Express In 2 on the second ROADM circuit pack, and vice versa, a four-degree node is formed. See node 560 in FIG. 5B and node 580 in FIG. 5C. For the four-degree node, either a single set of multiplexing/demultiplexing circuitry 565 could be shared between the two ROADM circuit packs 510*a*-*b* (FIG. 5B), or each ROADM circuit pack 510*a*-*b* could have its own dedicated multiplexing-demultiplexing circuitry 580 (FIG. 5C). In FIG. 5B, the MUX/DMUX circuit pack 565 contains a two to one optical coupler 544*a*, used to combine the wavelengths from the two ROADM circuit packs 510*a*-*b*, and the MUX/DMUX circuit pack 565 contains a one to two optical coupler 545 used to broadcast the added wavelengths from the MUX/DMUX circuit pack to both ROADM circuit packs 5120*a*-*b*. In FIG. 5C, ROADM circuit pack 1 510*a* is optically connected to MUX/DMUX circuit pack 1 585*a*, and ROADM circuit pack 2 510*b* is optically connected to MUX/DMUX circuit pack 2 585*b*. In four-degree nodes 560 and 580, ports Line In 1 and Line Out 1 may be interfaces 531*a* and 531*b* respectively, and ports Line In 2 and Line Out 2 may be interfaces 531*c* and 531*d* respectively, while the ports Add In and Drop Out may be the interfaces 531*e* and 531*f* respectively. In node 560, all the add/drop interfaces are able to send and receive from any of the four line interfaces, and therefore are considered directionless add/drop ports. In node 580, the add/drop ports can only send and receive wavelengths to and from the two line interfaces that are associated with the ROADM circuit pack that they are attached to, and therefore, the add/drop ports are said to be partially directionless add/drop ports.

If in node 580 the ROADM circuit pack 510*a* is used in a two-degree node application without a paired ROADM 510*b*, then the add/drop ports of the multiplexing/demultiplexing circuit pack 585*a* are (fully) directionless with respect to the two-degree node. The wavelength equalizing array on the ROADM circuit pack 510*a* is used to both select wavelengths for each degree, and to perform directionless steering for the add/drop ports of each degree.

When operating as a two-degree or four-degree ROADM, the wavelength equalizers are programmed to pass and/or block wavelengths in order to pass or block wavelengths between input/output port pairs. For example, in FIG. 5A, a wavelength arriving at input port 531*a* could be passed to output port 531*d* by programming wavelength equalizer 550*f* to pass the wavelength. In a similar manner, a wavelength arriving at input port 531*c* could be blocked from output port 531*b* by programming wavelength equalizer 550*b* to block the wavelength.

To either limit the number of supported circuit packs, or to simplify the manufacturing process, field configurable or field programmable photonics can be added to ROADMs.

Figure 6:
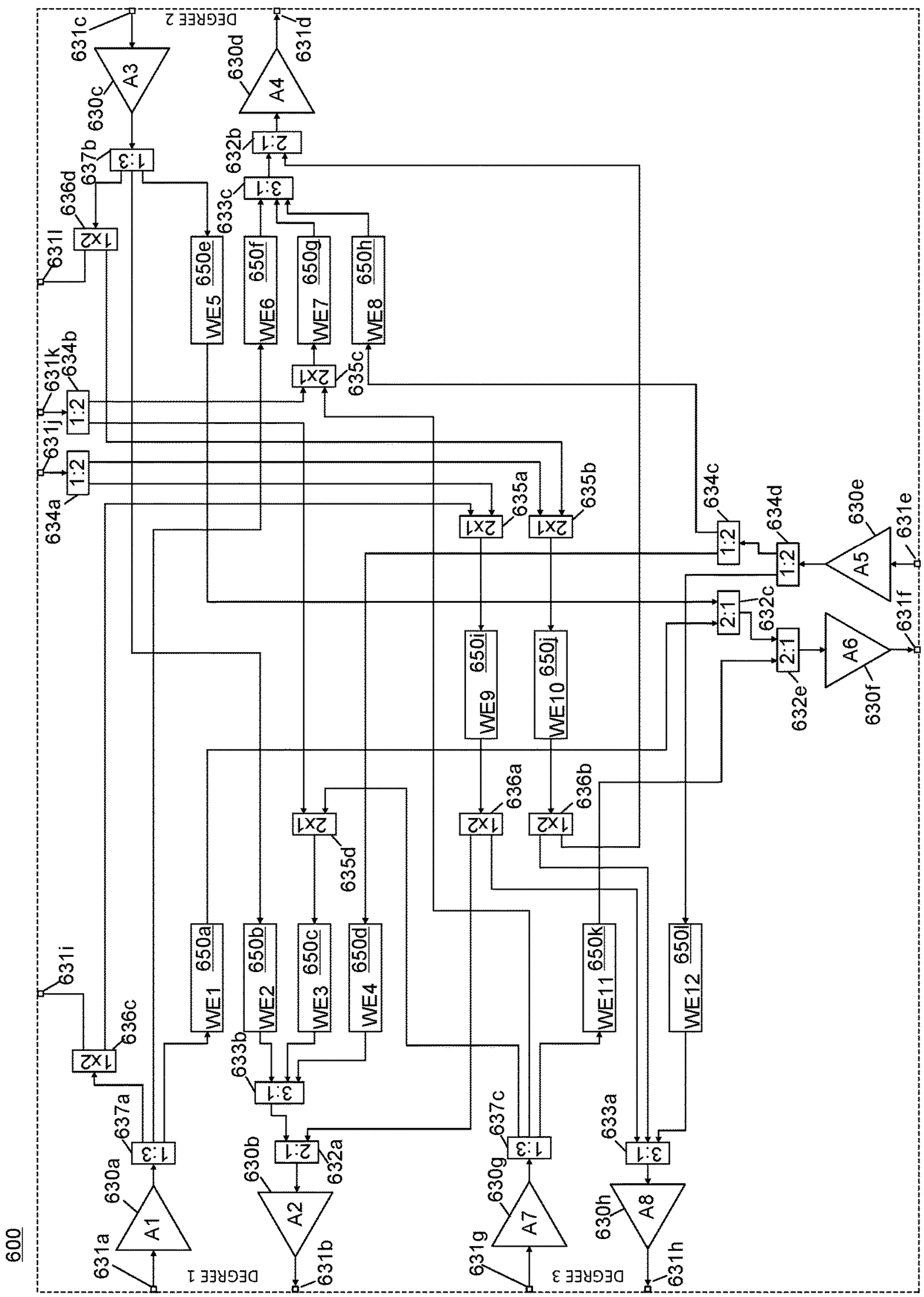
FIG. 6 is an illustration of a software programmable ROADM used to create a three or four degree optical node.

FIG. 6 shows an optical signal processor 600 that can perform the function of either optical signal processor 400 or optical signal processor 510. The dual functionality is enabled by the use of a set of 1 by 2 (636*a-d*) and 2 by 1 (635*a-d*) Single Pole Double Throw (SPDT) optical switches. Each of the optical switches 636*a-d* are broadband optical switches, meaning that each switch either forwards all the wavelengths entering the pole terminal of the switch to the first throw terminal of the switch (and forwards no wavelengths to the second throw terminal of the switch), or forwards all the wavelengths entering the pole terminal of the switch to the second throw terminal of the switch (and forwards no wavelengths to the first throw terminal of the switch). For such a switch, there is no ability to selectively forward some number of wavelengths to the first throw terminal while simultaneously forwarding some number of wavelengths to the second throw terminal—its instead designed to forward all the incoming wavelengths to a single throw terminal. Similarly, each of the optical switches 635*a-d* are broadband optical switches, meaning that all the wavelengths exiting the pole terminal of a switch are received from the first throw terminal of the switch (and no wavelengths are received from the second throw terminal of the switch), or all the wavelengths exiting the pole terminal of the switch are received from the second throw terminal of the switch (and no wavelengths are received from the first throw terminal of the switch). For such a switch, there is no ability to selectively forward some number of wavelengths from the first throw terminal while simultaneously forwarding some number of wavelengths from the second throw terminal—it's instead designed to forward all the outgoing wavelengths from a single throw terminal.

In addition to the broadband switches, some of the optical couplers may ideally be replaced with variable coupling ratio optical couplers (i.e., variable optical couplers, or VC). A common wavelength equalizing array containing twelve wavelength equalizers 300 can be used to support both functions (400, 510). An optical amplifier array containing eight amplifiers can be used to support both optical signal processor functions 400 and 510 within 600. Alternatively, if the optical signal processor is customized during manufacturing, two different optical amplifier arrays could be used, or a plurality of discrete pluggable amplifier sets could be used (one set for each pair of input/output amplifiers). Yet another alternative would be to place the optical signal processor 600 on a circuit pack with a front panel that contained slots to populate pairs of input/output amplifiers. This would easily allow an end user to populate the amplifier pair 630*g-h* only when operating the optical signal processor as a three-degree ROADM. This arrangement would also allow an end user to populate input amplifiers 630*a*, 630*c*, and 630*g* with different gain ranges in order to more efficiently accommodate optical spans of varying length.

The optical signal processor 600 is comprised of optical input ports 631*a*, 631*c*, 631*e*, 631*g*, 631*j*, 631*k*, optical output ports 631*b*, 631*d*, 631*f*, 631*h*, 631*i*, 6311, optical amplifiers 630*a-h*, wavelength equalizers 650*a*-1, optical couplers 637*a-c*, 633*a-c*, 632*a-c*, 632*e*, 634*a-d*, and broadband optical switches 635*a-d* and 636*a-d*.

In the optical signal processor 600, the three-degree function 400 can be programmed by programming optical switch 636*c* to forward its inputted wavelengths to optical switch 635*a*, programming optical switch 636*d* to direct its inputted wavelengths to optical switch 635*b*, programming optical switches 636*a* and 636*b* to direct their inputted wavelengths to optical coupler 633*a*, programming optical switches 635*c* and 635*d* to forward the wavelengths from optical coupler 637*c*, programming optical switch 635*a* to forward wavelengths from optical coupler 636*c*, and programming optical switch 635*b* to forward wavelengths from optical coupler 636*d*.

In addition, ideally, optical couplers 632*a* and 632*b* should be variable optical couplers wherein in the 400 application all the light exiting them should originate from optical couplers 633*b* and 633*c* respectively. For the 510 application, one quarter (¼) of the light exiting couplers 632*a* and 632*b* respectively should come from optical switches 636*a* and 636*b* respectively. Using other variable optical couplers in place of fixed coupling ratio optical couplers may also further optimize the application for the lowest insertion losses through various optical paths.

In optical signal processor 600, the four degree function 510 can be programmed using software by programming optical switch 636*c* to direct its inputted wavelengths to optical interface 631*i*, programming optical switch 636*d* to direct its inputted wavelengths to optical interface 631*l*, programming optical switches 636*a* and 636*b* to direct their inputted wavelengths to optical couplers 632*a* and 632*b* respectively, programming optical switches 635*c* and 635*d* to forward wavelengths from optical coupler 634*b*, and programming optical switches 635*a* and 635*b* to forward wavelengths from optical coupler 634*a*. Using variable optical couplers in place of fixed coupling ratio optical couplers may also further optimize the application for the lowest insertion losses through various optical paths.

From the diagram in FIG. 6, it can be seen that wavelength equalizers 650*k* and 650*l* are used only for the 400 function, and in addition optical amplifiers 630*g* and 630*h*—and their associated external interfaces 631*g* and 631*h*—are used only for the 400 function. Lastly, external interfaces 631*i*, 631*j*, 631*k*, and 631*l* are only used for the 510 function. Because the optical signal processor 600 can be software programmed to perform two different ROADM functions (i.e., applications), the optical signal processor 600 may be referred to as a software programmable ROADM.

In the optical signal processor (software programmable ROADM) 600, the broadband optical switches 636*a-d*, 635*a-d* each switch (i.e. direct) wavelength division multiplexed signals, while the wavelength equalizers 650*a-h* each switch individual wavelengths within the wavelength division multiplexed signals.

The optical signal processor (software programmable ROADM) 600 comprises a field programmable photonic device comprising a plurality of broadband optical switches 635*a-d*, each having at least one optical output and a first optical input and at least a second optical input, and used to direct a first wavelength division multiplexed signal from the first optical input to the at least one optical output when programmed for a first function, and used to direct a second wavelength division multiplexed signal from the at least a second optical input to the at least one optical output when programmed for a second function.

The optical signal processor (software programmable ROADM) 600 further comprises a first wavelength equalizer 650*f*, having only one optical input and only one optical output, and used to pass and block individual wavelengths from a first optical degree to a second optical degree when the plurality of optical switches are programmed for the first function and the second function.

The optical signal processor (software programmable ROADM) 600 further comprises a second wavelength equalizer 650*b*, having only one optical input and only one optical output, and used to pass and block individual wavelengths from the second optical degree to the first optical degree when the plurality of optical switches are programmed for the first function and the second function.

The optical signal processor (software programmable ROADM) 600 further comprises a third wavelength equalizer 650*c*, having only one optical input and only one optical output, and used to pass and block individual wavelengths from a third optical degree to the first optical degree when the plurality of optical switches are programmed for the first function, and used to pass and block individual wavelengths from an express interface 631*k* to the first optical degree when the plurality of optical switches are programmed for the second function.

The optical signal processor (software programmable ROADM) 600 further comprises a fourth wavelength equalizer 650*g*, having only one optical input and only one optical output, and used to pass and block individual wavelengths from the third optical degree to the second optical degree when the plurality of optical switches are programmed for the first function, and used to pass and block individual wavelengths from the express interface 631*k* to the second optical degree when the plurality of optical switches are programmed for the second function.

The field programmable photonic device within the optical signal processor (software programmable ROADM) 600 further comprises a second plurality of optical switches 636*a-d*, each having at least one optical input and a first optical output and at least a second optical output, and used to direct an inputted wavelength division multiplexed signal from the at least one optical input to the first optical output when programmed for the first function, and used to direct the inputted wavelength division multiplexed signal from the at least one optical input to the at least a second optical output when programmed for the second function. When programmed for the first function a first optical switch 636*a* of the second plurality of optical switches directs wavelengths from a fifth wavelength equalizer 650*i* to the third optical degree, and a second optical switch 636*b* of the second plurality of optical switches directs wavelengths from a sixth wavelength equalizer 650*j* to the third optical degree, and wherein when programmed for the second function the first optical switch 636*a* of the second plurality of optical switches directs wavelengths from the fifth wavelength equalizer 650*i* to the first optical degree, and the second optical switch 636*b* of the second plurality of optical switches directs wavelengths from the sixth wavelength equalizer 650*j* to the second optical degree. When programmed for the second function, a third optical switch 636*c* of the second plurality of optical switches directs wavelengths to the express interface 631*i*, and wherein when programmed for the first function, the third optical switch 636*c* of the second plurality of optical switches directs wavelengths away from the express interface 631*i*.

Within the optical signal processor (software programmable ROADM) 600, when programmed for the first function a first optical switch 635*a* of the plurality of optical switches directs wavelengths from the first optical degree to the fifth wavelength equalizer 650*i*, and wherein when programmed for the second function the first optical switch 635*a* of the plurality of optical switches directs wavelengths from a second express interface 631*j* to the fifth wavelength equalizer 650*i*.

Within the optical signal processor (software programmable ROADM) 600, when programmed for the first function a second optical switch 635*b* of the plurality of optical switches directs wavelengths from the second optical degree to the sixth wavelength equalizer 650*j*, and wherein when programmed for the second function the second optical switch 635*b* of the plurality of optical switches directs wavelengths from the second express interface 631*j* to the sixth wavelength equalizer 650*j*.

The optical signal processor (software programmable ROADM) 600 further comprises a wavelength equalizing array comprising the first wavelength equalizer 650*f*, the second wavelength equalizer 650*b*, the third wavelength equalizer 650*c* and the fourth wavelength equalizer 650*g*.

The optical signal processor (software programmable ROADM) 600 can further be described as comprising a plurality of optical inputs 631*a*, 631*c*, 631*j*, and 631*k*, a plurality of optical outputs 631*b*, 631*d*, and 631*h*, a plurality of wavelength equalizers 650*i-j* each comprising: a single optical input, a wavelength de-multiplexer connected to the single optical input, a plurality of variable optical attenuators connected to the wavelength de-multiplexer, a wavelength multiplexer connected to the plurality of variable optical attenuators, and a single optical output connected to the wavelength multiplexer, and a field programmable photonic device residing external to the plurality of wavelength equalizers. The field programmable photonic device may comprise: a first plurality of optical switches 635*a-b*, each having at least one optical output and a first optical input and at least a second optical input, and used to switch a first wavelength division multiplexed signal from the first optical input to the at least one optical output when programmed for a first function, and used to switch a second wavelength division multiplexed signal from the at least a second optical input to the at least one optical output when programmed for a second function, and a second plurality of optical switches 636*a-b* each having at least one optical input and a first optical output and at least a second optical output, and used to switch a wavelength division multiplexed signal from the at least one optical input to the first optical output when programmed for the first function, and used to switch the wavelength division multiplexed signal from the at least one optical input to the at least a second optical output when programmed for the second function. Within the optical signal processor (software programmable ROADM) 600, the first plurality of optical switches 635*a-b* are used to switch wavelength division multiplexed signals from the plurality of optical inputs 631*a*, 631*c*, 631*j*, 631*k* to the plurality of wavelength equalizers 650*i-j*, and wherein the second plurality of optical switches 636*a-b* are used to switch wavelength division multiplexed signals from the plurality of wavelength equalizers 650*i-j* to the plurality of optical outputs 631*b*, 631*d*, 631*h*. The plurality of wavelength equalizers 650*i-j* are used to pass and block individual wavelengths within wavelength division multiplexed signals from the first plurality of optical switches.

The optical signal processor (software programmable ROADM) 600 can further be described as comprising a wavelength equalizing array, wherein the wavelength equalizing array comprises a plurality of wavelength equalizers each comprising: a single optical input, a wavelength de-multiplexer connected to the single optical input, a plurality of variable optical attenuators connected to the wavelength de-multiplexer, a wavelength multiplexer connected to the plurality of variable optical attenuators, and a single optical output connected to the wavelength multiplexer. Additionally, the optical signal processor (software programmable ROADM) 600 further comprises a plurality of optical amplifying devices and at least one field programmable photonic device residing external to the wavelength equalizing array and comprising a plurality of optical switches that are programmable to perform a first function and a second function. When the plurality of optical switches are programmed to perform the first function, the plurality of wavelength equalizers pass and block individual wavelengths for three degrees of a three degree optical node, and wherein when the plurality of optical switches are programmed to perform the second function, the plurality of wavelength equalizers pass and block individual wavelengths for two degrees of a four degree optical node.

The plurality of optical switches comprises a first plurality of optical switches having at least one optical output and a first optical input and at least a second optical input and operational to direct a first inputted wavelength division multiplexed signal from the first optical input to the at least one optical output when programmed for the first function and operational to direct a second inputted wavelength division multiplexed signal from the at least a second optical input to the at least one optical output when programmed for the second function, and a second plurality of optical switches having at least one optical input and a first optical output and at least a second optical output and operational to direct an inputted wavelength division multiplexed signal from the at least one optical input to the first optical output when programmed for the first function and operational to direct the inputted wavelength division multiplexed signal from the at least one optical input to the at least a second optical output when programmed for the second function.

The optical signal processor (software programmable ROADM) 600 further comprises a plurality of optical inputs and a plurality of optical outputs, wherein the first plurality of optical switches are used to direct wavelength division multiplexed signals from the plurality of optical inputs to a portion of the plurality of wavelength equalizers, and wherein the portion of the plurality of wavelength equalizers are used to pass and block individual wavelengths within wavelength division multiplexed signals from the first plurality of optical switches, and wherein a number of the second plurality of optical switches are used to direct wavelength division multiplexed signals from the portion of the plurality of wavelength equalizers to the plurality of optical outputs.

Within the optical signal processor (software programmable ROADM) 600, the field programmable photonic device further comprises at least one optical coupler, used to optically combine wavelength division multiplexed signals from at least two wavelength equalizers of the plurality of wavelength equalizers. Furthermore, the field programmable photonic device further comprises at least one optical coupler, used to distribute a wavelength division multiplexed signal to a first wavelength equalizer of the plurality of wavelength equalizers and to a second wavelength equalizer of the plurality of wavelength equalizers.

Furthermore, the single optical input of each wavelength equalizer is used to input an input wavelength division multiplexed signal, and wherein the single optical output of each wavelength equalizer is used to output an output wavelength division multiplexed signal, and wherein the wavelength de-multiplexer within each wavelength equalizer is used to separate the input wavelength division multiplexed signal into a plurality of individual wavelengths, and wherein the plurality of variable optical attenuators within each wavelength equalizer are used to attenuate the plurality of individual wavelengths by some programmable amount, and wherein the wavelength multiplexer within each wavelength equalizer is used to combine the plurality of individual wavelengths from the plurality of variable optical attenuators into the output wavelength division multiplexed signal from each wavelength equalizer.

The optical signal processor (software programmable ROADM) 600 can further be described as comprising a first optical interface, a second optical interface, a third optical interface, a fourth optical interface, and a wavelength equalizing array, wherein the wavelength equalizing array comprises a plurality of wavelength equalizers each comprising: one optical input, a wavelength de-multiplexer connected to the one optical input, a plurality of variable optical attenuators connected to the wavelength de-multiplexer, a wavelength multiplexer connected to the plurality of variable optical attenuators, and one optical output connected to the wavelength multiplexer. The optical signal processor (software programmable ROADM) 600 further comprises a field programmable photonic device residing external to the wavelength equalizing array and comprising a plurality of optical switches that are programmable to perform a first function and a second function. When the plurality of optical switches are programmed to perform the first function, the plurality of wavelength equalizers pass and block individual wavelengths from the third optical interface to the first optical interface and from the third optical interface to the second optical interface, and the plurality of wavelength equalizers do not pass and block individual wavelengths from the fourth optical interface to the first optical interface and from the fourth optical interface to the second optical interface. Conversely, when the plurality of optical switches are programmed to perform the second function, the plurality of wavelength equalizers pass and block individual wavelengths from the fourth optical interface to the first optical interface and from the fourth optical interface to the second optical interface, and the plurality of wavelength equalizers do not pass and block individual wavelengths from the third optical interface to the first optical interface and from the third optical interface to the second optical interface.

Within the optical signal processor (software programmable ROADM) 600, the plurality of optical switches comprises of a first plurality of optical switches and a second plurality of optical switches. The first plurality of optical switches each have at least one switch output and a first switch input and at least a second switch input, wherein when programmed to perform the first function, light received from the first switch input is directed to the at least one switch output, and wherein when programmed to perform the second function, light received from the at least a second switch input is directed to the at least one switch output. The second plurality of optical switches each have at least one switch input and a first switch output and at least a second switch output, wherein when programmed to perform the first function, light received from the at least one switch input is directed to the first switch output, and wherein when programmed to perform the second function, light received from the at least one switch input is directed to the at least a second switch output.

The first optical interface of the optical signal processor (software programmable ROADM) 600 may be a first optical degree of an optical node, and the second optical interface may be a second optical degree of the optical node, and the third optical interface may be a third optical degree of the optical node, and the fourth optical interface may be a first express interface.

The optical signal processor (software programmable ROADM) 600 may further comprise a fifth optical interface, wherein when the plurality of optical switches are programmed to perform the first function, the plurality of wavelength equalizers do not pass and block individual wavelengths from the fifth optical interface to the first optical interface and from the fifth optical interface to the second optical interface, and wherein when the plurality of optical switches are programmed to perform the second function, the plurality of wavelength equalizers pass and block individual wavelengths from the fifth optical interface to the first optical interface and from the fifth optical interface to the second optical interface.

Within the optical signal processor (software programmable ROADM) 600, the first optical interface may be a first optical degree of an optical node, and the second optical interface may be a second optical degree of the optical node, and the third optical interface may be a third optical degree of the optical node, and the fourth optical interface may be a first express interface, and the fifth optical interface may be a second express interface.

Within the optical signal processor (software programmable ROADM) 600, when the plurality of optical switches are programmed to perform the first function, the plurality of wavelength equalizers pass and block individual wavelengths between the first optical interface and the second optical interface, and when the plurality of optical switches are programmed to perform the second function, the plurality of wavelength equalizers pass and block individual wavelengths between the first optical interface and the second optical interface.

Figure 7:
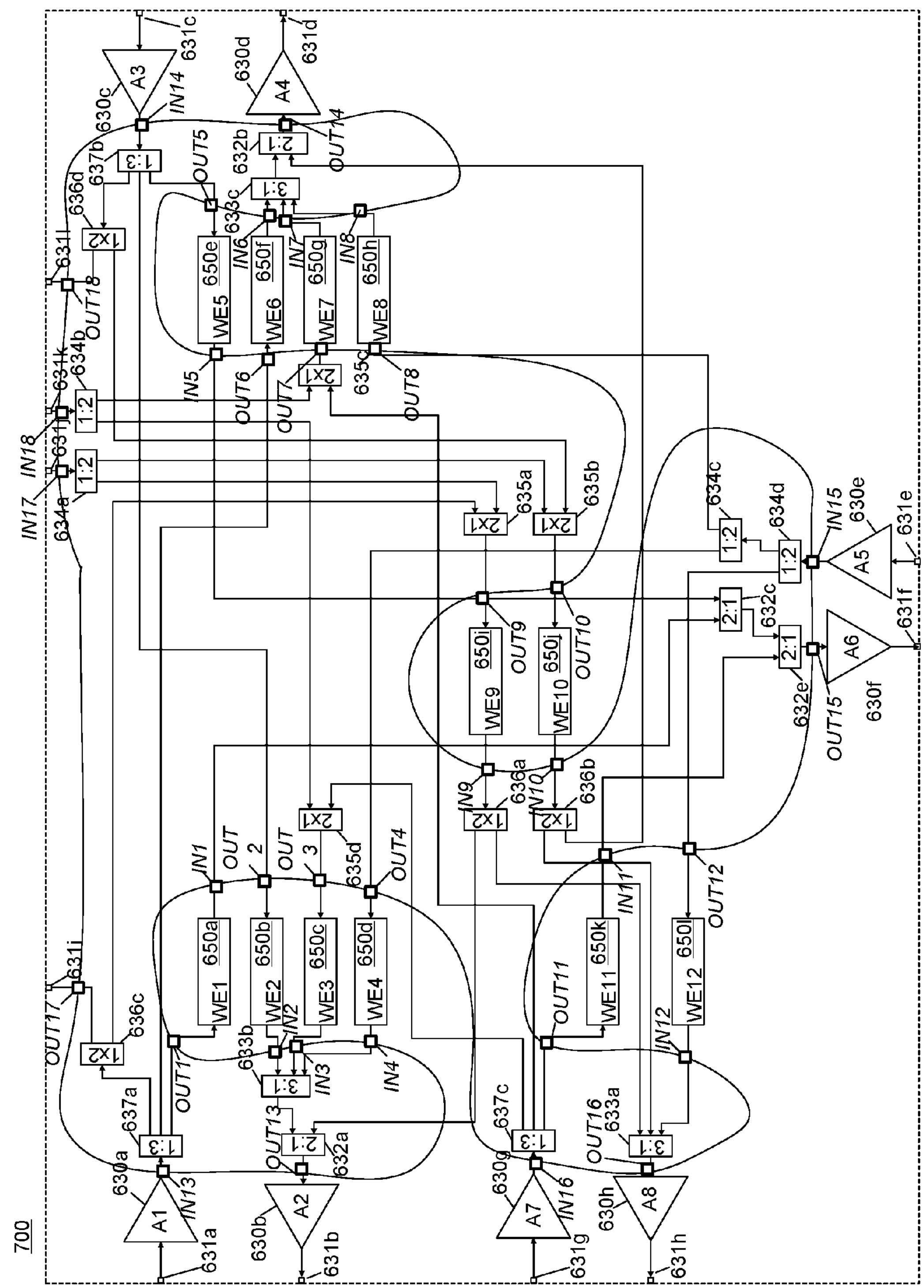
FIG. 7 is a detailed illustration of a software programmable ROADM used to create a three or four-degree optical node, with field programmable photonics.

FIG. 7 illustrates the optical elements of 600 that would be placed in a field programmable photonic device. As can be seen in 700, the elements that would be placed in the field programmable photonic device have been circled, and only the optical amplifiers and wavelength equalizers are placed outside of the field programmable photonic device. Additionally PLC based wavelength equalizers may be placed within the field programmable photonic device if this makes economic sense in the future. The inputs and outputs of the field programmable photonic device have been labeled as INi and OUTi in FIG. 7. As can be seen, there are 18 optical inputs to the FPP device, and 18 optical outputs.

Figure 8:
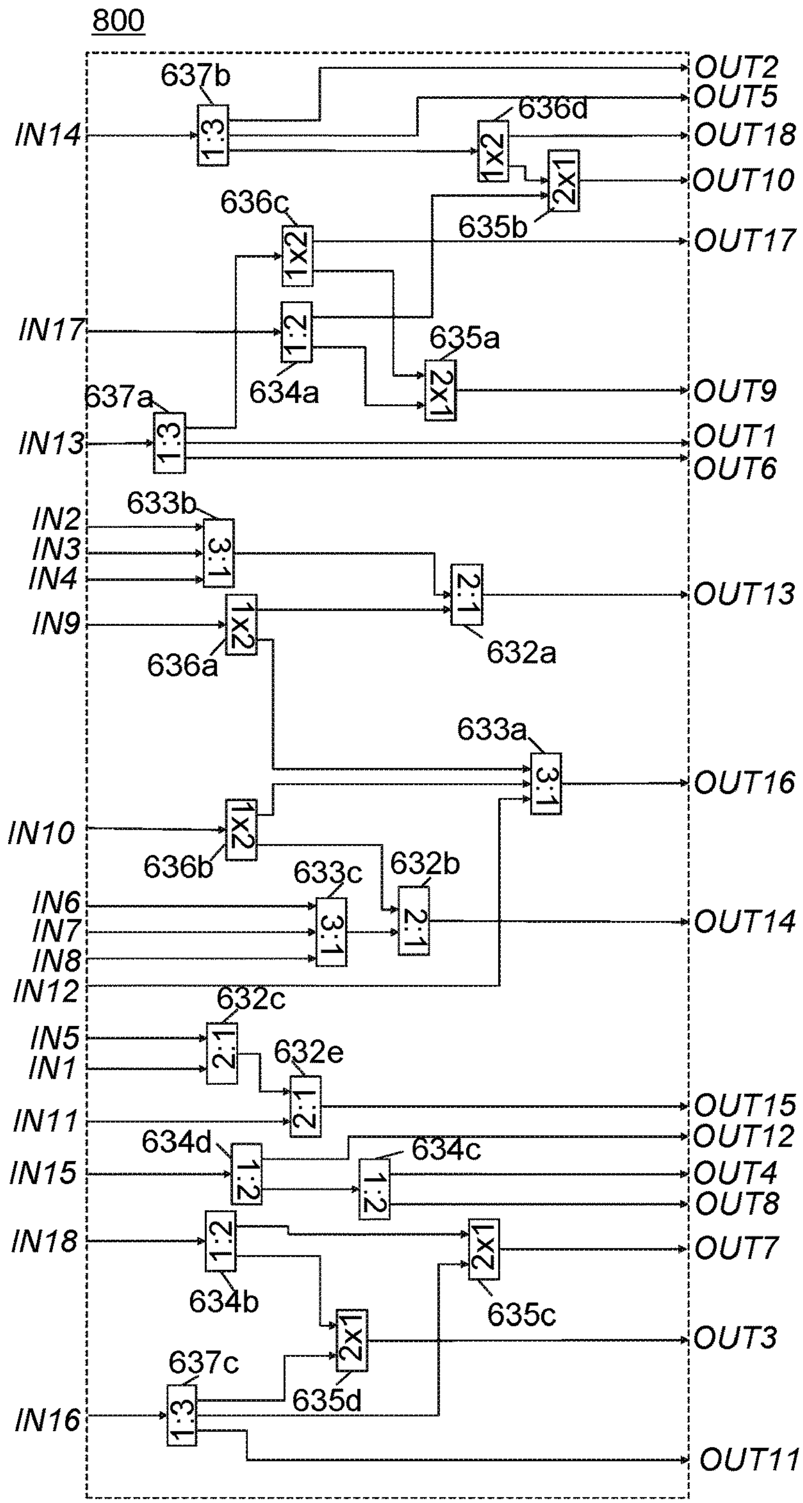
FIG. 8 is a detailed look inside of a field programmable photonic device.

FIG. 8 shows the field programmable photonic elements of 700 grouped together into one field programmable photonic (FPP) device 800, wherein the entry and exit labels INi and OUTi in 800 correspond to the labels INi and OUTi of the entry and exit points of the FPP in 700. As can be seen, the field programmable photonic device 800 is comprised of a plurality of optical coupler devices 632*a-c*, 632*e*, 633*a-c*, 634*a-d*, 637*a-c*, whose interconnection to the input and output ports of the device is done using broadband optical switches 636*a-d*, 637*a-d*. Additionally (not shown), broadband optical switches could be used to interconnect one or more optical couplers together within the field programmable photonic device, in order to add additional functionality. The optical couplers and optical switches in 800 may be integrated together on a common substrate in order to enable the mass manufacture of the field programmable photonic device.

Figure 9:
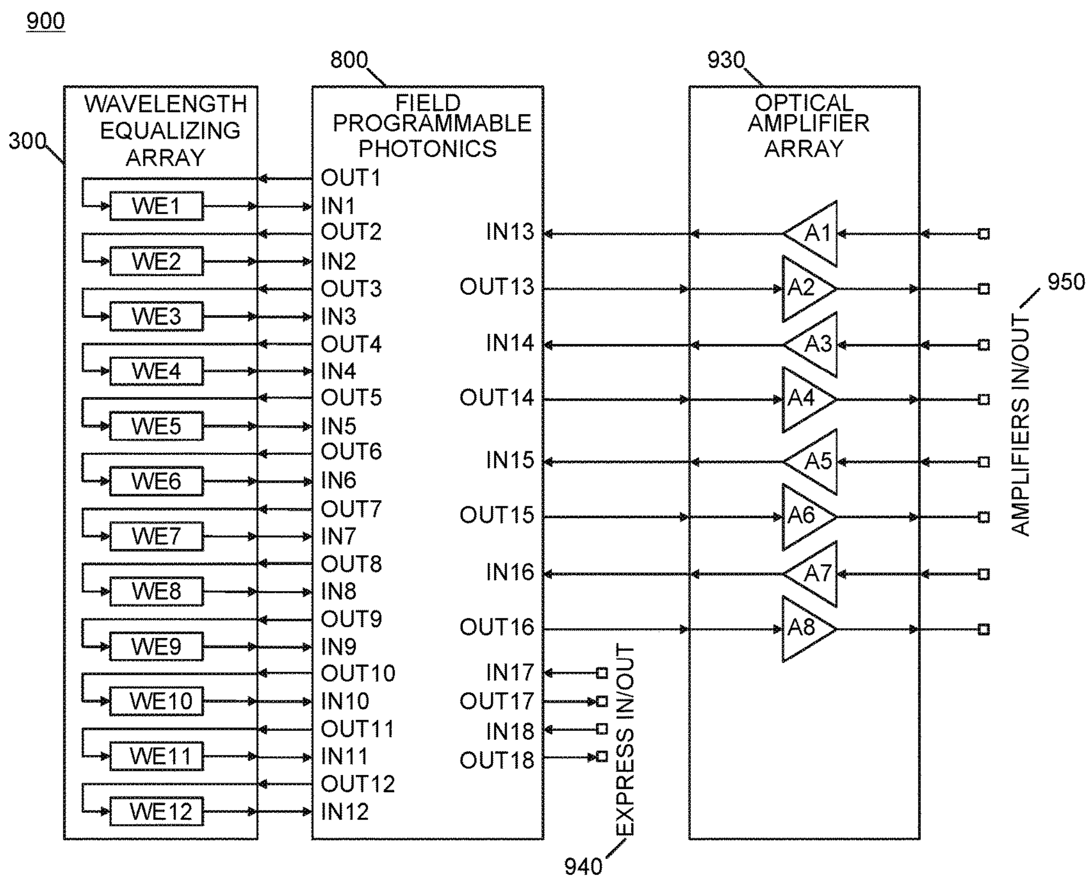
FIG. 9 is a high-level diagram showing the three optical building blocks of a software programmable ROADM used to create a three or four-degree optical node.

FIG. 9 is a high level diagram showing the three optical building blocks of an optical signal processor (software programmable ROADM) that can be used to create a three or four degree optical node. Interconnection between the three major components may most easily be done by using parallel fiber optic cables with MTP optical connectors. The ROADM 900 comprises, wavelength equalizing array 300, field programmable photonics 800, optical amplifier array 930, express inputs and outputs 940, and amplifier inputs and outputs 950. The wavelength equalizing array 300 may be substantially the same as the wavelength equalizing array 300 discussed in reference to FIG. 3. The field programmable photonic device 800 may be substantially the same as the field programmable photonic device 800 discussed in reference to FIG. 8.

Based upon the previous embodiments, it is clear that the wavelength equalizing array becomes a common building block that can be paired with field programmable optics to build optical signal processors with any number of functions—limited only by the complexity of the field programmable photonics. For instance, in addition to the two, three, and four degree integrated ROADM products that can be built with the described field programmable photonics, additional optical circuitry could be added to the FPP that would provide for some number of colorless optical add/drop ports for a non-expandable two degree ROADM.

Figure 10A:
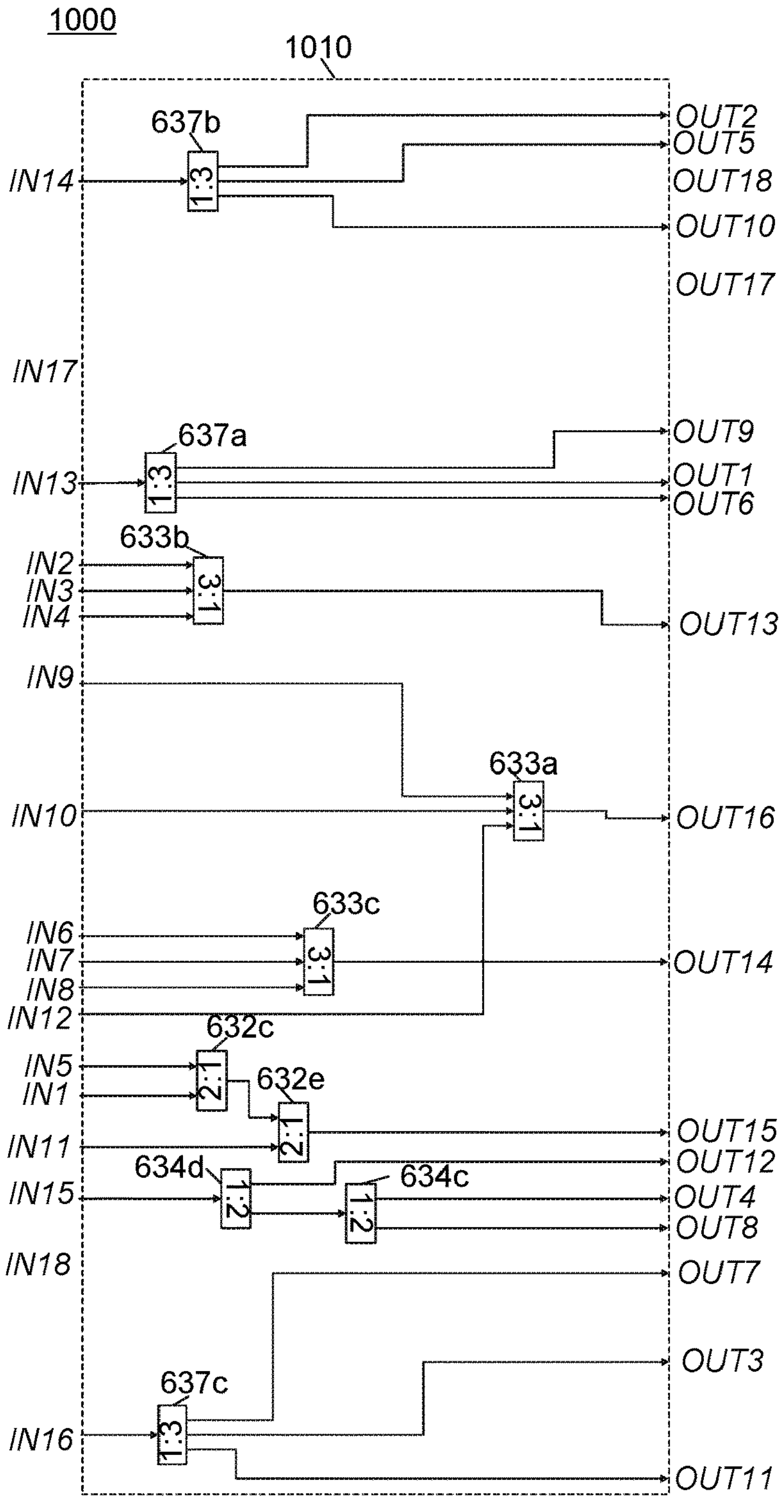
FIG. 10A is a detailed look inside of an application specific photonic device used to construct a three-degree optical node.
Figure 10B:
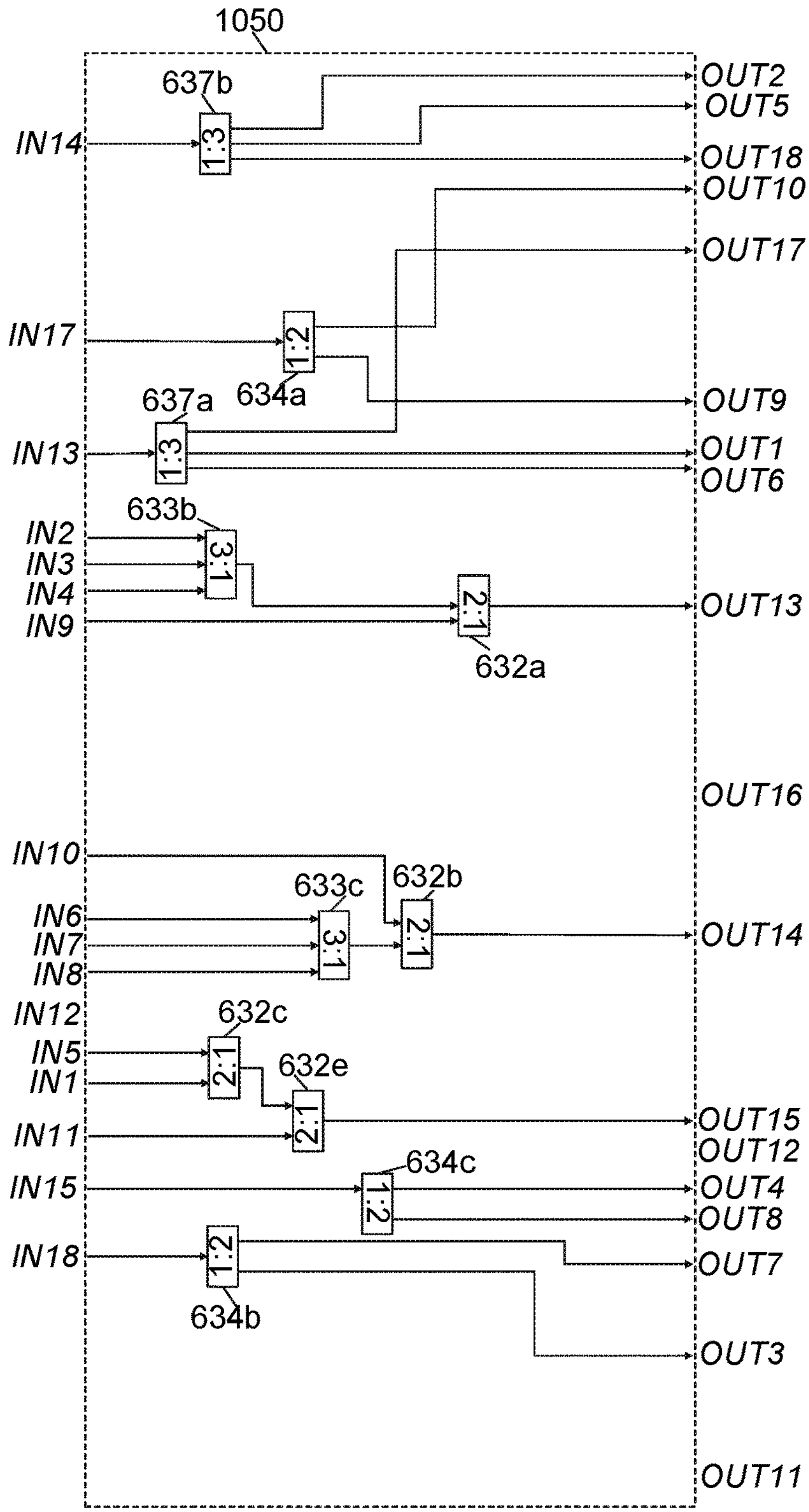
FIG. 10B is a detailed look inside of an application specific photonic device used to construct a four-degree optical node.

As an alternative to using a single field programmable photonic device 800, multiple Application Specific Photonic (ASP) devices may be used to create optical signal processors with differing capabilities. The Application Specific Photonic devices may have substantially the same physical form factor, electrical connectors, and optical connectors, in order to allow one to easily swap between different single-application photonic devices when configuring the optical signal processor for various applications. For instance, FIG. 10A and FIG. 10B 1000 show two Application Specific Photonic devices 1010, 1050 which could be used in place of the field programmable photonic device 800 on optical signal processor 900 in FIG. 9.

Application Specific Photonic device 1010 is used to implement the optical signal processor 400, while Application Specific Photonic device 1050 is used to implement the optical signal processor 510.

As indicated, the application specific photonic device 1010 is comprised of optical coupler devices 632*c*, 632*e*, 633*a-c*, 634*c-d*, 637*a-c*, and the application specific photonic device 1050 is comprised of a plurality of optical coupler devices 632*a-c*, 632*e*, 633*b-c*, 634*a-c*, 637*a-b*. Additionally (not shown), other fixed and programmable optical devices could be contained within the application specific photonic devices in order to provide additional functionality. The optical couplers (and optionally other fixed and programmable optical devices) in 1010 and 1050 may be integrated together on a common substrate in order to enable the mass manufacture of the application specific photonic device.

A method of constructing an optical signal processor may consist of utilizing at least one wavelength processing device to operate on individual wavelengths, a plurality of optical amplifying devices to amplify groups of wavelengths, and a field programmable photonic device to allow the optical signal processor and to perform multiple networking applications.

Figure 11:
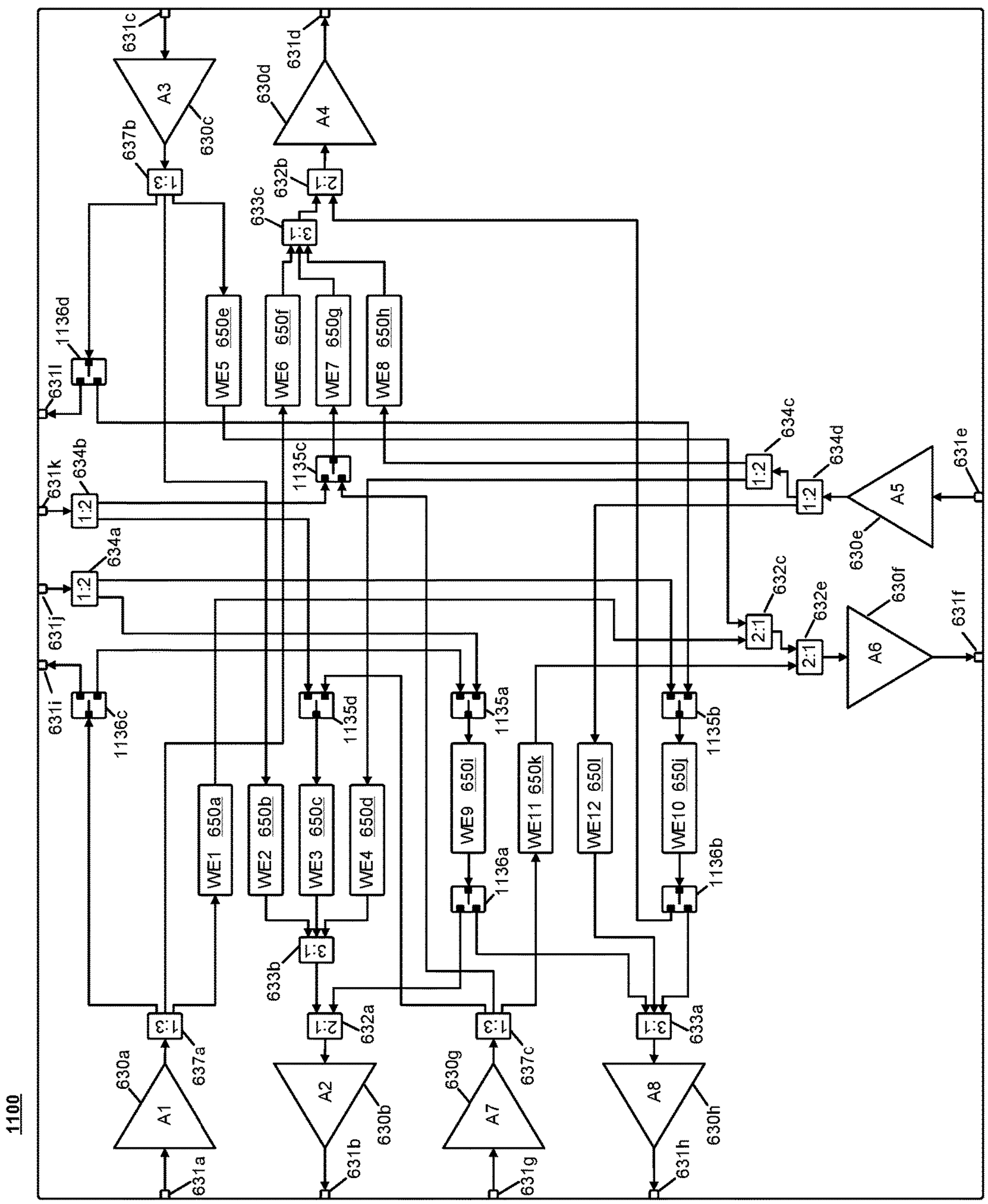
FIG. 11 is an illustration of a software programmable ROADM used to create a three or four-degree optical node.

FIG. 11 illustrates a redrawn version of the optical signal processor (software programmable ROADM) 600 of FIG. 6, now identified as 1100. In FIG. 11, each of the single-pole double-throw 2×1 optical switches 635*a-d* have been redrawn 1135*a-d* to explicitly show the single-pole and double-throw connections of each switch. Similarly, each of the single-pole double-throw 1×2 optical switches 636*a-d* have been redrawn 1136*a-d* to explicitly show the single-pole and double-throw connections of each switch. In FIG. 11 each of the single-pole double-throw switches are drawn as having their poles connected to neither throw position to indicate that a connection can be made from the pole of a switch to either throw position.

Each of the optical switches 1136*a-d* (636*a-d*) are broadband optical switches, meaning that each switch either forwards all the wavelengths entering the pole terminal of the switch to the first throw terminal of the switch (and forwards no wavelengths to the second throw terminal of the switch), or forwards all the wavelengths entering the pole terminal of the switch to the second throw terminal of the switch (and forwards no wavelengths to the first throw terminal of the switch). For such a switch, there is no ability to selectively forward some number of wavelengths to the first throw terminal while simultaneously forwarding some number of wavelengths to the second throw terminal—its instead designed to forward all the incoming wavelengths to a single throw terminal. For a given optical switch 1136*a-d* (636*a-d*), since all the wavelengths of the waveguide attached to the pole of the optical switch 1136*a-d* are forwarded to the waveguide connected to the first throw terminal of the given switch (and none to the second throw terminal of the given switch), or all the wavelengths of the waveguide attached to the pole of the optical switch 1136*a-d* are forwarded to the waveguide connected to the second throw terminal of the given switch (and none to the first throw terminal of the given switch), each of the optical switches 1136*a-d* (636*a-d*) can also be referred to as waveguide switches. Similarly, each of the optical switches 1135*a-d* (635*a-d*) can also be referred to as waveguide switches. Each waveguide switch 1135*a-d*, 1136*a-d* (635*a-d*, 636*a-d*) may be constructed using one or more Mach-Zehnder interferometers (MZIs), or they be constructing using other optical techniques.

Conversely, since the wavelength equalizers 650*a-h* are able to be configured to selectively pass some wavelengths while blocking other wavelengths, the wavelength equalizers 650*a-h* may be referred to as wavelength switches. A wavelength selective switch (WSS) is also a type of wavelength switch.

Figure 12:
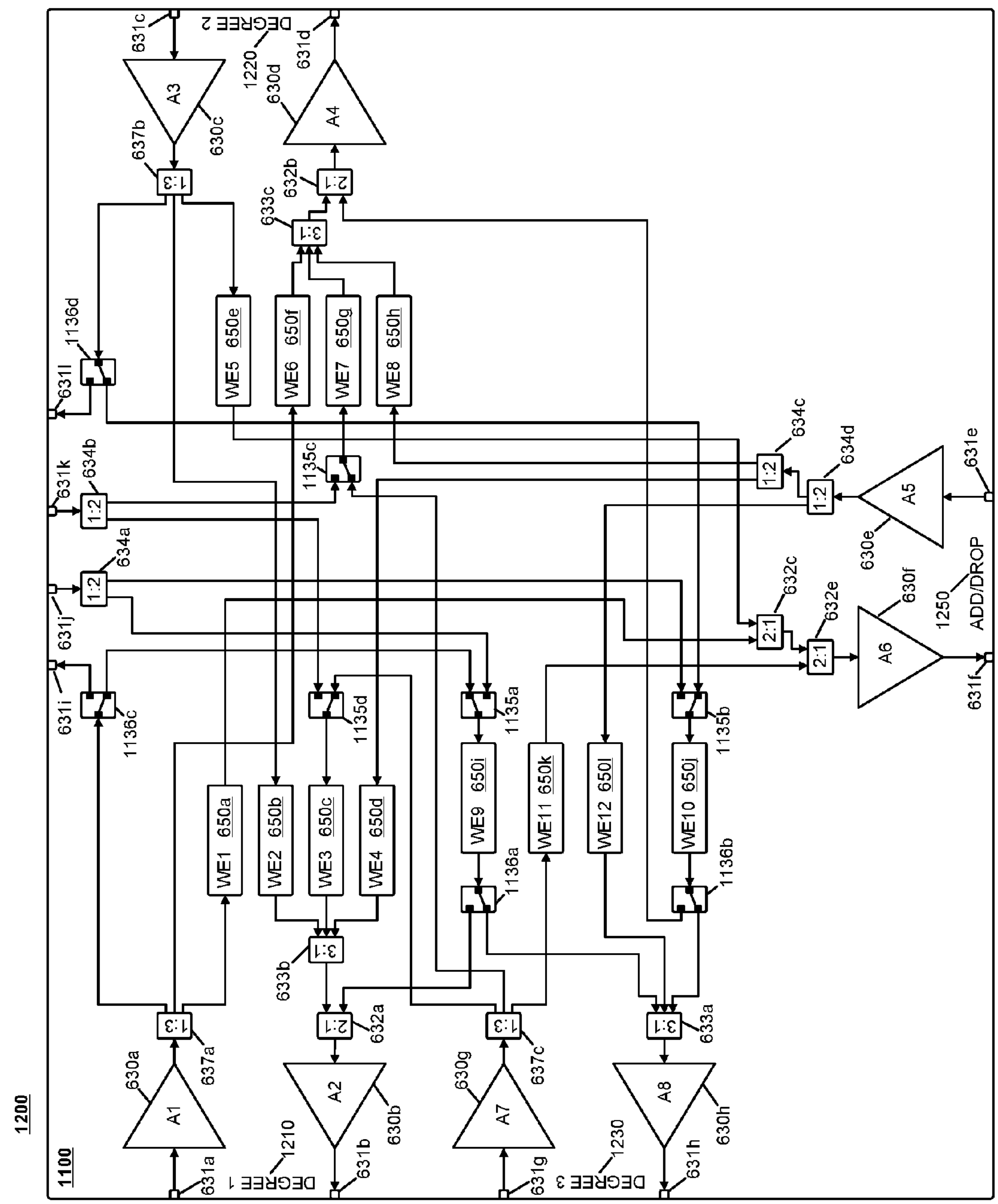
FIG. 12 is an illustration of the FIG. 11 software programmable ROADM configured to create a three-degree optical node.

FIG. 12 is an illustration of the FIG. 11 optical signal processor (software programmable ROADM) 1100 configured as a three-degree optical node 1200. For this configuration, optical degree one 1210 comprises of the optical interfaces 631*a-b*, optical degree two 1220 comprises of the optical interfaces 631*c-d*, optical degree three 1230 comprises of the optical interfaces 631*g-h*, and the directionless add/drop port 1250 comprises of the optical interfaces 631*e-f*. As shown in FIG. 12, the optical switches 1136*c*, 1135*a*, and 1136*a* are configured to forward wavelengths from degree one 1210 towards degree three 1230, and optical switches 1136*d*, 1135*b*, and 1136*b* are configured to forward wavelengths from degree two 1220 towards degree three 1230, and optical switch 1135*d* is configured to forward wavelengths from degree three 1230 towards degree one 1210, and optical switch 1135*c* is configured to forward wavelengths from degree three 1230 towards degree two 1220.

In FIG. 12, optical switch 1136*c* is configured to forward a copy of all the wavelengths arriving at degree one 1210 to optical switch 1135*a* (instead of to the express output of interface 631*i*). In FIG. 12, optical switch 1135*a* is configured to forward all the wavelengths from optical switch 1136*c* to the wavelength equalizer 650*i*. In FIG. 12, the wavelength equalizer 650*i* is configured to selectively pass and block individual wavelengths from optical switch 1135*a* to optical switch 1136*a*. In FIG. 12, optical switch 1136*a* is configured to forward all the wavelengths from wavelength equalizer 650*i* to degree three 1230.

In FIG. 12, optical switch 1136*d* is configured to forward a copy of all the wavelengths arriving at degree two 1220 to optical switch 1135*b* (instead of to the express output of interface 631*i*). In FIG. 12, optical switch 1135*b* is configured to forward all the wavelengths from optical switch 1136*d* to the wavelength equalizer 650*j*. In FIG. 12, the wavelength equalizer 650*j* is configured to selectively pass and block individual wavelengths from optical switch 1135*b* to optical switch 1136*b*. In FIG. 12, optical switch 1136*b* is configured to forward all the wavelengths from wavelength equalizer 650*j* to degree three 1230.

In FIG. 12, optical switch 1135*d* is configured to forward a copy of all the wavelengths from degree three 1230 to the wavelength equalizer 650*c*. In FIG. 12, the wavelength equalizer 650*c* is configured to selectively pass and block individual wavelengths from optical switch 1135*d* to degree one 1210.

In FIG. 12, optical switch 1135*c* is configured to forward a copy of all the wavelengths from degree three 1230 to the wavelength equalizer 650*g*. In FIG. 12, the wavelength equalizer 650*g* is configured to selectively pass and block individual wavelengths from optical switch 1135*c* to degree two 1220.

In FIG. 12, wavelength equalizers 650*b-d* are used to pass and block individual wavelengths from degree two 1220, from degree three 1230, and from the directionless add/drop port 1250, to degree one 1210, while wavelength equalizers 650*f-h* are used to pass and block individual wavelengths from degree one 1210, from degree three 1230, and from the directionless add/drop port 1250, to degree two 1220, while wavelength equalizers 650*i*, 650*j*, and 650*l* are used to pass and block individual wavelengths from degree one 1210, from degree two 1220, and from the directionless add/drop port 1250, to degree three 1230, while wavelength equalizers 650*a*, 650*e*, and 650*k* are used to pass and block individual wavelengths from degree one 1210, from degree two 1220, and from degree three 1230, to the add/drop port 1250.

In FIG. 12, the express interfaces 631*i*, 631*j*, 631*k*, and 631*l* are not used.

Figure 13A:
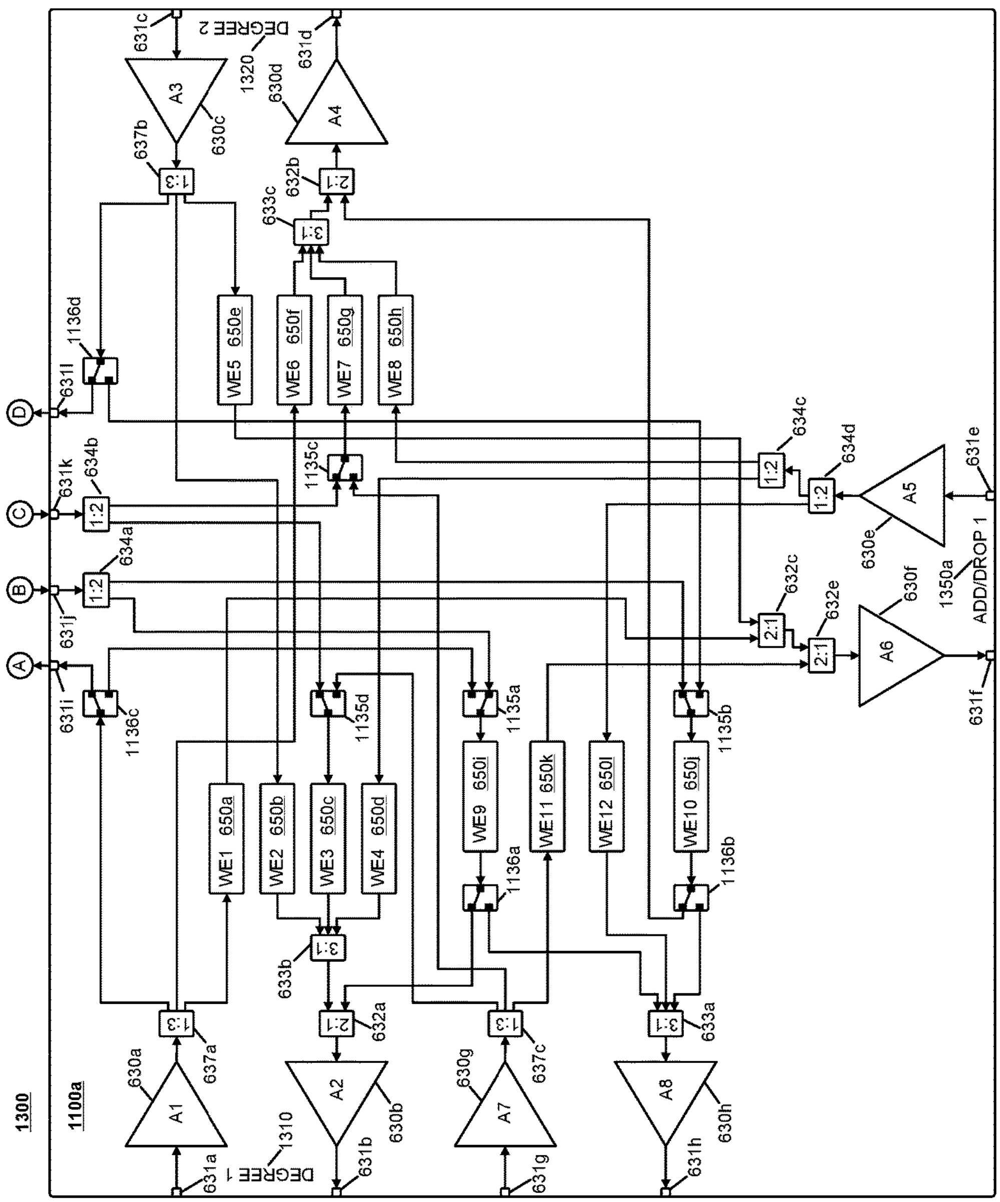
FIGS. 13A and 13B illustrate two FIG. 11 software programmable ROADMs connected and configured to create a four-degree optical node.
Figure 13B:
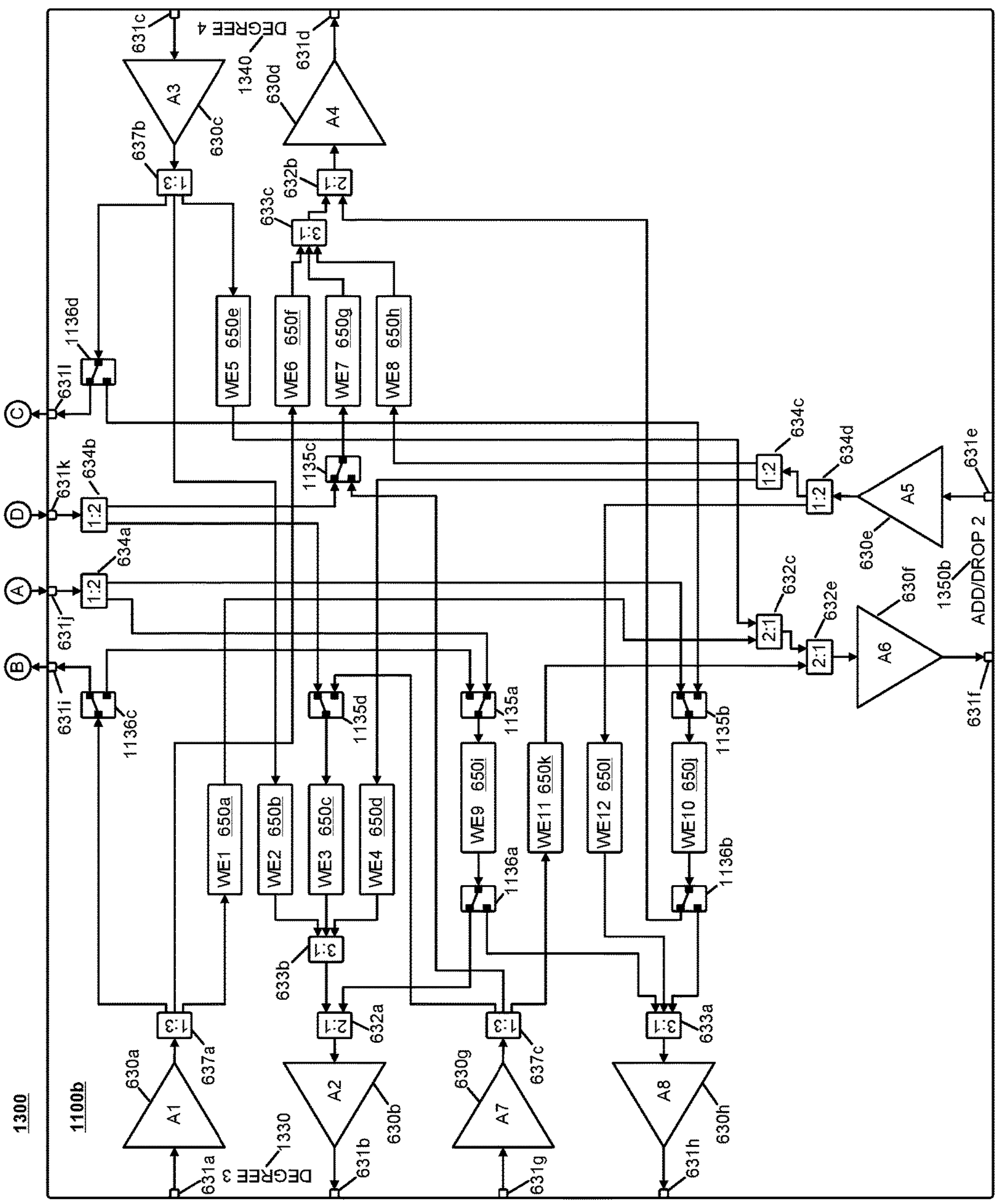

FIG. 13A and FIG. 13B is an illustration of two of the FIG. 11 optical signal processors (software programmable ROADMs) 1100*a*,1100*b* configured as a four-degree optical node 1300. For this configuration, optical degree one 1310 comprises of the optical interfaces 631*a-b* of FIG. 13A, optical degree two 1320 comprises of the optical interfaces 631*c-d* of FIG. 13A, optical degree three 1330 comprises of the optical interfaces 631*a-b* of FIG. 13B, optical degree four 1340 comprises of the optical interfaces 631*c-d* of FIG. 13B, directionless add/drop port one 1350*a* comprises of the optical interfaces 631*e-f* of FIG. 13A, and directionless add/drop port two 1350*b* comprises of the optical interfaces 631*e-f* of FIG. 13B.

In FIG. 13A and FIG. 13B, optical interface 631*i* of 1100*a* is connected to optical interface 631*j* of 1100*b*, optical interface 631*j* of 1100*a* is connected to optical interface 631*i* of 1100*b*, optical interface 631*k* of 1100*a* is connected to optical interface 631*l* of 1100*b*, and optical interface 631*l* of 1100*a* is connected to optical interface 631*k* of 1100*b*. The signal connections between FIG. 13A and FIG. 13B are indicated by the letter encircled sheet-to-sheet connection indicators A, B, C, and D.

As shown in FIG. 13A and FIG. 13B, optical switch 1136*c* of FIG. 13A is configured to forward wavelengths from degree one 1310 on optical signal processor 1100*a* towards degrees three 1330 and four 1340 on optical signal processor 1100*b*, and optical switch 1136*d* of FIG. 13A is configured to forward wavelengths from degree two 1320 on optical signal processor 1100*a* towards degrees three 1330 and four 1340 on optical signal processor 1100*b*, and optical switch 1136*c* of FIG. 13B is configured to forward wavelengths from degree three 1330 on optical signal processor 1100*b* towards degrees one 1310 and two 1320 on optical signal processor 1100*a*, and optical switch 1136*d* of FIG. 13B is configured to forward wavelengths from degree four 1340 on optical signal processor 1100*b* towards degrees one 1310 and two 1320 on optical signal processor 1100*a*, and optical switches 1135*a* and 1136*a* of FIG. 13A are configured to forward wavelengths from degree three 1330 on optical signal processor 1100*b* towards degree one 1310 on optical signal processor 1100*a*, and optical switches 1135*b* and 1136*b* of FIG. 13A are configured to forward wavelengths from degree three 1330 on optical signal processor 1100*b* towards degree two 1320 on optical signal processor 1100*a*, and optical switch 1135*c* of FIG. 13A is configured to forward wavelengths from degree four 1340 on optical signal processor 1100*b* towards degree two 1320 on optical signal processor 1100*a*, and optical switch 1135*d* of FIG. 13A is configured to forward wavelengths from degree four 1340 on optical signal processor 1100*b* towards degree one 1310 on optical signal processor 1100*a*, and optical switches 1135*a* and 1136*a* of FIG. 13B are configured to forward wavelengths from degree one 1310 on optical signal processor 1100*a* towards degree three 1330 on optical signal processor 1100*b*, and optical switches 1135*b* and 1136*b* of FIG. 13B are configured to forward wavelengths from degree one 1310 on optical signal processor 1100*a* towards degree four 1340 on optical signal processor 1100*b*, and optical switch 1135*c* of FIG. 13B is configured to forward wavelengths from degree two 1320 on optical signal processor 1100*a* towards degree four 1340 on optical signal processor 1100*b*, and optical switch 1135*d* of FIG. 13B is configured to forward wavelengths from degree two 1320 on optical signal processor 1100*a* towards degree three 1330 on optical signal processor 1100*b*.

In FIG. 13A, wavelength equalizers 650*b-d* and 650*i* are used to pass and block individual wavelengths from degree two 1320, from degree three 1330, from degree four 1340 and from the directionless add/drop port one 1350*a*, to degree one 1310, while wavelength equalizers 650*f-h* and 650*j* are used to pass and block individual wavelengths from degree one 1310, from degree three 1330, from degree four 1340, and from the directionless add/drop port 1350*a*, to degree two 1320, while wavelength equalizers 650*a* and 650*e*, are used to pass and block individual wavelengths from degree one 1310, and from degree two 1320 to the add/drop port 1350*a*.

In FIG. 13B, wavelength equalizers 650*b-d* and 650*i* are used to pass and block individual wavelengths from degree one 1310, from degree two 1320, from degree four 1340, and from the directionless add/drop port one 1350*b*, to degree three 1330, while wavelength equalizers 650*f-h* and 650*j* are used to pass and block individual wavelengths from degree one 1310, from degree two 1320, from degree three 1330, and from the directionless add/drop port 1350*b*, to degree four 1340, while wavelength equalizers 650*a* and 650*e*, are used to pass and block individual wavelengths from degree three 1330, and from degree four 1340 to the add/drop port 1350*b*.

In FIG. 13A and FIG. 13B, the interfaces 631*g*, and 631*h* are not used.

Since each of the waveguide switches 1135*a-d* and 1136*a-d* in FIG. 12, FIG. 13A and FIG. 13B have two throw positions, each of the waveguide switches have two states. From inspection of FIG. 12, FIG. 13A and FIG. 13B, it is evident that there are two configurations of switch settings used. The optical signal processor 1100 of 1200 utilizes a first switch setting configuration, while the optical signal processors 1100*a* and 1100*b* of 1300 use a second switch setting configuration. In 1300, the switch setting configuration of optical signal processor 1100*a* is identical to the switch setting configuration of optical signal processor 1100*b*, while the switch setting configuration of optical signal processor 1100 in 1200 differs from that of optical signal processors 1100*a* and 1100*b* of 1300.

Figure 14:
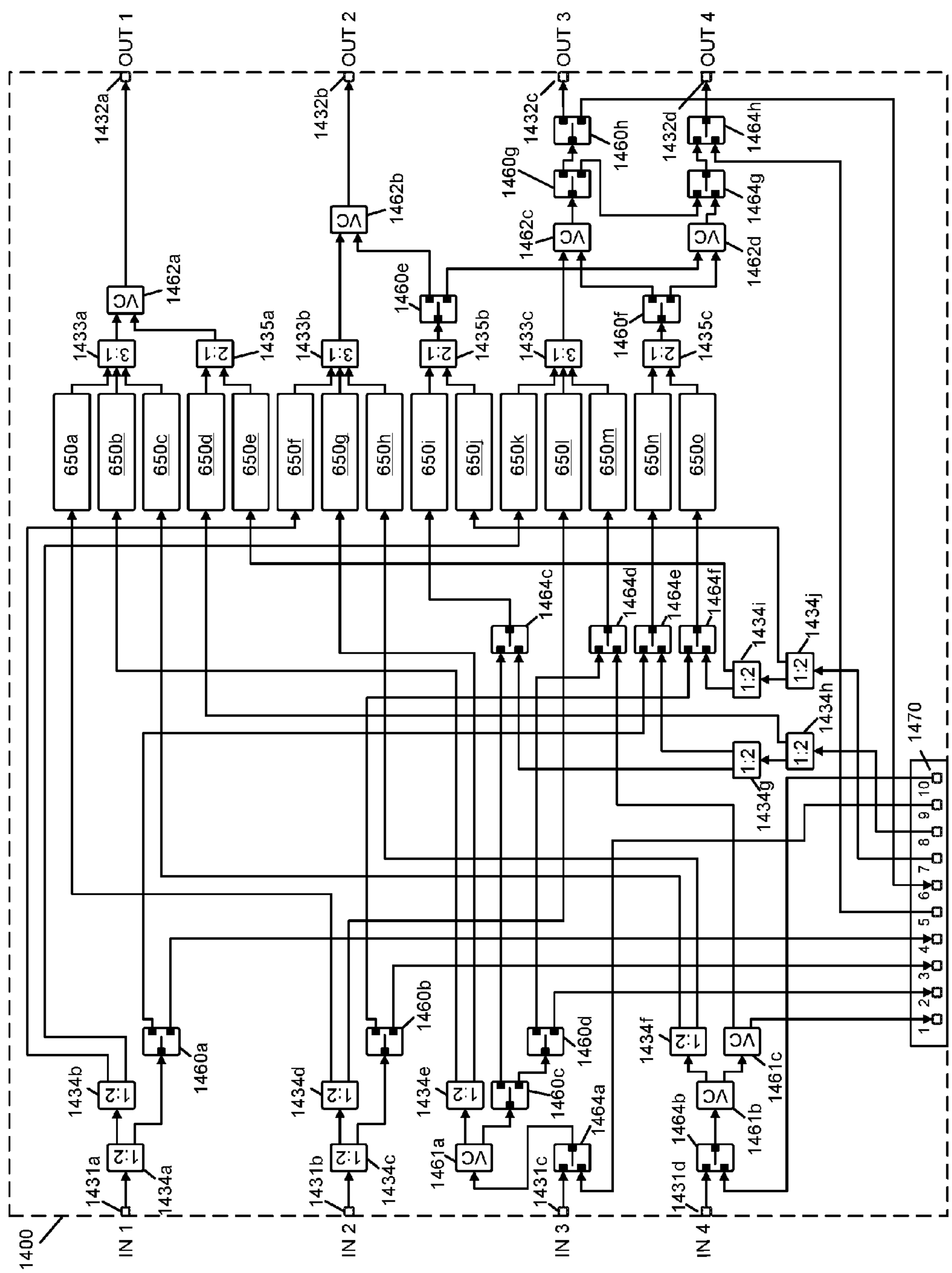
FIG. 14 is an illustration of a software programmable ROADM used to construct two, three, four, and five-degree optical nodes.

FIG. 14 depicts another optical signal processor (software programmable ROADM) 1400. The software programmable ROADM 1400, can be used to construct two-degree optical nodes, three-degree optical nodes, four-degree optical nodes, and five-degree optical nodes. Additionally, the software programmable ROADM 1400 provides either one, two, three, or four directionless add/drop ports—depending upon the configuration of the ROADM. A single software programmable ROADM 1400 can be used to construct optical nodes having two or three optical degrees, while two of the software programmable ROADMs 1400 are required to construct optical nodes having four or five optical degrees. A two-degree optical node using a single software programmable ROADM 1400 can have up to two directionless add/drop ports, while a three-degree optical node using a single software programmable ROADM 1400 can have only one directionless add/drop port. Similarly, a four-degree optical node using two software programmable ROADMs 1400 can have up to two directionless add/drop ports, while a five-degree optical node using two software programmable ROADM 1400 can have only one directionless add/drop port. Table 1 summarizes the various node configurations and their properties.

TABLE 1

Figure 15:
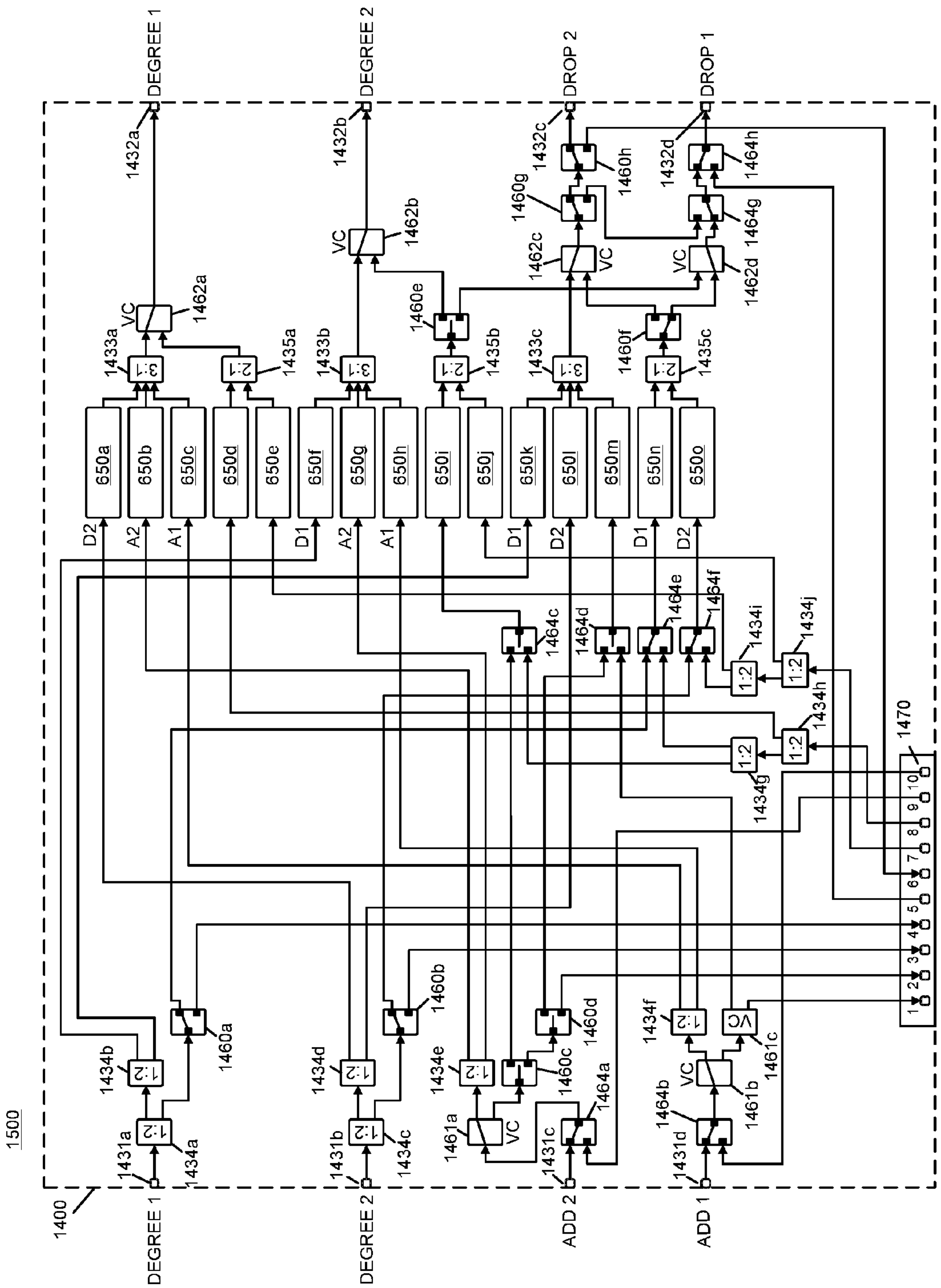
FIG. 15 illustrates the use of the FIG. 14 software programmable ROADM to construct a two-degree optical node with two directionless add/drop ports.
Figure 16:
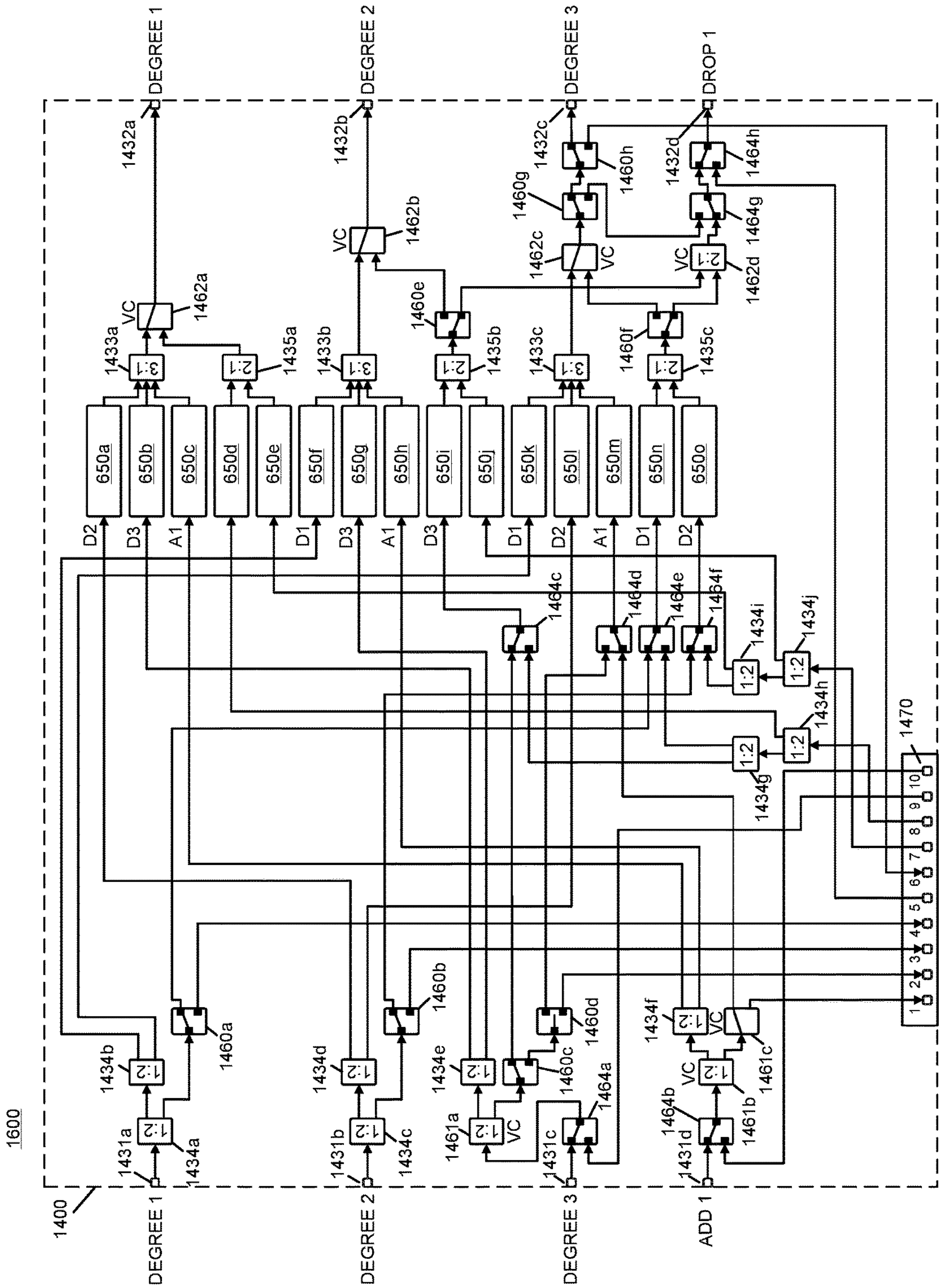
FIG. 16 illustrates the use of the FIG. 14 software programmable ROADM to construct a three-degree optical node with a single directionless add/drop port.
Figure 17A:
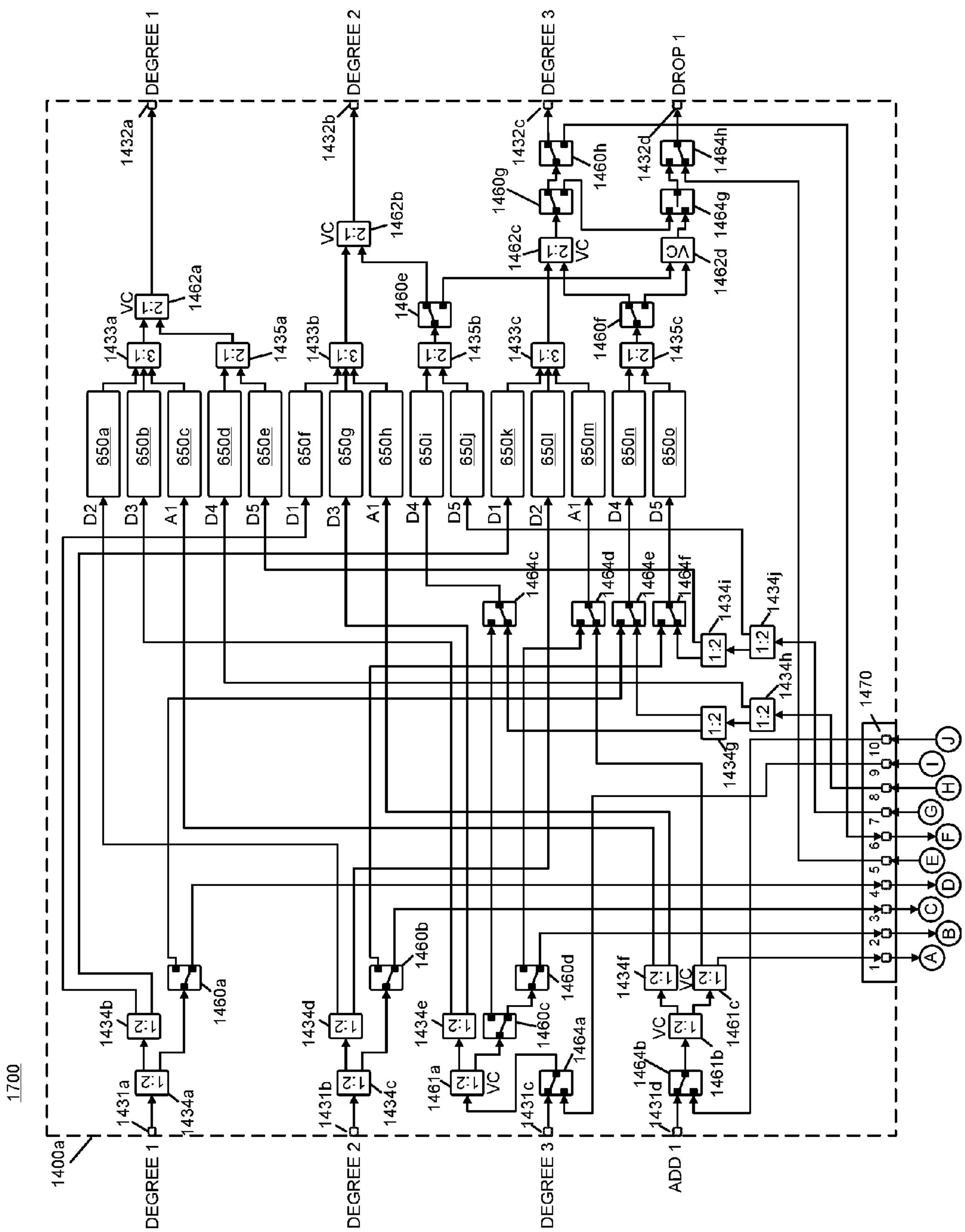
FIGS. 17A and 17B illustrate the use of two FIG. 14 software programmable ROADMs to construct a five-degree optical node with a single directionless add/drop port.
Figure 18A:
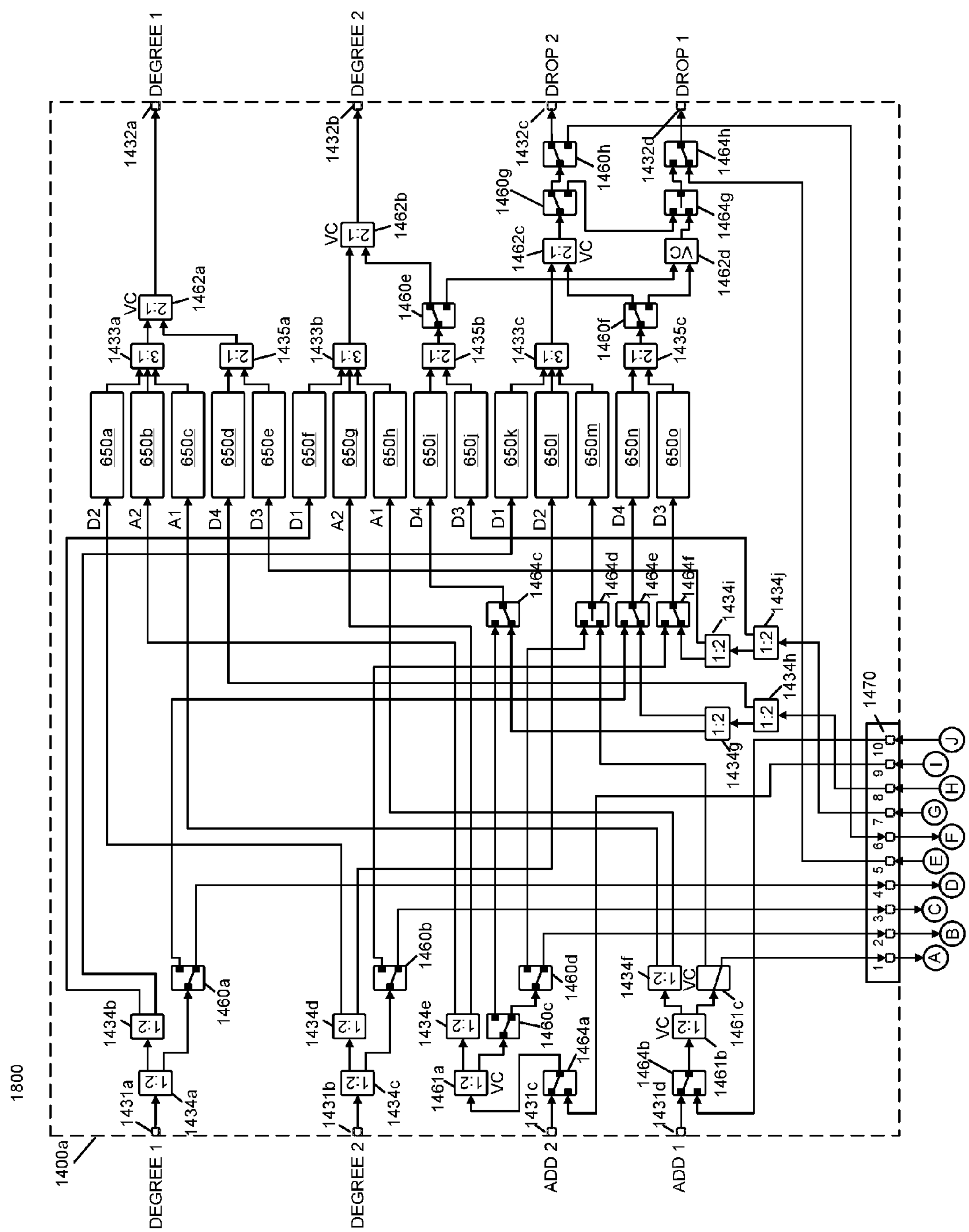
FIGS. 18A and 18B illustrate the use of two FIG. 14 software programmable ROADMs to construct a four-degree optical node with two directionless add/drop ports.
Figure 19A:
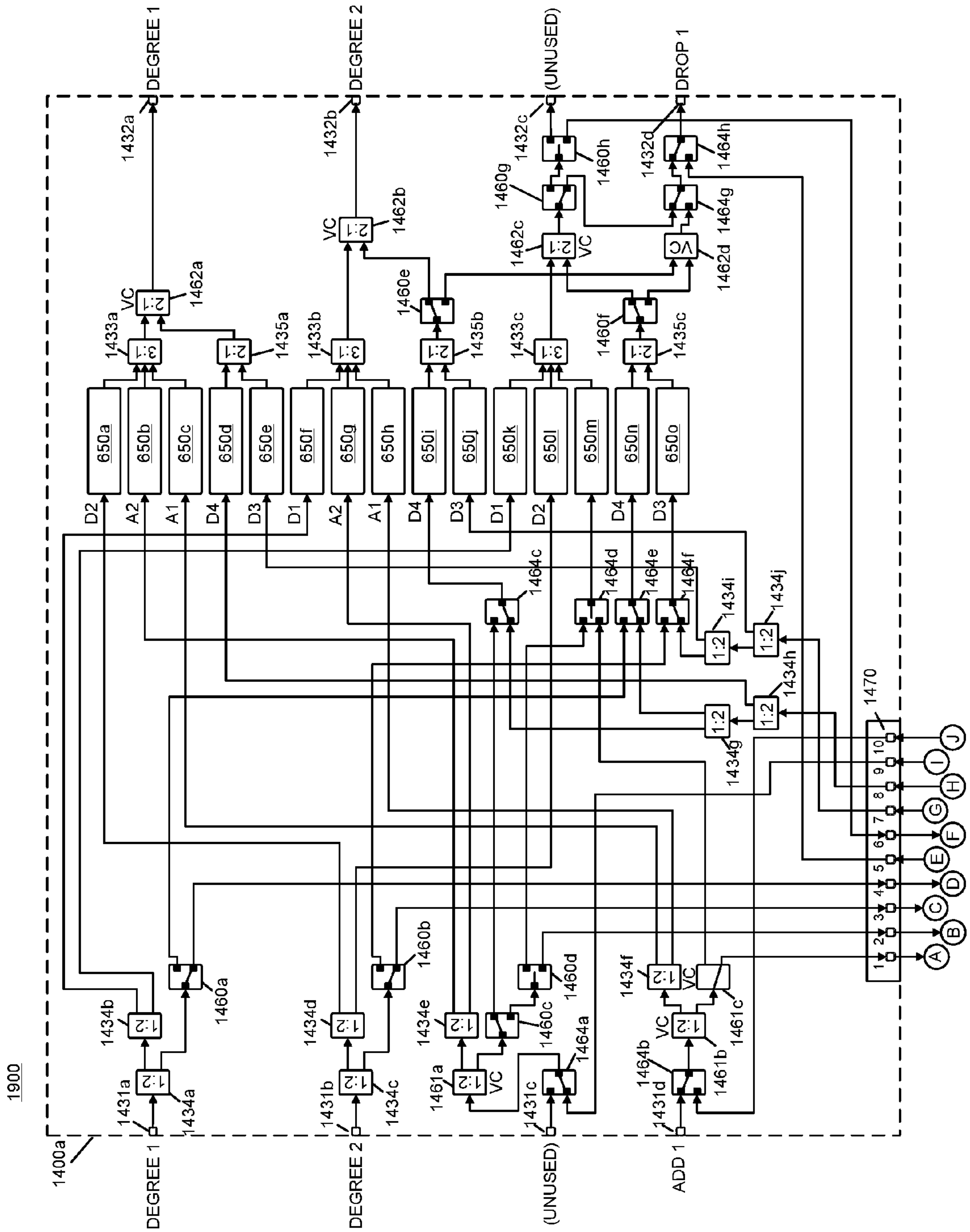
FIGS. 19A and 19B illustrate the use of two FIG. 14 software programmable ROADMs to construct another version of a four-degree optical node with two directionless add/drop ports.
Figure 55A:
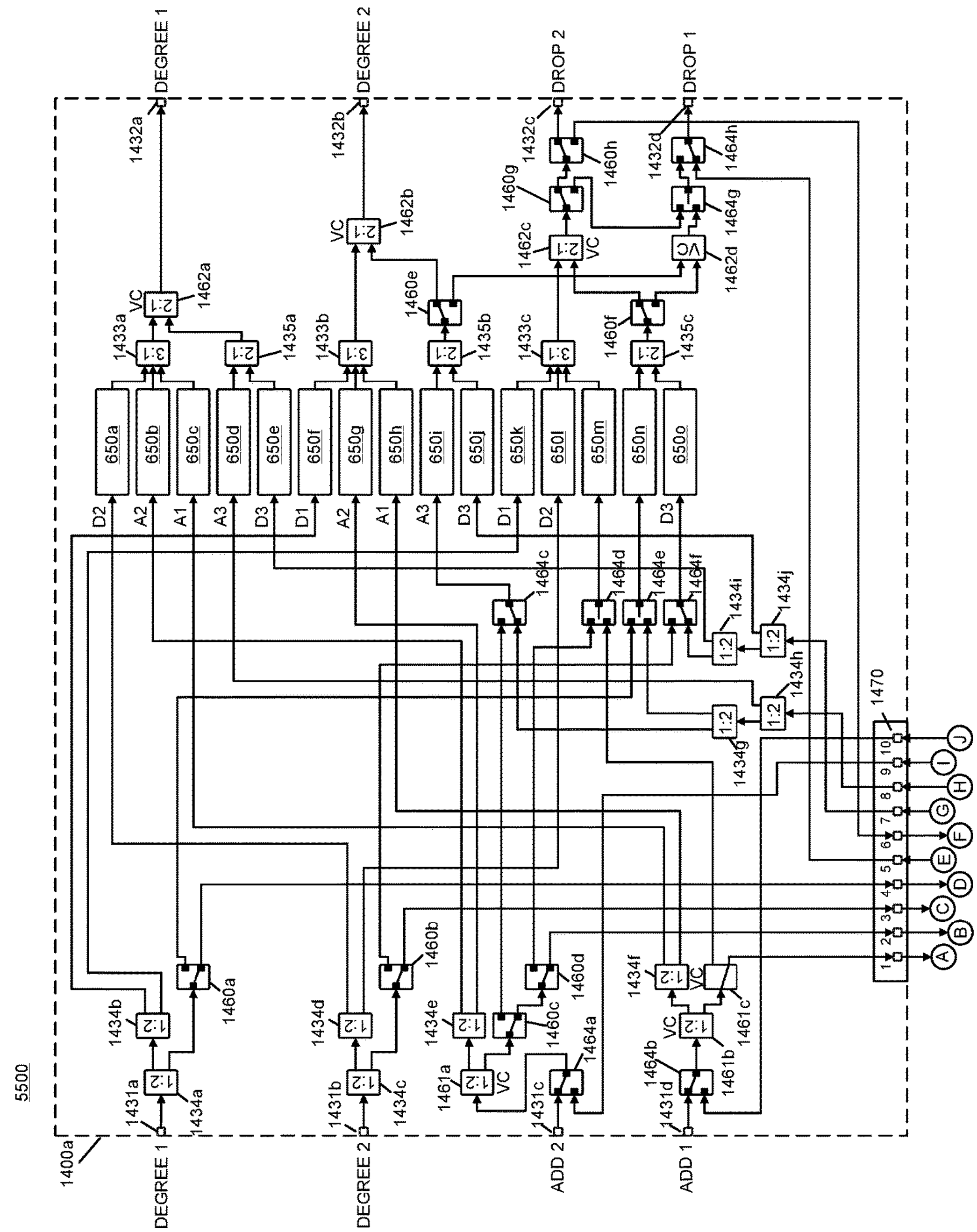
FIGS. 55A and 55B illustrate the use of two FIG. 14 software programmable ROADMs to construct a three-degree optical node with three directionless add/drop ports.
Figure 56A:
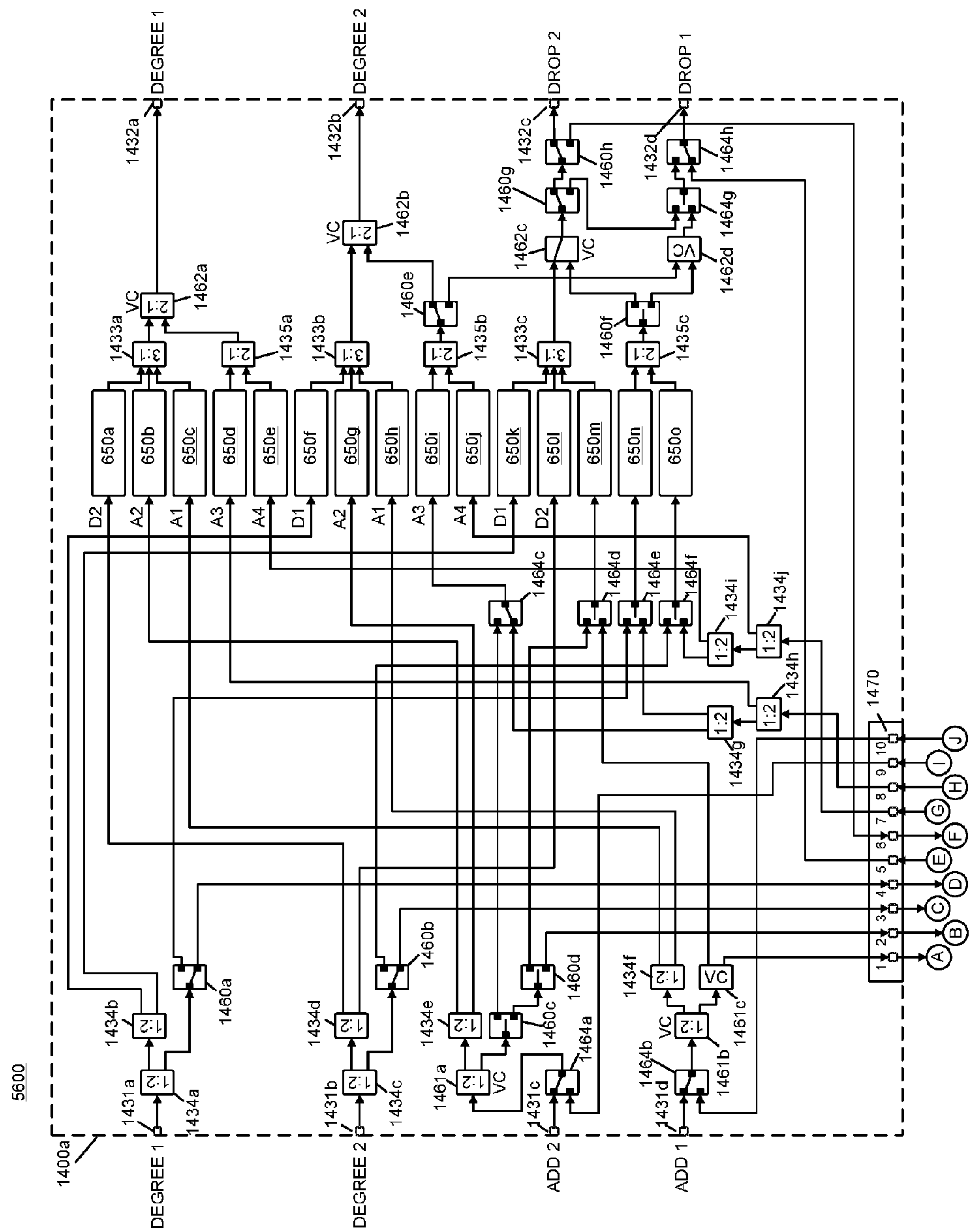
FIGS. 56A and 56B illustrate the use of two FIG. 14 software programmable ROADMs to construct a two-degree optical node with four directionless add/drop ports.

| Node Configuration | Number of Software Programmable ROADMs | Total Number of Directionless Add/Drop Ports | FIG. |
|---|---|---|---|
| Two-Degree | 1 | 2 | FIG. 15 |
| Three-Degree | 1 | 1 | FIG. 16 |
| Four-Degree | 2 | 2 | FIG. 18AB, FIG. 19A |
| Five-Degree | 2 | 1 | FIG. 17AB |
| Two-Degree | 2 | 4 | FIG. 56AB |
| Three-Degree | 2 | 3 | FIG. 55AB |

The software configurable ROADM 1400 comprises of: plurality of primary optical inputs 1431*a-d*, a plurality of primary optical outputs 1432*a-d*, a plurality of secondary optical inputs and outputs 1470, a plurality of wavelength equalizers (wavelength switches) 650*a-o*, a plurality of 1-by-2 waveguide switches 1460*a-h*, a plurality of 2-by-1 waveguide switches 1464*a-h*, a plurality of 1-to-2 fixed coupling ratio optical couplers 1434*a-j*, a plurality of 2-to-1 fixed coupling ratio optical couplers 1435*a-c*, a plurality of 3-to-1 fixed coupling ratio optical couplers 1433*a-c*, a plurality of 1-to-2 variable coupling ratio optical couplers 1461*a-c*, and a plurality of 2-to-1 variable coupling ratio optical couplers 1462*a-d*. In addition, the various optical elements 1431*a-d*, 1432*a-d*, 1470, 650*a-o*, 1460*a-h*, 1464*a-h*, 1434*a-j*, 1435*a-c*, 1433*a-c*, 1461*a-c* and 1462*a-d* are interconnected with optical waveguides, as shown in FIG. 14. The optical components 1460*a-h*, 1464*a-h*, 1434*a-j*, 1435*a-c*, 1433*a-c*, 1461*a-c* and 1462*a-d* may be integrated on one or more common substrates in order to form one or more photonic integrated chips (PICs). Additionally, the optical components 1431*a-d*, 1432*a-d*, 1470, 650*a-o*, 1460*a-h*, 1464*a-h*, 1434*a-j*, 1435*a-c*, 1433*a-c*, 1461*a-c* and 1462*a-d* may be placed on a common electrical circuit pack, and each of the four primary optical inputs 1431*a-d* may be pair with the corresponding primary optical outputs 1432*a-d* with optical connections being made with dual-LC optical connectors, while the plurality of secondary optical inputs and outputs 1470 may be combined into one parallel MTP connector.

The three wavelength equalizers 650*a-c* and the optical coupler 1433*a* form a first 3×1 wavelength selective switch (WSS), while the three wavelength equalizers 650*f-h* and the optical coupler 1433*b* form a second 3×1 wavelength selective switch (WSS), and three wavelength equalizers 650*k-m* and the optical coupler 1433*c* form a third 3×1 wavelength selective switch (WSS). Similarly, the two wavelength equalizers 650*d-e* and the optical coupler 1435*a* form a first 2×1 wavelength selective switch (WSS), while the two wavelength equalizers 650*i-j* and the optical coupler 1435*b* form a second 2×1 wavelength selective switch (WSS), and the two wavelength equalizers 650*n-o* and the optical coupler 1435*c* form a third 2×1 wavelength selective switch (WSS). The six so formed wavelength selective switches can be used as standalone wavelength selective switches, or they can be combined to form larger wavelength selective switches. For instance, the five wavelength equalizers 650*a-e* are combinable using couplers 1433*a*, 1435*a*, and 1462*a* to form a 5×1 wavelength selective switch (WSS). Similarly, the five wavelength equalizers 650*f-j* are combinable using couplers 1433*b*, 1435*b*, and 1462*b*, as well as waveguide switch 1460*e* to form a 5×1 wavelength selective switch (WSS). This is accomplished by software programming waveguide switch 1460*e* to the "Up" position, so that the output of coupler 1435*b* connects to the lower input of coupler 1462*b*. Alternatively, the 2×1 WSS formed from wavelength equalizers 650*i-j* and coupler 1435*b* is combinable with the 2×1 WSS formed from wavelength equalizers 650*n-o* and coupler 1435*c* using coupler 1462*d* and waveguide switches 1460*e-f* to form a 4×1 WSS. This is accomplished by software programming both waveguide switches 1460*e-f* to the "Down" position, so that the outputs of couplers 1435*b-c* connect to the coupler 1462*d*.

For a given node configuration, a copy of the wavelengths applied to the primary optical inputs 1431*a-d* must be applied to the optical inputs of the formed WSSs attached to the primary optical outputs 1432*a-d*. In order to do this, the waveguide switches 1460*a-d* and 1464*a-f* are set accordingly. The couplers 1434*a-f* and 1461*a-c* are used to duplicate the WDM signals applied to the primary optical inputs 1431*a-d*, and then waveguide switches are used to route the WDM signals to the WSS output structures. The waveguide switches 1460*g-h* and 1464*g-h* are used to route WDM signals from the formed WSS structures to primary outputs 1432*c-d* and the secondary optical inputs and outputs 1470. When two software programmable ROADMs are used together to form larger optical nodes, couplers 1434*g-j* are used to duplicate the WDM signals applied to the secondary optical inputs of 1470, and waveguide switches 1464*c-f* are used to assist in the forwarding of these WDM signals to the WSS output structures.

FIG. 15 illustrates the use of the software programmable ROADM 1400 in the two-degree node configuration 1500 (having two directionless add/drop ports). This application requires a single software programmable ROADM 1400. The software programmable ROADM 1400 can be configured (i.e., programmed via software) to form a two-degree optical node with two directionless add/drop ports. Each of the two directionless add/drop ports 1431*d*/1432*d* and 1431*c*/1432*c* may be connected to optical multiplexer/demultiplexers (such as 585*a-b* in FIG. 5C) to filter the wavelengths of the add/drop ports. In FIG. 15, primary optical input 1431*a* is the DEGREE 1 input (or D1), primary optical input 1431*b* is the DEGREE 2 input (or D2), primary optical output 1432*a* is the DEGREE 1 output, and primary optical output 1432*b* is the DEGREE 2 output.

For the two-degree node with two directionless add/drop ports 1500, the DEGREE 1 output WSS must be able to select wavelengths from the DEGREE 2 input 1431*b* and the ADD 1 input (or A1) 1431*d* and the ADD 2 input (or A2) 1431*c*. Therefore, a copy of the WDM signals applied to primary inputs 1431*b-d* must be forwarded to the DEGREE 1 output WSS. Since the DEGREE 1 output WSS is required to select wavelengths from three WDM signals, a 3×1 WSS needs to be formed and connected to the DEGREE 1 output 1432*a*. This 3×1 WSS is formed from wavelength equalizers 650*a-c* and coupler 1433*a*. Wavelength equalizer 650*a* selects wavelengths from the DEGREE 2 (D2) input 1431*b*, wavelength equalizer 650*b* selects wavelengths from the ADD 2 (A2) input 1431*c*, and wavelength equalizer 650*c* selects wavelengths from the ADD 1 (A1) input 1431*d*. A copy of the wavelengths from the DEGREE 2 (D2) input are forwarded to wavelength equalizer 650*a* via couplers 1434*c* and 1434*d*, while a copy of the wavelengths from the ADD 2 (A2) input are forwarded to wavelength equalizer 650*b* via couplers 1461*a* and 1434*e*, and a copy of the wavelengths from the ADD 1 (A1) input are forwarded to wavelength equalizer 650*c* via couplers 1461*b* and 1434*f* Additionally, waveguide switch 1464*a* is configured (i.e., software programmed) to attach the ADD 2 (A2) input 1431*c* to the input of coupler 1461*a*, and similarly, waveguide switch 1464*b* is configured (i.e., software programmed) to attach the ADD 1 (A1) input 1431*d* to the input of coupler 1461*b*. Since only a 3×1 WSS is needed for the DEGREE 1 output, variable optical coupler 1462*a* is configured (i.e., software programmed) to forward all of the light from coupler 1433*a* to output 1432*a*, and no light from optical coupler 1435*a* is forwarded to output 1432*a*. When programmed in this way, coupler 1462*a* acts like a waveguide switch, and therefore is depicted as a switch in FIG. 15.

For the two-degree node with two directionless add/drop ports 1500, the DEGREE 2 output WSS must be able to select wavelengths from the DEGREE 1 (D1) input 1431*a* and the ADD 1 (A1) input 1431*d* and the ADD 2 (A2) input 1431*c*. Therefore, a copy of the WDM signals applied to primary inputs 143*a,c-d* must be forwarded to the DEGREE 2 output WSS. Since the DEGREE 2 output WSS is required to select wavelengths from three WDM signals, a 3×1 WSS needs to be formed and connected to the DEGREE 2 output 1432*b*. This 3×1 WSS is formed from wavelength equalizers 650*f-h* and coupler 1433*b*. Wavelength equalizer 650*f* selects wavelengths from the DEGREE 1 (D1) input 1431*a*, wavelength equalizer 650*g* selects wavelengths from the ADD 2 (A2) input 1431*c*, and wavelength equalizer 650*h* selects wavelengths from the ADD 1 (A1) input 1431*d*. A copy of the wavelengths from the DEGREE 1 (D1) input are forwarded to wavelength equalizer 650*f* via couplers 1434*a* and 1434*b*, while a copy of the wavelengths from the ADD 2 (A2) input are forwarded to wavelength equalizer 650*g* via couplers 1461*a* and 1434*e*, and a copy of the wavelengths from the ADD 1 (A1) input are forwarded to wavelength equalizer 650*h* via couplers 1461*b* and 1434*f* Additionally, waveguide switch 1464*a* is configured (i.e., software programmed) to attach the ADD 2 (A2) input 1431*c* to the input of coupler 1461*a*, and similarly, waveguide switch 1464*b* is configured (i.e., software programmed) to attach the ADD 1 (A1) input 1431*d* to the input of coupler 1461*b*. Since only a 3×1 WSS is needed for the DEGREE 2 output, variable optical coupler 1462*b* is configured (i.e., software programmed) to forward all of the light from coupler 1433*b* to output 1432*b*, and no light from optical coupler 1435*b* is forwarded to output 1432*b*. When programmed in this way, coupler 1462*b* acts like a waveguide switch, and therefore is depicted as a switch in FIG. 15.

For the two-degree node with two directionless add/drop ports 1500, the DROP 2 output WSS must be able to select wavelengths from the DEGREE 1 (D1) input 1431*a* and the DEGREE 2 (D2) input 1431*b*. Therefore, a copy of the WDM signals applied to primary inputs 143*a-b* must be forwarded to the DROP 2 output WSS. Since the DROP 2 output WSS is required to select wavelengths from two WDM signals, a 2×1 WSS needs to be formed and connected to the DROP 2 output 1432*c*. This 2×1 WSS is formed from wavelength equalizers 650*k*-1 and coupler 1433*c*. Wavelength equalizer 650*k* selects wavelengths from the DEGREE 1 (D1) input 1431*a*, and wavelength equalizer 650*l* selects wavelengths from the DEGREE 2 (D2) input 1431*b*. A copy of the wavelengths from the DEGREE 1 (D1) input are forwarded to wavelength equalizer 650*k* via couplers 1431*a* and 1434*b*, while a copy of the wavelengths from the DEGREE 2 (D2) input are forwarded to wavelength equalizer 650*l* via couplers 1434*b* and 1434*d*. (Since only a 2×1 WSS is needed for the DROP 2 output, a performance optimization could be made by replacing coupler 1433*c* with a variable optical coupler.) Since the DROP 2 output only requires a 2×1 WSS variable optical coupler 1462*c* is configured (i.e., software programmed) to forward all of the light from coupler 1433*c* to waveguide switch 1460*g*, and no light from optical coupler 1435*c* is forwarded to switch 1460*g*. When programmed in this way, coupler 1462*c* acts like a waveguide switch, and therefore is depicted as a switch in FIG. 15. Waveguide switches 1460*g-h* connects the output of coupler 1462*c* to the DROP 2 output 1432*c*.

For the two-degree node with two directionless add/drop ports 1500, the DROP 1 output WSS must be able to select wavelengths from the DEGREE 1 (D1) input 1431*a* and the DEGREE 2 (D2) input 1431*b*. Therefore, a copy of the WDM signals applied to primary inputs 143*a-b* must be forwarded to the DROP 1 output WSS. Since the DROP 1 output WSS is required to select wavelengths from two WDM signals, a 2×1 WSS needs to be formed and connected to the DROP 1 output 1432*d*. This 2×1 WSS is formed from wavelength equalizers 650*n-o* and coupler 1435*c*. Wavelength equalizer 650*n* selects wavelengths from the DEGREE 1 (D1) input 1431*a*, and wavelength equalizer 650*o* selects wavelengths from the DEGREE 2 (D2) input 1431*b*. A copy of the wavelengths from the DEGREE 1 (D1) input are forwarded to wavelength equalizer 650*n* via coupler 1434*a* and waveguide switches 1460*a* and 1464*e*, while a copy of the wavelengths from the DEGREE 2 (D2) input are forwarded to wavelength equalizer 650*o* via coupler 1434*c* and waveguide switches 1460*b* and 1464*f*. Since the DROP 1 output only requires a 2×1 WSS variable optical coupler 1462*d* is configured (i.e., software programmed) to forward all of the light from coupler 1435*c* to waveguide switch 1464*g*, and no light from optical coupler 1435*b* is forwarded to switch 1464*g*. When programmed in this way, coupler 1462*d* acts like a waveguide switch, and therefore is depicted as a switch in FIG. 15. Waveguide switches 1464*g-h* connects the output of coupler 1462*d* to the DROP 1 output 1435*d*.

For the two-degree node with two directionless add/drop ports 1500, wavelength equalizers 650*d-e,i-j,m*, couplers 1434*g-j*, 1435*a-b*, 1461*c*, and waveguide switches 1460*c-d* and 1464*c-e* are not used.

FIG. 15, illustrates which ROADM input signal is routed to which wavelength equalizer by labeling each wavelength equalizer input port with a ROADM input signal name. Abbreviated ROADM input signals names are used, wherein the abbreviations D1, D2, A1, and A2, correspond to ROADM input signal names DEGREE 1, DEGREE 2, ADD 1, and ADD 2 respectively. An unused wavelength equalizer does not have an abbreviated ROADM input signal name on its respective wavelength equalizer input port.

FIG. 16 illustrates the use of the software programmable ROADM 1400 in the three-degree node configuration 1600. This application requires a single software programmable ROADM 1400. The software programmable ROADM 1400 can be configured (i.e., programmed via software) to form a three-degree optical node with one directionless add/drop port. The directionless add/drop port 1431*d*/1432*d* may be connected to an optical multiplexer/demultiplexer (such as 585*a-b* in FIG. 5C) in order to filter the wavelengths of the add/drop port. In FIG. 16, primary optical input 1431*a* is the DEGREE 1 input, primary optical input 1431*b* is the DEGREE 2 input, primary optical input 1431*c* is the DEGREE 3 input, primary optical output 1432*a* is the DEGREE 1 output, primary optical output 1432*b* is the DEGREE 2 output, and primary optical output 1432*c* is the DEGREE 3 output.

For the three-degree node with one directionless add/drop port 1600, the DEGREE 1 output WSS must be able to select wavelengths from the DEGREE 2 input 1431*b* and the DEGREE 3 input 1431*c* and the ADD 1 input 1431*d*. Therefore, a copy of the WDM signals applied to primary inputs 1431*b-d* must be forwarded to the DEGREE 1 output WSS. Since the DEGREE 1 output WSS is required to select wavelengths from three WDM signals, a 3×1 WSS needs to be formed and connected to the DEGREE 1 output 1432*a*. This 3×1 WSS is formed from wavelength equalizers 650*a-c* and coupler 1433*a*. Wavelength equalizer 650*a* selects wavelengths from the DEGREE 2 input 1431*b*, wavelength equalizer 650*b* selects wavelengths from the DEGREE 3 input 1431*c*, and wavelength equalizer 650*c* selects wavelengths from the ADD 1 input 1431*d*. A copy of the wavelengths from the DEGREE 2 input are forwarded to wavelength equalizer 650*a* via couplers 1434*c* and 1434*d*, while a copy of the wavelengths from the DEGREE 3 input are forwarded to wavelength equalizer 650*b* via couplers 1461*a* and 1434*e*, and a copy of the wavelengths from the ADD 1 input are forwarded to wavelength equalizer 650*c* via couplers 1461*b* and 1434*f* Additionally, waveguide switch 1464*a* is configured (i.e., software programmed) to attach the DEGREE 3 input 1431*c* to the input of coupler 1461*a*, and similarly, waveguide switch 1464*b* is configured (i.e., software programmed) to attach the ADD 1 input 1431*d* to the input of coupler 1461*b*. Since only a 3×1 WSS is needed for the DEGREE 1 output, variable optical coupler 1462*a* is configured (i.e., software programmed) to forward all of the light from coupler 1433*a* to output 1432*a*, and no light from optical coupler 1435*a* is forwarded to output 1432*a*. When programmed in this way, coupler 1462*a* acts like a waveguide switch, and therefore is depicted as a switch in FIG. 16.

For the three-degree node with one directionless add/drop port 1600, the DEGREE 2 output WSS must be able to select wavelengths from the DEGREE 1 input 1431*a* and the DEGREE 3 input 1431*c* and the ADD 1 input 1431*d*. Therefore, a copy of the WDM signals applied to primary inputs 143*a,c-d* must be forwarded to the DEGREE 2 output WSS. Since the DEGREE 2 output WSS is required to select wavelengths from three WDM signals, a 3×1 WSS needs to be formed and connected to the DEGREE 2 output 1432*b*. This 3×1 WSS is formed from wavelength equalizers 650*f-h* and coupler 1433*b*. Wavelength equalizer 650*f* selects wavelengths from the DEGREE 1 input 1431*a*, wavelength equalizer 650*g* selects wavelengths from the DEGREE 3 input 1431*c*, and wavelength equalizer 650*h* selects wavelengths from the ADD 1 input 1431*d*. A copy of the wavelengths from the DEGREE 1 input are forwarded to wavelength equalizer 650*f* via couplers 1434*a* and 1434*b*, while a copy of the wavelengths from the DEGREE 3 input are forwarded to wavelength equalizer 650*g* via couplers 1461*a* and 1434*e*, and a copy of the wavelengths from the ADD 1 input are forwarded to wavelength equalizer 650*h* via couplers 1461*b* and 1434*f* Additionally, waveguide switch 1464*a* is configured (i.e., software programmed) to attach the DEGREE 3 input 1431*c* to the input of coupler 1461*a*, and similarly, waveguide switch 1464*b* is configured (i.e., software programmed) to attach the ADD 1 input 1431*d* to the input of coupler 1461*b*. Since only a 3×1 WSS is needed for the DEGREE 2 output, variable optical coupler 1462*b* is configured (i.e., software programmed) to forward all of the light from coupler 1433*b* to output 1432*b*, and no light from optical coupler 1435*b* is forwarded to output 1432*b*. When programmed in this way, coupler 1462*b* acts like a waveguide switch, and therefore is depicted as a switch in FIG. 16.

For the three-degree node with one directionless add/drop port 1600, the DEGREE 3 output WSS must be able to select wavelengths from the DEGREE 1 input 1431*a* and the DEGREE 2 input 1431*b*, and the ADD 1 input 1431*d*. Therefore, a copy of the WDM signals applied to primary inputs 143*a-b,d* must be forwarded to the DEGREE 3 output WSS. Since the DEGREE 3 output WSS is required to select wavelengths from three WDM signals, a 3×1 WSS needs to be formed and connected to the DEGREE 3 output 1432*c*. This 3×1 WSS is formed from wavelength equalizers 650*k-m* and coupler 1433*c*. Wavelength equalizer 650*k* selects wavelengths from the DEGREE 1 input 1431*a*, wavelength equalizer 650*l* selects wavelengths from the DEGREE 2 input 1431*b*, and wavelength equalizer 650*m* selects wavelengths from the ADD 1 input 1431*d*. A copy of the wavelengths from the DEGREE 1 input are forwarded to wavelength equalizer 650*k* via couplers 1434*a* and 1434*b*, while a copy of the wavelengths from the DEGREE 2 input are forwarded to wavelength equalizer 650*l* via couplers 1434*c* and 1434*d*, and a copy of the wavelengths from the ADD 1 input are forwarded to wavelength equalizer 650*l* via couplers 1461*b* and 1461*c*. In addition, waveguide switch 1464*d* must be configured (i.e., software programmed) to connect the output of coupler 1461*c* to the input of wavelength equalizer 650*m*. Since, in this application, the variable optical coupler 1461*c* is not required to forward a copy of the ADD 1 wavelengths to the secondary optical connectors 1470, coupler 1461*c* is configured to forward all its inputted optical power towards waveguide switch 1464*d*. By doing so, the OSNR (optical signal to noise ratio) performance of the node increases, due to lessening amplification needs. Since both outputs of coupler 1461*b* are used, variable optical coupler 1461*b* is configured (i.e., software programmed) to be a two-to-one coupler, wherein the optical power of the WDM signal inputted to coupler 1461*b* is split between the two outputs of the coupler. For this case more optical power is forwarded to coupler 1434*f* than coupler 1461*c*, as the power sent to coupler 1434*f* must be further split between its two outputs. Since the DEGREE 3 output only requires a 3×1 WSS variable optical coupler 1462*c* is configured (i.e., software programmed) to forward all of the light from coupler 1433*c* to waveguide switch 1460*g*, and no light from optical coupler 1435*c* is forwarded to switch 1460*g*. When programmed in this way, coupler 1462*c* acts like a waveguide switch, and therefore is depicted as a switch in FIG. 16. Waveguide switches 1460*g-h* connects the output of coupler 1462*c* to the DEGREE 3 output 1432*c*.

For the three-degree node with one directionless add/drop port 1600, the DROP 1 output WSS must be able to select wavelengths from the DEGREE 1 input 1431*a*, the DEGREE 2 input 1431*b*, and the DEGREE 3 input 1431*c*. Therefore, a copy of the WDM signals applied to primary inputs 143*a-c* must be forwarded to the DROP 1 output WSS. Since the DROP 1 output WSS is required to select wavelengths from three WDM signals, a 3×1 WSS needs to be formed and connected to the DROP 1 output 1432*d*. This 3×1 WSS is formed from wavelength equalizers 650*i,n-o* and couplers 1435*b*, 1435*c*, and 1462*d*. Wavelength equalizer 650*n* selects wavelengths from the DEGREE 1 input 1431*a*, while wavelength equalizer 650*o* selects wavelengths from the DEGREE 2 input 1431*b*, and wavelength equalizer 650*i* selects wavelengths from the DEGREE 3 input 1431*c*. A copy of the wavelengths from the DEGREE 1 input are forwarded to wavelength equalizer 650*n* via coupler 1434*a* and waveguide switches 1460*a* and 1464*e*, while a copy of the wavelengths from the DEGREE 2 input are forwarded to wavelength equalizer 650*o* via coupler 1434*c* and waveguide switches 1460*b* and 1464*f*, and a copy of the wavelengths from the DEGREE 3 input are forwarded to wavelength equalizer 650*i* via coupler 1461*a* and waveguide switches 1460*c* and 1464*c*. Since wavelength equalizer 650*j* is not used in this application, system performance could be improved by replacing fixed ratio coupler 1435*b* with a variable ratio coupler. Since variable optical coupler 1462*d* combines optical signals from both of its inputs, variable optical coupler 1462*d* is configured to be a two-to-one coupler and not a switch (as was done in the application of FIG. 15). Waveguide switches 1460*e-f* are configured to forward WDM signals to the coupler 1462*d*, while waveguide switches 1464*g-h* connects the output of coupler 1462*d* to the DROP 1 output 1432*d*.

For the three-degree node with one directionless add/drop port 1600, wavelength equalizers 650*d-e,i*, couplers 1434*g-j*, 1435*a*, and waveguide switches 1460*d* are not used.

FIG. 16, illustrates which ROADM input signal is routed to which wavelength equalizer by labeling each wavelength equalizer input port with a ROADM input signal name.

Abbreviated ROADM input signals names are used, wherein the abbreviations D1, D2, D3, and A1, correspond to ROADM input signal names DEGREE 1, DEGREE 2, DEGREE 3, and ADD 1 respectively. An unused wavelength equalizer does not have an abbreviated ROADM input signal name on its respective wavelength equalizer input port.

Figure 17B:
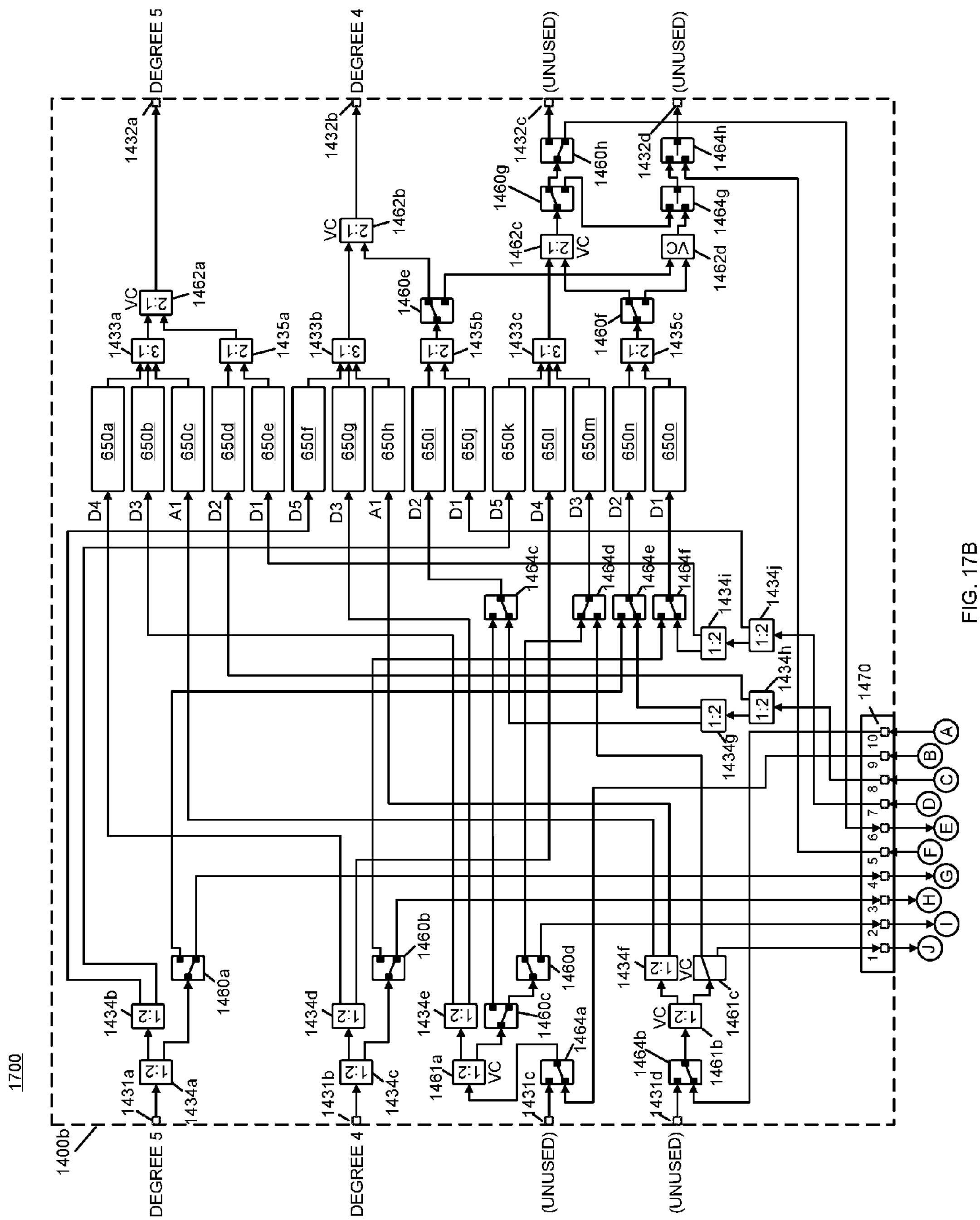

FIG. 17A and FIG. 17B illustrate the use of the software programmable ROADM 1400 in the five-degree node configuration 1700. This application requires a two software programmable ROADMs 1400. Software programmable ROADM 1400*a* provides interfaces for DEGREE 1, DEGREE 2, DEGREE 3, and the ADD/DROP port, while software programmable ROADM 1400*b* provides interfaces for DEGREE 4 and DEGREE 5. This partitioning of resources allows for the expansion from a three-degree optical node to a five degree optical node without the need to physically move the optical cables attached to the DEGREE 1, DEGREE 2, DEGREE 3, and the ADD/DROP optical ports of the first software programmable ROADM 1400*a*. If the secondary optical input output ports 1470 are implemented with a single MPO/MPT (Multiple-Fiber Push-On/Pull-Off) connector, then expanding a three-degree node to a five-degree node only requires adding a second software programmable ROADM 1400*b* and attaching a single Type B MPO/MTP cable between the two MPO/MTP ports 1470 of the two software programmable ROADMs 1400*a-b*. The Type B cable performs the optical signal cross needed to connect the two software programmable ROADMs 1400*a-b* according to the labeling of the 1470 signals illustrated in FIGS. 17A and 17B. As shown, pin 1 of 1470 of 1400*a* is connected to pin 10 of 1470 of 1400*b*, pin 2 of 1470 of 1400*a* is connected to pin 9 of 1470 of 1400*b*, etc. (as illustrated via the lettering signal interconnects A-J).

Although only half of the primary optical inputs and outputs are utilized on the second software programmable ROADM 1400*b*, all of the wavelength equalizers on both ROADMs are used. Accordingly, the wavelength equalizers on ROADM 1400*a* are used to generate the DEGREE 1, DEGREE 2, and DEGREE 3 output signals, while the wavelength equalizers on ROADM 1400*b* are used to generate the DEGREE 4, DEGREE 5, and DROP 1 output signals. The DROP 1 output signal generated by the wavelength equalizers on ROADM 1400*b* in FIG. 17B is sent to the ROADM 1400*a* via the "E" optical signal of 1470 connecting the two ROADMs.

The input optical signals applied to primary optical inputs 1431*a-d* of 1400*a* of FIG. 17A are forwarded to 1400*b* of FIG. 17B via 1470. Similarly, the input optical signals applied to primary optical inputs 1431*a-b* of 1400*b* of FIG. 17B are forwarded to 1400*a* of FIG. 17A via 1470. In FIG. 17A, waveguide switches 1460*a-d* and variable optical couplers 1461*b-c* are configured (i.e., software programmed) to forward the input signals applied to inputs 1431*a-d* to 1470, while in FIG. 17B, waveguide switches 1460*a-b* are configured (i.e., software programmed) to forward the input signals applied to inputs 1431*a-b* to 1470. This results in coupler 1434*j* in FIG. 17A receiving the input signal applied to DEGREE 5, and coupler 1434*h* in FIG. 17A receiving the input signal applied to DEGREE 4, and waveguide switch 1464*b* in FIG. 17B receiving the input signal applied to ADD 1, and waveguide switch 1464*a* in FIG. 17B receiving the input signal applied to DEGREE 3, and coupler 1434*h* in FIG. 17B receiving the input signal applied to DEGREE 2, and coupler 1434*j* in FIG. 17B receiving the input signal applied to DEGREE 1. This exchange of primary input signals between the two ROADMs 1400*a-b* provides access to all six primary optical inputs signals (i.e., DEGREE 1 to 5, and ADD 1) on both 1400*a* and 1400*b*.

For the five-degree node with one directionless add/drop port 1700, the DEGREE 1 output WSS must be able to select wavelengths from the DEGREE 2 input, the DEGREE 3 input, the DEGREE 4 input, the DEGREE 5 input, and the ADD 1 input. The 5×1 WSS needed to support the DEGREE 1 output is formed from wavelength equalizers 650*a-e* and couplers 1433*a*, 1435*b* and 1462*a* in FIG. 17A. In FIG. 17A, wavelength equalizer 650*a* selects wavelengths from the DEGREE 2 input, wavelength equalizer 650*b* selects wavelengths from the DEGREE 3 input, wavelength equalizer 650*c* selects wavelengths from the ADD 1 input, wavelength equalizer 650*d* selects wavelengths from the DEGREE 4 input (via coupler 1434*h*), wavelength equalizer 650*e* selects wavelengths from the DEGREE 5 input (via coupler 1434*j*). In a similar manner, the 5×1 WSS needed to support the DEGREE 2 output is formed from wavelength equalizers 650*f-j* in FIG. 17A, the 5×1 WSS needed to support the DEGREE 3 output is formed from wavelength equalizers 650*k-o* in FIG. 17A, the 5×1 WSS needed to support the DEGREE 5 output is formed from wavelength equalizers 650*a-e* in FIG. 17B, the 5×1 WSS needed to support the DEGREE 4 output is formed from wavelength equalizers 650*f-j* in FIG. 17B, and the 5×1 WSS needed to support the DROP 1 output is formed from wavelength equalizers 650*k-o* in FIG. 17B. The waveguide switch settings and variable optical coupler settings to support the routing of input signals to the various wavelength equalizers are shown in FIGS. 17A and 17B. FIG. 17A and FIG. 17B also illustrate the settings of the waveguide switches and variable optical couplers to route the signals from the wavelength equalizers. Table 2 summarizes which signals are used to generate each output signal, and the corresponding wavelength equalizers for the five-degree node with one directionless add/drop port of FIG. 17A and FIG. 17B.

TABLE 2

| Five Degrees & One Add/Drop Port | | | | | |
|---|---|---|---|---|---|
| Output Signal | Wavelength Equalizers Used & Corresponding Input Signal | | | | |
| DEGREE 1 | 650a of 1400a (DEGREE 2) | 650b of 1400a (DEGREE 3) | 650c of 1400a (ADD 1) | 650d of 1400a (DEGREE 4) | 650e of 1400a (DEGREE 5) |
| DEGREE 2 | 650f of 1400a (DEGREE 1) | 650g of 1400a (DEGREE 3) | 650h of 1400a (ADD 1) | 650i of 1400a (DEGREE 4) | 650j of 1400a (DEGREE 5) |
| DEGREE 3 | 650k of 1400a (DEGREE 1) | 650l of 1400a (DEGREE 2) | 650m of 1400a (ADD 1) | 650n of 1400a (DEGREE 4) | 650o of 1400a (DEGREE 5) |
| DEGREE 5 | 650a of 1400b (DEGREE 4) | 650b of 1400b (DEGREE 3) | 650c of 1400b (ADD 1) | 650d of 1400b (DEGREE 2) | 650e of 1400b (DEGREE 1) |

TABLE 2-continued

| Five Degrees & One Add/Drop Port | | | | | |
|---|---|---|---|---|---|
| Output Signal | Wavelength Equalizers Used & Corresponding Input Signal | | | | |
| DEGREE 4 | 650f of 1400b (DEGREE 5) | 650g of 1400b (DEGREE 3) | 650h of 1400b (ADD 1) | 650i of 1400b (DEGREE 2) | 650j of 1400b (DEGREE 1) |
| DROP 1 | 650k of 1400b (DEGREE 5) | 650l of 1400b (DEGREE 4) | 650m of 1400b (DEGREE 3) | 650n of 1400b (DEGREE 2) | 650o of 1400b (DEGREE 1) |

In FIG. 17A and FIG. 17B, for the five-degree node with one add/drop port node 1700, coupler 1462*d* of 1400*a*, and waveguide switch 1464*g* of 1400*a* are not used, and coupler 1462*d* of 1400*b*, and waveguide switch 1464*g* of 1400*b* are not used.

FIG. 17A and FIG. 17B, illustrate which ROADM input signal is routed to which wavelength equalizer by labeling each wavelength equalizer input port with a ROADM input signal name. Abbreviated ROADM input signals names are used, wherein the abbreviations D1, D2, D3, D4, D5, and A1, correspond to ROADM input signal names DEGREE 1, DEGREE 2, DEGREE 3, DEGREE 4, DEGREE 5, and ADD 1 respectively.

Figure 18B:
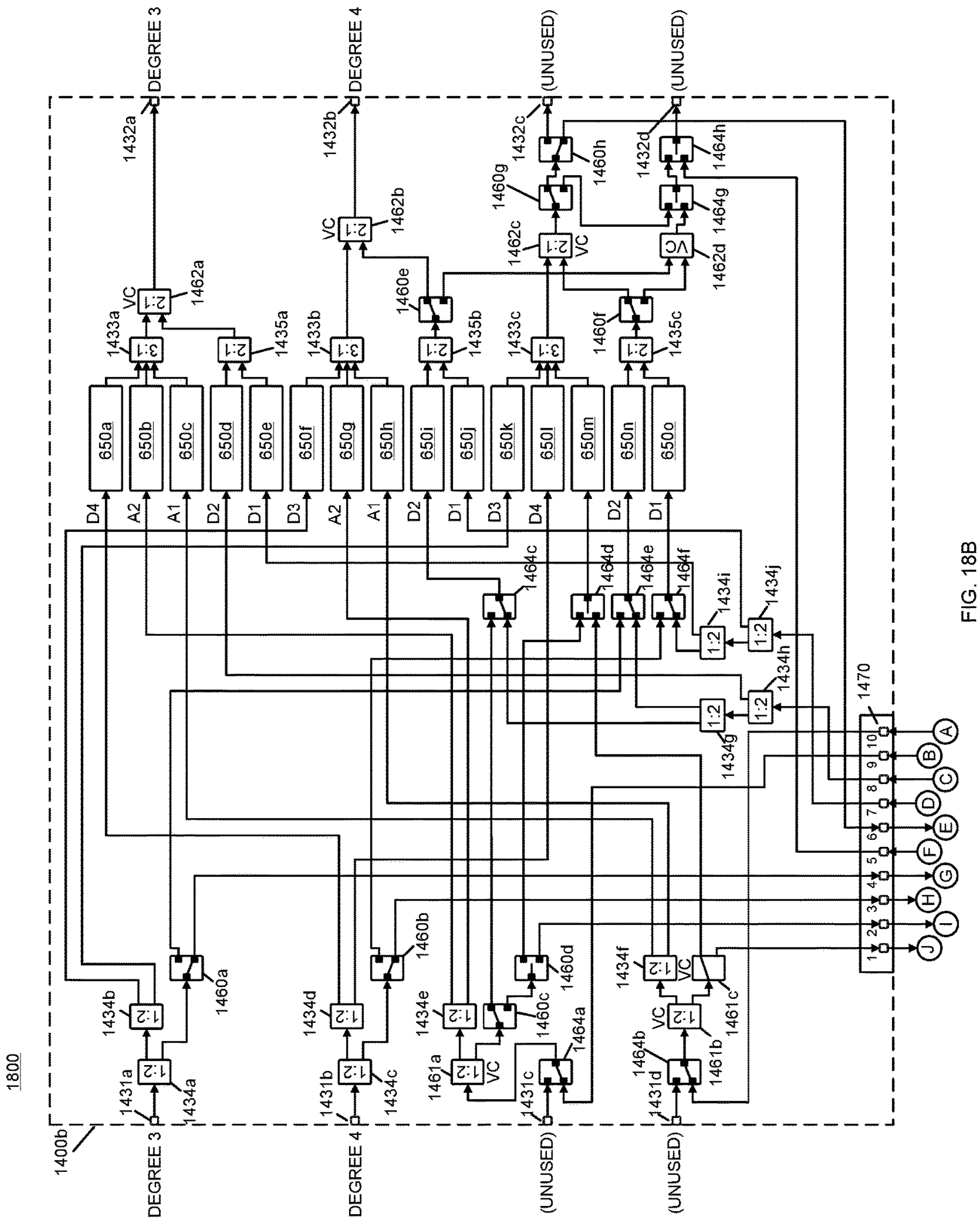

FIG. 18A and FIG. 18B illustrate the use of the software programmable ROADM 1400 in a first four-degree and two directionless add/drop ports node configuration 1800, requiring two software programmable ROADMs 1400. Software programmable ROADM 1400*a* provides interfaces for DEGREE 1, DEGREE 2, ADD/DROP port 1, and ADD/DROP port 2, while software programmable ROADM 1400*b* provides interfaces for DEGREE 3 and DEGREE 4. This partitioning of resources allows for the expansion from a two-degree optical node with two add/drop ports to a four-degree optical node without the need to physically move the optical cables attached to the DEGREE 1, DEGREE 2, ADD/DROP 1, and ADD/DROP 2 optical ports of the first software programmable ROADM 1400*a*. In this configuration, the wavelength equalizers used to generate the DROP 1 signal exiting 1400*a* reside on 1400*b*. Table 3 summarizes which signals are used to generate each output signal, and the corresponding wavelength equalizers for the four-degree node with two directionless add/drop ports of FIG. 18A and FIG. 18B.

TABLE 3

| Four Degrees & Two Add/Drop Ports (Version 1) | | | | | |
|---|---|---|---|---|---|
| Output Signal | Wavelength Equalizers Used & Corresponding Input Signal | | | | |
| DEGREE 1 | 650a of 1400a (DEGREE 2) | 650b of 1400a (ADD 2) | 650c of 1400a (ADD 1) | 650d of 1400a (DEGREE 4) | 650e of 1400a (DEGREE 3) |
| DEGREE 2 | 650f of 1400a (DEGREE 1) | 650g of 1400a (ADD 2) | 650h of 1400a (ADD 1) | 650i of 1400a (DEGREE 4) | 650j of 1400a (DEGREE 3) |
| DROP 2 | 650k of 1400a (DEGREE 1) | 650l of 1400a (DEGREE 2) | 650m of 1400a (UNUSED) | 650n of 1400a (DEGREE 4) | 650o of 1400a (DEGREE 3) |
| DEGREE 3 | 650a of 1400b (DEGREE 4) | 650b of 1400b (ADD 2) | 650c of 1400b (ADD 1) | 650d of 1400b (DEGREE 2) | 650e of 1400b (DEGREE 1) |
| DEGREE 4 | 650f of 1400b (DEGREE 3) | 650g of 1400b (ADD 2) | 650h of 1400b (ADD 1) | 650i of 1400b (DEGREE 2) | 650j of 1400b (DEGREE 1) |
| DROP 1 | 650k of 1400b (DEGREE 3) | 650l of 1400b (DEGREE 4) | 650m of 1400b (UNUSED) | 650n of 1400b (DEGREE 2) | 650o of 1400b (DEGREE 1) |

The waveguide switch settings and variable optical coupler settings for the first version of the four-degree node with two add/drop ports are shown in FIG. 18A and FIG. 18B.

In FIG. 18A, wavelength equalizer 650*m*, coupler 1462*d*, and waveguide switches 1464*d,g* are not used. In FIG. 18B, wavelength equalizer 650*m*, coupler 1462*d*, and waveguide switches 1464*d,g* are not used.

FIG. 18A and FIG. 18B, illustrate which ROADM input signal is routed to which wavelength equalizer by labeling each wavelength equalizer input port with a ROADM input signal name. Abbreviated ROADM input signals names are used, wherein the abbreviations D1, D2, D3, D4, A1, and A2, correspond to ROADM input signal names DEGREE 1, DEGREE 2, DEGREE 3, DEGREE 4, ADD 1, and ADD 2 respectively. An unused wavelength equalizer does not have an abbreviated ROADM input signal name on its respective wavelength equalizer input port.

Figure 19B:
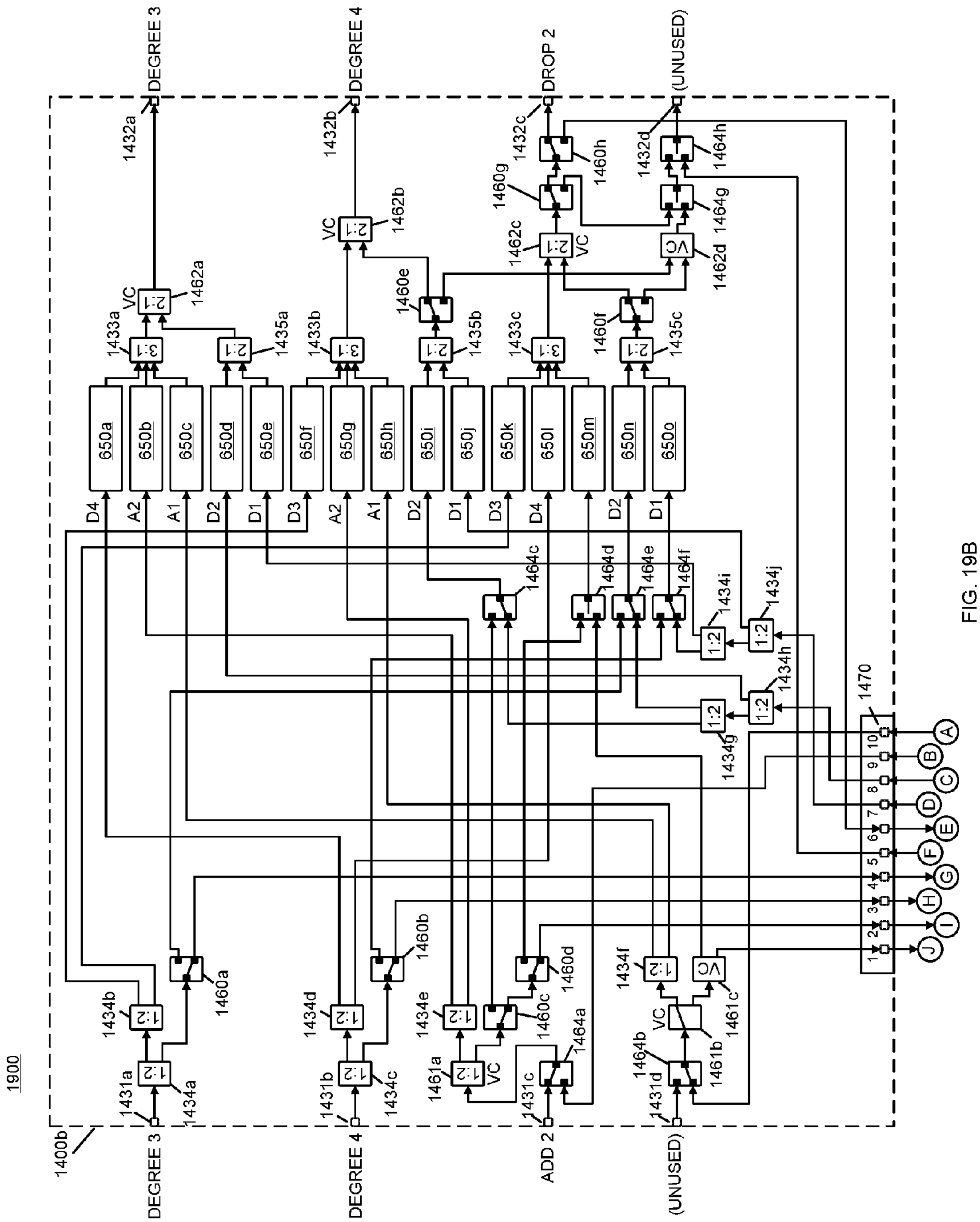

FIG. 19A and FIG. 19B illustrate the use of the software programmable ROADM 1400 in a second four-degree and two directionless add/drop ports node configuration 1900, requiring two software programmable ROADMs 1400. Software programmable ROADM 1400*a* provides interfaces for DEGREE 1, DEGREE 2, and ADD/DROP port 1, while software programmable ROADM 1400*b* provides interfaces for DEGREE 3, DEGREE 4, and ADD/DROP port 2. Table 4 summarizes which signals are used to generate each output signal, and the corresponding wavelength equalizers for the four-degree node with two directionless add/drop ports of FIG. 19A and FIG. 19B. Inspection of Table 4 shows it to be identical to Table 3.

In FIG. 19A, wavelength equalizer 650*m*, coupler 1462*d*, and waveguide switches 1464*d,g* are not used. In FIG. 19B, wavelength equalizer 650*m*, coupler 1462*d*, and waveguide switches 1464*d,g* are not used.

FIG. 19A and FIG. 19B, illustrate which ROADM input signal is routed to which wavelength equalizer by labeling each wavelength equalizer input port with a ROADM input signal name. Abbreviated ROADM input signals names are used, wherein the abbreviations D1, D2, D3, D4, A1, and A2, correspond to ROADM input signal names DEGREE 1, DEGREE 2, DEGREE 3, DEGREE 4, ADD 1, and ADD 2 respectively. An unused wavelength equalizer does not have an abbreviated ROADM input signal name on its respective wavelength equalizer input port.

TABLE 4

| Four Degrees & Two Add/Drop Ports (Version 2) | | | | | |
|---|---|---|---|---|---|
| Output Signal | Wavelength Equalizers Used & Corresponding Input Signal | | | | |
| DEGREE 1 | 650a of 1400a (DEGREE 2) | 650b of 1400a (ADD 2) | 650c of 1400a (ADD 1) | 650d of 1400a (DEGREE 4) | 650e of 1400a (DEGREE 3) |
| DEGREE 2 | 650f of 1400a (DEGREE 1) | 650g of 1400a (ADD 2) | 650h of 1400a (ADD 1) | 650i of 1400a (DEGREE 4) | 650j of 1400a (DEGREE 3) |
| DROP 1 | 650k of 1400a (DEGREE 1) | 650l of 1400a (DEGREE 2) | 650m of 1400a (UNUSED) | 650n of 1400a (DEGREE 4) | 650o of 1400a (DEGREE 3) |
| DEGREE 3 | 650a of 1400b (DEGREE 4) | 650b of 1400b (ADD 2) | 650c of 1400b (ADD 1) | 650d of 1400b (DEGREE 2) | 650e of 1400b (DEGREE 1) |
| DEGREE 4 | 650f of 1400b (DEGREE 3) | 650g of 1400b (ADD 2) | 650h of 1400b (ADD 1) | 650i of 1400b (DEGREE 2) | 650j of 1400b (DEGREE 1) |
| DROP 2 | 650k of 1400b (DEGREE 3) | 650l of 1400b (DEGREE 4) | 650m of 1400b (UNUSED) | 650n of 1400b (DEGREE 2) | 650o of 1400b (DEGREE 1) |

Each of the two software programmable ROADMs 1100 and 1400 can be used to construct optical nodes of various sizes and configurations. Both software programmable ROADM 1100 and 1400 can be programmed to at least two different configurations in order to create optical nodes of at least two different sizes. In general, a software programmable ROADM comprises a plurality of wavelength switches (650*a-j* for 1100, and 650*a-o* for 1400), and a plurality of waveguide switches (1135*a-d* & 1136*a-d* for 1100, and 1460*a-h* & 1464*a-h* for 1400). For both 1100 and 1400, when the plurality of waveguide switches are set to a first switch configuration, the software programmable ROADM provides n degrees of an n-degree optical node, and when the waveguide switches are set to a second switch configuration, the software programmable ROADM provides k degrees of an m-degree optical node, where n>1, and where m>n, and where k>0, and where the second switch configuration is different from the first switch configuration. (For the ROADM 1100, n=3, k=2, and m=4, so that k≠n, while for the ROADM 1400 of nodes 1600 and 1700, n=3, k=3, and m=5, so that k=n.) It can also be seen that when the plurality of waveguide switches of the software programmable ROADM are set to the first switch configuration, the software programmable ROADM provides wavelength switching for n degrees of the n-degree optical node, and wherein when the waveguide switches are set to the second switch configuration, the software programmable ROADM provides wavelength switching for k degrees of the m-degree optical node.

For software programmable ROADM 1100, the waveguide switches can be set (i.e., programmed) to a first switch configuration as shown in FIG. 12 in order to provide three degrees of a three-degree node (n=3). The waveguide switches of 1100 can also be set (i.e., programmed) to a second switch configuration as shown in FIG. 13 (1100*a*) in order to provide two degrees (k=2) of a four-degree node (m=4). For this case, m−n=4−3=1, and k≠n.

For software programmable ROADM 1400, the waveguide switches can be set (i.e., programmed) to a first switch configuration as shown in FIG. 15 in order to provide two degrees of a two-degree node (n=2). The waveguide switches of 1400 can also be set (i.e., programmed) to a second switch configuration as shown in FIG. 18A (1400*a*) in order to provide two degrees (k=2) of a four-degree node (m=4). For this case, m−n=4−2=2, and so m−n>1. Also, for this case k=n=2.

For software programmable ROADM 1400, the waveguide switches can be set (i.e., programmed) to a first switch configuration as shown in FIG. 15 in order to provide two degrees of a two-degree node (n=2). The waveguide switches of 1400 can also be set (i.e., programmed) to a second switch configuration as shown in FIG. 19A (1400*a*) in order to provide two degrees (k=2) of a four-degree node (m=4). For this case, m−n=4−2=2, and so m−n>1. Also, for this case k=n=2.

For software programmable ROADM 1400, the waveguide switches can be set (i.e., programmed) to a first switch configuration as shown in FIG. 16 in order to provide three degrees of a three-degree node (n=3). The waveguide switches of 1400 can also be set (i.e., programmed) to a second switch configuration as shown in FIG. 17A (1400*a*) in order to provide three degrees (k=3) of a five-degree node (m=5). For this case, m−n=5−3=2, and so m−n>1. Also, for this case k=n=3.

For software programmable ROADM 1400, the waveguide switches can be set (i.e., programmed) to a first switch configuration as shown in FIG. 15 in order to provide two degrees of a two-degree node (n=2). The waveguide switches of 1400 can also be set (i.e., programmed) to a second switch configuration (as shown in FIG. 16 in order to provide three degrees (k=3) of a three-degree node (m=3). For this case, m−n=3−2=1. Also, for this case k>n, and k=m.

By examining the various figures, for all of the above examples, the second switch configuration is different from the first switch configuration. Also, the plurality of wavelength switches within the software programmable ROADM are operable to selectively switch individual wavelengths, and the plurality of waveguide switches are not operable to selectively switch individual wavelengths.

For software programmable ROADM applications that require two software programmable ROADMs, when setting the waveguide switches to the second switch configuration, there are three waveguide switch configurations. The first switch configuration is the switch configuration used when the software programmable ROADM is used in a standalone ROADM application (such as shown in FIG. 15, or such as shown in FIG. 16). The second switch configuration is the switch configuration used by the first software programmable ROADM of a configuration that uses two software programmable ROADMs. The third switch configuration is the switch configuration used by the second software programmable ROADM of the configuration that uses two software programmable ROADMs.

A first example of the three switch configuration settings is illustrated in FIG. 15, FIG. 18A, and FIG. 18B. For this example, the waveguide switches of the software programmable ROADM 1400 are set to a first switch configuration (as shown in FIG. 15, for the 2-degree node configuration). In FIG. 18A, the waveguide switches are set to a second switch configuration (to provide the first two degrees of the four-degree node). And in FIG. 18B, the waveguide switches are set to a third switch configuration (to provide the second two degrees of the four-degree node). For this example, the third switch configuration is deferent from the second switch configuration. The software programmable ROADM using the third switch configuration (1400*b* in FIG. 18B) provides two degrees of the four-degree optical node.

A second example of the three switch configuration settings is illustrated in FIG. 16, FIG. 17A, and FIG. 17B. For this example, the waveguide switches of software programmable ROADM 1400 are set to a first switch configuration (as shown in FIG. 16, for the 3-degree node configuration). In FIG. 17A, the waveguide switches are set to a second switch configuration (to provide the first three degrees of the five-degree node). And in FIG. 17B, the waveguide switches are set to a third switch configuration (to provide the last two degrees of the five-degree node). For this example, the third switch configuration is deferent from the second switch configuration. The software programmable ROADM using the third switch configuration (1400*b* in FIG. 18B) provides two degrees of the five-degree optical node.

A third example of the three switch configuration settings is illustrated in FIG. 12, FIG. 13A, and FIG. 13B. For this example, the waveguide switches of software programmable ROADM 1100 are set to a first switch configuration (as shown in FIG. 12, for the 3-degree node configuration). In FIG. 13A, the waveguide switches are set to a second switch configuration (to provide the first two degrees of the four-degree node). And in FIG. 13B, the waveguide switches are set to a third switch configuration (to provide the last two degrees of the four-degree node). For this example, the third switch configuration is identical to the second switch configuration. The software programmable ROADM using the third switch configuration (1100*b* in FIG. 13B) provides two degrees of the four-degree optical node.

For the above examples, the second software programmable ROADM of the two-ROADM configuration provides m−k degrees of the m-degree optical node. For the first example n=2, m=4, and k=2, and so the second software programmable ROADM provides m−k=4−2=2 degrees. For the second example n=3, m=5, and k=3, and so the second software programmable ROADM provides m−k=5−3=2 degrees. For the third example n=3, m=4, and k=2, and so the second software programmable ROADM provides m−k=4−2=2 degrees.

The presented software programmable ROADMs also provide one or more directionless add/drop ports. In general, an optical degree may be substituted for a directionless add/drop port, or a directionless add/drop port may be substituted for an optical degree. For instance, when the plurality of waveguide switches are set to a first switch configuration, the software programmable ROADM 1400 of FIG. 15 (1500) provides two optical degrees and two directionless add/drop ports, and when the plurality of waveguide switches are set to a second switch configuration, the software programmable ROADM 1400 of FIG. 16 (1600) provides three optical degrees and one directionless add/drop port. In general, it can be stated that, in some cases, when the plurality of waveguide switches of a software programmable ROADM are set to a first switch configuration, the software programmable ROADM provides n degrees and q directionless add/drop ports of an optical node, and wherein when the plurality of waveguide switches are set to a second switch configuration the software programmable ROADM provides n+j degrees and q−j directionless add/drop ports of an optical node, wherein q>0, and wherein j>0. For the example first and second switch configurations of 1500 and 1600, n=2, and q=2, and j=1, so that for the first switch configuration, the software programmable ROADM 1400 provides n=2 degrees and q=2 directionless add/drop ports of an optical node, and when set to the second switch configuration, the software programmable ROADM 1400 provides n+j=2+1=3 degrees and q−j=2−1=1 directionless add/drop port of an optical node.

A method of constructing an optical node having n optical degrees is as follows. For a given software programmable ROADM there is a threshold number of optical degrees i, wherein two software programmable ROADMs must be used to construct the optical node having n optical degrees (rather than just one software programmable ROADM). If the number of optical degree n is less than i, then a single software programmable ROADM can be used to construct the optical node, and the software programmable ROADM will have its set of waveguide switches set to a first configuration to construct the optical node having n number of optical degrees, wherein n<i. However, if the number of optical degrees n is greater than or equal to i, then two software programmable ROADMs must be used to construct the optical node, and the first software programmable ROADM of the two software programmable ROADMs will have its set of waveguide switches set to a second configuration to construct the optical node having n number of optical degrees, wherein n≥i. For the case where n≥i, the second software programmable ROADM used to construct the optical node must have its waveguide switches configured to a third switch configuration. The two software programmable ROADMs used when n≥i may be identical, and they may be optically connected together using a single parallel optical cable.

The method described above may simply be stated as, a method of constructing an optical node having n number of optical degrees comprising: configuring a set of waveguide switches to a first switch configuration on a software programmable ROADM) if n<i, and configuring the set of waveguide switches to a second switch configuration on the software programmable ROADM if n≥i. The method further comprises configuring a second set of waveguide switches to a third switch configuration on a second software programmable ROADM if n≥i. The method further comprising optically connecting the software programmable ROADM to the second software programmable ROADM using a single parallel optical cable if n≥i.

Figure 20:
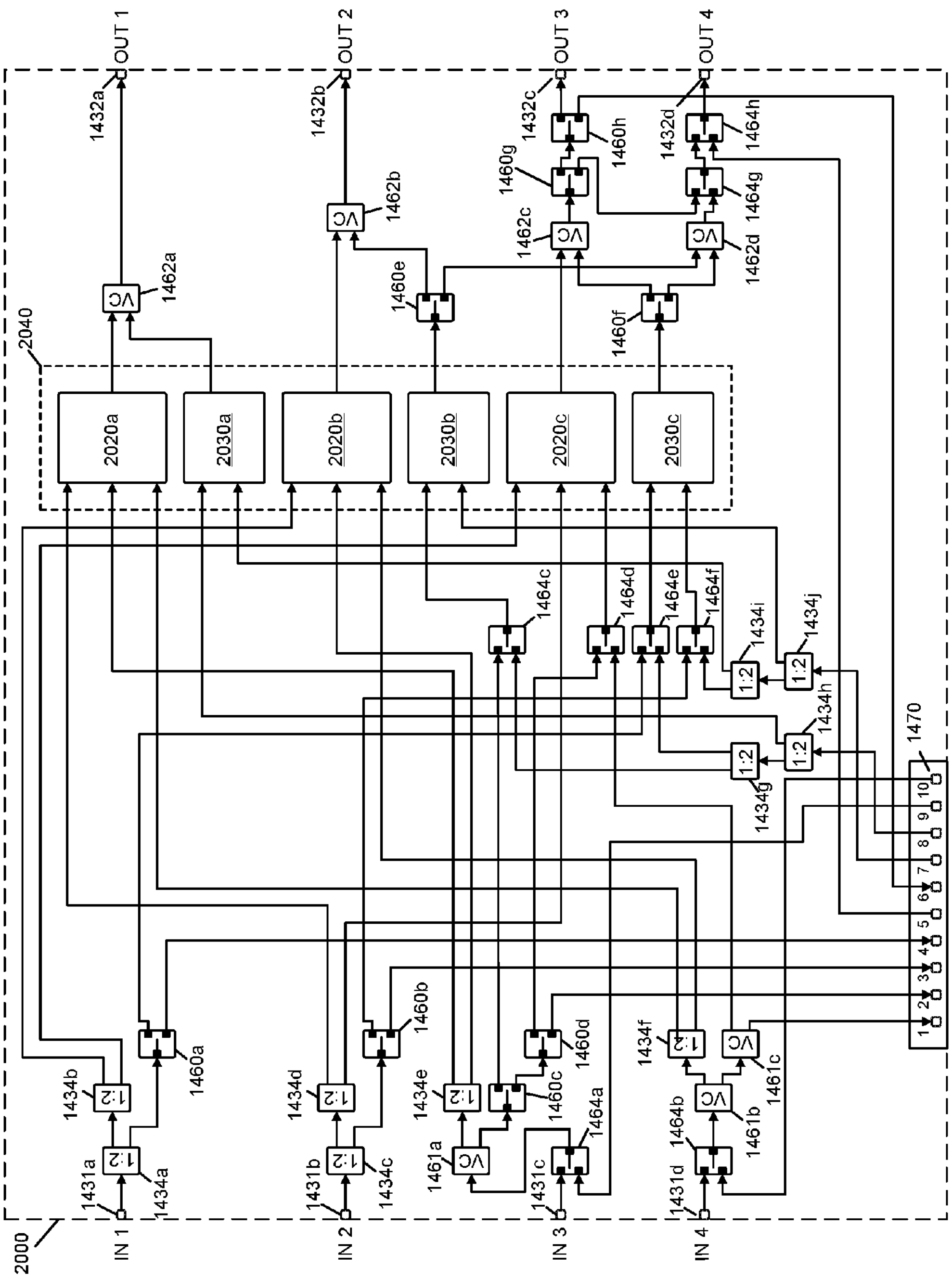
FIG. 20 is an illustration of a second software programmable ROADM used to construct two, three, four, and five-degree optical nodes.

FIG. 20 illustrates a software programmable ROADM 2000 that is identical to the software programmable ROADM 1400, except that the wavelength equalizers (wavelength switches) have been replaced by 3×1 2020*a-c* and 2×1 2030*a-c* wavelength selective switches 2040. More specifically, the WSS formed by 650*a-c* and coupler 1433*a* has been replaced by 3×1 WSS 2020*a*, the WSS formed by 650*d-e* and coupler 1435*a* has been replaced by 2×1 WSS 2030*a*, the WSS formed by 650*f-h* and coupler 1433*b* has been replaced by 3×1 WSS 2020*b*, the WSS formed by 650*i-j* and coupler 1435*b* has been replaced by 2×1 WSS 2030*b*, the WSS formed by 650*k-m* and coupler 1433*c* has been replaced by 3×1 WSS 2020*c*, and the WSS formed by 650*n-o* and coupler 1435*c* has been replaced by 2×1 WSS 2030*c*.

The plurality of wavelength switches in the software programmable ROADM 2000 comprises of a set of p×1 wavelength selective switches and a set of r×1 wavelength selective switches, wherein r>p. For the software programmable ROADM 2000, r=3, and p=2. Alternatively, a software programmable ROADM may comprise of a single set of r×1 wavelength selective switches.

Figure 21:
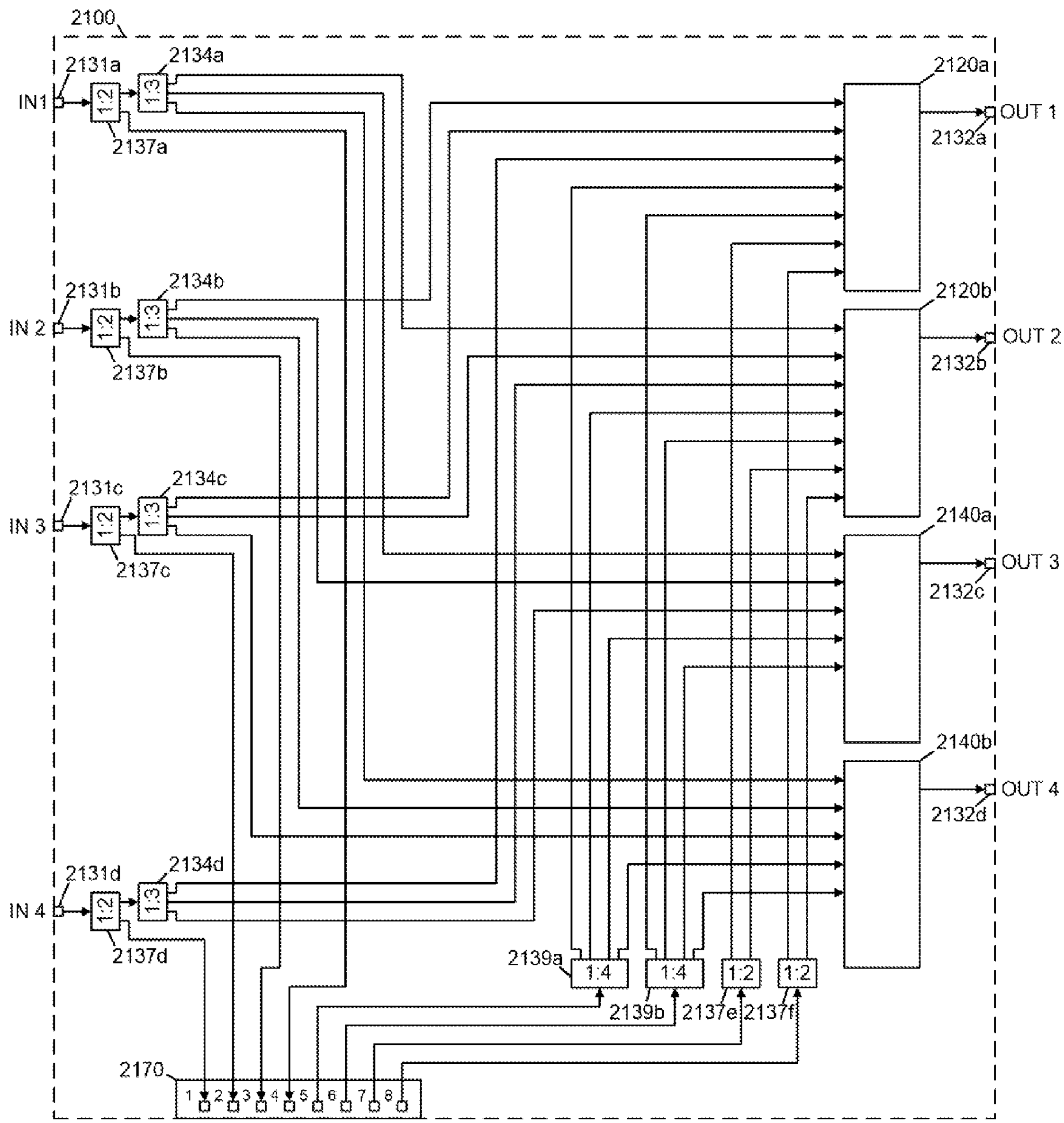
FIG. 21 is an illustration of a ROADM used to construct two, three, four, and five-degree optical nodes.

FIG. 21 is an illustration of ROADM 2100 used to construct two, three, four, and five-degree optical nodes. The ROADM 2100 passively interconnects optical couplers 2137*a-f*, 2134*a-d*, 2139*a-b*, and WSS devices 2120*a-b*, 2140*a-b*. For wavelength switching, the ROADM 2100 uses two 7×1 WSS devices and two 5×1 WSS, instead of the fifteen wavelength equalizers used in the software programmable ROADM 1400, and instead of the three 3×1 WSS devices and three 2×1 WSS devices used in software programmable ROADM 2000. Like the ROADM 1400, the ROADM 2100 has four primary optical inputs 2131*a-d*, four primary optical outputs 2132*a-d*, and a plurality of secondary optical inputs and outputs 2170. In most of the applications of the ROADM 2100, the wavelength switching capability of the four WSS devices 2120*a-b*, 2140*a-b* is very underutilized, as will be illustrated.

Figure 22:
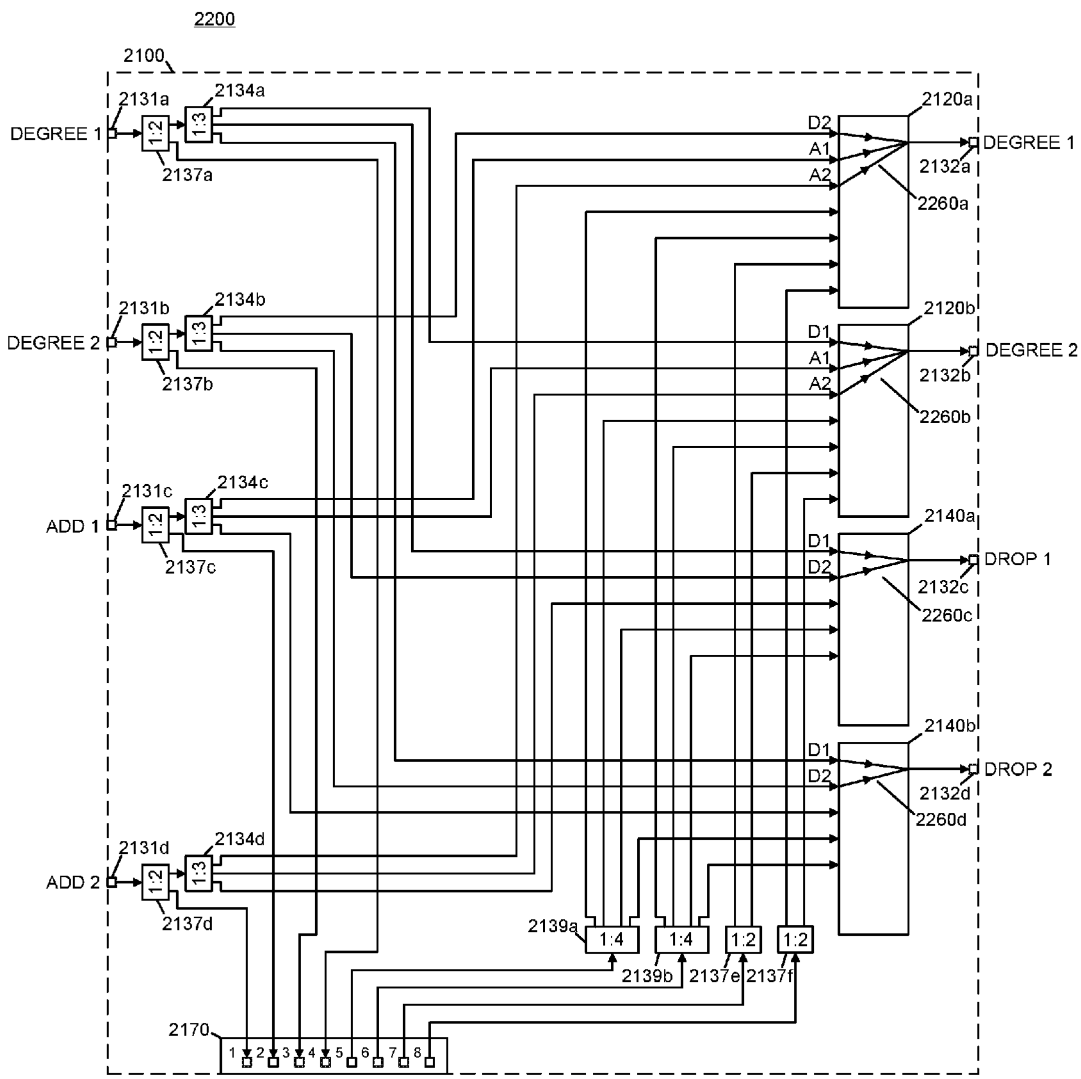
FIG. 22 illustrates the use of the FIG. 21 ROADM to construct a two-degree optical node with two directionless add/drop ports.

FIG. 22 illustrates the use of the FIG. 21 ROADM 2100 to construct a two-degree optical node with two directionless add/drop ports 2200. Within the WSS devices 2120*a-b*, 2140*a-b*, the solid lines 2260*a-d* connecting WSS inputs to a corresponding WSS output indicate which WSS inputs are used for the two-degree optical node with two directionless add/drop ports. As shown, only 10 of the 24 inputs are used, resulting in a very inefficient use of wavelength switching resources.

Figure 23:
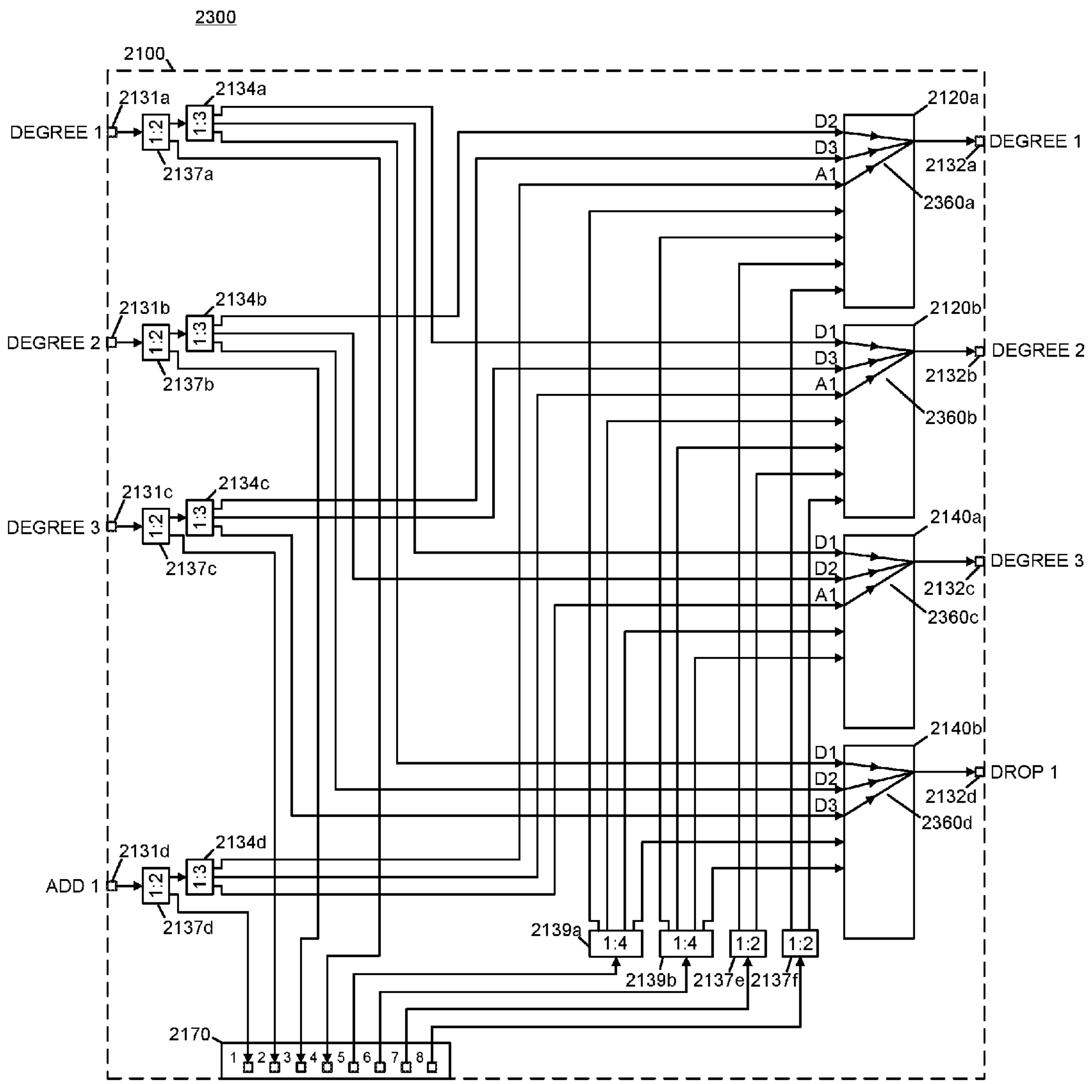
FIG. 23 illustrates the use of the FIG. 21 ROADM to construct a three-degree optical node with a single directionless add/drop port.

FIG. 23 illustrates the use of the FIG. 21 ROADM 2300 to construct a three-degree optical node with a single directionless add/drop port 2300. Within the WSS devices 2120*a-b*, 2140*a-b*, the solid lines 2360*a-d* connecting WSS inputs to a corresponding WSS output indicate which WSS inputs are used for the three-degree optical node with one directionless add/drop port. As shown, only 12 of the 24 inputs are used, resulting in a very inefficient use of wavelength switching resources.

FIG. 22 and FIG. 23, illustrate which ROADM input signal is routed to which wavelength switch by labeling each wavelength switch input port with a ROADM input signal name. Abbreviated ROADM input signals names are used, wherein the abbreviations D1, D2, D3, A1, and A2, correspond to ROADM input signal names DEGREE 1, DEGREE 2, DEGREE 3, ADD 1, and ADD 2 respectively. An unused input port of a wavelength switch does not have an abbreviated ROADM input signal name on its respective wavelength switch input port.

Figure 24A:
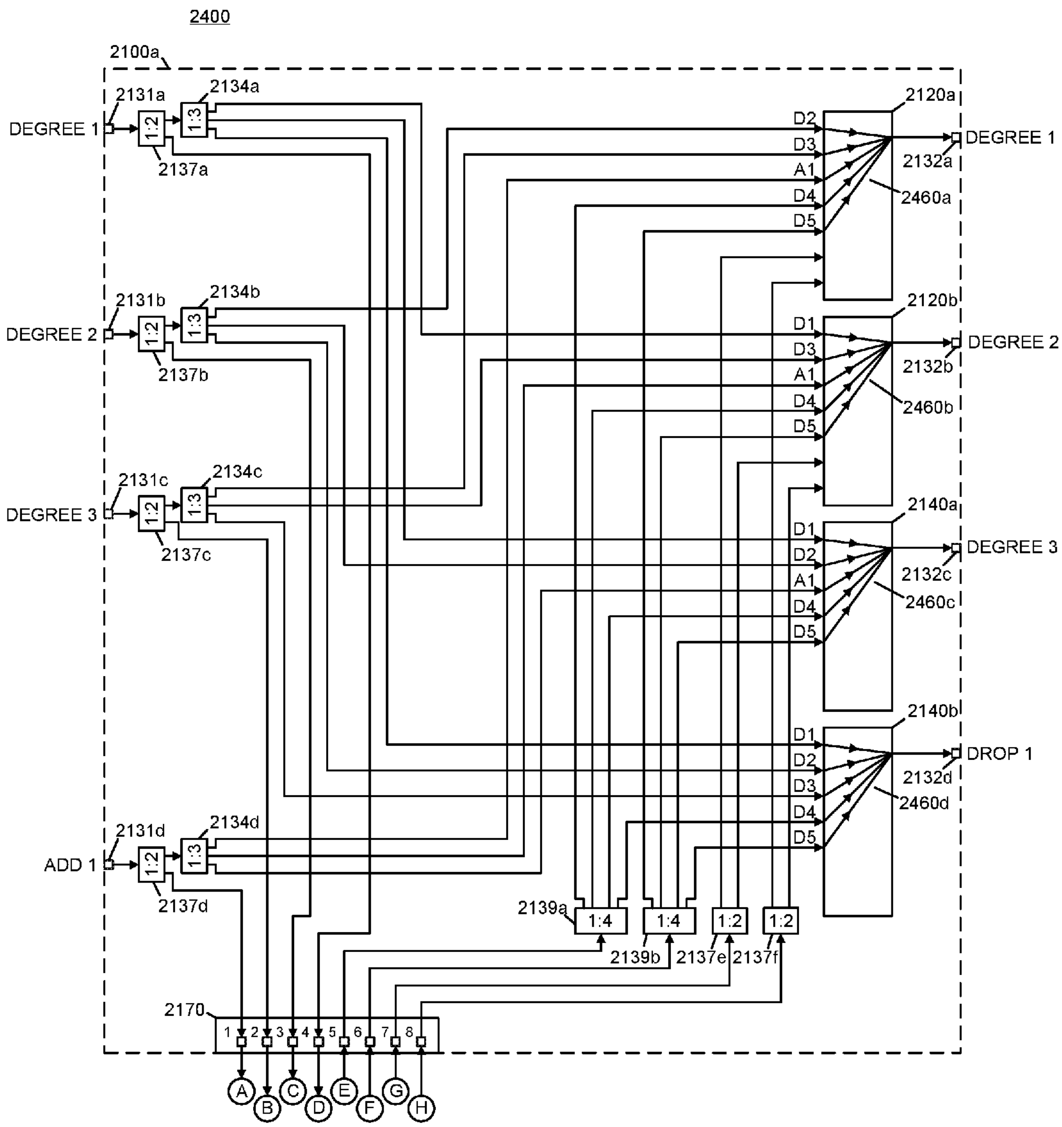
FIGS. 24A and 24B illustrate the use of two FIG. 21 ROADMs to construct a five-degree optical node with a single directionless add/drop port.
Figure 24B:
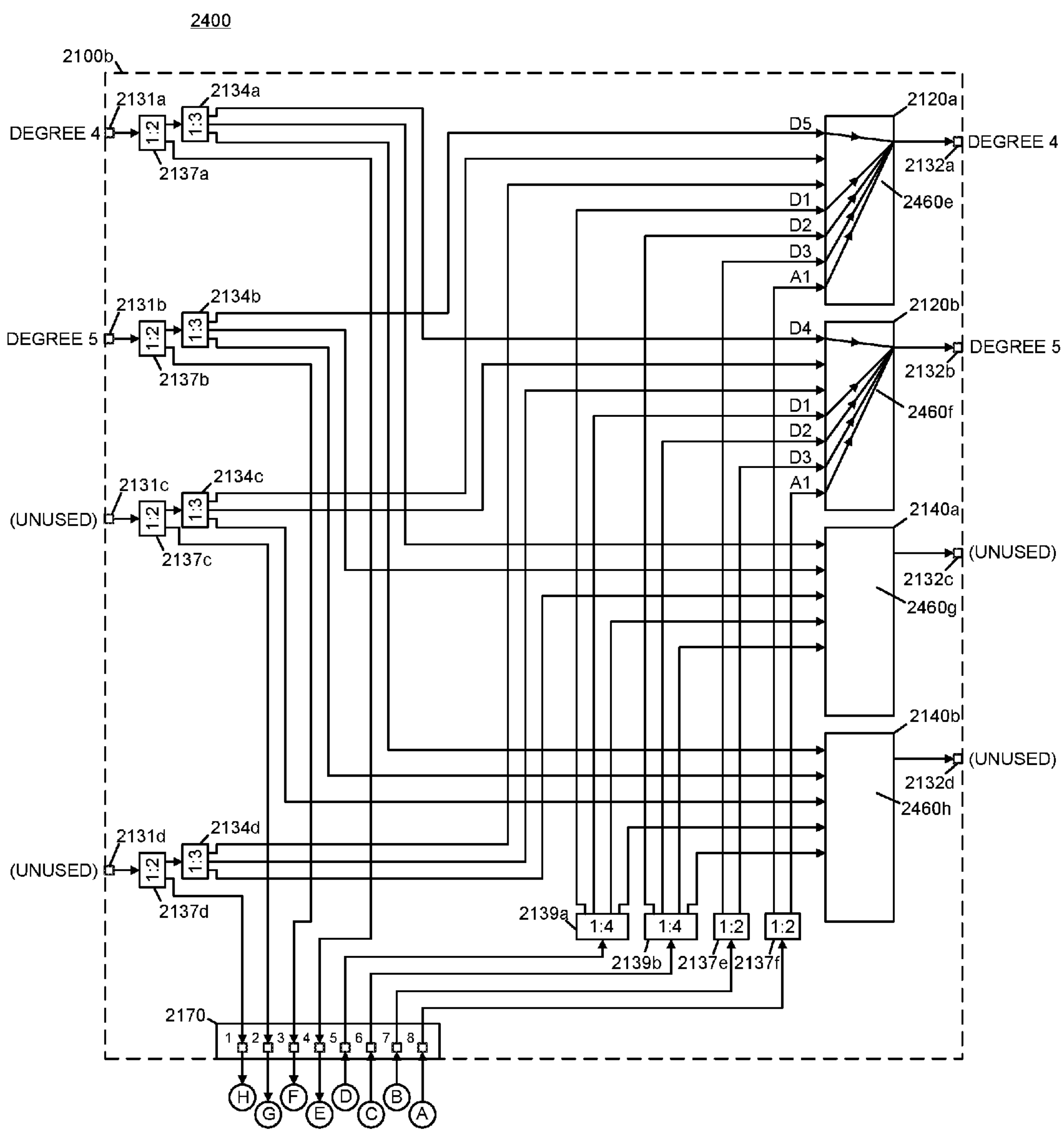

FIGS. 24A and 24B illustrate the use of two FIG. 21 ROADMs 2100*a-b* to construct a five-degree optical node with a single directionless add/drop port 2400. The two ROADMs are connected to together using the secondary optical inputs and outputs 2170, as indicated. The solid lines 2460*a-h* within the WSS devices indicate that 20 of 24 WSS inputs are used on 2100*a*, but only 10 of 24 WSS inputs are used on 2100*b*.

FIG. 24A and FIG. 24B, illustrate which ROADM input signal is routed to which wavelength switch by labeling each wavelength switch input port with a ROADM input signal name. Abbreviated ROADM input signals names are used, wherein the abbreviations D1, D2, D3, D4, D5, and A1, correspond to ROADM input signal names DEGREE 1, DEGREE 2, DEGREE 3, DEGREE 4, DEGREE 5, and ADD 1 respectively. An unused input port of a wavelength switch does not have an abbreviated ROADM input signal name on its respective wavelength switch input port.

Figure 25A:
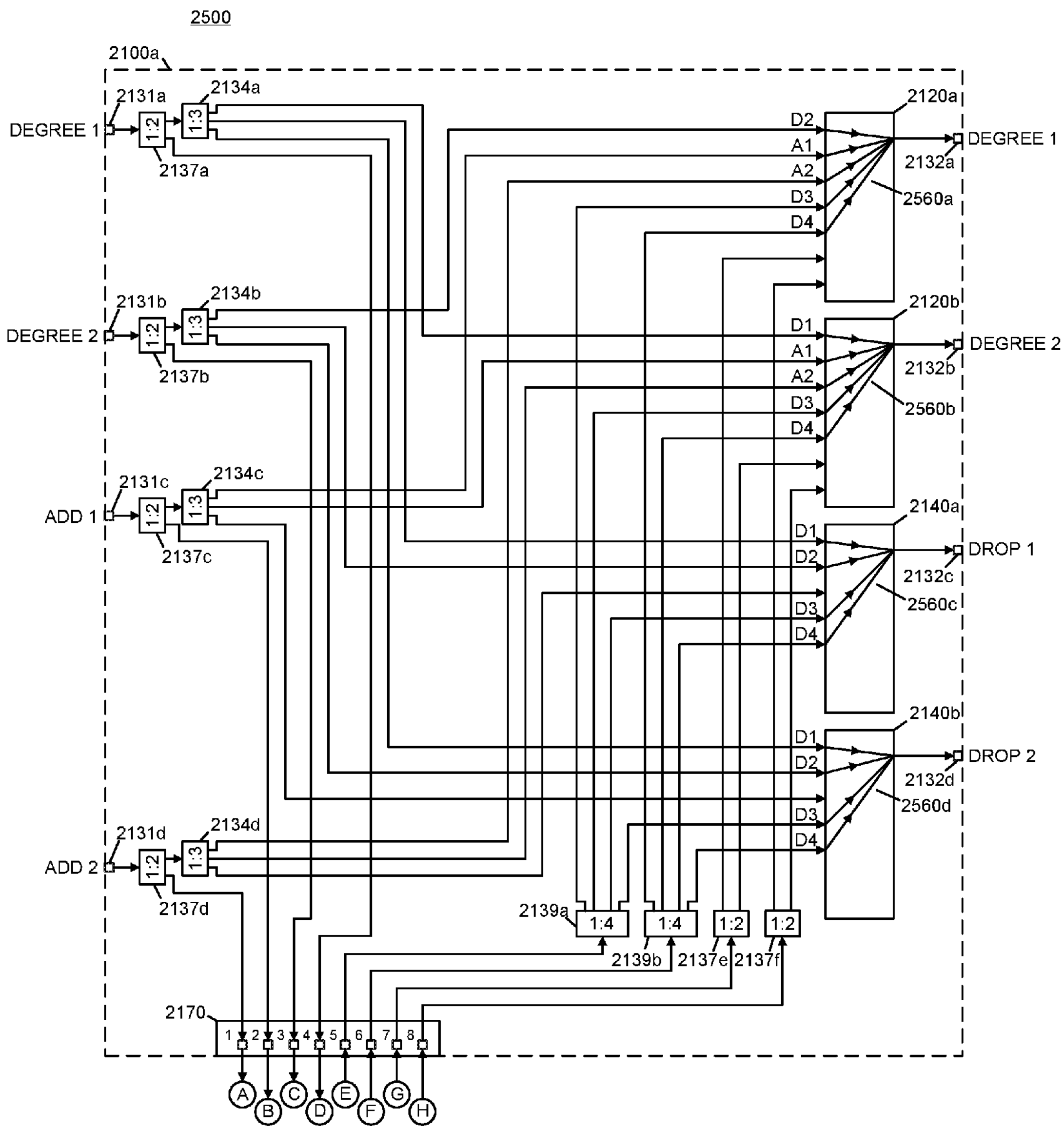
FIGS. 25A and 25B illustrate the use of two FIG. 21 ROADMs to construct a four-degree optical node with two directionless add/drop ports.
Figure 25B:
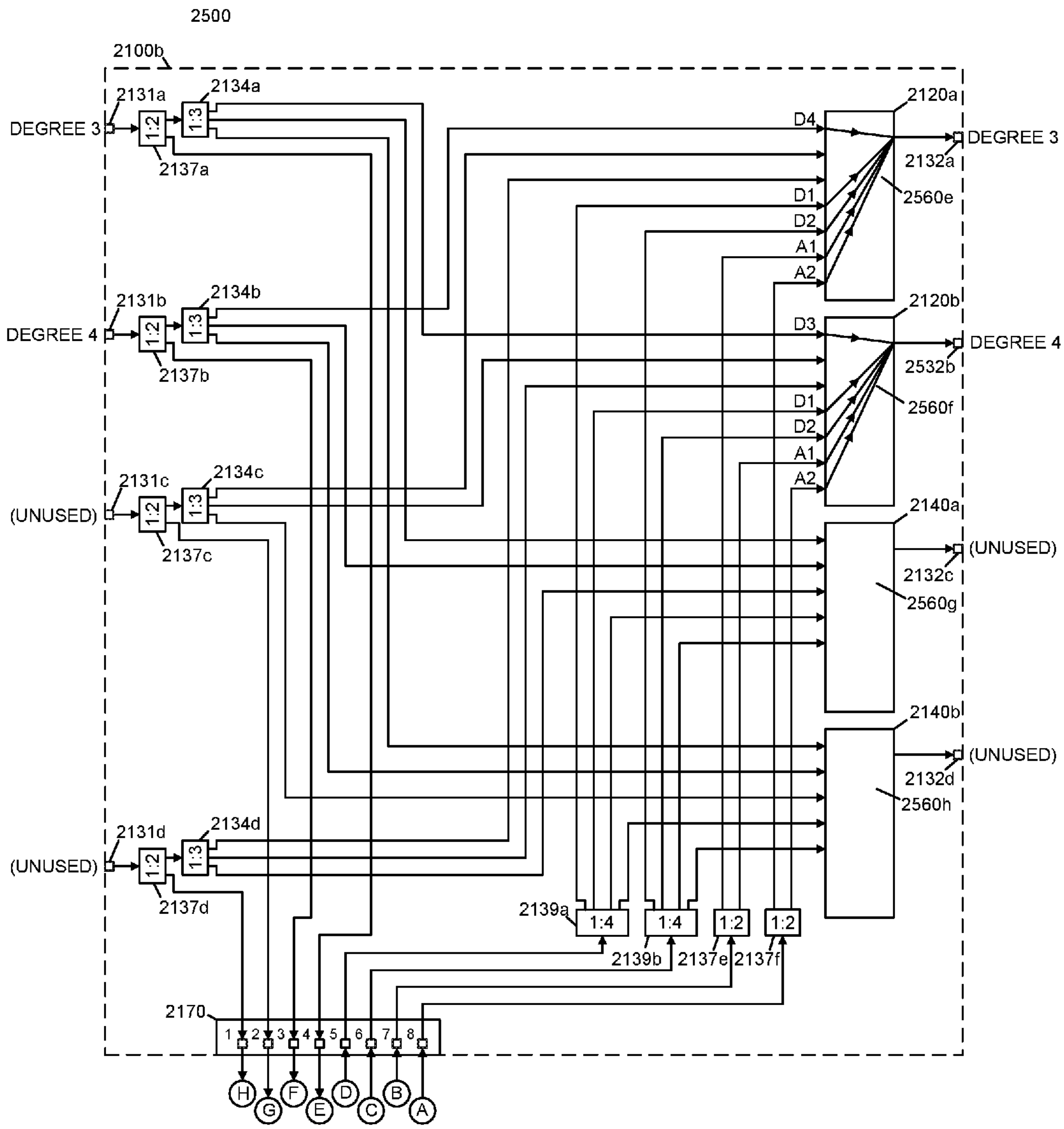

FIGS. 25A and 25B illustrate the use of two FIG. 21 ROADMs 2100*a-b* to construct a four-degree optical node with two directionless add/drop ports 2500. The solid lines 2560*a-h* within the WSS devices indicate that 18 of 24 WSS inputs are used on 2100*a*, but only 10 of 24 WSS inputs are used on 2100*b*.

Figure 26A:
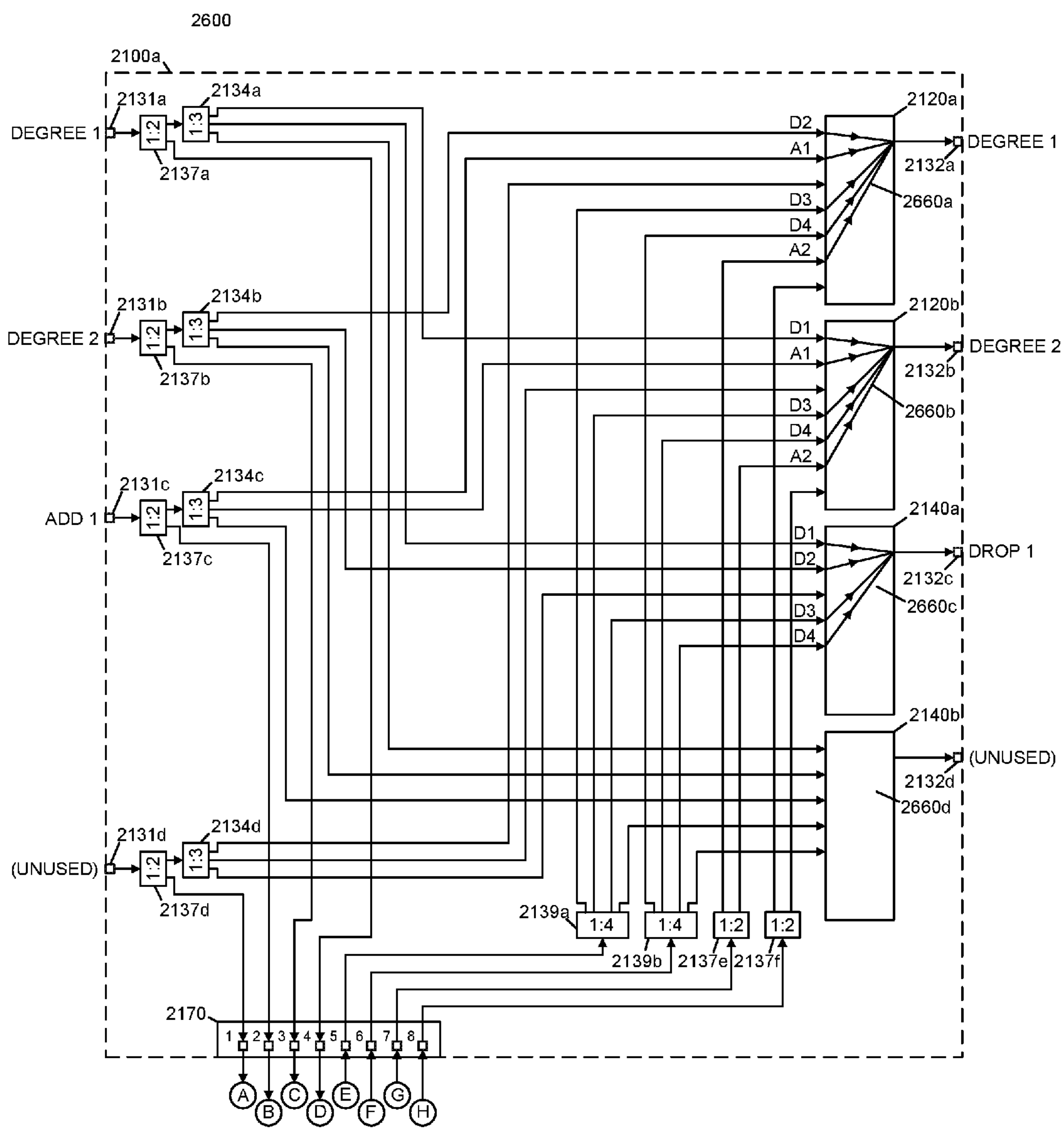
FIGS. 26A and 26B illustrate the use of two FIG. 21 ROADMs to construct another version of a four-degree optical node with two directionless add/drop ports.
Figure 26B:
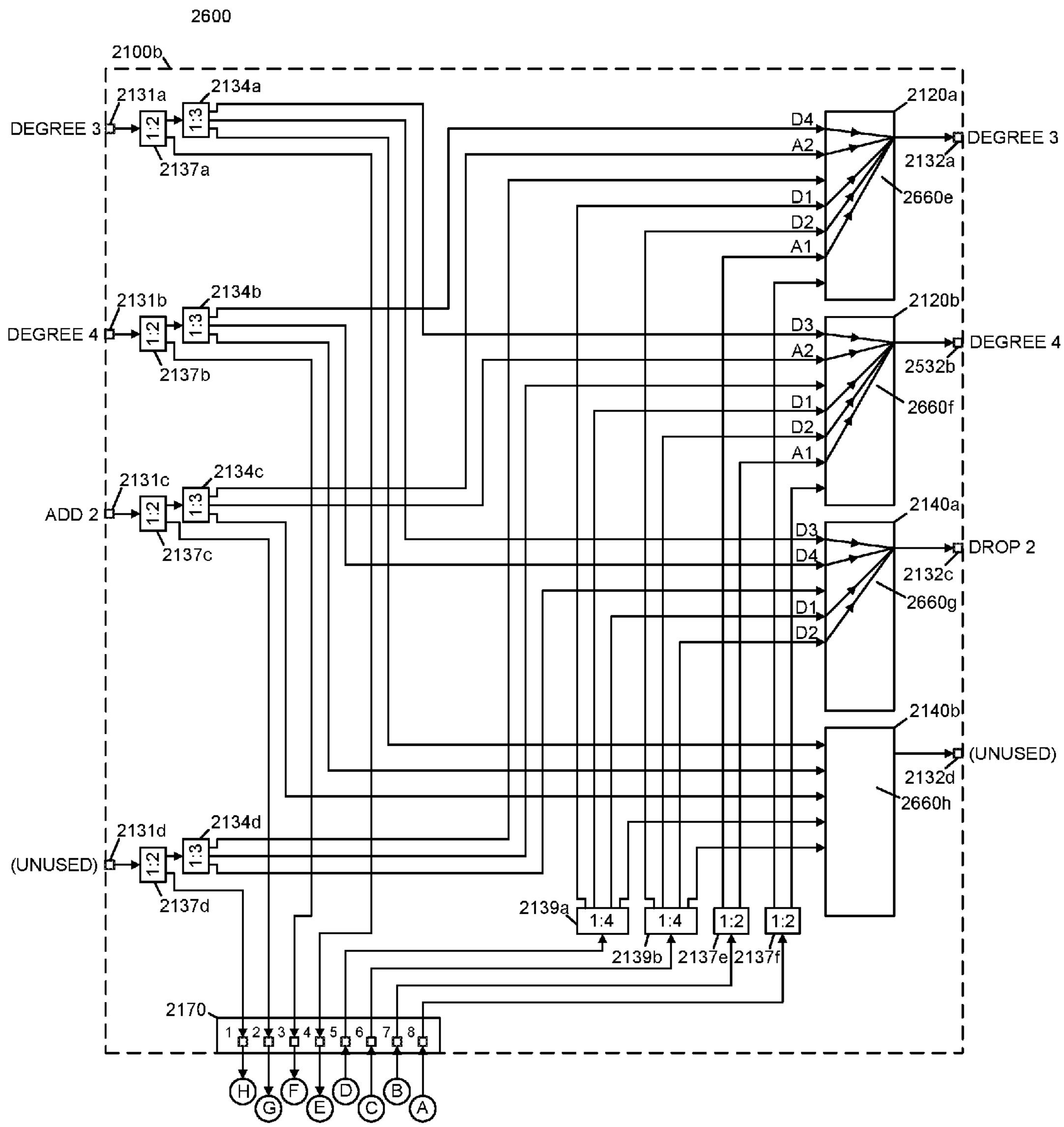

FIGS. 26A and 26B illustrate the use of two FIG. 21 ROADMs 2100*a-b* to construct another version of a four-degree optical node with two directionless add/drop ports 2600. The solid lines 2660*a-h* within the WSS devices indicate that only 14 of 24 WSS inputs are used on 2100*a*, and only 14 of 24 WSS inputs are used on 2100*b*.

FIG. 25A, FIG. 25B, FIG. 26A, AND FIG. 26B illustrate which ROADM input signal is routed to which wavelength switch by labeling each wavelength switch input port with a ROADM input signal name. Abbreviated ROADM input signals names are used, wherein the abbreviations D1, D2, D3, D4, A1, and A2, correspond to ROADM input signal names DEGREE 1, DEGREE 2, DEGREE 3, DEGREE 4, ADD 1, and ADD 2 respectively. An unused input port of a wavelength switch does not have an abbreviated ROADM input signal name on its respective wavelength switch input port.

Figure 27:
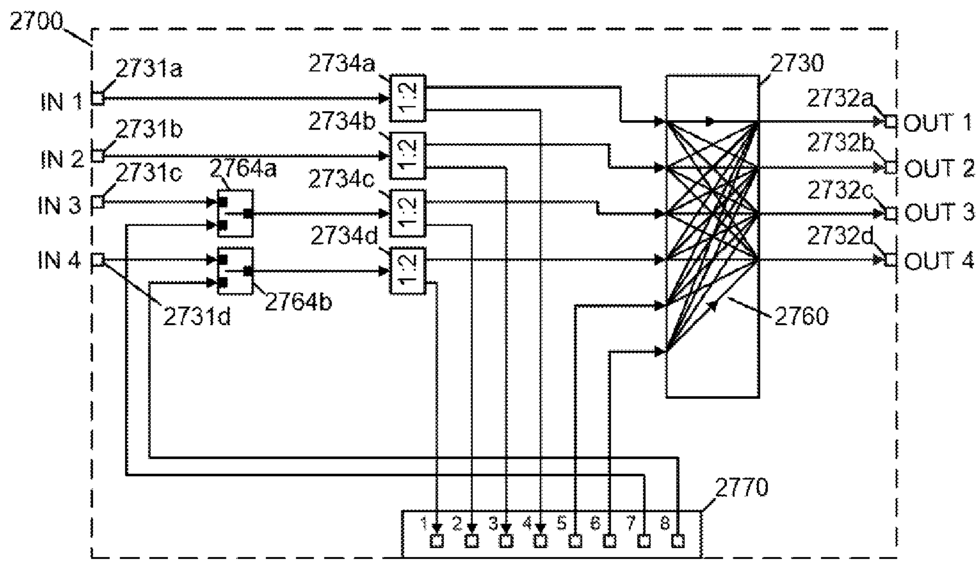
FIG. 27 is an illustration of a software programmable ROADM used to construct two, three, four, and five-degree optical nodes.

FIG. 27 is an illustration of another software programmable ROADM 2700 used to construct two, three, four, and five-degree optical nodes. To perform wavelength switching, ROADM 2700 uses a single N×M wavelength selective switch (WSS) 2730, where N=6, and M=4. The solid lines 2760 within the WSS 2730 indicate the available paths through the WSS. As shown, a path exists between each input and each output. The software programmable ROADM 2700 further comprises fixed ratio 1 to 2 optical couplers 2734*a-d*, waveguide switches 2764*a-b*, primary optical inputs and outputs 2731*a-d* & 2732*a-d*, and secondary optical inputs and outputs 2770.

Figure 28:
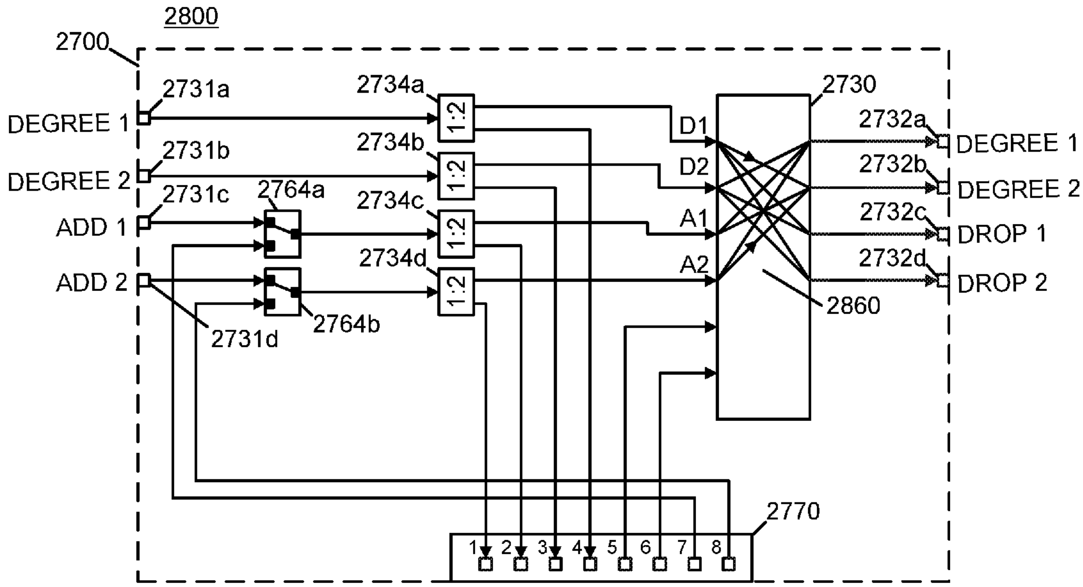
FIG. 28 illustrates the use of the FIG. 27 software programmable ROADM to construct a two-degree optical node with two directionless add/drop ports.

FIG. 28 illustrates the use of the FIG. 27 software programmable ROADM 2700 to construct a two-degree optical node with two directionless add/drop ports 2800. The solid lines 2860 through the WSS 2730 indicates the paths through the WSS used for this application. As shown, only 10 of the 24 paths are used. The waveguide switches 2764*a-b* are set to a first switch configuration (both in the "UP" position), connecting the two ADD ports 2731*c-d* to the WSS via the couplers.

Figure 29:
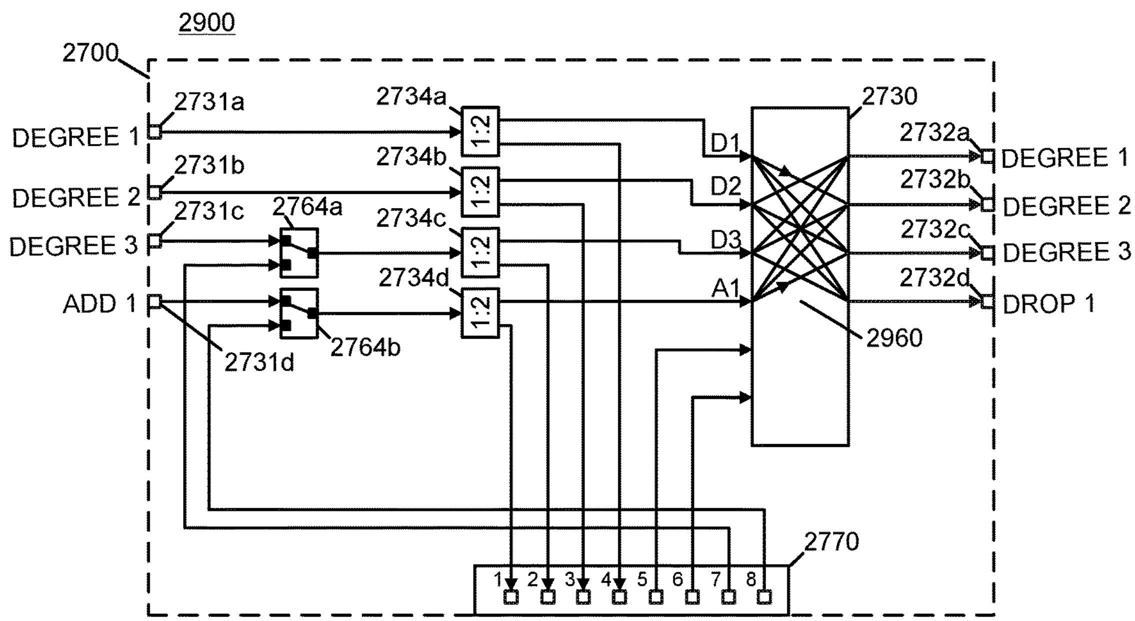
FIG. 29 illustrates the use of the FIG. 27 software programmable ROADM to construct a three-degree optical node with a single directionless add/drop port.

FIG. 29 illustrates the use of the FIG. 27 software programmable ROADM 2700 to construct a three-degree optical node with a single directionless add/drop port 2900. The solid lines 2960 through the WSS 2730 indicate that only 12 of 24 paths are used. The waveguide switches 2764*a-b* are set to the same switch configuration used for the 2800 optical node.

Figure 30:
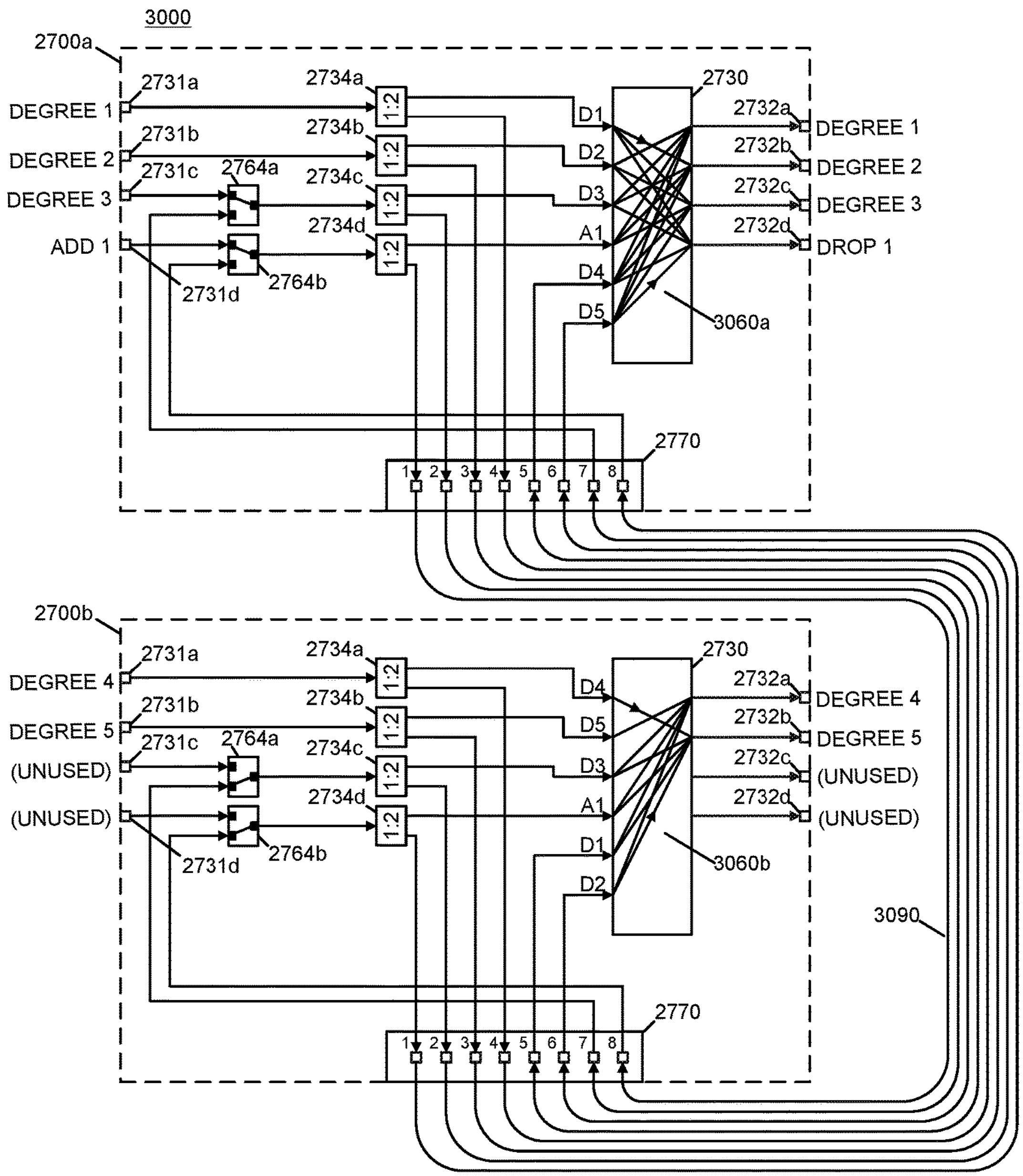
FIG. 30 illustrates the use of two FIG. 27 software programmable ROADMs to construct a five-degree optical node with a single directionless add/drop port.

FIG. 30 illustrates the use of two FIG. 27 software programmable ROADMs 2700*a-b* to construct a five-degree optical node with a single directionless add/drop port 3000. The two ROADMs 2700*a-b* are interconnected via their secondary optical ports 2770. The solid lines 3060*a-b* through the WSS devices 2730 indicate that 20 of 24 paths are used within the WSS of 2700*a*, and only 10 of 24 paths are used within the WSS of 2700*b*. For ROADM 2700*a*, waveguide switches 2764*a-b* are set to the same switch configuration used for the 2800 and 2900 optical nodes, while in ROADM 2700*b*, the waveguide switches 2764*a-b* are set to a second switch configuration (both in the "DOWN" position).

Figure 31:
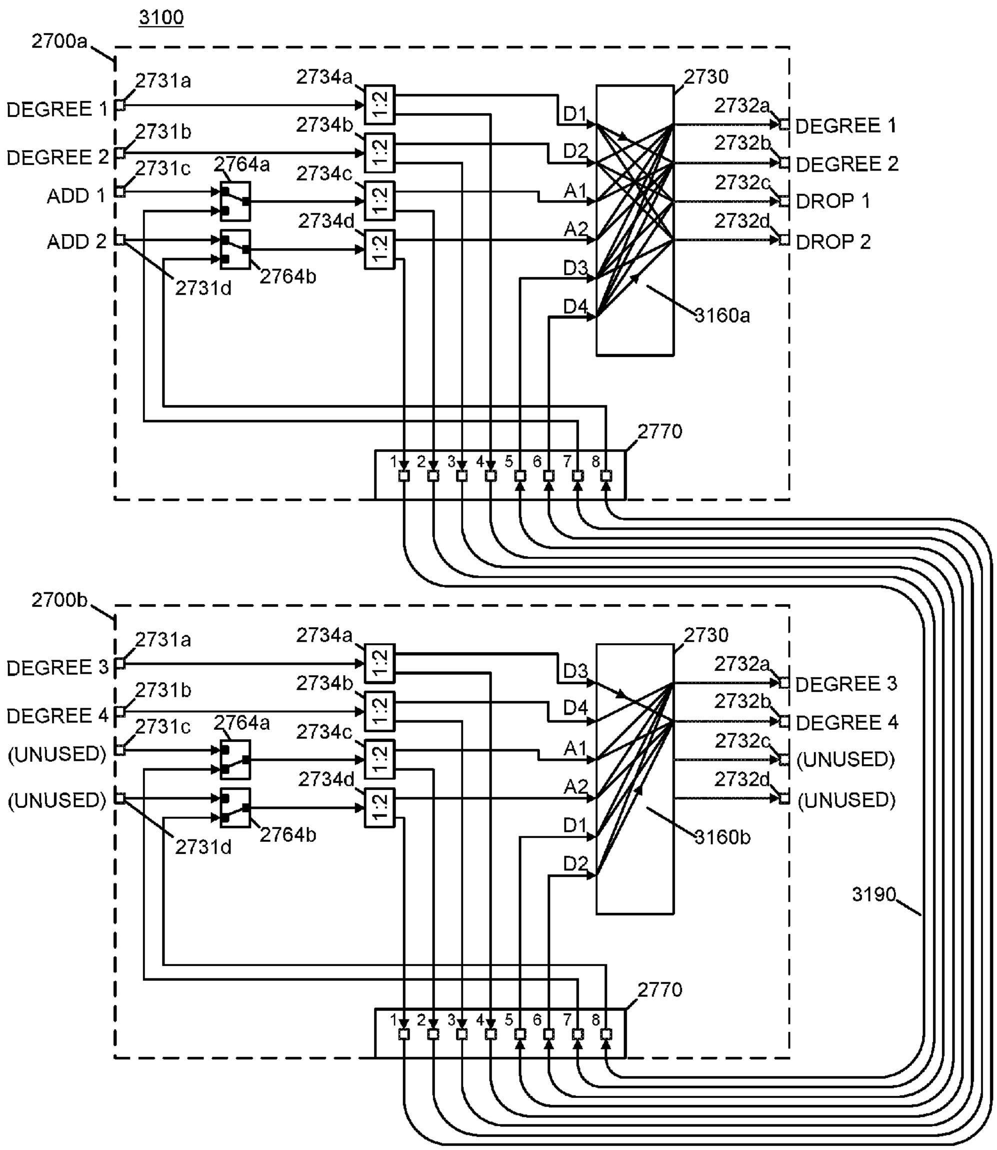
FIG. 31 illustrates the use of two FIG. 27 software programmable ROADMs to construct a four-degree optical node with two directionless add/drop ports.

FIG. 31 illustrates the use of two FIG. 27 software programmable ROADMs 2700*a-b* to construct a four-degree optical node with two directionless add/drop ports 3100. The solid lines 3160*a-b* through the WSS devices 2730 indicate that 18 of 24 paths are used within the WSS of 2700*a*, and only 10 of 24 paths are used within the WSS of 2700*b*. For ROADM 2700*a*, waveguide switches 2764*a-b* are set to the same switch configuration used for the 2800 and 2900 optical nodes, while in ROADM 2700*b*, the waveguide switches 2764*a-b* are set to the second switch configuration (both in the "DOWN" position), like in optical node 3000.

Figure 32:
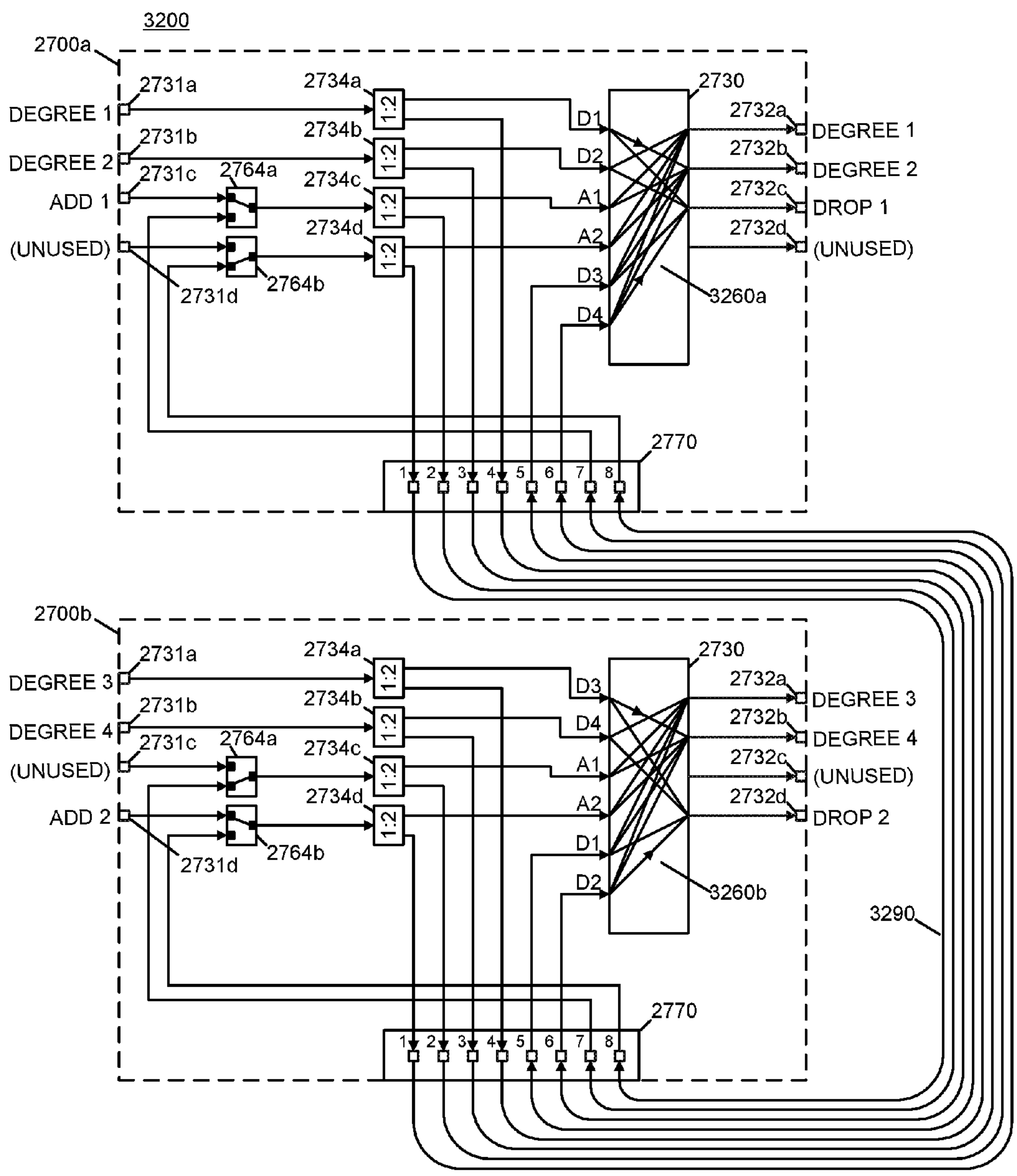
FIG. 32 illustrates the use of two FIG. 27 software programmable ROADMs to construct another version of a four-degree optical node with two directionless add/drop ports.

FIG. 32 illustrates the use of two FIG. 27 software programmable ROADMs 2700*a-b* to construct another version of a four-degree optical node with two directionless add/drop ports 3200. The solid lines 3260*a-b* through the WSS devices 2730 indicate that only 14 of 24 paths are used within each of the two WSSs. For ROADM 2700*a*, waveguide switches 2764*a-b* are set to third switch configuration (2764*a* in the "UP" position, and 2764*b* in the "DOWN" position), while for ROADM 2700*b*, waveguide switches 2764*a-b* are set to fourth switch configuration (2764*a* in the "DOWN" position, and 2764*b* in the "UP" position).

FIG. 28, FIG. 29, FIG. 30, FIG. 31 and FIG. 32 illustrate which ROADM input signal is routed to which wavelength switch by labeling each wavelength switch input port with a ROADM input signal name. Abbreviated ROADM input signals names are used, wherein the abbreviations D1, D2, D3, D4, D5, A1, and A2, correspond to ROADM input signal names DEGREE 1, DEGREE 2, DEGREE 3, DEGREE 4, DEGREE 5, ADD 1, and ADD 2 respectively. An unused input port of a wavelength switch does not have an abbreviated ROADM input signal name on its respective wavelength switch input port.

Figure 33:
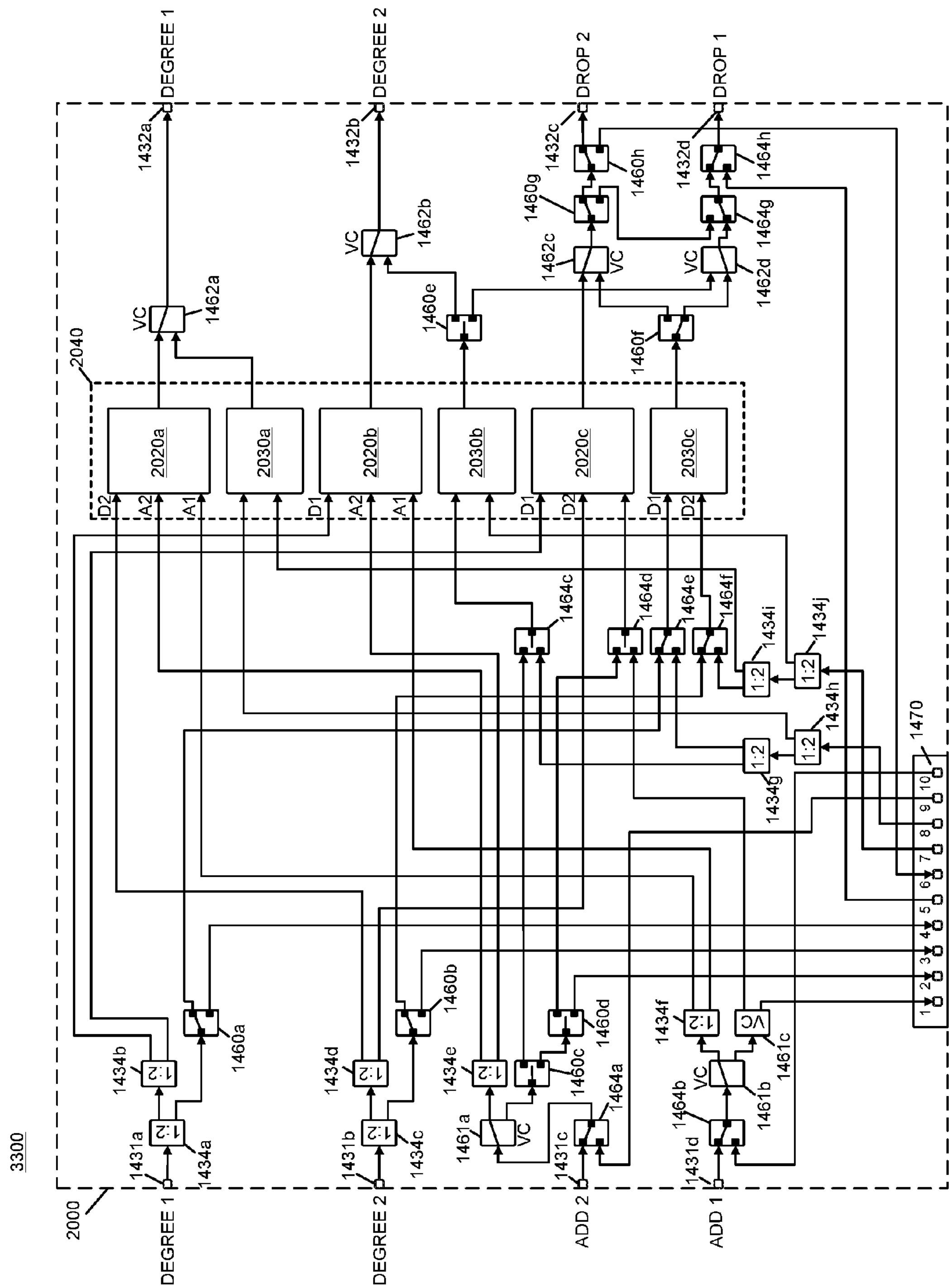
FIG. 33 illustrates the use of the FIG. 20 software programmable ROADM to construct a two-degree optical node with two directionless add/drop ports.

FIG. 33 illustrates the use of the FIG. 20 software programmable ROADM 2000 to construct a two-degree optical node with two directionless add/drop ports 3300, and is substantially similar to the optical node 1500.

Figure 34:
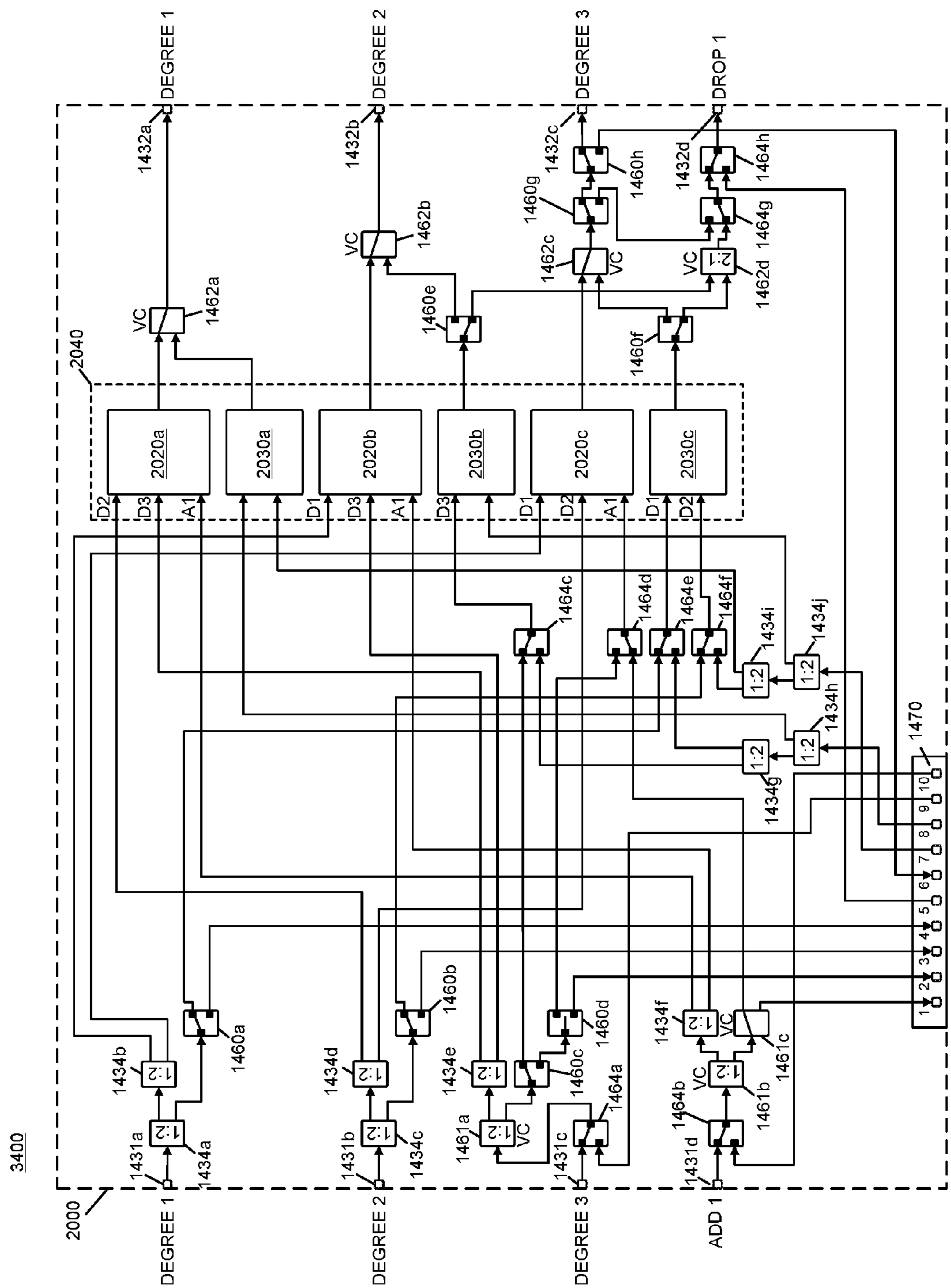
FIG. 34 illustrates the use of the FIG. 20 software programmable ROADM to construct a three-degree optical node with a single directionless add/drop port.

FIG. 34 illustrates the use of the FIG. 20 software programmable ROADM 2000 to construct a three-degree optical node with a single directionless add/drop port 3400, and is substantially similar to the optical node 1600.

Figure 35A:
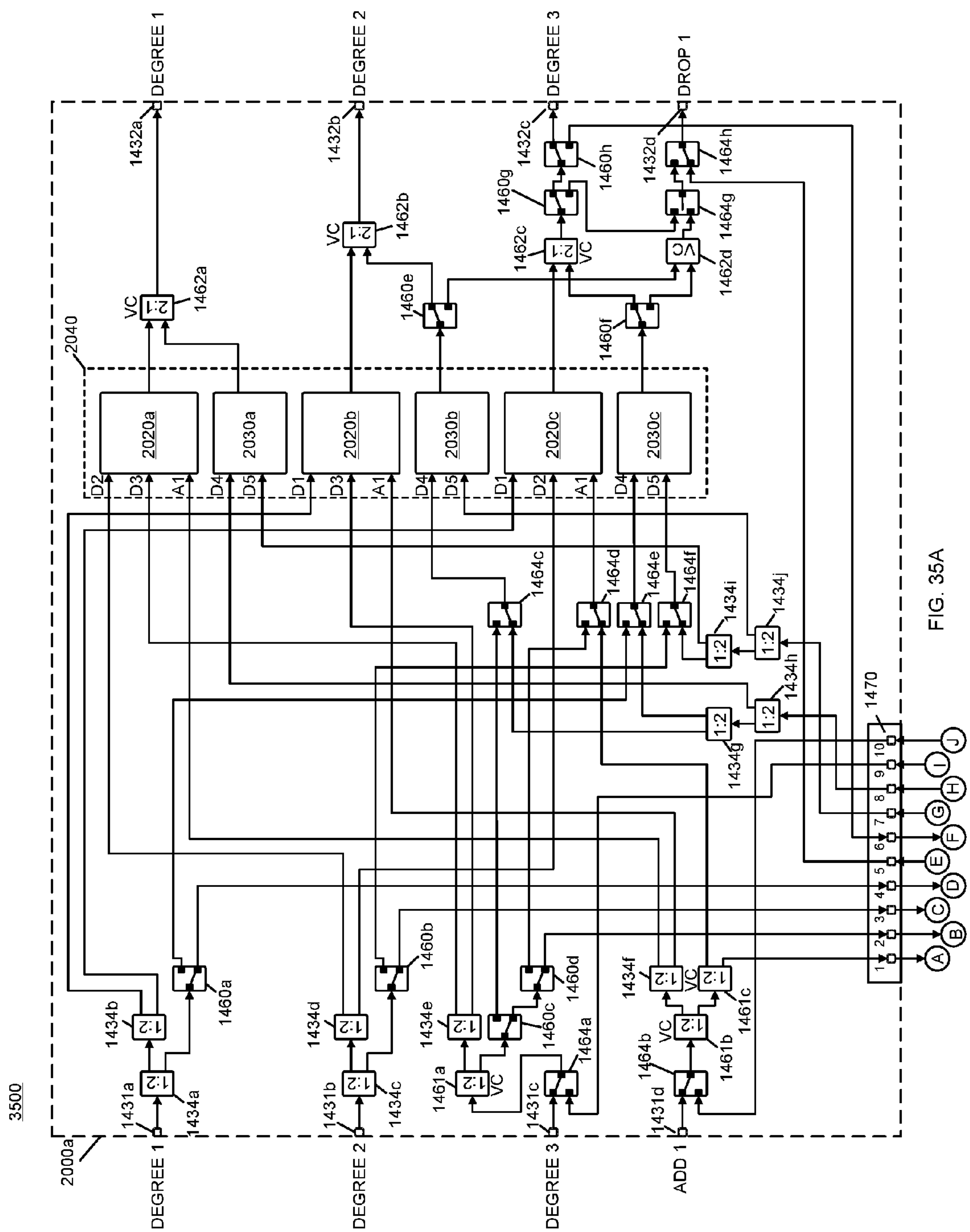
FIGS. 35A and 35B illustrate the use of two FIG. 20 software programmable ROADMs to construct a five-degree optical node with a single directionless add/drop port.
Figure 35B:
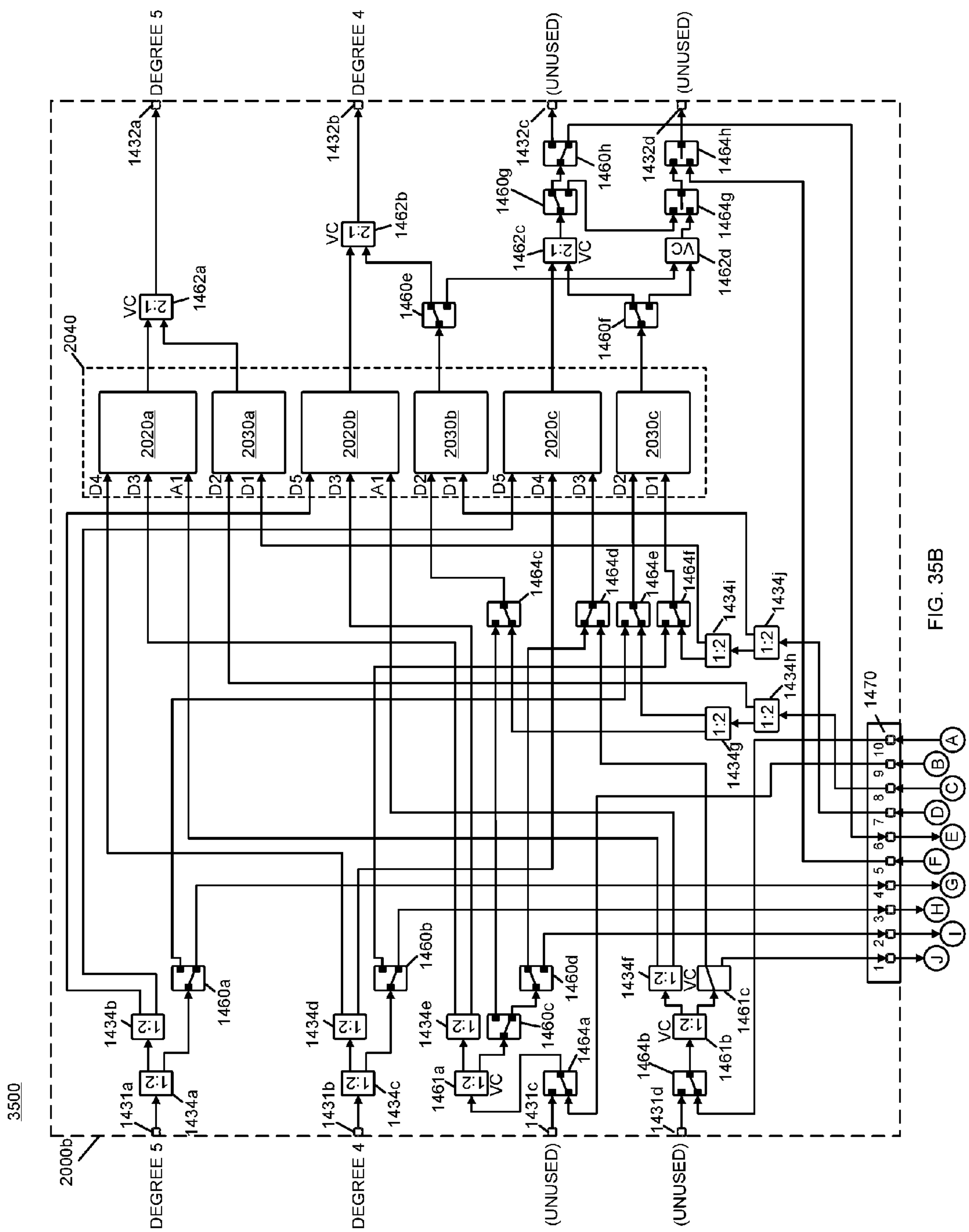

FIGS. 35A and 35B illustrate the use of two FIG. 20 software programmable ROADMs 2000*a-b* to construct a five-degree optical node with a single directionless add/drop port 3500, and is substantially similar to the optical node 1700.

Figure 36A:
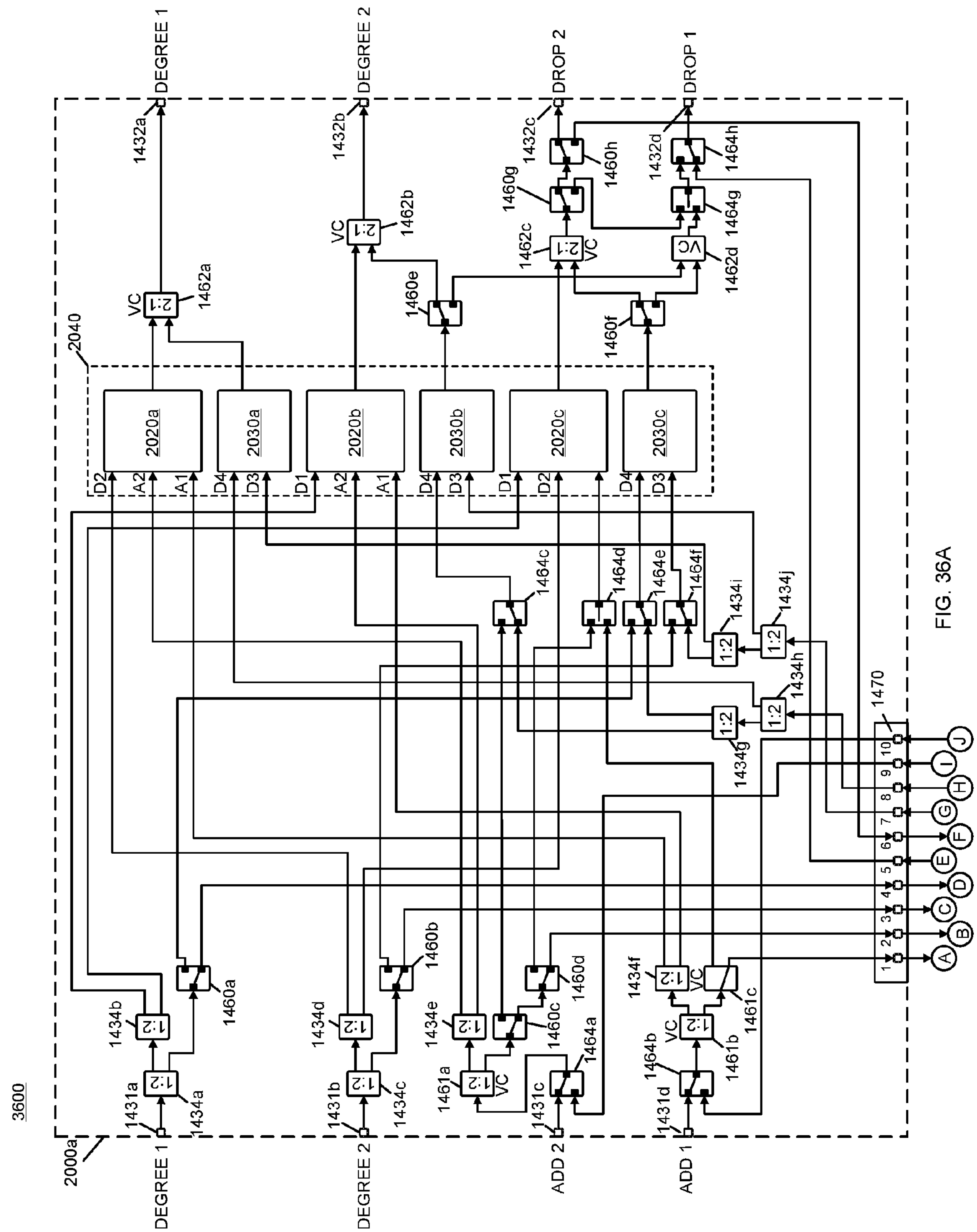
FIGS. 36A and 36B illustrate the use of two FIG. 20 software programmable ROADMs to construct a four-degree optical node with two directionless add/drop ports.
Figure 36B:
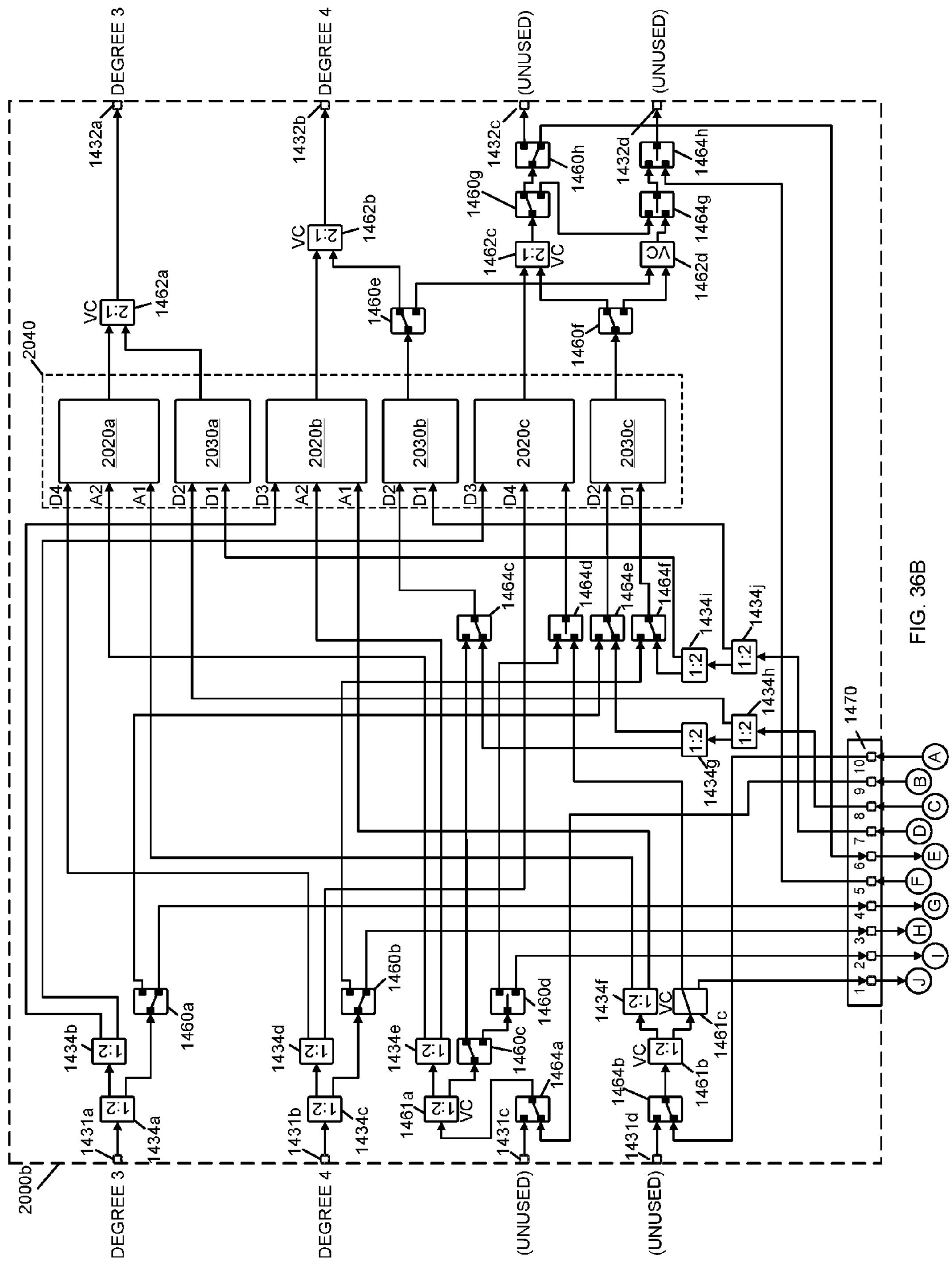

FIGS. 36A and 36B illustrate the use of two FIG. 20 software programmable ROADMs 2000*a-b* to construct a four-degree optical node with two directionless add/drop ports 3600, and is substantially similar to the optical node 1800.

Figure 37A:
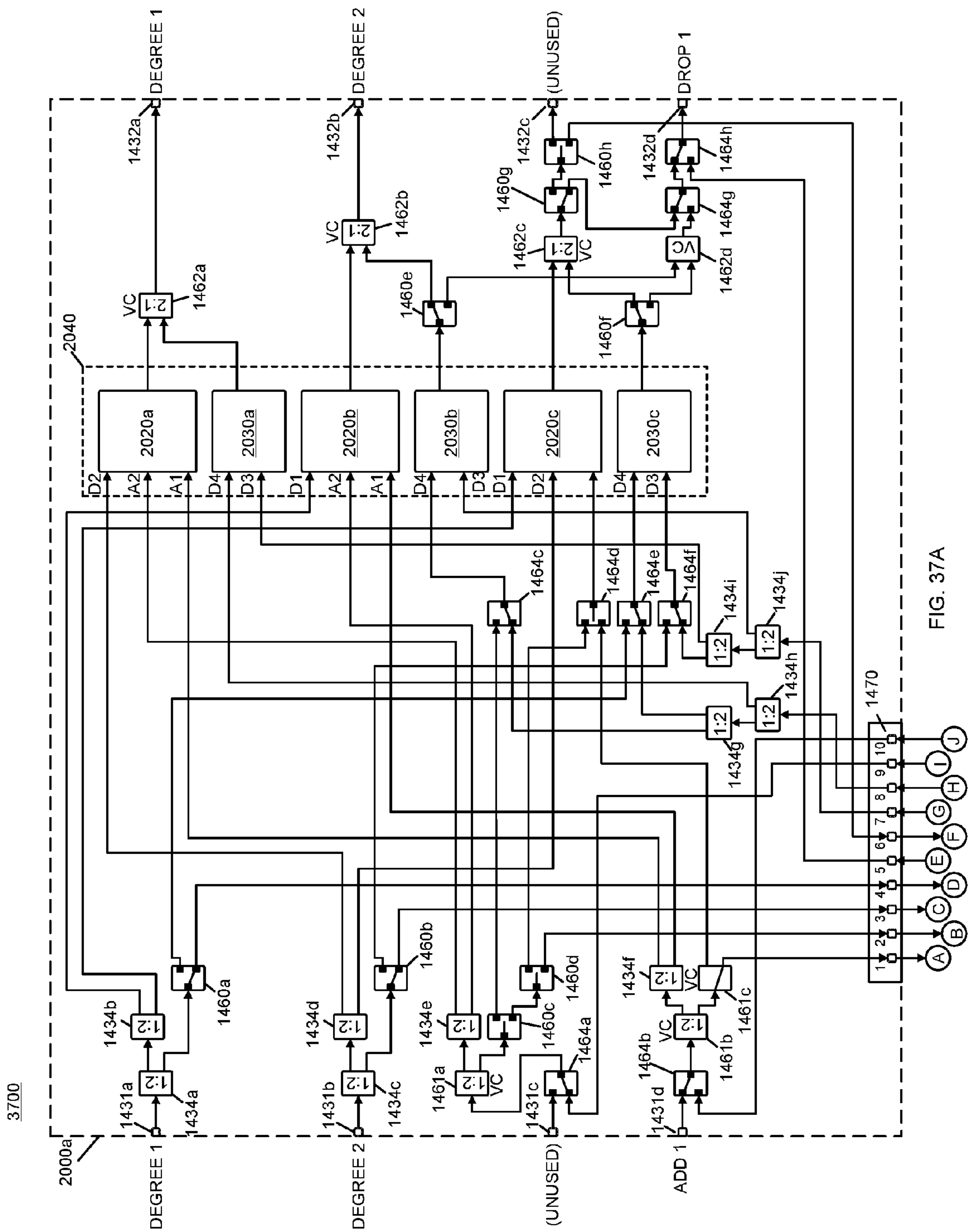
FIGS. 37A and 37B illustrate the use of two FIG. 20 software programmable ROADMs to construct another version of a four-degree optical node with two directionless add/drop ports.
Figure 37B:
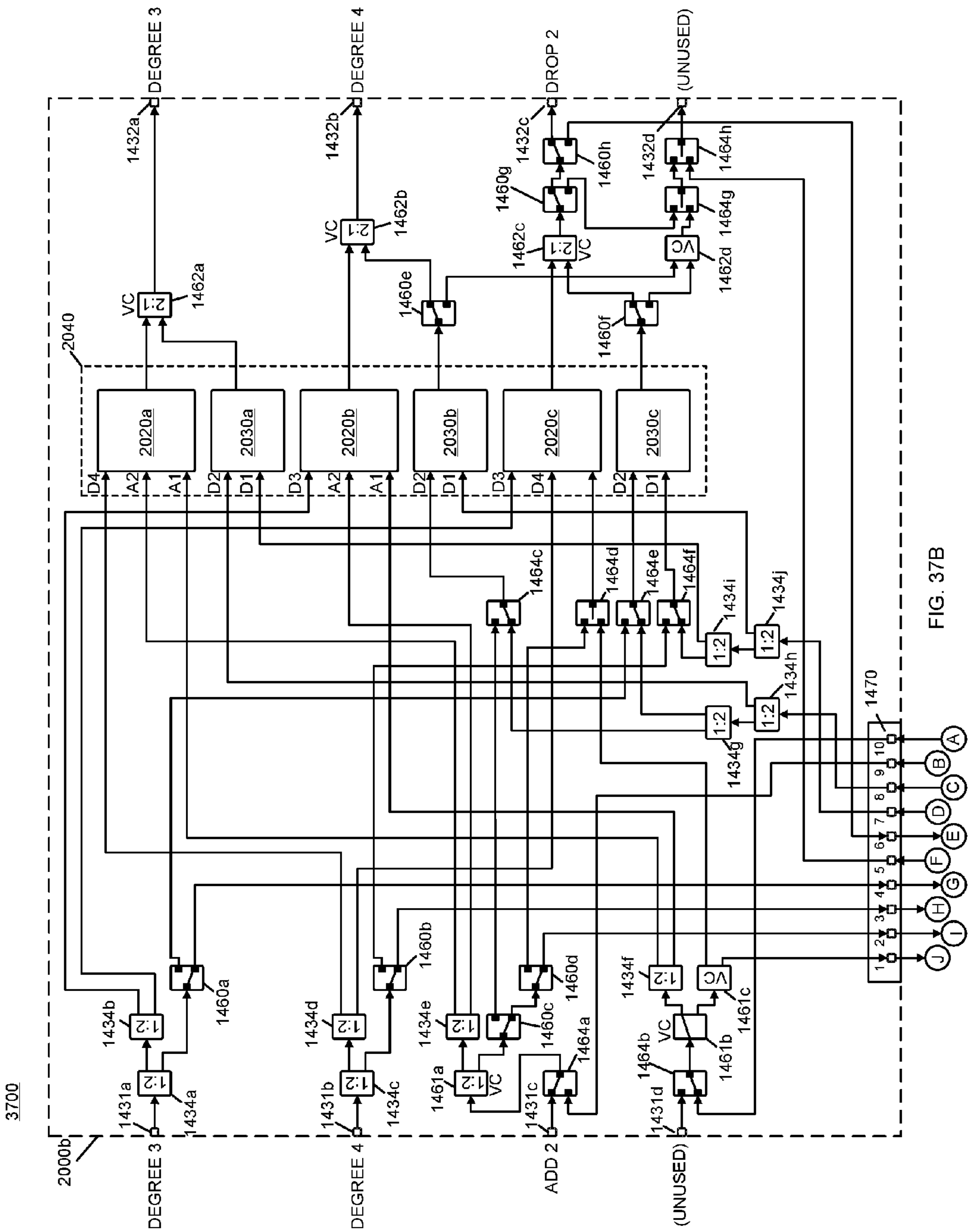

FIGS. 37A and 37B illustrate the use of two FIG. 20 software programmable ROADMs 2000*a-b* to construct another version of a four-degree optical node with two directionless add/drop ports 3700, and is substantially similar to the optical node 1900.

FIG. 33, FIG. 34, FIG. 30, FIGS. 35A&B, FIGS. 36A&B and FIGS. 37A&B illustrate which ROADM input signal is routed to which wavelength switch by labeling each wavelength switch input port with a ROADM input signal name. Abbreviated ROADM input signals names are used, wherein the abbreviations D1, D2, D3, D4, D5, A1, and A2, correspond to ROADM input signal names DEGREE 1, DEGREE 2, DEGREE 3, DEGREE 4, DEGREE 5, ADD 1, and ADD 2 respectively. An unused input port of a wavelength switch does not have an abbreviated ROADM input signal name on its respective wavelength switch input port.

Figure 38:
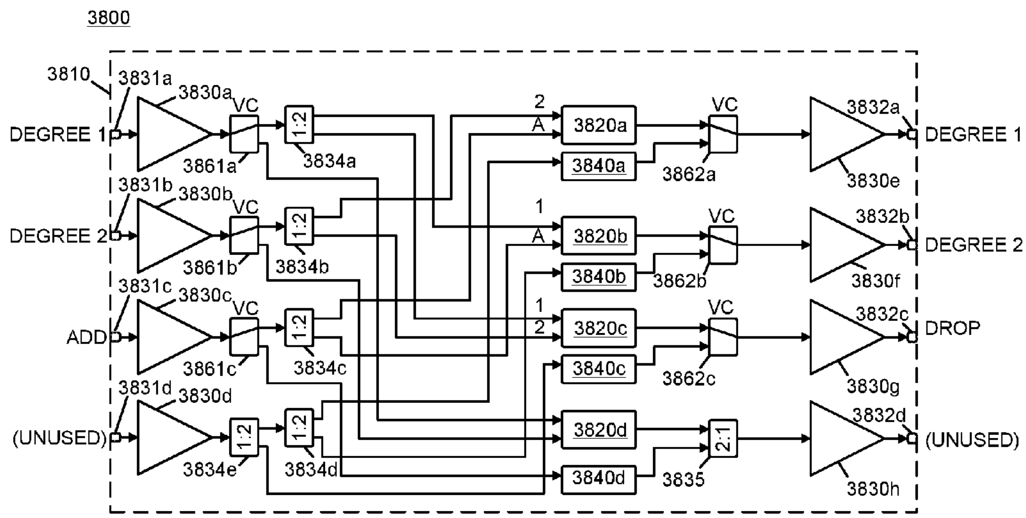
FIG. 38 is an illustration of a software programmable ROADM used to construct two and three-degree optical nodes, configured as a two-degree optical node.

FIG. 38 is an illustration of a two-degree optical node 3800 having one directionless add/drop port constructed using one software programmable ROADM 3810. The optical node 3800 comprises: two optical degree input ports 3831*a-b*, two optical degree output ports 3832*a-b*, one directionless add port 3831*c*, one directionless drop port 3832*c*, one unused input port 3831*d*, one unused output port 3832*d*, four input optical amplifiers 3830*a-d*, four output optical amplifiers 3830*e-h*, three one-to-two variable optical couplers (VC) 3861*a-c*, five one-to-two fixed optical couplers 3834*a-e*, four 2×1 wavelength switches 3820*a-d*, four 1×1 wavelength switches 3840*a-d*, three two-to-one variable optical couplers (VC) 3862*a-c*, one two-to-one fixed optical coupler 3835, and optical waveguides interconnecting the various optical components (illustrated with solid lines). The optical amplifiers 3830*a-h* are broadband optical amplifiers that are used to optically amplify a band of wavelengths. The optical amplifiers may be erbium-doped fiber amplifiers (EDFA). The optical degree ports 3831*a-b*, 3832*a-b* are used to interconnect the optical node 3800 to other optical nodes within a network of optical nodes. Each node within the network of optical nodes may be separated by some amount of physical distance (such as 1 to 100 kilometers). The optical nodes within the network of optical nodes are interconnected using optical fibers. The input optical amplifiers 3830*a-b* attached to the input degree ports (DEGREE 1, DEGREE 2) 3831*a-b* are used to compensate for the optical insertion loss of the optical fiber connected to the input ports 3831*a-b*. The optional input optical amplifier 3830*c* is used to boost the optical power levels of all wavelengths added to the optical node 3800 via the add port 3831*c*. The output optical amplifiers 3830*e-h* are used to compensate for the optical components 3861*a-c*, 3834*a-e*, 3820*a-d*, 3840*a-d*, 3862*a-c*, 3835 residing between the input optical amplifiers 3830*a-d* and the output optical amplifiers 3830*e-h*.

The output optical amplifiers 3830*e-h* may have at least two optical gain settings. Since the optical signal to noise ratio (OSNR) of an optical amplifier depends upon the optical gain of the optical amplifier, a lower optical gain setting results in a higher OSNR. Therefore, it's advantageous to use the lower optical gain setting of an optical amplifier, as opposed to using a higher optical gain setting. The optical insertion loss of the optical components 3834*a-e*, 3835, 3820*a-d*, and 3840*a-d* are fixed. However, the optical insertion loss through the variable optical couplers 3861*a-c* and 3862*a-c* is not fixed, and therefore for a given application it is advantageous to limit the optical insertion loss through the variable optical couplers 3861*a-c* and 3862*a-c*. For the optical node 3800, the insertion loss between the input and the top output of the variable optical couplers 3861*a-c* is set to the component's minimal value by software programming the variable optical couplers 3861*a-c* to direct as much input light as possible to the top outputs, while simultaneously directing as little input light as possible to the bottom outputs. For this case, as much as 99% of the input light may be directed to the top output, while as little as 1% of the input light may be directed to the bottom output. For such a configuration, the variable optical coupler effectively operates as a broadband optical switch, wherein the input optical signal is switched to the top optical output of the variable optical coupler, as indicated by the solid line connecting the input port to the top output port of the optical couplers 3861*a-c* in FIG. 38. The reason that his can be done, is that the light from the bottom output of the variable optical couplers 3861*a-c* is directed towards the unused optical output port 3832*d*. When as much light as possible is directed towards a given output of a given variable optical coupler 3861*a-c*, the lowest possible insertion loss between the input and the given output results, thus resulting in a lower required optical gain setting in the corresponding output optical amplifier 3830*e-g*. The lower optical gain setting results in wavelengths exiting the optical node 3800 with higher optical to signal noise ratios, which allows these wavelengths to be transmitted longer distances before optical regeneration is required.

In a similar fashion, each of the two-to-one variable optical couplers 3862*a-c* may be software programmed to direct as much light as possible from the top input port to the output port, and as little light as possible from the bottom input port to the output port. This results in the variable optical couplers 3862*a-c* effectively acting as a two-to-one broadband optical switch, wherein the optical signal applied to the top input port is switched to the output port, as indicated by the solid line drawn between the top input port and the output port within the variable optical couplers 3862*a-c* shown in FIG. 38. This results in the lowest possible optical insertion loss for the optical signals applied to the top ports of the couplers 3862*a-c*, which results in a lower required optical gain setting for the output optical amplifiers 3830*e-g*, resulting in wavelengths with higher optical signal to noise ratios exiting the optical node 3800.

The reason that no light needs to be directed from the bottom inputs of the variable optical couplers 3862*a-c* to the optical output of the variable optical couplers 3862*a-c* is that no optical wavelengths are exiting the optical switches 3840*a-c* that are connected to the lower inputs of the optical couplers 3862*a-c*. This is because the wavelength switches 3840*a-c* are used to switch wavelengths from optical input 3831*d*, which is not used in the optical node 3800.

In the optical node 3800, optical wavelengths received at optical input port 3831*a* are optically amplified by input optical amplifier 3830*a*, and then forwarded to the variable optical coupler 3861*a*. The variable optical coupler 3861*a* is software programmed to direct the received optical wavelengths to optical coupler 3834*a* with the lowest possible optical insertion loss. The optical coupler 3834*a* broadcasts copies of each of the received wavelengths to both optical switch 3820*b* and optical switch 3820*c*. The optical coupler 3834*a* may have a 50/50 optical coupling ratio, or may have an unequal coupling ratio, such as 70/30. The wavelength switch 3820*b* is used to pass or block individual wavelengths to the DEGREE 2 output port 3832*b*, while the wavelength switch 3820*c* is used to pass or block individual wavelengths to the DROP output port 3832*c*. Wavelengths exiting wavelength switch 3820*b* are forwarded to variable optical coupler 3862*b*, while wavelengths exiting wavelength switch 3820*c* are forwarded to variable optical coupler 3862*c*. Variable optical couplers 3862*b* and 3862*c* are software programmed to forward the received wavelengths to output optical amplifiers 3830*f* and 3830*g* with the lowest possible optical insertion loss. Optical amplifier 3830*f* is software programmed to utilize the lowest possible gain setting, based upon the insertion loss between the output of the input amplifiers and the input to the amplifier 3830*f*, and optical amplifier 3830*g* is software programmed to utilize the lowest possible gain setting, based upon the insertion loss between the output of the input amplifiers and the input to the amplifier 3830*g*. Optical amplifier 3830*f* then optically amplifies its received wavelengths and forwards them out of the DEGREE 2 port 3832*b*, while optical amplifier 3830*g* optically amplifies its received wavelengths and forwards them out of the DROP port 3832*c*.

In the optical node 3800, optical wavelengths received at optical input port 3831*b* are optically amplified by input optical amplifier 3830*b*, and then forwarded to the variable optical coupler 3861*b*. The variable optical coupler 3861*b* is software programmed to direct the received optical wavelengths to optical coupler 3834*b* with the lowest possible optical insertion loss. The optical coupler 3834*b* broadcasts copies of each of the received wavelengths to both optical switch 3820*a* and optical switch 3820*c*. The optical coupler 3834*b* may have a 50/50 optical coupling ratio, or may have an unequal coupling ratio, such as 70/30. The wavelength switch 3820*a* is used to pass or block individual wavelengths to the DEGREE 1 output port 3832*a*, while the wavelength switch 3820*c* is used to pass or block individual wavelengths to the DROP output port 3832*c*. Wavelengths exiting wavelength switch 3820*a* are forwarded to variable optical coupler 3862*a*, while wavelengths exiting wavelength switch 3820*c* are forwarded to variable optical coupler 3862*c*. Variable optical couplers 3862*a* and 3862*c* are software programmed to forward the received wavelengths to output optical amplifiers 3830*e* and 3830*g* with the lowest possible optical insertion loss. Optical amplifier 3830*e* is software programmed to utilize the lowest possible gain setting, based upon the insertion loss between the output of the input amplifiers and the input to the amplifier 3830*e*, and optical amplifier 3830*g* is software programmed to utilize the lowest possible gain setting, based upon the insertion loss between the output of the input amplifiers and the input to the amplifier 3830*g*. Optical amplifier 3830*e* then optically amplifies its received wavelengths and forwards them out of the DEGREE 1 port 3832*a*, while optical amplifier 3830*g* optically amplifies its received wavelengths and forwards them out of the DROP port 3832*c*.

In the optical node 3800, optical wavelengths received at optical input port 3831*c* are optically amplified by input optical amplifier 3830*c*, and then forwarded to the variable optical coupler 3861*c*. The variable optical coupler 3861*c* is software programmed to direct the received optical wavelengths to optical coupler 3834*c* with the lowest possible optical insertion loss. The optical coupler 3834*c* broadcasts copies of each of the received wavelengths to both optical switch 3820*a* and optical switch 3820*b*. The optical coupler 3834*c* may have a 50/50 optical coupling ratio. The wavelength switch 3820*a* is used to pass or block individual wavelengths to the DEGREE 1 output port 3832*a*, while the wavelength switch 3820*b* is used to pass or block individual wavelengths to the DEGREE 2 output port 3832*b*. Wavelengths exiting wavelength switch 3820*a* are forwarded to variable optical coupler 3862*a*, while wavelengths exiting wavelength switch 3820*b* are forwarded to variable optical coupler 3862*b*. Variable optical couplers 3862*a* and 3862*b* are software programmed to forward the received wavelengths to output optical amplifiers 3830*e* and 3830*f* with the lowest possible optical insertion loss. Optical amplifier 3830*e* is software programmed to utilize the lowest possible gain setting, based upon the insertion loss between the output of the input amplifiers and the input to the amplifier 3830*e*, and optical amplifier 3830*f* is software programmed to utilize the lowest possible gain setting, based upon the insertion loss between the output of the input amplifiers and the input to the amplifier 3830*f* Optical amplifier 3830*e* then optically amplifies its received wavelengths and forwards them out of the DEGREE 1 port 3832*a*, while optical amplifier 3830*f* optically amplifies its received wavelengths and forwards them out of the DEGREE 2 port 3832*b*.

The optical components 3830*a-h*, 3861*a-c*, 3862*a-c*, 3834*a-e*, and 3835 are waveguide optical elements, as they operate on optical signals at the waveguide level, as opposed to the wavelength level. For instance, the optical amplifiers 3830*a-h* generally optically amplify each wavelength within the received optical signal by the same amount, and cannot be programmed to amplify a first wavelength by a first amount and a second wavelength by a second amount, different from the first amount. Similarly, the fixed optical couplers 3834*a-e* split the optical power of each received wavelength by generally the same amount, and cannot be programmed to split the optical power of a first wavelength by a first amount and a second wavelength by a second amount, different from the first amount. Similarly, for a given software setting, the variable optical couplers 3861*a-c* split the optical power of each received wavelength by generally the same amount, and cannot be programmed to split the optical power of a first wavelength by a first amount and a second wavelength by a second amount. Conversely, the wavelength switches 3820*a-d* and 3840*a-d* are not waveguide optical elements, but instead are wavelength optical elements. This is because, the wavelength switches 3820*a-d* and 3840*a-d* can be software programmed to operate on individual wavelengths within an optical signal. For instance, a given wavelength switch may be programmed to block a first wavelength from passing to the output port of the given wavelength switch, while the wavelength switch may be programmed to pass a second a wavelength to the output port of the given wavelength switch. Since the variable optical couplers 3861*a-c* and 3862*a-c* are waveguide optical elements that can be software programmed to different optical states, the variable optical couplers 3861*a-c* and 3862*a-c* are programmable waveguide optical elements.

Figure 39:
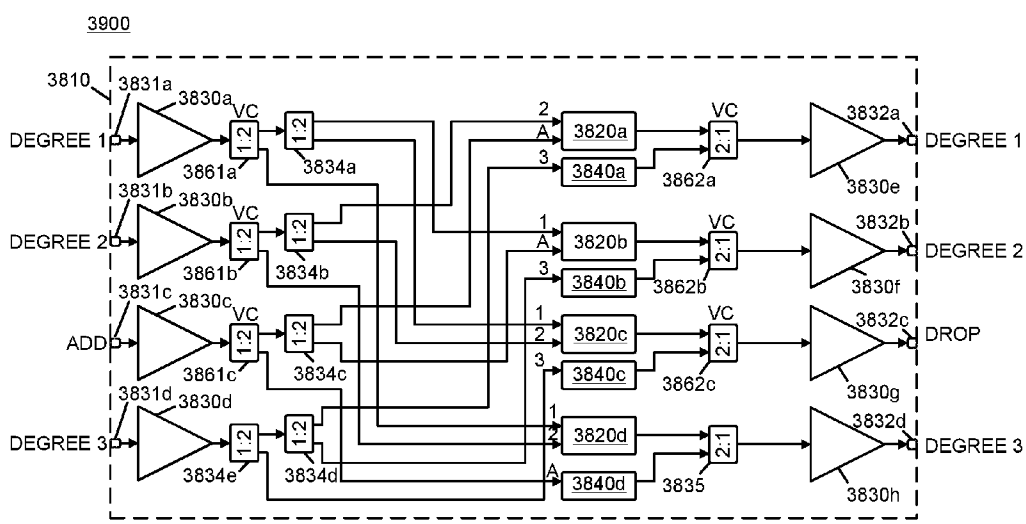
FIG. 39 is an illustration of a software programmable ROADM used to construct two and three-degree optical nodes, configured as a three-degree optical node.

FIG. 39 is an illustration of a three-degree optical node 3900 having one directionless add/drop port constructed using one software programmable ROADM 3810. The optical node 3900 contains the same optical ROADM 3810 as used in the optical node 3800. However, unlike for the optical node 3800, the programmable waveguide optical elements 3861*a-c* are software programmed to enable wavelengths to be directed from the DEGREE 1, DEGREE 2, and ADD input ports to output port 3832*d* (the DEGREE 3 output port). And in addition, the programmable waveguide optical elements 3862*a-c* are software programmed to enable wavelengths to be directed from wavelength switches 3840*a-c* to output ports 3832*a-c* (the DEGREE 1, DEGREE 2, and DROP output ports). More specifically, variable optical coupler 3861*a* is software programmed to broadcast amplified wavelengths from optical amplifier 3830*a* to both optical coupler 3834*a* and wavelength switch 3820*d*, and variable optical coupler 3861*b* is software programmed to broadcast amplified wavelengths from optical amplifier 3830*b* to both optical coupler 3834*b* and wavelength switch 3820*d*, and variable optical coupler 3861*c* is software programmed to broadcast amplified wavelengths from optical amplifier 3830*c* to both optical coupler 3834*c* and wavelength switch 3840*d*, and variable optical coupler 3862*a* is software programmed to combine wavelengths from both wavelength switch 3820*a* and wavelength switch 3840*a*, and variable optical coupler 3862*b* is software programmed to combine wavelengths from both wavelength switch 3820*b* and wavelength switch 3840*b*, and variable optical coupler 3862*c* is software programmed to combine wavelengths from both wavelength switch 3820*c* and wavelength switch 3840*c*. The coupling ratios of variable optical couplers 3861*a-c* and 3862*a-c* may be programmed to have a 50/50 coupling ratio, or they may be programmed to have some coupling ratio other than 50/50, such as 70/30, for example.

Since in optical node 3900, there are paths between input and output amplifiers with greater optical insertion loss than the similar paths in optical node 3800, the output optical amplifiers 3830*e-h* are configured to have a optical gain greater than the optical gain of the output amplifiers of optical node 3800. For instance, in optical node 3800 the used optical paths through the variable optical couplers may have an optical insertion loss of perhaps 0.5 dB, while in the optical node 3900 the used optical paths through the variable optical couplers may have an optical insertion loss of perhaps 3.5 dB (for a programmed 50/50 coupling ratio). Therefore, for example, the optical path from the output of input amplifier 3830*a* to output amplifier 3830*f* may have an insertion loss that is 6 dB greater for the optical node 3900 when compared to optical node 3800 (due to the increase in insertion loss of variable optical couplers 3861*a* and 3862*b*). Therefore, for this example, the output optical amplifier 3830*f* would require a gain setting 6 dB greater in node 3900 than that of node 3800.

In optical node 3800, wavelength switch 3820*a* passes and blocks wavelengths from optical inputs 3831*b* and 3831*c* to optical output 3832*a*, wavelength switch 3820*b* passes and blocks wavelengths from optical input 3831*a* and 3831*c* to optical output 3832*b*, wavelength switch 3820*c* passes and blocks wavelengths from optical inputs 3831*a* and 3831*b* to optical output 3832*c*, and wavelength switches 3840*a-d* and 3820*d* are not used. In optical node 3900, wavelength switch 3820*a* passes and blocks wavelengths from optical inputs 3831*b* and 3831*c* to optical output 3832*a*, wavelength switch 3820*b* passes and blocks wavelengths from optical input 3831*a* and 3831*c* to optical output 3832*b*, wavelength switch 3820*c* passes and blocks wavelengths from optical inputs 3831*a* and 3831*b* to optical output 3832*c*, wavelength switch 3820*d* passes and blocks wavelengths from optical inputs 3831*a* and 3831*b* to optical output 3832*d*, wavelength switch 3840*a* passes and blocks wavelengths from optical input 3831*d* to optical output 3832*a*, wavelength switch 3840*b* passes and blocks wavelengths from optical input 3831*d* to optical output 3832*b*, wavelength switch 3840*c* passes and blocks wavelengths from optical input 3831*d* to optical output 3832*c*, and wavelength switch 3840*d* passes and blocks wavelengths from optical input 3831*c* to optical output 3832*d*.

Optical node 3800 is a two-degree optical node having one directionless add/drop port, while optical node 3900 is a three-degree optical node having one directionless add/drop port. Therefore, FIG. 38 and FIG. 39 illustrate a ROADM 3810 comprising: a first wavelength switch set comprising at least one wavelength switch 3820*a*, a second wavelength switch set comprising of at least one wavelength switch 3840*a*, and at least one programmable waveguide optical element 3862*a*, wherein when the at least one programmable waveguide optical element 3862*a* is programmed to a first state (directing light to its output port from only 3820*a*), the first wavelength switch set provides wavelength switching for one output degree (DEGREE 1) of an n-degree optical node (wherein, n=2), and wherein when the at least one programmable waveguide optical element 3862*a* is programmed to a second state (combining wavelengths from 3820*a* and 3840*a*), the first wavelength switch set 3820*a* and the second wavelength switch set 3840*a* provide wavelength switching for one output degree (DEGREE 1) of an m-degree optical node (wherein, m=3), wherein m>n, and wherein the second state is different from the first state. Furthermore, each wavelength switch 3820*a* within the first wavelength switch set includes one optical input and one optical output, and each wavelength switch 3840*a* within the second wavelength switch set includes one optical input and one optical output. The at least one programmable waveguide optical element may be a variable optical coupler 3862*a*, wherein the variable optical coupler connects to the first wavelength switch set 3820*a* and to the second wavelength switch set 3840*a*. The ROADM 3810 may further comprise a second programmable waveguide optical element 3861*b*, used to forward an optical signal to the first wavelength switch set 3820*a*.

A single optical node can be defined that comprises ROADM 3810. The optical node can be either a two-degree optical node 3800 with one directionless add/drop port or a three-degree optical node 3900 with one directionless add/drop port. For instance, the optical node may initially be deployed as a two-degree optical node (optimized so that the gain of the output amplifiers are as low as possible). At some later date, the optical node may be upgraded to a three-degree optical node (by changing the states of programmable waveguide optical elements 3861*a-c* and 3862*a-c*). Therefore, there is an optical node 3800/3900 comprising a first wavelength switch set comprising at least one wavelength switch 3820*a*, a second wavelength switch set comprising at least one wavelength switch 3840*a*, and at least one programmable waveguide optical element 3862*a*, wherein when the at least one programmable waveguide optical element 3862*a* is programmed to a first state, the first wavelength switch set 3820*a* provides wavelength switching for one output degree (DEGREE 1) of an n-degree optical node (wherein, n=2), and wherein when the at least one programmable waveguide optical element 3862*a* is programmed to a second state, the first wavelength switch set 3820*a* and the second wavelength switch set 3840*a* provide wavelength switching for one output degree (DEGREE 1) of an m-degree optical node (wherein, m=2), wherein m>n, and wherein the second state is different from the first state. The optical node may further comprise a second programmable waveguide optical element 3861*b*, used to forward an optical signal to the first wavelength switch set 3820*a*. The optical node may further comprise a circuit pack, wherein the first wavelength switch set 3820*a*, the second wavelength switch set 3840*a*, and the at least one programmable waveguide optical element 3862*a* reside on the circuit pack. The circuit pack may have an electrical connector, used to plug the circuit pack into an electrical backplane of a mechanical chassis.

Figure 40:
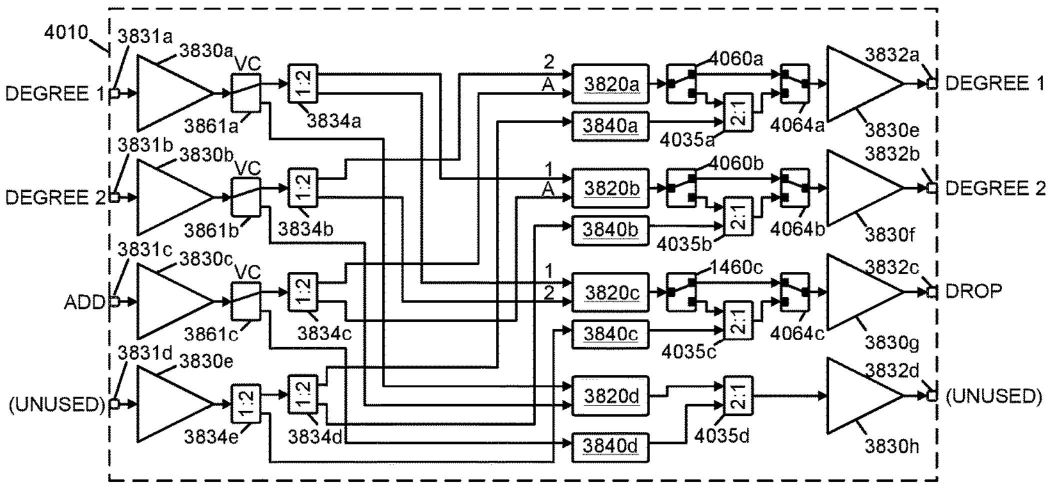
FIG. 40 is an illustration of a software programmable ROADM used to construct two and three-degree optical nodes, configured as a two-degree optical node.

FIG. 40 is an illustration of a two-degree optical node 4000 having one directionless add/drop port constructed using one software programmable ROADM 4010. The optical node 4000 comprises: two optical degree input ports 3831*a-b*, two optical degree output ports 3832*a-b*, one directionless add port 3831*c*, one directionless drop port 3832*c*, one unused input port 3831*d*, one unused output port 3832*d*, four input optical amplifiers 3830*a-d*, four output optical amplifiers 3830*e-h*, three one-to-two variable optical couplers (VC) 3861*a-c*, five one-to-two fixed optical couplers 3834*a-e*, four 2×1 wavelength switches 3820*a-d*, four 1×1 wavelength switches 3840*a-d*, four two-to-one fixed optical couplers 4035*a-d*, three one-to-two waveguide optical switches 4060*a-c*, three two-to-one optical switches 4064*a-c*, and optical waveguides interconnecting the various optical components (illustrated with solid lines). The ROADM 4010 is identical to the ROADM 3800 of FIG. 38, except that the two-to-one variable optical couplers 3862*a-c* of 3800 are replaced by the three two-to-one fixed optical couplers 4035*a-c*, the three one-to-two waveguide optical switches 4060*a-c*, and the three two-to-one optical switches 4064*a-c*. Operationally, the ROADM 4010 is identical to the ROADM 3010.

For the optical node 4000, the insertion loss between the input and the top output of the variable optical couplers 3861*a-c* is set to the component's minimal value by software programming the variable optical couplers 3861*a-c* to direct as much input light as possible to the top outputs, while simultaneously directing as little as much input light as possible to the bottom outputs. For this case, as much as 99% of the input light may be directed to the top output, while as little as 1% of the input light may be directed to the bottom output. For such a configuration, the variable optical coupler effectively operates as an optical switch, wherein the input optical signal is switched to the top optical output of the variable optical coupler, as indicated by the solid line connecting the input port to the top output port of the optical couplers 3861*a-c* in FIG. 40.

For the optical node 4000, the wavelength switches 3840*a-d* and 3820*d* are unused. Therefore, the waveguide optical switches 4060*a-c* and 4064*a-c* are set so as to bypass the fixed optical couplers 4035*a-c*, as shown in FIG. 40. Since the insertion loss of each waveguide switch 4060*a-c* and 4064*a-c* may typically be between 0.25 dB and 0.5 dB, while the insertion loss of each optical coupler 4035*a-c* will typically be about 3.5 dB, the optical insertion loss between the wavelength switches 3820*a-c* and the output optical amplifiers 3830*e-g* is reduced by passing the optical couplers 4035*a-c*. For the optical node 4000, the optical wavelengths from wavelength switches 3820*a-c* propagate through waveguide switches 4060*a-c*, and then directed to waveguide switches 4064*a-c* by waveguide switches 4060*a-c*. Waveguide switches 4064*a-c* then direct the wavelengths from waveguide switches 4060*a-c* to output optical amplifiers 3830*e-g*, while optical couplers 4035*a-c* go unused.

Figure 41:
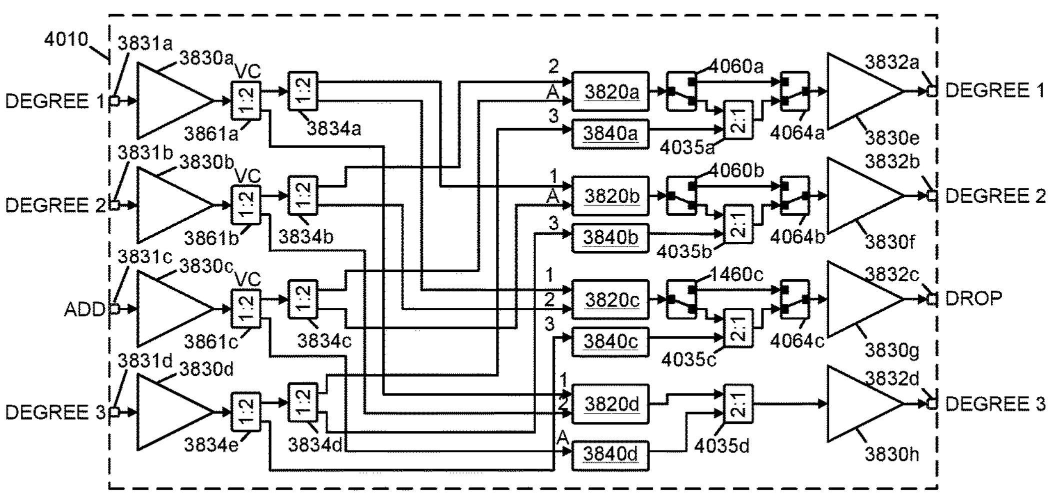
FIG. 41 is an illustration of a software programmable ROADM used to construct two and three-degree optical nodes, configured as a three-degree optical node.

FIG. 41 is an illustration of a three-degree optical node 4100 having one directionless add/drop port constructed using one software programmable ROADM 4010. The optical node 4100 uses the same software programmable ROADM 4010 as was used in the optical node 4000. However, unlike for the optical node 4000, the programmable waveguide optical elements 3861*a-c* are software programmed to enable wavelengths to be directed from the DEGREE 1, DEGREE 2, and ADD input ports to output port 3832*d* (the DEGREE 3 output port). And in addition, the programmable waveguide optical elements 4060*a-c* and 4064*a-c* are software programmed to enable wavelengths to be directed from wavelength switches 3840*a-c* to output ports 3832*a-c* (the DEGREE 1, DEGREE 2, and DROP output ports). More specifically, variable optical coupler 3861*a* is software programmed to broadcast amplified wavelengths from optical amplifier 3830*a* to both optical coupler 3834*a* and wavelength switch 3820*d*, and variable optical coupler 3861*b* is software programmed to broadcast amplified wavelengths from optical amplifier 3830*b* to both optical coupler 3834*b* and wavelength switch 3820*d*, and variable optical coupler 3861*c* is software programmed to broadcast amplified wavelengths from optical amplifier 3830*c* to both optical coupler 3834*c* and wavelength switch 3840*d*, and waveguide switches 4060*a* and 4064*a* are software programmed so as to use fixed optical coupler 4035*a* to combine wavelengths from both wavelength switch 3820*a* and wavelength switch 3840*a*, and waveguide switches 4060*b* and 4064*b* are software programmed so as to use fixed optical coupler 4035*b* to combine wavelengths from both wavelength switch 3820*b* and wavelength switch 3840*b*, and waveguide switches 4060*c* and 4064*c* are software programmed so as to use fixed optical coupler 4035*c* to combine wavelengths from both wavelength switch 3820*c* and wavelength switch 3840*c*. The coupling ratios of variable optical couplers 3861*a-c* may be programmed to have a 50/50 coupling ratio, or they may be programmed to have some coupling ratio other than 50/50, such as 70/30, for example.

Since in optical node 4100, there are paths between input and output amplifiers with greater optical insertion loss than the similar paths in optical node 4000, the output optical amplifiers 3830*e-h* are configured to have an optical gain greater than the optical gain of the output amplifiers of optical node 4000.

Optical node 4000 is a two-degree optical node having one directionless add/drop port, while optical node 4100 is a three-degree optical node having one directionless add/drop port. Therefore, FIG. 40 and FIG. 41 illustrate a ROADM 4010 comprising: a first wavelength switch set comprising at least one wavelength switch 3820*a*, a second wavelength switch set comprising of at least one wavelength switch 3840*a*, and at least one programmable waveguide optical element 4060*a*, wherein when the at least one programmable waveguide optical element 4060*a* is programmed to a first state (directing wavelengths from 3820*a* to waveguide switch 4064*a*), the first wavelength switch set provides wavelength switching for one output degree (DEGREE 1) of an n-degree optical node (wherein, n=2), and wherein when the at least one programmable waveguide optical element 4060*a* is programmed to a second state (directing wavelengths from 3820*a* to optical coupler 4035*a*), the first wavelength switch set 3820*a* and the second wavelength switch set 3840*a* provide wavelength switching for one output degree (DEGREE 1) of an m-degree optical node (wherein, m>3), wherein m>n, and wherein the second state is different from the first state. Furthermore, the at least one programmable waveguide optical 4060*a* element may comprise of a waveguide switch. Or alternatively, the at least one programmable waveguide optical element may comprise of a one by two waveguide switch and a two by one waveguide switch, wherein the one to two waveguide switch is connected to the first wavelength switch set and to the two by one waveguide switch and to a first input of a two to one fixed optical coupler, and wherein the second wavelength switch set is connected to a second input of the two to one fixed optical coupler, and wherein the output of the two to one fixed optical coupler is connected to the two by one waveguide switch.

FIG. 38 through FIG. 41, illustrate which ROADM input signal is routed to which wavelength switch by labeling each wavelength switch input port with a ROADM input signal name. Abbreviated ROADM input signals names are used, wherein the abbreviations 1, 2, 3, and A, correspond to ROADM input signal names DEGREE 1, DEGREE 2, DEGREE 3, and ADD respectively. An unused input port of a wavelength switch does not have an abbreviated ROADM input signal name on its respective wavelength switch input port.

Figure 42:
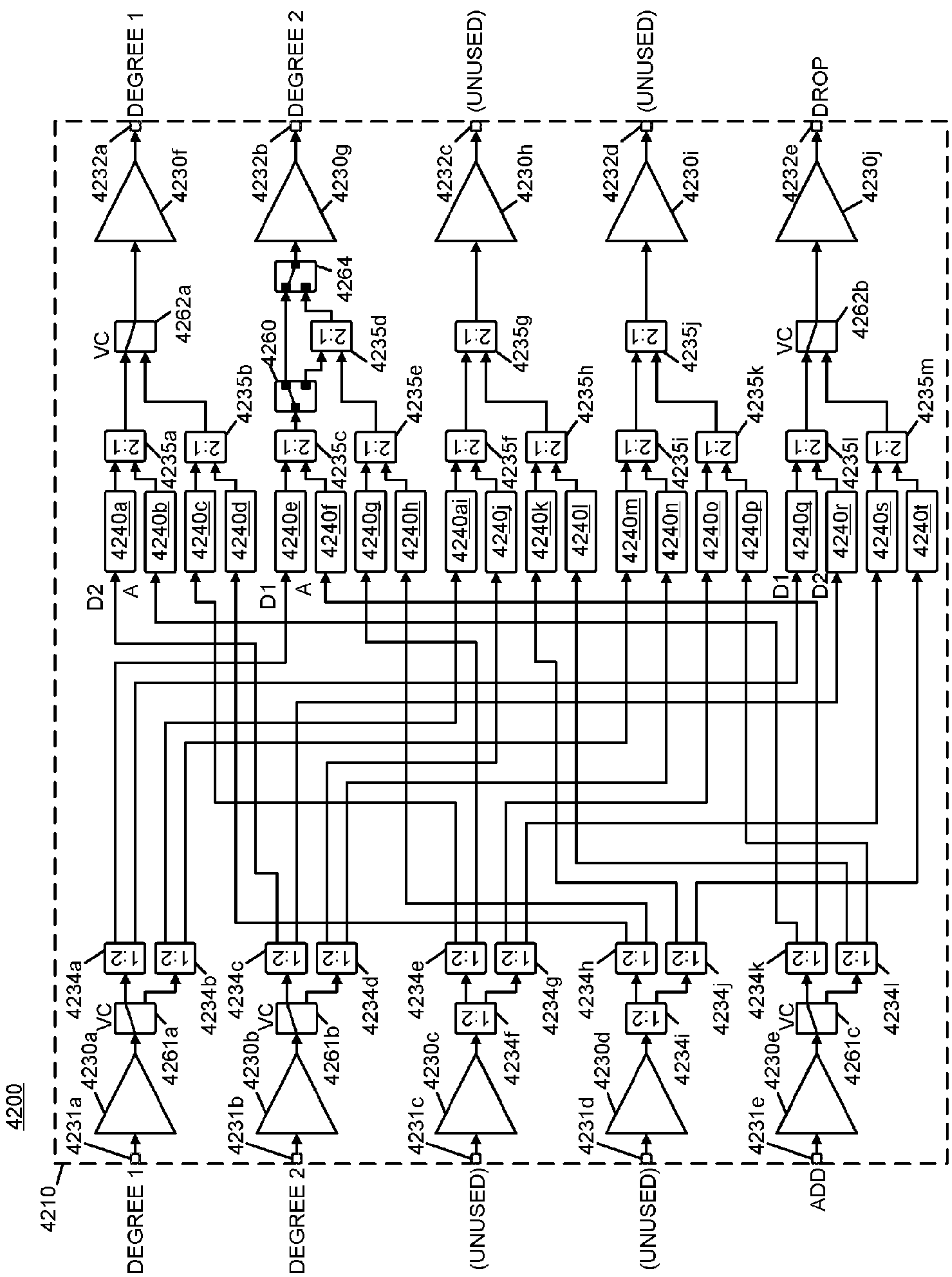
FIG. 42 is an illustration of a software programmable ROADM used to construct two and four-degree optical nodes, configured as a two-degree optical node.
Figure 43:
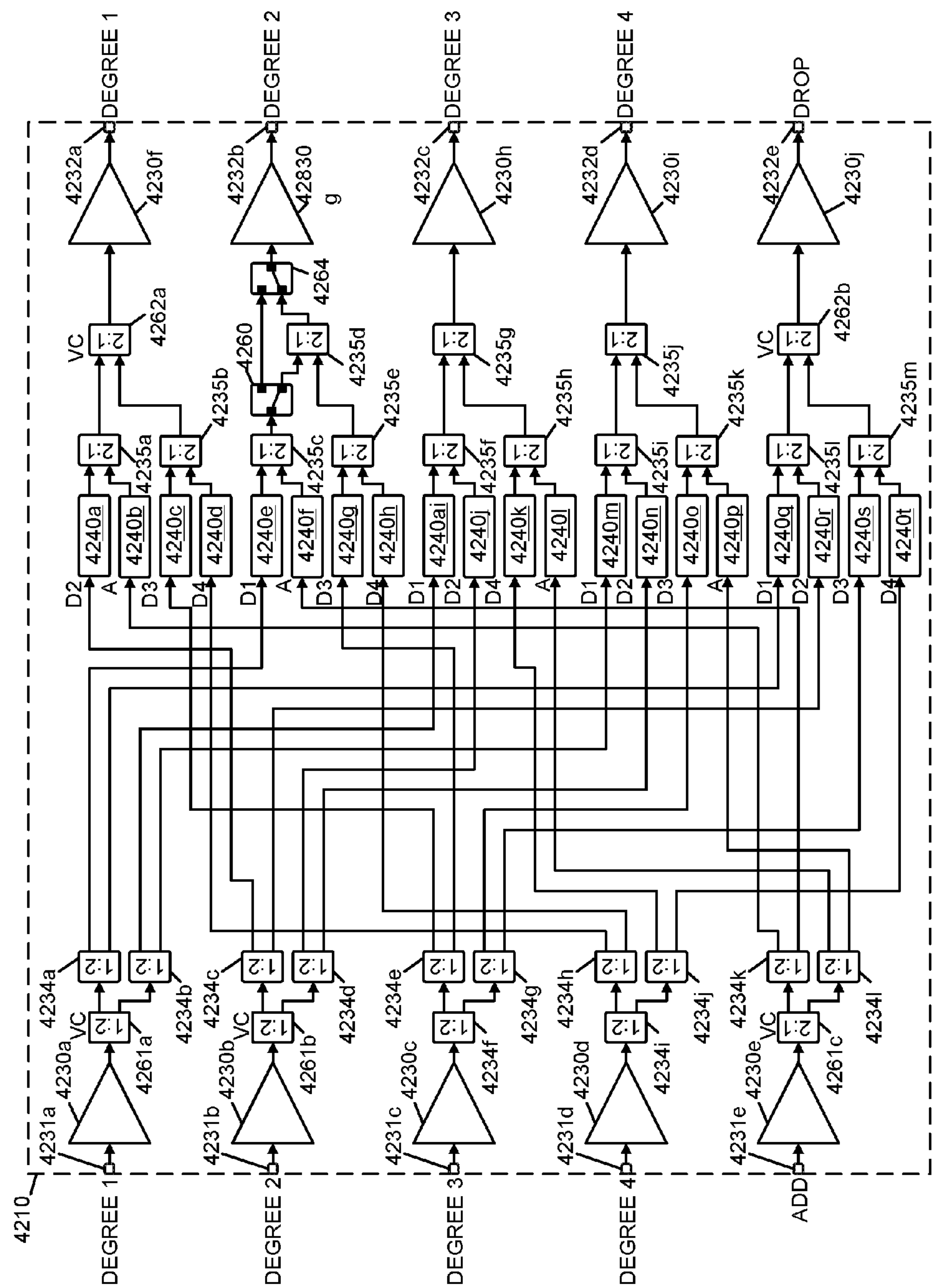
FIG. 43 is an illustration of a software programmable ROADM used to construct two and four-degree optical nodes, configured as a four-degree optical node.

FIG. 42 and FIG. 43 depict optical nodes 4200 and 4300 comprising of a software programmable ROADM 4210 substantially the same as the software programmable ROADMs 3810 and 4010, except that the software programmable ROADM 4210 can be software programmed to have up to four optical degrees, instead of three optical degrees. In addition, the wavelength switches 4240*a-t* of the 4210 ROADM comprise of 1×1 wavelength switches, instead of both 2×1 and 1×1 wavelength switches 3820*a-d*, 3840*a-d*.

The software programmable ROADM 4210 comprises: five optical degree input ports 4231*a-e*, five optical degree output ports 4232*a-e*, five input optical amplifiers 4230*a-e*, five output optical amplifiers 4230*f-j*, three one-to-two variable optical couplers (VC) 4261*a-c*, twelve one-to-two fixed optical couplers 4234*a*-1, twenty 1×1 wavelength switches 4240*a-t*, thirteen two-to-one fixed optical couplers 4235*a-m*, one one-to-two waveguide optical switch 4260, one two-to-one optical switch 4264, two two-to-one variable optical couplers 4262*a-b*, and optical waveguides interconnecting the various optical components (illustrated with solid lines).

The software programmable ROADM 4210 can be programmed to have up to two optical degrees and one add/drop port 4200, or it can be programmed to have up to four optical degrees and one add/drop port 4300. When programmed to support up to two optical degrees, optical ports 4231*c-d* and 4232*c-d* are unused, and variable optical couplers 4261*a-c* are programmed to direct all their inputted light to couplers 4234*a*, 4234*c*, and 4234*k* respectively. In addition, variable optical coupler 4262*a* is programmed to direct light only from optical coupler 4235*a* to the output of 4262*a*, and waveguide switches 4260 and 4264 are programmed to bypass optical coupler 4235*d*, and variable optical coupler 4262*b* is programmed to direct light only from optical coupler 42351 to the output of 4262*b*, as shown in FIG. 42. When programmed to support up to four optical degrees, all optical ports are used, and variable optical couplers 4261*a-c* are programmed to broadcast wavelengths to both optical couplers 4234*a-b*,4234*c-d* and 4234*k*-1. In addition, variable optical coupler 4262*a* is programmed to combine wavelengths from optical couplers 4235*a-b*, and waveguide switches 4260 and 4264 are programmed such that optical coupler 4235*d* combines wavelengths from couplers 4235*c* and 4235*e*, and variable optical coupler 4262*b* is programmed to combine wavelengths from optical couplers 42351-*m*, as shown in FIG. 43.

The ROADM 4210 comprises a first plurality of wavelength switches 4240*a-b*, a second plurality of wavelength switches 4240*c-d*, and at least one programmable waveguide optical element 4262*a*, wherein when the at least one programmable waveguide optical element 4262*a* is programmed to a first state (forwarding only light from coupler 4235*a* to output optical amplifier 4230*f*, as shown in FIG. 42), the first plurality of wavelength switches 4240*a-b* provides wavelength switching for one output degree (DEGREEE 1) of an n-degree optical node (n=2), and wherein when the at least one programmable waveguide optical element 4262*a* is programmed to a second state (combining wavelengths from both coupler 4235*a* and 4235*b*, as shown in FIG. 43), the first plurality of wavelength switches 4240*a-b* and the second plurality of wavelength switches 4240*c-d* provide wavelength switching for one output degree (DEGREE 1) of an m-degree optical node (m=4), wherein m>n, and wherein the second state is different from the first state. Furthermore, each wavelength switch 4240*a* and 4240*b* of the first plurality of wavelength switches 4240*a-b* includes one optical input and one optical output, and wherein each wavelength switch 4240*c* and 4240*d* of the second plurality of wavelength switches 4240*c-d* includes one optical input and one optical output. Also, in the ROADM 4210, the at least one programmable waveguide optical element may be a variable optical coupler 4262*a*, wherein the variable optical coupler 4262*a* connects to the first plurality of wavelength switches 4240*a-b* (via coupler 4235*a*) and to the second plurality of wavelength switches 4240*c-d* (via coupler 4235*b*).

Alternatively, the ROADM 4210 comprises a first plurality of wavelength switches 4240*e-f*, a second plurality of wavelength switches 4240*g-h*, and at least one programmable waveguide optical element 4260, wherein when the at least one programmable waveguide optical element 4260*a* is programmed to a first state (bypassing coupler 4235*d*, as shown in FIG. 42), the first plurality of wavelength switches 4240*e-f* provides wavelength switching for one output degree (DEGREEE 2) of an n-degree optical node (n=2), and wherein when the at least one programmable waveguide optical element 4260 is programmed to a second state (using coupler 4235*d* to combine wavelengths from both coupler 4235*c* and 4235*e*, as shown in FIG. 43), the first plurality of wavelength switches 4240*e-f* and the second plurality of wavelength switches 4240*g-h* provide wavelength switching for one output degree (DEGREE 2) of an m-degree optical node (m=4), wherein m>n, and wherein the second state is different from the first state. Furthermore, each wavelength switch 4240*e* and 4240*f* of the first plurality of wavelength switches 4240*e-f* includes one optical input and one optical output, and wherein each wavelength switch 4240*g* and 4240*h* of the second plurality of wavelength switches 4240*g-h* includes one optical input and one optical output. Also, in the ROADM 4210, the at least one programmable waveguide optical element may be a waveguide switch 4260.

Alternatively, the ROADM 4210 comprises a first wavelength switch set 4240*a-b* comprising at least one wavelength switch 4240*a*, a second wavelength switch set 4240*c-d* comprising of at least one wavelength switch 4240*c*, and at least one programmable waveguide optical element 4262*a*, wherein when the at least one programmable waveguide optical element 4262*a* is programmed to a first state (directing light to its output port from only 4240*a*), the first wavelength switch set provides wavelength switching for one output degree (DEGREE 1) of an n-degree optical node (wherein, n=2), and wherein when the at least one programmable waveguide optical element 4262*a* is programmed to a second state (combining wavelengths from 4240*a-b* and 4240*c-d*), the first wavelength switch set 4240*a-b* and the second wavelength switch set 4240*c-d* provide wavelength switching for one output degree (DEGREE 1) of an m-degree optical node (wherein, m=4), wherein m>n, and wherein the second state is different from the first state. In addition, the first wavelength switch set 4240*a-b* may comprise of at least two wavelength switches 4240*a* and 4240*b*, and the second wavelength switch set 4240*c-d* may comprise of at least two wavelength switches 4240*c* and 4240*d*.

FIG. 42 and FIG. 43, illustrate which ROADM input signal is routed to which wavelength switch by labeling each wavelength switch input port with a ROADM input signal name. Abbreviated ROADM input signals names are used, wherein the abbreviations D1, D2, D3, D4, and A, correspond to ROADM input signal names DEGREE 1, DEGREE 2, DEGREE 3, DEGREE 4 and ADD respectively. An unused input port of a wavelength switch does not have an abbreviated ROADM input signal name on its respective wavelength switch input port.

Figure 44:
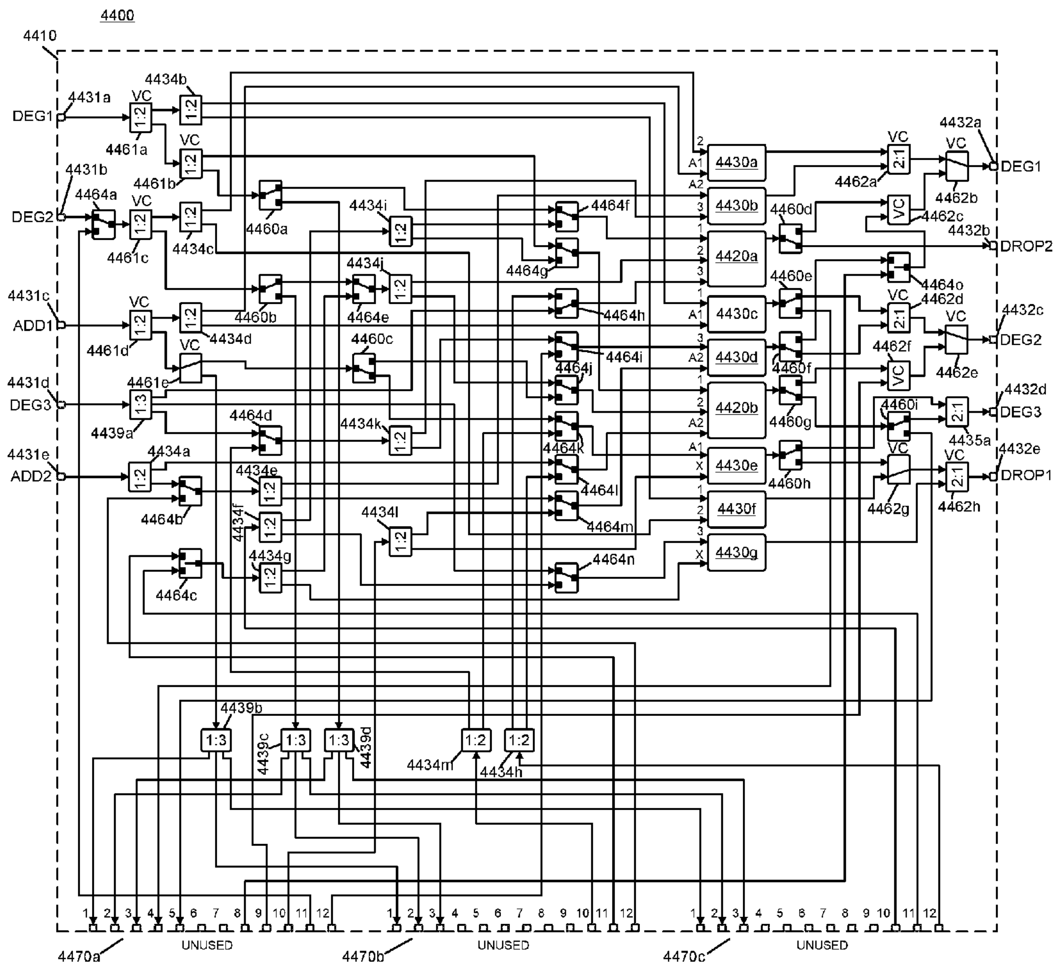
FIG. 44 is an illustration of a software programmable ROADM used to construct two, three, four, five, and six-degree optical nodes, configured as a three-degree optical node.
Figure 45A:
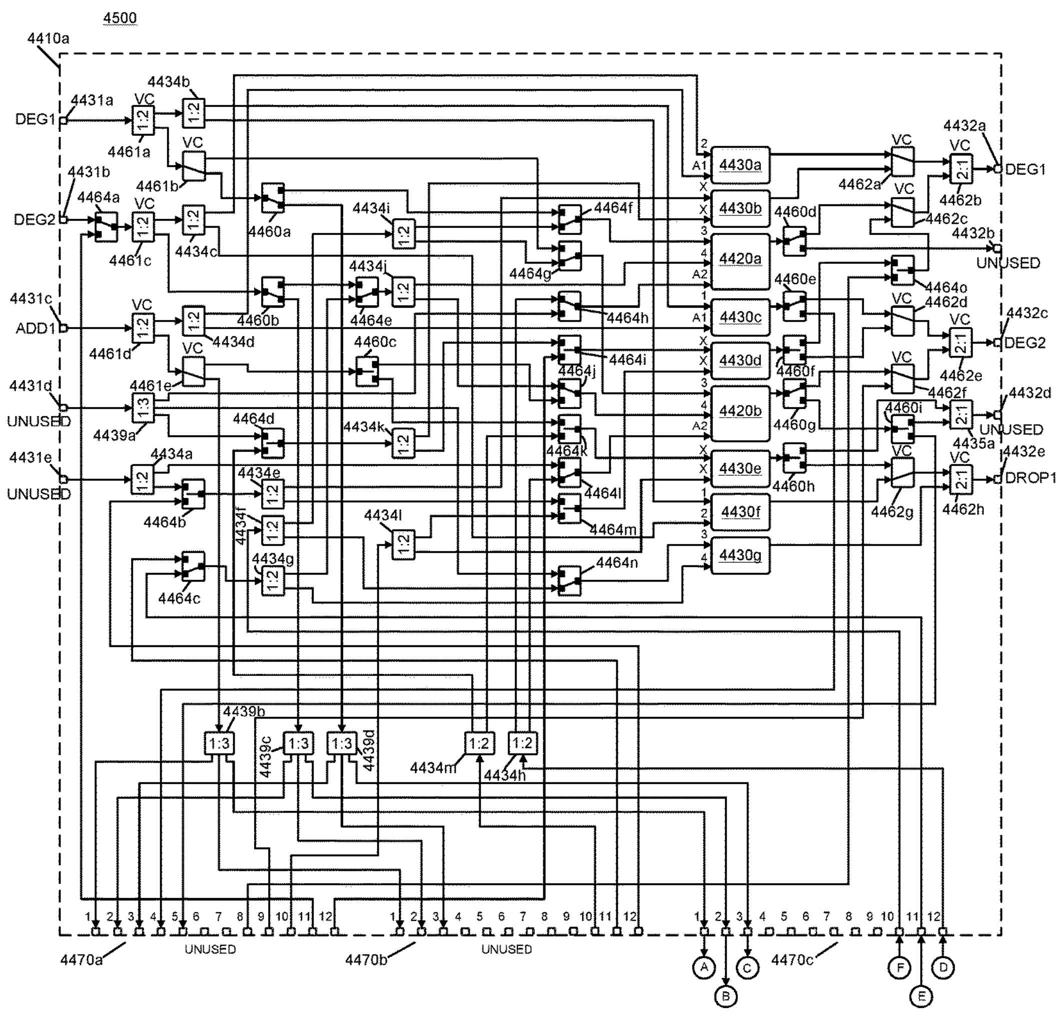
FIGS. 45A and 45B illustrate the use of two FIG. 44 software programmable ROADMs to construct a four-degree optical node with two directionless add/drop ports.
Figure 45B:
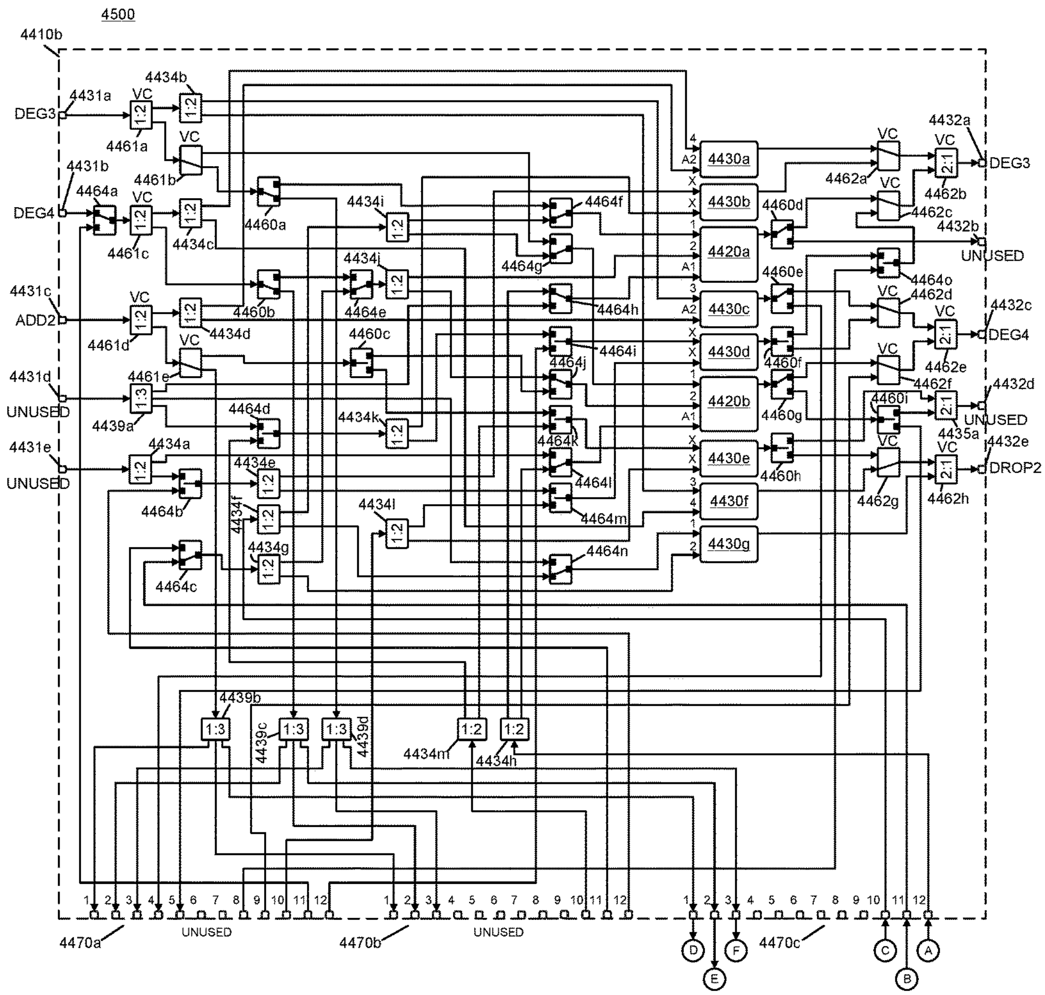
Figure 46A:
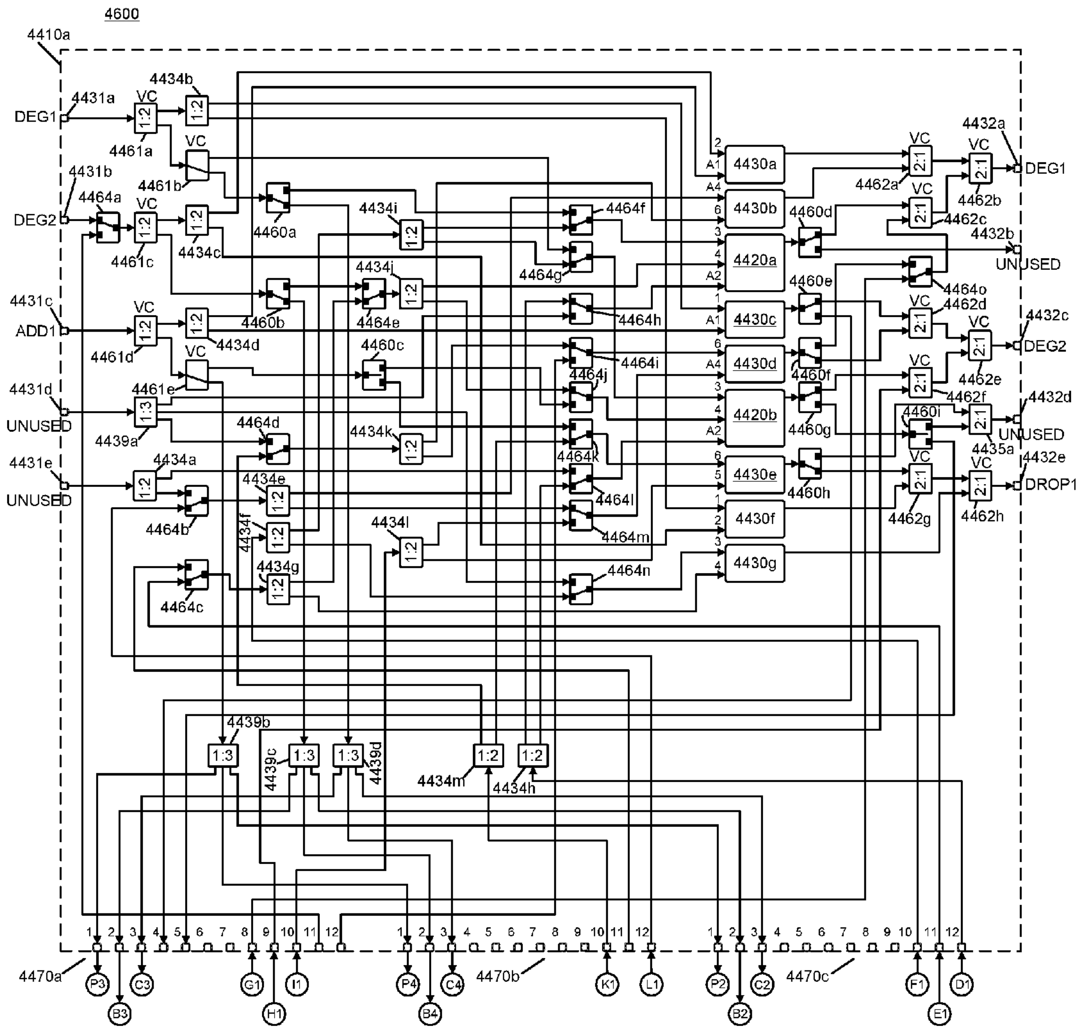

FIG. 44, FIG. 45AB, and FIG. 46ABCD, illustrate three different size optical nodes 4400, 4500, 4600 constructed from the same software programmable ROADM 4410. The optical node 4400 of FIG. 44 supports up to three optical degrees and two directionless add/drop ports using a single software programmable ROADM 4410. The optical node 4500 of FIG. 45A and FIG. 45B supports up to four optical degrees and two directionless add/drop ports using two software programmable ROADMs 4410*a-b*. The optical node 4600 of FIG. 46A, FIG. 46B, FIG. 46C, and FIG. 46D supports up to six optical degrees and four directionless add/drop ports using four software programmable ROADMs 4410*a-d*.

The software programmable ROADM 4410 comprises of programmable waveguide optical elements 4460*a-i*, 4461*a-e*, 4462*a-h*, and 4464*a-o*. Each programmable waveguide optical element 4460*a-i*, 4461*a-e*, 4462*a-h*, and 4464*a-o* may be programmed to two or more states. The one-to-two waveguide optical switches 4460*a-i* may be set to at least two states: pole connected to the first throw position and disconnected from second throw position (4460*a* in FIG. 44), and pole connected to the second throw position and disconnected from first throw position (4460*a* in FIG. 45A). In addition, the one-to-two waveguide optical switches 4460*a-i* may have a third state: pole disconnected from the first throw position and pole disconnected from the second throw position (4460*h* in FIG. 45A). The two-to-one waveguide optical switches 4464*a-o* may also be set to at least two states: pole connected to the first throw position and disconnected from second throw position (4464*f* in FIG. 44), and pole connected to the second throw position and disconnected from first throw position (4464*f* in FIG. 45A). In addition, the two-to-one waveguide optical switches 4464*a-o* may have a third state: pole disconnected from the first throw position and pole disconnected from the second throw position (4464*b* in FIG. 45A). The one-to-two variable optical couplers 4461*a-e* have at least two states: a switch-like state wherein as much light as possible is directed from the optical input to one optical output (4461*b* in FIG. 45A), and a splitter-like state wherein the optical light from the input is broadcasted to both outputs using some predefined coupling ratio (4461*b* in FIG. 44). In addition, the one-to-two variable optical couplers 4461*a-e* may have any number of additional states corresponding to any number of additional coupling ratios. The two-to-one variable optical couplers 4462*a-h* have at least two states: a switch-like state wherein as much light as possible is directed from one optical input to the optical output (4462*b* in FIG. 44), and a coupler-like state wherein the optical light from the two inputs is combined for the output using some predefined coupling ratio (4462*b* in FIG. 45A). In addition, the two-to-one variable optical couplers 4462*a-h* may have any number of additional states corresponding to any number of additional coupling ratios.

Associated with the programmable waveguide optical elements 4460*a-i*, 4461*a-e*, 4462*a-h*, and 4464*a-o* are various programmable waveguide optical element configuration settings. For a given programmable waveguide optical element configuration setting, each of the programmable waveguide optical elements 4460*a-i*, 4461*a-e*, 4462*a-h*, and 4464*a-o* are programmed to a specific state. As such, the setting shown in FIG. 44 for the programmable waveguide optical elements 4460*a-i*, 4461*a-e*, 4462*a-h*, and 4464*a-o* is a first programmable waveguide optical element configuration setting, while the setting shown in FIG. 45A for the programmable waveguide optical elements 4460*a-i*, 4461*a-e*, 4462*a-h*, and 4464*a-o* is a second programmable waveguide optical element configuration setting, wherein the second configuration setting is different from the first configuration setting, since at least one programmable waveguide optical element in FIG. 45A is set to a different state than the corresponding programmable waveguide optical element in FIG. 44. Four distinct programmable waveguide optical element configuration settings are utilized for the ROADM 4410 in FIG. 44, FIG. 45AB, and FIG. 46ABCD. The ROADM 4410 in FIG. 44 uses a first programmable waveguide optical element configuration setting. The ROADMs 4410*a* and 4410*b* in FIG. 45A and FIG. 45B use a second programmable waveguide optical element configuration setting. The ROADMs 4410*a* and 4410*b* in FIG. 46A and FIG. 46B use a third programmable waveguide optical element configuration setting. And, the ROADMs 4410*c* and 4410*d* in FIG. 46C and FIG. 45D use a fourth programmable waveguide optical element configuration setting.

In addition to the programmable waveguide optical elements 4460*a-i*, 4461*a-e*, 4462*a-h*, and 4464*a-o*, ROADM 4410 comprises: 2×1 wavelength switches 4430*a-g*, 3×1 wavelength switches 4420*a-b*, one-to-two (1:2) fixed coupling ratio optical couplers 4434*a-m*, one-to-three (1:3) fixed coupling ratio optical couplers 4439*a-d*, two-to-one (2:1) fixed coupling ratio optical couplers 4462*a-b*, optical input ports 4431*a-e*, optical output ports 4432*a-e*, and parallel optical ports 4470*a-c*.

For the three-degree optical node 4400, all five optical input ports 4431*a-e* are used, and all five optical output ports 4432*a-e* are used, and none of the three parallel optical ports 4470*a-c* are used. For the four-degree optical node 4500, optical input ports 4431*d-e* go unused, optical output ports 4432*b,d* go unused, and parallel optical ports 4470*a-b* go unused. For the six-degree optical node 4600, optical input ports 4431*d-e* go unused, optical output ports 4432*b,d* go unused, and the additional optical ports 4431*b* and 4432*c* go unused on ROADMs 4410*c-d*.

Within ROADM 4410, optical couplers 4461*a-e*, 4434*a-m*, and 4439*a-d* are used to make duplicate copies of WDM signals (broadcast the signals) inputted to the ROADM from the input ports 431*a-e* and the parallel optical ports 4470*a-b*. Within ROADM 4410, optical waveguide switches 4460*a-c* and 4464*a-n* are used to route the copies of the inputted WDM signals to the wavelength switches 4420*a-b* and 4430*a-g*. Within ROADM 4410, the wavelength switches 4420*a-b* and 4430*a-g* are used to pass and block individual wavelengths from the input ports 4431*a-e* and the parallel optical ports to the output ports 4432*a-e* and the parallel optical port 4470*a*. Within ROADM 4410, optical waveguide switches 4460*d-i* and 4464*o* are used to route WDM signals from the wavelength switches 4420*a-b* and 4430*a-g* to optical couplers 4462*a-h* and 4435*a* and the output port 4432*b* and the parallel port 4470*a*. And within ROADM 4410, optical couplers 4462*a-h* and 4435*a* are used to combine optical signals from the wavelength switches 4420*a-b* and 4430*a-g* and the parallel optical port 4470*a* in order to effectively create wavelength switches larger than the 3×1 and 2×1 wavelength switches 4420*a-b* and 4430*a-g*.

As illustrated in FIG. 44, within optical node 4400, the DEG1 (Degree 1, or simply 1) signal is routed to wavelength switches 4420*a*, 4430*c*, 4420*b*, and 4430*f*. As illustrated in FIG. 44, within optical node 4400, the DEG2 (Degree 2, or simply 2) signal is routed to wavelength switches 4430*a*, 4420*a*, 4420*b*, and 4430*f*. As illustrated in FIG. 44, within optical node 4400, the DEG3 (Degree 3, or simply 3) signal is routed to wavelength switches 4430*b*, 4420*a*, 4430*d*, and 4430*g*. As illustrated in FIG. 44, within optical node 4400, the ADD1 (directionless add port 1, or A1) signal is routed to wavelength switches 4430*a*, 4430*c*, and 4430*e*. As illustrated in FIG. 44, within optical node 4400, the ADD2 (directionless add port 2, or A2) signal is routed to wavelength switches 4430*b*, 4430*d*, and 4420*b*.

Within optical node 4400, variable optical coupler 4462*a* is used to combine the outputs of wavelength switches 4430*a* and 4430*b* in order to form a 4×1 wavelength switch to select wavelengths for the DEG1 (Degree 1) output port 4432*a*. Within optical node 4400, variable optical coupler 4462*d* is used to combine the outputs of wavelength switches 4430*c* and 4430*d* in order to form a 4×1 wavelength switch to select wavelengths for the DEG2 (Degree 2) output port 4432*c*. Within optical node 4400, fixed optical coupler 4435*a* is used to combine the outputs of wavelength switches 4420*b* and 4430*e* in order to form a 4×1 wavelength switch to select wavelengths for the DEG3 (Degree 3) output port 4432*d*. Within optical node 4400, variable optical coupler 4462*h* is used to combine the outputs of wavelength switches 4430*f* and 4430*g* in order to form a 3×1 wavelength switch to select wavelengths for the DROP1 (directionless drop port 1) output port 4432*e*. Within optical node 4400, wavelength switch 4420*a* is used to select wavelengths for the DROP2 (directionless drop port 2) output port 4432*b*.

Within optical node 4400, the optical components 4464*c*, 4434*g*, 44341, 4439*b-d*, 4434*h*, 4434*m*, 4434*i*, 4434*f*, 4462*c*, 4464*o*, and 4462*f* are unused. Since variable optical coupler 4462*c* is not used, variable optical coupler 4462*b* is programmed to only direct light from coupler 4462*a* to output optical port 4432*a*, and to direct no light from coupler 4462*c*. Similarly, since variable optical coupler 4462*f* is unused, variable optical coupler 4462*e* is programmed to only direct light from coupler 4462*d* to output optical port 4432*c*, and to direct no light from coupler 4462*f*. In addition, since wavelength switch 4430*e* is used to select wavelengths for optical output port 4432*d*, and not for output port 4432*e*, variable optical coupler 4462*g* is programmed to only direct light from wavelength switch 4430*f* to output optical port 4432*e*, and to direct no light from waveguide switch 4460*h*. Since waveguide switches 4464*c* and 4464*o* are unused, they may be programmed to any available state. The poles of waveguide switches 4464*c* and 4464*o* are depicted in FIG. 44 as being disconnected from either throw position, to illustrate that the switches are not used in node 4400. Since parallel optical connectors 4470*a-c* are unused in optical node 4400, variable optical coupler 4461*e* is programmed to direct all the light from it's input to waveguide switch 4460*c*, as shown in FIG. 44.

As illustrated in FIGS. 45A, and 45B, two software programmable ROADMs 4410*a-b* are used to construct a four-degree optical node having two directionless add/drop ports. ROADM 4410*a* provides bidirectional interfaces for DEG1 (Degree 1), DEG2 (Degree 2), and ADD1/DROP1 (directionless add/drop port 1), while ROADM 4410*b* provides bidirectional interfaces for DEG3 (Degree 3), DEG4 (Degree 4), and ADD2/DROP2 (directionless add/drop port 2). Parallel optical port 4470*c* on ROADM 4410*a* is used to forward copies of the signals inputted to the DEG1, the DEG2, and the ADD1 optical ports to ROADM 4410*b* using the signals emitting from 4470*c* labeled "C", "B", and "A", respectively (as shown in FIG. 45A). These signals are received by ROADM 4410*b* at parallel optical connector 4470*c* using the same naming convention (i.e., "C", "B", and "A"), as shown in FIG. 45B. In a similar manner, parallel optical port 4470*c* on ROADM 4410*b* is used to forward copies of the signals inputted to the DEG3, the DEG4, and the ADD2 optical ports to ROADM 4410*a* using the signals emitting from 4470*c* labeled "F", "E", and "D", respectively (as shown in FIG. 45B). These signals are received by ROADM 4410*a* at parallel optical connector 4470*c* using the same naming convention (i.e., "F", "E", and "D"), as shown in FIG. 45A. A single Type B MPO/MTP cable between the parallel optical port 4470*c* of ROADM 4410*a* and the parallel optical port 4470*c* of ROADM 4410*b* interconnects the two ROADMs of the optical node 4500.

As illustrated in FIG. 45A, within optical node 4500, the DEG1 (Degree 1) signal is routed to wavelength switches 4430*c* and 4430E As illustrated in FIG. 45A, within optical node 4500, the DEG2 (Degree 2) signal is routed to wavelength switches 4430*a* and 4430*f*. As illustrated in FIG. 45A, within optical node 4500, the ADD1 (directionless add port 1, or A1) signal is routed to wavelength switches 4430*a* and 4430*c*. As illustrated in FIG. 45A, within optical node 4500, the DEG3 (Degree 3) signal (arriving on the port indicated by "F" of 4470*c*) is routed to wavelength switches 4420*a*, 4420*b*, and 4430*g*. As illustrated in FIG. 45A, within optical node 4500, the DEG4 (Degree 4) signal (arriving on the port indicated by "E" of 4470*c*) is routed to wavelength switches 4420*a*, 4420*b*, and 4430*g*. As illustrated in FIG. 45A, within optical node 4500, the ADD2 (directionless add port 2, or A2) signal (arriving on the port indicated by "D" of 4470*c*) is routed to wavelength switches 4420*a* and 4420*b*.

Within ROADM 4410*a* of optical node 4500, variable optical coupler 4462*b* is used to combine the outputs of wavelength switches 4430*a* and 4420*a* to form a 5×1 wavelength switch to select wavelengths for the DEG1 (Degree 1) output port 4432*a*. Within ROADM 4410*a* of optical node 4500, variable optical coupler 4462*e* is used to combine the outputs of wavelength switches 4430*c* and 4420*b* to form a 5×1 wavelength switch to select wavelengths for the DEG2 (Degree 2) output port 4432*c*. Within ROADM 4410*a* of optical node 4500, variable optical coupler 4462*h* is used to combine the outputs of wavelength switches 4430*f* and 4430*g* in order to form a 4×1 wavelength switch to select wavelengths for the DROP1 (directionless drop port 1) output port 4432*e*.

Within ROADM 4410*a* of optical node 4500, the optical components 4439*a*, 4434*a,e,k,l*, 4464*b,d,i,k,m,o*, 4460*c,f,h,i*, 4435*a*, 4430*b,d,e* are unused. Since wavelength switch 4430*b* is not used (as indicated by the letter "X" on the signals into wavelength switch 4430*b*'s input ports), variable optical coupler 4462*a* is programmed to only direct light from wavelength switch 4430*a* to variable optical coupler 4462*b*. Since waveguide switch 4464*o* is not used, variable optical coupler 4462*c* is programmed to only direct light from waveguide switch 4460*d* to variable optical coupler 4462*b*. Since waveguide switch 4460*f* is not used, variable optical coupler 4462*d* is programmed to only direct light from waveguide switch 4460*e* to variable optical coupler 4462*e*. Since parallel optical port 4470*a* is not used, variable optical coupler 4462*f* is programmed to only direct light from waveguide switch 4460*g* to variable optical coupler 4462*e*. Since wavelength switch 4430*e* is not used, variable optical coupler 4462*g* is programmed to only direct light from wavelength switch 4430*f* to variable optical coupler 4462*h*. Since waveguide switch 4464*g* does not use the signal from variable optical coupler 4461*b*, variable optical coupler 4461*b* is programmed to only direct light to wavelength switch 4460*a*. Since waveguide switch 4460*c* is not used, variable optical coupler 4461*e* is programmed to only direct light to optical coupler 4439*b*. Since waveguide switches 4464*b,d,i,k,m,o* and 4460*c,f,h,i* are unused, they may be programmed to any available state. The poles of waveguide switches 4464*b,d,i,k,m,o* and 4460*c,f,h,i* are depicted in FIG. 45A as being disconnected from either throw position, to illustrate that the switches are not used in node 4500.

As illustrated in FIG. 45B, within optical node 4500, the DEG3 (Degree 3) signal is routed to wavelength switches 4430*c* and 4430E As illustrated in FIG. 45B, within optical node 4500, the DEG4 (Degree 4) signal is routed to wavelength switches 4430*a* and 4430*f*. As illustrated in FIG. 45B, within optical node 4500, the ADD2 (directionless add port 2, or A2) signal is routed to wavelength switches 4430*a* and 4430*c*. As illustrated in FIG. 45B, within optical node 4500, the DEG1 (Degree 1) signal (arriving on the port indicated by "C" of 4470*c*) is routed to wavelength switches 4420*a*, 4420*b*, and 4430*g*. As illustrated in FIG. 45B, within optical node 4500, the DEG2 (Degree 2) signal (arriving on the port indicated by "B" of 4470*c*) is routed to wavelength switches 4420*a*, 4420*b*, and 4430*g*. As illustrated in FIG. 45B, within optical node 4500, the ADD1 (directionless add port 1, or A1) signal (arriving on the port indicated by "A" of 4470*c*) is routed to wavelength switches 4420*a* and 4420*b*.

Within ROADM 4410*b* of optical node 4500, variable optical coupler 4462*b* is used to combine the outputs of wavelength switches 4430*a* and 4420*a* to form a 5×1 wavelength switch to select wavelengths for the DEG3 (Degree 3) output port 4432*a*. Within ROADM 4410*b* of optical node 4500, variable optical coupler 4462*e* is used to combine the outputs of wavelength switches 4430*c* and 4420*b* to form a 5×1 wavelength switch to select wavelengths for the DEG4 (Degree 4) output port 4432*c*. Within ROADM 4410*b* of optical node 4500, variable optical coupler 4462*h* is used to combine the outputs of wavelength switches 4430*f* and 4430*g* in order to form a 4×1 wavelength switch to select wavelengths for the DROP2 (directionless drop port 2) output port 4432*e*.

Within ROADM 4410*b* of optical node 4500, the optical components 4439*a*, 4434*a,e,k,l*, 4464*b,d,i,k,m,o*, 4460*c,f,h,i*, 4435*a*, 4430*b,d,e* are unused. Since wavelength switch 4430*b* is not used, variable optical coupler 4462*a* is programmed to only direct light from wavelength switch 4430*a* to variable optical coupler 4462*b*. Since waveguide switch 4464*o* is not used, variable optical coupler 4462*c* is programmed to only direct light from waveguide switch 4460*d* to variable optical coupler 4462*b*. Since waveguide switch 4460*f* is not used, variable optical coupler 4462*d* is programmed to only direct light from waveguide switch 4460*e* to variable optical coupler 4462*e*. Since parallel optical port 4470*a* is not used, variable optical coupler 4462*f* is programmed to only direct light from waveguide switch 4460*g* to variable optical coupler 4462*e*. Since wavelength switch 4430*e* is not used, variable optical coupler 4462*g* is programmed to only direct light from wavelength switch 4430*f* to variable optical coupler 4462*h*. Since waveguide switch 4464*g* does not use the signal from variable optical coupler 4461*b*, variable optical coupler 4461*b* is programmed to only direct light to wavelength switch 4460*a*. Since waveguide switch 4460*c* is not used, variable optical coupler 4461*e* is programmed to only direct light to optical coupler 4439*b*. Since waveguide switches 4464*b,d,i,k,m,o* and 4460*c,f,h,i* are unused, they may be programmed to any available state. The poles of waveguide switches 4464*b,d,i,k,m,o* and 4460*c,f,h,i* are depicted in FIG. 45B as being disconnected from either throw position, to illustrate that the switches are not used in node 4500.

Figure 46B:
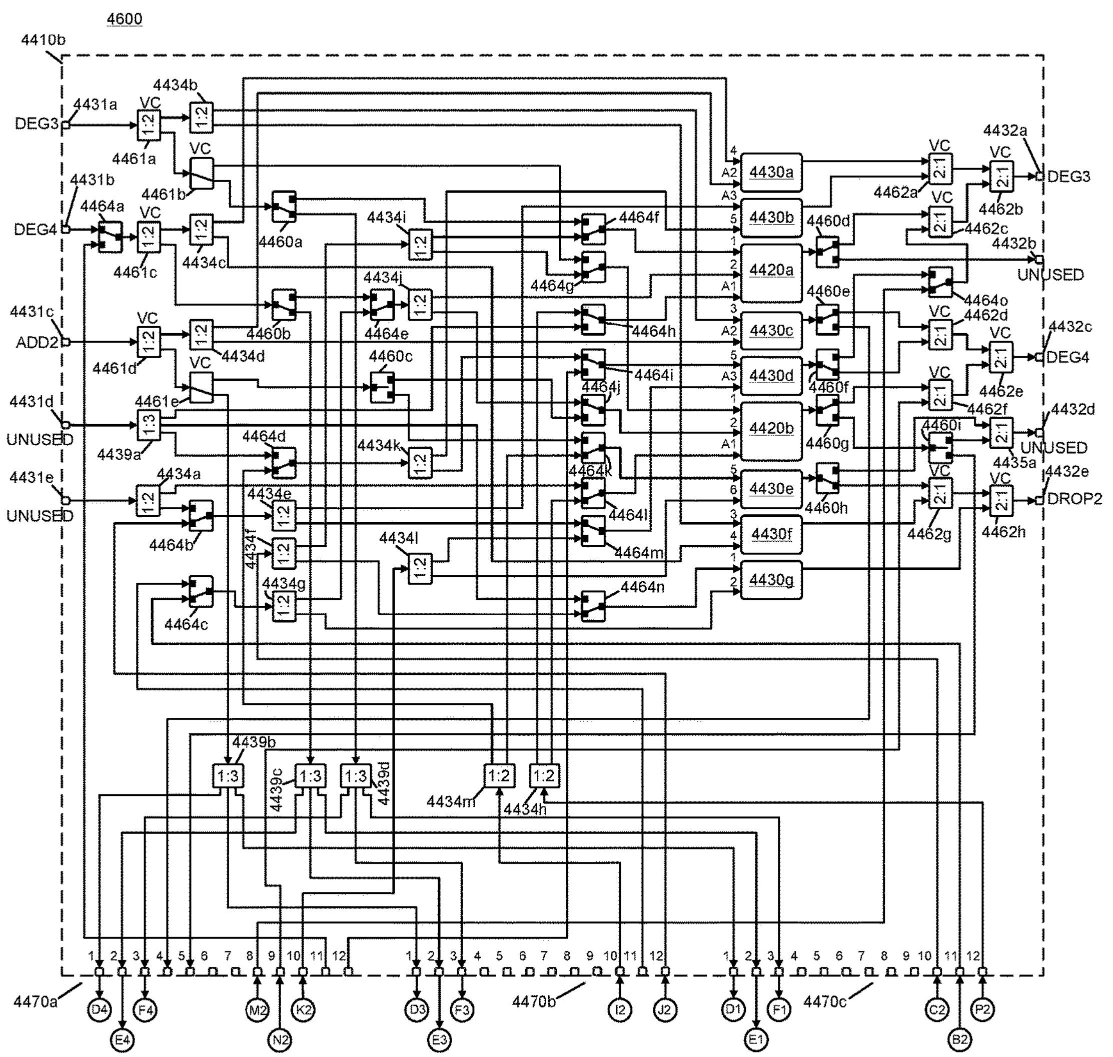
Figure 46C:
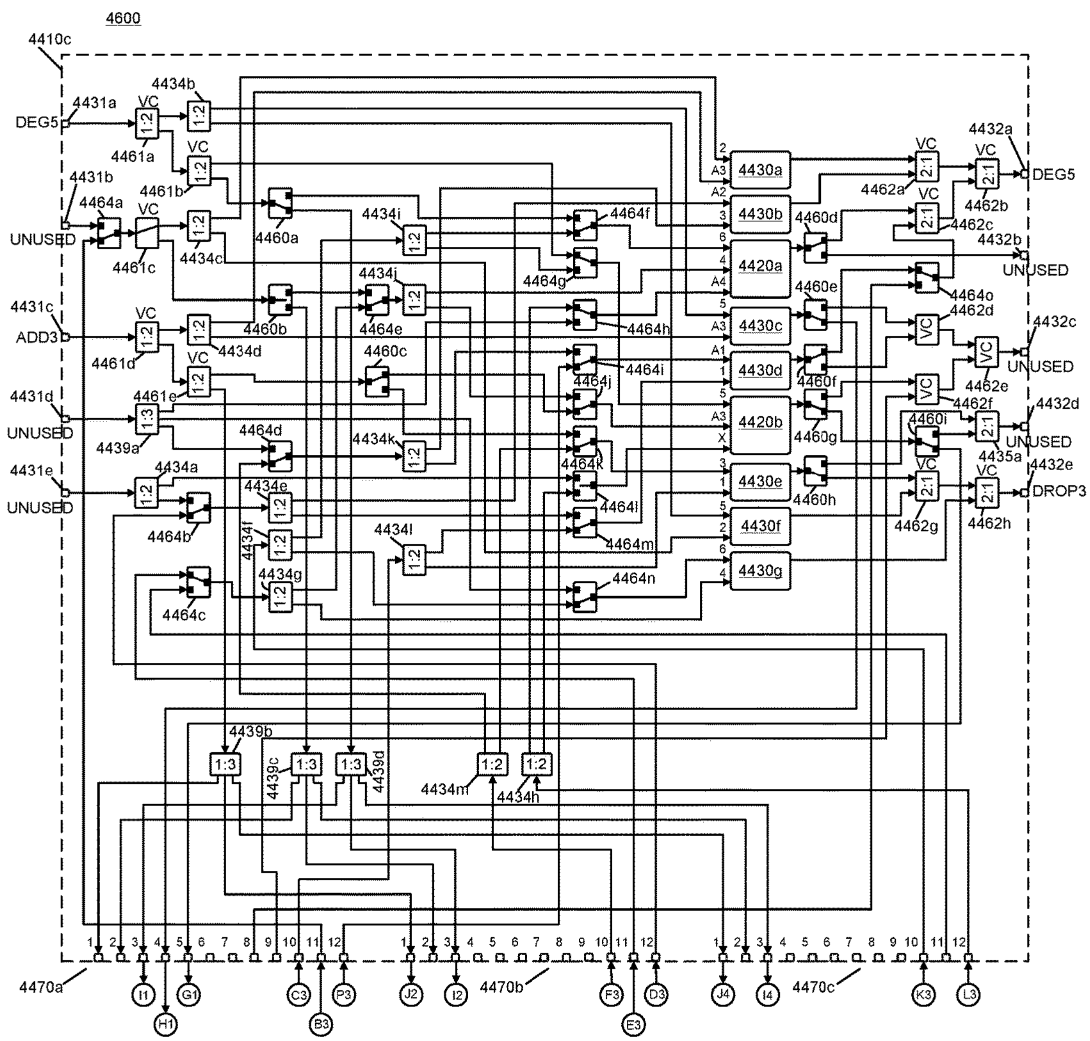
Figure 46D:
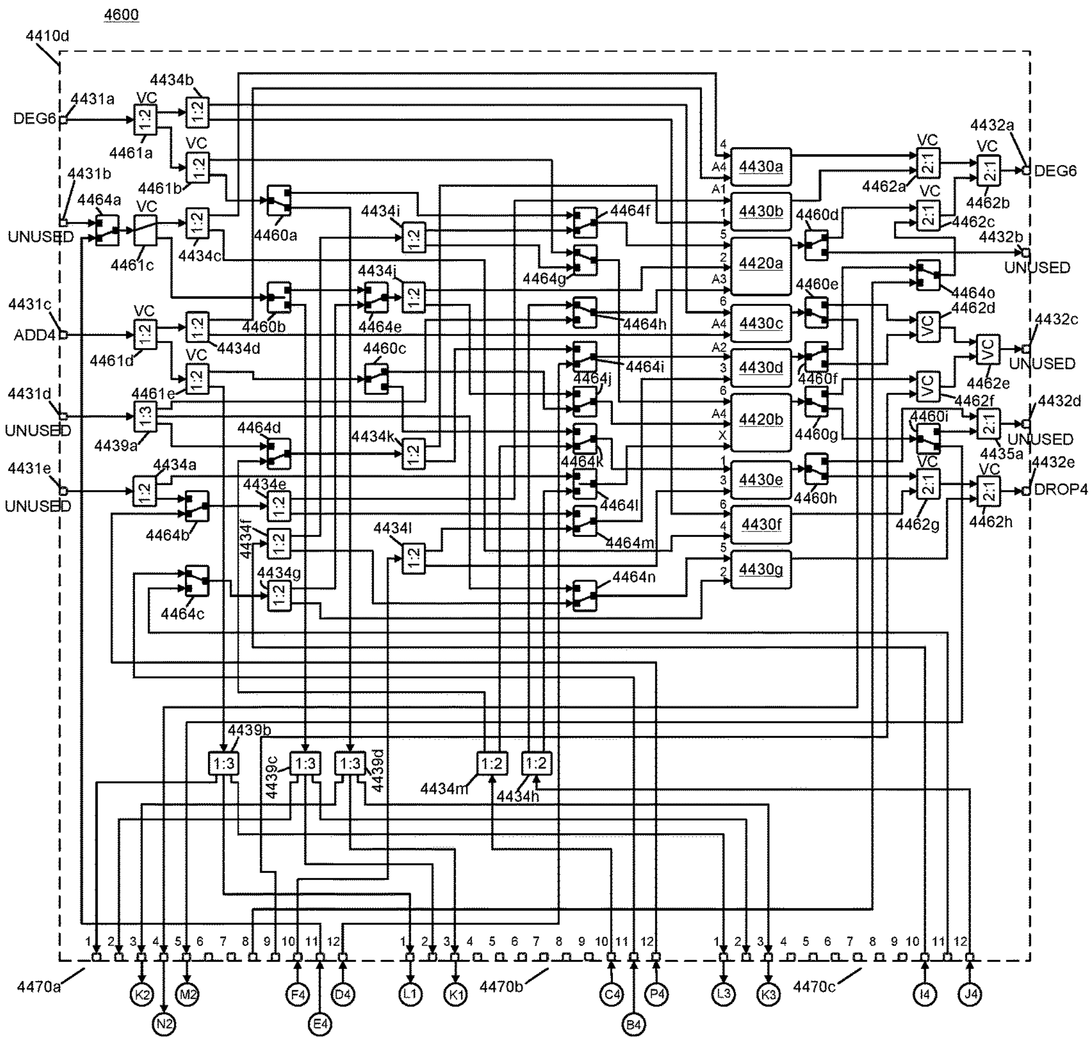

As illustrated in FIGS. 46A, 46B, 46C, and 46D, four software programmable ROADMs 4410*a-d* are used to construct a six-degree optical node having four directionless add/drop ports. ROADM 4410*a* in FIG. 46A provides bidirectional interfaces for DEG1 (Degree 1), DEG2 (Degree 2), and ADD1/DROP1 (directionless add/drop port 1), and ROADM 4410*b* in FIG. 46B provides bidirectional interfaces for DEG3 (Degree 3), DEG4 (Degree 4), and ADD2/DROP2 (directionless add/drop port 2), and ROADM 4410*c* in FIG. 46C provides bidirectional interfaces for DEG5 (Degree 5), and ADD3/DROP3 (directionless add/drop port 3), and ROADM 4410*d* in FIG. 46D provides bidirectional interfaces for DEG6 (Degree 6), and ADD4/DROP4 (directionless add/drop port 4).

In optical node 4600, six Type B MPO/MTP cables are used to connect each ROADM to all other ROADMs. More specifically, a first Type B MPO/MTP cable connects port 4470*a* of ROADM 4410*a* to port 4470*a* of ROADM 4410*c* (as illustrated by the inter-figure-sheet connection labels P3, B3, C3, G1, H1, I1), and a second Type B MPO/MTP cable connects port 4470*b* of ROADM 4410*a* to port 4470*b* of ROADM 4410*d* (as illustrated by the inter-figure-sheet connection labels P4, B4, C4, K1, L1), and a third Type B MPO/MTP cable connects port 4470*c* of ROADM 4410*a* to port 4470*c* of ROADM 4410*b* (as illustrated by the inter-figure-sheet connection labels P2, B2, C2, D1, E1, F1), and a fourth Type B MPO/MTP cable connects port 4470*a* of ROADM 4410*b* to port 4470*a* of ROADM 4410*d* (as illustrated by the inter-figure-sheet connection labels D4, E4, F4, K2, N2, M2), and a fifth Type B MPO/MTP cable connects port 4470*b* of ROADM 4410*b* to port 4470*b* of ROADM 4410*c* (as illustrated by the inter-figure-sheet connection labels D3, E3, F3, I2, J2), and a sixth Type B MPO/MTP cable connects port 4470*c* of ROADM 4410*c* to port 4470*c* of ROADM 4410*d* (as illustrated by the inter-figure-sheet connection labels J4, I4, K3, L3).

Using the first Type B MPO/MTP cable, ROADM 4410*a* forwards copies of the signals DEG1, DEG2, and ADD1 to ROADM 4410*c*, and ROADM 4410*c* forwards a copy of the signal DEG5 to ROADM 4410*a*. In addition, ROADM 4410*c* forwards the outputs from wavelength switches 4430*c* and 4420*b* of ROADM 4410*c* to ROADM 4410*a*. In a similar manner, using the fourth Type B MPO/MTP cable, ROADM 4410*b* forwards copies of the signals DEG3, DEG4, and ADD2 to ROADM 4410*d*, and ROADM 4410*d* forwards a copy of the signal DEG6 to ROADM 4410*b*. In addition, ROADM 4410*d* forwards the outputs from wavelength switches 4430*c* and 4420*b* of ROADM 4410*d* to ROADM 4410*b*.

Using the second Type B MPO/MTP cable, ROADM 4410*a* forwards copies of the signals DEG1, DEG2, and ADD1 to ROADM 4410*d*, and ROADM 4410*d* forwards copies of the signals DEG6 and ADD4 to ROADM 4410*a*. In a similar manner, using the fifth Type B MPO/MTP cable, ROADM 4410*b* forwards copies of the signals DEG3, DEG4, and ADD2 to ROADM 4410*c*, and ROADM 4410*c* forwards copies of the signals DEG5 and ADD3 to ROADM 4410*b*.

Using the third Type B MPO/MTP cable, ROADM 4410*a* forwards copies of the signals DEG1, DEG2, and ADD1 to ROADM 4410*b*, and ROADM 4410*b* forwards copies of the signals DEG3, DEG4, and ADD2 to ROADM 4410*a*. And lastly, using the sixth Type B MPO/MTP cable, ROADM 4410*c* forwards copies of the signals DEG5 and ADD3 to ROADM 4410*d*, and ROADM 4410*d* forwards copies of the signals DEG6 and ADD4 to ROADM 4410*c*.

As illustrated in FIG. 46A, within optical node 4600, the DEG1 (Degree 1) signal is routed to wavelength switches 4430*c* and 4430*f* As illustrated in FIG. 46A, within optical node 4600, the DEG2 (Degree 2) signal is routed to wavelength switches 4430*a* and 4430*f*. As illustrated in FIG. 46A, within optical node 4600, the ADD1 (directionless add port 1, or A1) signal is routed to wavelength switches 4430*a* and 4430*c*. As illustrated in FIG. 46A, within optical node 4600, the DEG3 (Degree 3) signal (arriving on the port indicated by "F1" of 4470*c*) is routed to wavelength switches 4420*a*, 4420*b*, and 4430*g*. As illustrated in FIG. 46A, within optical node 4600, the DEG4 (Degree 4) signal (arriving on the port indicated by "E1" of 4470*c*) is routed to wavelength switches 4420*a*, 4420*b*, and 4430*g*. As illustrated in FIG. 46A, within optical node 4600, the ADD2 (directionless add port 2, or A2) signal (arriving on the port indicated by "D1" of 4470*c*) is routed to wavelength switches 4420*a* and 4420*b*. As illustrated in FIG. 46A, within optical node 4600, the ADD4 (directionless add port 4, or A4) signal (arriving on the port indicated by "L1" of 4470*b*) is routed to wavelength switches 4430*b* and 4430*d*. As illustrated in FIG. 46A, within optical node 4600, the DEG6 (Degree 6) signal (arriving on the port indicated by "K1" of 4470*b*) is routed to wavelength switches 4430*b*, 4430*d*, and 4430*e*. As illustrated in FIG. 46A, within optical node 4600, the DEG5 (Degree 5) signal (arriving on the port indicated by "I1" of 4470*a*) is routed to wavelength switch 4430*e*.

On ROADM 4410*c* within optical node 4600, wavelength switch 4420*b* is used to select wavelengths from the DEG5 and ADD3 input signals. The output of wavelength switch 4420*b* is forwarded to ROADM 4410*a* within optical node 4600 (using the first Type B MPO/MTP cable) in order to use it for the generation of the DEG1 output signal. Similarly, on ROADM 4410*c* within optical node 4600, wavelength switch 4430*c* is used to select wavelengths from the DEG5 and ADD3 input signals. The output of wavelength switch 4430*c* is forwarded to ROADM 4410*a* within optical node 4600 (using the first Type B MPO/MTP cable) in order to use it for the generation of the DEG2 output signal.

Within ROADM 4410*a* of optical node 4600, variable optical couplers 4462*a*, 4462*b*, and 4462*c* are used to combine the outputs of wavelength switches 4430*a*, 4430*b*, and 4420*a* of 4410*a*, and wavelength switch 4420*b* of 4410*c* to form a 9×1 wavelength switch to select wavelengths for the DEG1 (Degree 1) output port 4432*a* of 4410*a*. Similarly, within ROADM 4410*a* of optical node 4600, variable optical couplers 4462*d*, 4462*e*, and 4462*f* are used to combine the outputs of wavelength switches 4430*c*, 4430*d*, and 4420*b* of 4410*a*, and wavelength switch 4430*c* of 4410*c* to form a 9×1 wavelength switch to select wavelengths for the DEG2 (Degree 2) output port 4432*c* of 4410*a*. Within ROADM 4410*a* of optical node 4600, variable optical couplers 4462*g-h* are used to combine the outputs of wavelength switches 4430*e-g* to form a 6×1 wavelength switch to select wavelengths for the DROP1 (directionless drop port 1) output port 4432*e*.

Within ROADM 4410*a* of optical node 4600, the optical components 4439*a*, 4434*a*, 4460*c,i*, and 4435*a*, are unused. Since waveguide switch 4464*g* does not use the signal from variable optical coupler 4461*b*, variable optical coupler 4461*b* is programmed to only direct light to wavelength switch 4460*a*. Since waveguide switch 4460*c* is not used, variable optical coupler 4461*e* is programmed to only direct light to optical coupler 4439*b*. Since waveguide switches 4460*c,i* are unused, they may be programmed to any available state. The poles of waveguide switches d 4460*c,i* are depicted in FIG. 46A as being disconnected from either throw position, to illustrate that the switches are not used in node 4600.

As illustrated in FIG. 46B, within optical node 4600, the DEG3 (Degree 3) signal is routed to wavelength switches 4430*c* and 4430E As illustrated in FIG. 46B, within optical node 4600, the DEG4 (Degree 4) signal is routed to wavelength switches 4430*a* and 4430*f*. As illustrated in FIG. 46B, within optical node 4600, the ADD2 (directionless add port 2, or A2) signal is routed to wavelength switches 4430*a* and 4430*c*. As illustrated in FIG. 46B, within optical node 4600, the DEG1 (Degree 1) signal (arriving on the port indicated by "C2" of 4470*c*) is routed to wavelength switches 4420*a*, 4420*b*, and 4430*g*. As illustrated in FIG. 46B, within optical node 4600, the DEG2 (Degree 2) signal (arriving on the port indicated by "B2" of 4470*c*) is routed to wavelength switches 4420*a*, 4420*b*, and 4430*g*. As illustrated in FIG. 46B, within optical node 4600, the ADD1 (directionless add port 1, or A1) signal (arriving on the port indicated by "P2" of 4470*c*) is routed to wavelength switches 4420*a* and 4420*b*. As illustrated in FIG. 46B, within optical node 4600, the ADD3 (directionless add port 3, or A3) signal (arriving on the port indicated by "J2" of 4470*b*) is routed to wavelength switches 4430*b* and 4430*d*. As illustrated in FIG. 46B, within optical node 4600, the DEG5 (Degree 5) signal (arriving on the port indicated by "I2" of 4470*b*) is routed to wavelength switches 4430*b*, 4430*d*, and 4430*e*. As illustrated in FIG. 46B, within optical node 4600, the DEG6 (Degree 6) signal (arriving on the port indicated by "K2" of 4470*a*) is routed to wavelength switch 4430*e*.

On ROADM 4410*d* within optical node 4600, wavelength switch 4420*b* is used to select wavelengths from the DEG6 and ADD4 input signals. The output of wavelength switch 4420*b* is forwarded to ROADM 4410*b* within optical node 4600 (using the fourth Type B MPO/MTP cable) in order to use it for the generation of the DEG3 output signal. Similarly, on ROADM 4410*d* within optical node 4600, wavelength switch 4430*c* is used to select wavelengths from the DEG6 and ADD4 input signals. The output of wavelength switch 4430*c* is forwarded to ROADM 4410*b* within optical node 4600 (using the fourth Type B MPO/MTP cable) in order to use it for the generation of the DEG4 output signal.

Within ROADM 4410*b* of optical node 4600, variable optical couplers 4462*a*, 4462*b*, and 4462*c* are used to combine the outputs of wavelength switches 4430*a*, 4430*b*, and 4420*a* of 4410*b*, and wavelength switch 4420*d* of 4410*c* to form a 9×1 wavelength switch to select wavelengths for the DEG3 (Degree 3) output port 4432*a* of 4410*b*. Similarly, within ROADM 4410*b* of optical node 4600, variable optical couplers 4462*d*, 4462*e*, and 4462*f* are used to combine the outputs of wavelength switches 4430*c*, 4430*d*, and 4420*b* of 4410*b*, and wavelength switch 4430*c* of 4410*d* to form a 9×1 wavelength switch to select wavelengths for the DEG4 (Degree 4) output port 4432*c* of 4410*b*. Within ROADM 4410*b* of optical node 4600, variable optical couplers 4462*g-h* are used to combine the outputs of wavelength switches 4430*e-g* to form a 6×1 wavelength switch to select wavelengths for the DROP2 (directionless drop port 2) output port 4432*e*.

Within ROADM 4410*b* of optical node 4600, the optical components 4439*a*, 4434*a*, 4460*c,i*, and 4435*a*, are unused. Since waveguide switch 4464*g* does not use the signal from variable optical coupler 4461*b*, variable optical coupler 4461*b* is programmed to only direct light to wavelength switch 4460*a*. Since waveguide switch 4460*c* is not used, variable optical coupler 4461*e* is programmed to only direct light to optical coupler 4439*b*. Since waveguide switches 4460*c,i* are unused, they may be programmed to any available state. The poles of waveguide switches d 4460*c,i* are depicted in FIG. 46B as being disconnected from either throw position, to illustrate that the switches are not used in node 4600.

As illustrated in FIG. 46C, within optical node 4600, the DEG5 (Degree 5) signal is routed to wavelength switches 4430*c*, 4420*b*, and 4430*f*. As illustrated in FIG. 46B, within optical node 4600, the ADD3 (directionless add port 3, or A3) signal is routed to wavelength switches 4430*a*, 4430*c*, and 4420*b*. As illustrated in FIG. 46C, within optical node 4600, the DEG3 (Degree 3) signal (arriving on the port indicated by "F3" of 4470*b*) is routed to wavelength switches 4430*b* and 4430*e*. As illustrated in FIG. 46C, within optical node 4600, the DEG4 (Degree 4) signal (arriving on the port indicated by "E3" of 4470*b*) is routed to wavelength switches 4420*a* and 4430*g*. As illustrated in FIG. 46C, within optical node 4600, the ADD2 (directionless add port 2, or A2) signal (arriving on the port indicated by "D3" of 4470*b*) is routed to wavelength switch 4430*b*. As illustrated in FIG. 46C, within optical node 4600, the ADD4 (directionless add port 4, or A4) signal (arriving on the port indicated by "L3" of 4470*c*) is routed to wavelength switch 4420*a*. As illustrated in FIG. 46C, within optical node 4600, the DEG6 (Degree 6) signal (arriving on the port indicated by "K3" of 4470*c*) is routed to wavelength switches 4420*a* and 4430*g*. As illustrated in FIG. 46C, within optical node 4600, the DEG2 (Degree 2) signal (arriving on the port indicated by "B3" of 4470*a*) is routed to wavelength switches 4430*a* and 4430*f*. As illustrated in FIG. 46C, within optical node 4600, the DEG1 (Degree 1) signal (arriving on the port indicated by "C3" of 4470*a*) is routed to wavelength switches 4430*d* and 4430*e*. As illustrated in FIG. 46C, within optical node 4600, the ADD1 (directionless add port 1, or A1) (arriving on the port indicated by "P3" of 4470*a*) is routed to wavelength switch 4430*d*.

Within ROADM 4410*c* of optical node 4600, variable optical couplers 4462*a*, 4462*b*, and 4462*c* are used to combine the outputs of wavelength switches 4430*a*, 4430*b*, 4420*a*, and 4430*d* of 4410*a* to form a 9×1 wavelength switch to select wavelengths for the DEG5 (Degree 5) output port 4432*a* of 4410*c*. Within ROADM 4410*c* of optical node 4600, variable optical couplers 4462*g-h* are used to combine the outputs of wavelength switches 4430*e-g* to form a 6×1 wavelength switch to select wavelengths for the DROP3 (directionless drop port 3) output port 4432*e*.

Within ROADM 4410*c* of optical node 4600, the optical components 4439*a*, 4434*a*, 4460*b*, 44641, 4462*d-f*, and 4435*a*, are unused. Since waveguide switch 4460*b* is not used, variable optical coupler 4461*c* is programmed to only direct light to optical coupler 4434*c*. Since waveguide switches 4460*b* and 44641 are unused, they may be programmed to any available state. The poles of waveguide switches 4460*b* and 44641 are depicted in FIG. 46C as being disconnected from either throw position, to illustrate that the switches are not used in node 4600.

As illustrated in FIG. 46D, within optical node 4600, the DEG6 (Degree 6) signal is routed to wavelength switches 4430*c*, 4420*b*, and 4430*f*. As illustrated in FIG. 46D, within optical node 4600, the ADD4 (directionless add port 4, or A4) signal is routed to wavelength switches 4430*a*, 4430*c*, and 4420*b*. As illustrated in FIG. 46D, within optical node 4600, the DEG1 (Degree 1) signal (arriving on the port indicated by "C4" of 4470*b*) is routed to wavelength switches 4430*b* and 4430*e*. As illustrated in FIG. 46D, within optical node 4600, the DEG2 (Degree 2) signal (arriving on the port indicated by "B4" of 4470*b*) is routed to wavelength switches 4420*a* and 4430*g*. As illustrated in FIG. 46D, within optical node 4600, the ADD1 (directionless add port 1, or A1) signal (arriving on the port indicated by "P4" of 4470*b*) is routed to wavelength switch 4430*b*. As illustrated in FIG. 46D, within optical node 4600, the ADD3 (directionless add port 3, or A3) signal (arriving on the port indicated by "J4" of 4470*c*) is routed to wavelength switch 4420*a*. As illustrated in FIG. 46D, within optical node 4600, the DEG5 (Degree 5) signal (arriving on the port indicated by "I4" of 4470*c*) is routed to wavelength switches 4420*a* and 4430*g*. As illustrated in FIG. 46D, within optical node 4600, the DEG4 (Degree 4) signal (arriving on the port indicated by "E4" of 4470*a*) is routed to wavelength switches 4430*a* and 4430*f* As illustrated in FIG. 46D, within optical node 4600, the DEG3 (Degree 3) signal (arriving on the port indicated by "F4" of 4470*a*) is routed to wavelength switches 4430*d* and 4430*e*. As illustrated in FIG. 46D, within optical node 4600, the ADD2 (directionless add port 2, or A2) (arriving on the port indicated by "D4" of 4470*a*) is routed to wavelength switch 4430*d*.

Within ROADM 4410*d* of optical node 4600, variable optical couplers 4462*a*, 4462*b*, and 4462*c* are used to combine the outputs of wavelength switches 4430*a*, 4430*b*,

4420*a*, and 4430*d* of 4410*a* to form a 9×1 wavelength switch to select wavelengths for the DEG6 (Degree 6) output port 4432*a* of 4410*d*. Within ROADM 4410*d* of optical node 4600, variable optical couplers 4462*g-h* are used to combine the outputs of wavelength switches 4430*e-g* to form a 6×1 wavelength switch to select wavelengths for the DROP4 (directionless drop port 4) output port 4432*e*.

Within ROADM 4410*d* of optical node 4600, the optical components 4439*a*, 4434*a*, 4460*b*, 44641, 4462*d-f*, and 4435*a*, are unused. Since waveguide switch 4460*b* is not used, variable optical coupler 4461*c* is programmed to only direct light to optical coupler 4434*c*. Since waveguide switches 4460*b* and 44641 are unused, they may be programmed to any available state. The poles of waveguide switches 4460*b* and 44641 are depicted in FIG. 46D as being disconnected from either throw position, to illustrate that the switches are not used in node 4600.

Figure 47:
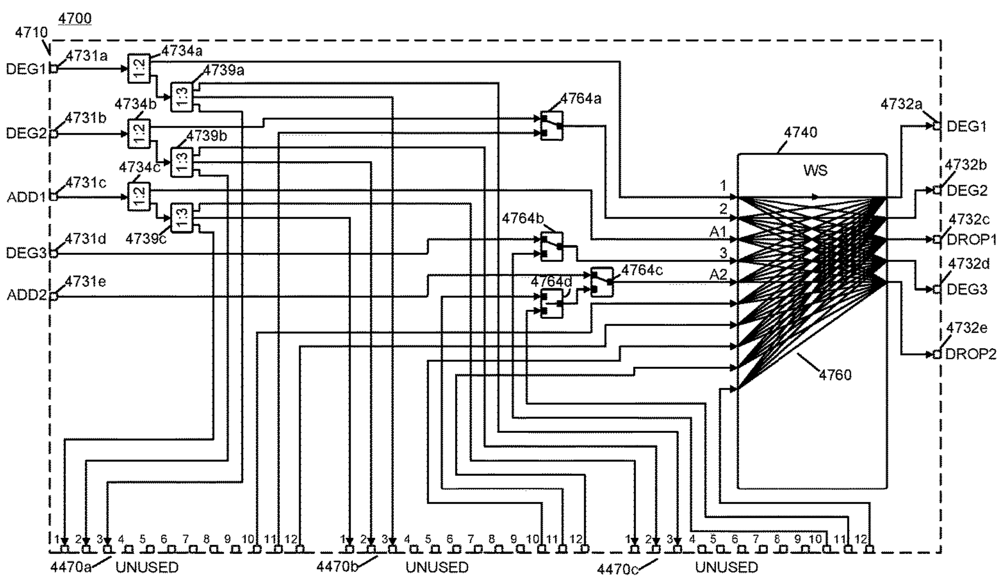
FIG. 47 is an illustration of a software programmable ROADM used to construct three, four and six-degree optical nodes, configured as a three-degree optical node.
Figure 48A:
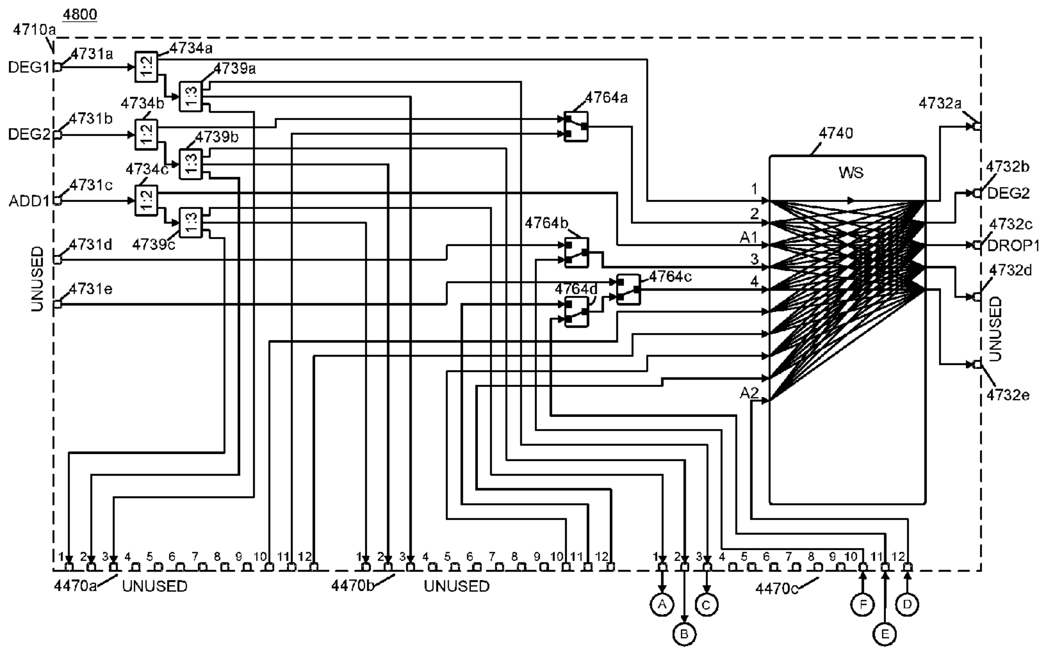
FIGS. 48A and 48B illustrate the use of two FIG. 47 software programmable ROADMs to construct a four-degree optical node with two directionless add/drop ports.
Figure 48B:
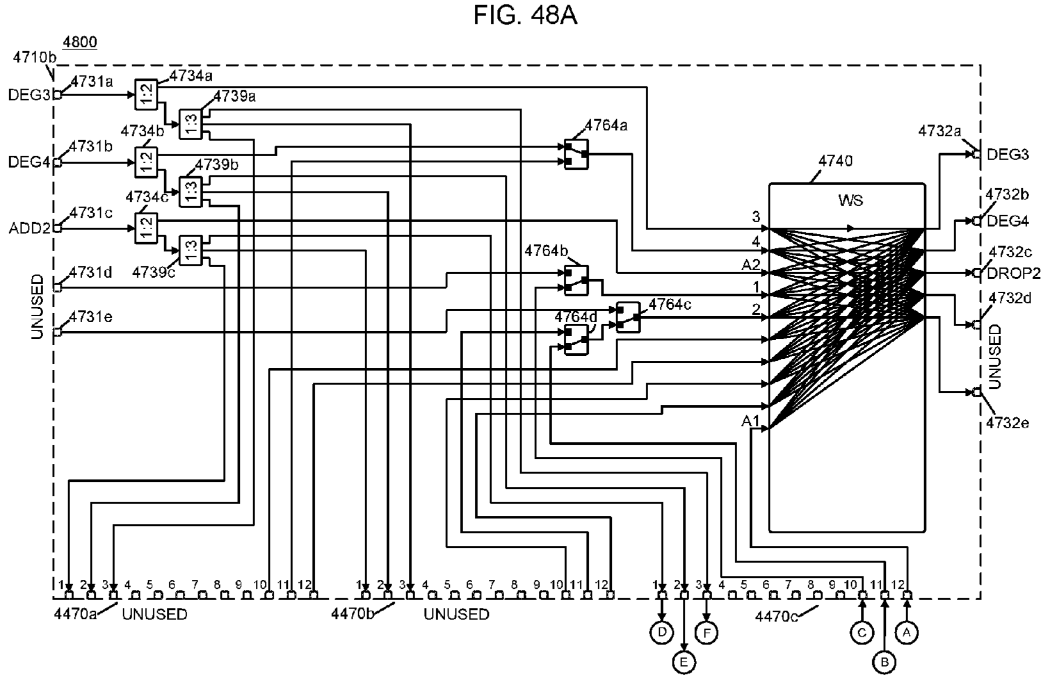
Figure 49A:
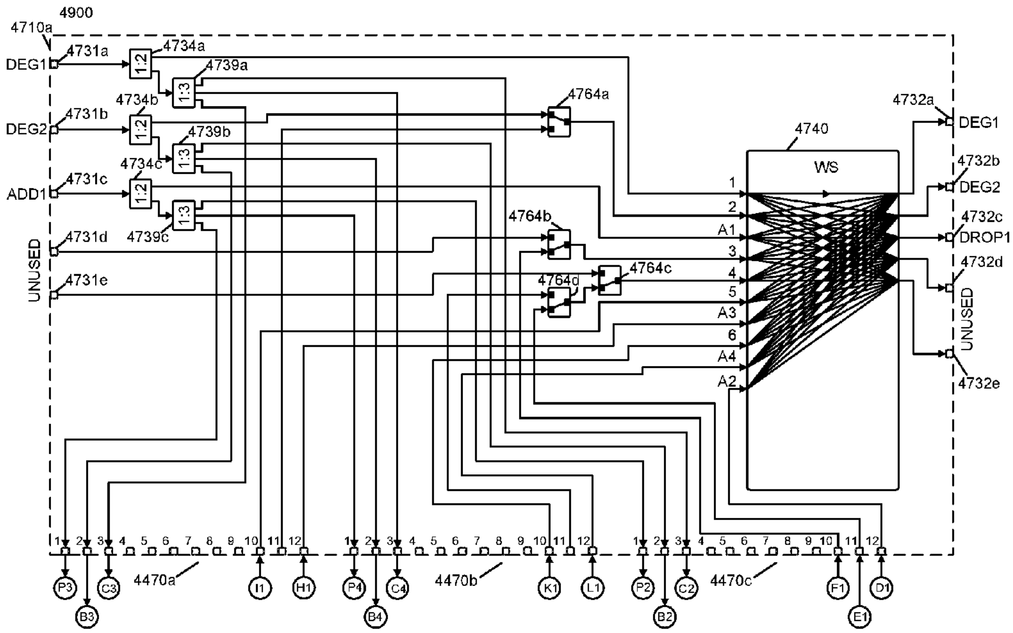
FIGS. 49A, 49B, 49C, and 49D illustrate the use of four FIG. 47 software programmable ROADMs to construct a six-degree optical node with four directionless add/drop ports.

FIG. 47, FIG. 48AB, and FIG. 49ABCD, illustrate three different size optical nodes 4700, 4800, 4900 constructed from the same software programmable ROADM 4710. The optical node 4700 of FIG. 47 supports up to three optical degrees and two directionless add/drop ports using a single software programmable ROADM 4710. The optical node 4800 of FIG. 48A and FIG. 48B supports up to four optical degrees and two directionless add/drop ports using two software programmable ROADMs 4710*a-b*. The optical node 4900 of FIG. 49A, FIG. 49B, FIG. 49C, and FIG. 49D supports up to six optical degrees and four directionless add/drop ports using four software programmable ROADMs 4710*a-d*.

FIG. 47 is an illustration of a software programmable ROADM 4710 used to construct three, four and six-degree optical nodes, configured as a three-degree optical node 4700. The ROADM 4710 comprises: a 10×5 wavelength switch 4740, four two-by-one waveguide switches 4764*a-d*, three one-to-two optical couplers 4734*a-c*, three one-to-three optical couplers 4739*a-c*, three parallel optical ports 4470*a-c*, five optical input ports 4731*a-e*, five optical output ports 4732*a-e*, and optical waveguides interconnecting the various optical components (illustrated with solid lines). The a 10×5 wavelength switch 4740 provides the ability to forward any wavelength from any of the ten input ports of the wavelength switch to any of the five output ports of the wavelength switch, as indicated by the solid lines 4760. The optical couplers 4734*a-c* and 4739*a-c* are used to make copies of the WDM signals DEG1, DEG2, DEG3, ADD1, and ADD2 applied to input optical ports 4731*a-e*. The software programmable waveguide switches 4764*a-d* are used to route copies of the signals DEG1, DEG2, DEG3, ADD1, and ADD2 to the input ports of the wavelength switch 4740. In addition, the waveguide switches 4764*a-d* are used to route signals from the three parallel optical ports 4470*a-c* to the input ports of the wavelength switch 4740.

As illustrated in FIG. 47, within the optical node 4700, the optical signals DEG1, DEG2, ADD1, DEG3, and ADD2 are routed to the first input, the second input, the third input, the fourth input, and the fifth input of the wavelength switches 4740, as shown, and the wavelength switch 4740 is used to route individual wavelengths within each of the signals DEG1, DEG2, ADD1, DEG3, and ADD2 to the output ports 4732*a-e*. Within the optical node 4700, the parallel optical ports 4470*a-c* are unused, and the waveguide switch 4764*d* is unused. Optical inputs six through ten of the wavelength switch 4740 are unused, and therefore, 25 of the possible 50 optical paths through the wavelength switch 4740 of optical node 4700 are not used.

FIGS. 48A and 48B illustrate the use of two software programmable ROADMs 4710*a-b* to construct a four-degree optical node 4800 with two directionless add/drop ports. ROADM 4710*a* provides the optical interfaces for Degrees one and two (DEG1 and DEG2), and provides the optical interfaces for the first directionless add/drop port (ADD1 and DROP1), while ROADM 4710*b* provides the optical interfaces for Degrees three and four (DEG3 and DEG4), and provides the optical interfaces for the second directionless add/drop port (ADD2 and DROP2). The two ROADMs 4710*a-b* are interconnected using a single Type B MPO/MTP cable (not shown), which connects parallel port 4470*c* of ROADM 4710*a* to parallel port 4470*c* of ROADM 4710*b*. The interconnections between the two ROADMs are indicated using the page interconnection indicators A, B, C, D, E, and F. Using the parallel optical port 4470*c* on each ROADM, ROADM 4710*a* forwards a copy of the inputted optical signals DEG1, DEG2, and ADD1, to ROADM 4710*b*, and ROADM 4710*b* forwards a copy of the inputted optical signals DEG3, DEG4, and ADD2, to ROADM 4710*a*.

As shown in FIG. 48A, copies of the inputted optical signals DEG1 (1), DEG2 (2), ADD1 (A1), DEG3 (3), and DEG4 (4) are forwarded to the first five inputs of wavelength switch 4740 of ROADM 4710*a*, and a copy of the inputted optical signal ADD2 (A2) is forwarded to the last input of wavelength switch 4740 of ROADM 4710*a*. Similarly, as shown in FIG. 48B, copies of the inputted optical signals DEG3 (3), DEG4 (4), ADD2 (A2), DEG1 (1), and DEG2 (2) are forwarded to the first five inputs of wavelength switch 4740 of ROADM 4710*b*, and a copy of the inputted optical signal ADD1 (A1) is forwarded to the last input of wavelength switch 4740 of ROADM 4710*b*. On the ROADM 4710*a* of optical node 4800, optical input ports 4731*d-e* are unused, and optical output ports 4732*d-e* are unused, and parallel optical ports 4470*a-b* are unused. Similarly, on the ROADM 4710*b* of optical node 4800, optical input ports 4731*d-e* are unused, and optical output ports 4732*d-e* are unused, and parallel optical ports 4470*a-b* are unused.

Figure 49B:
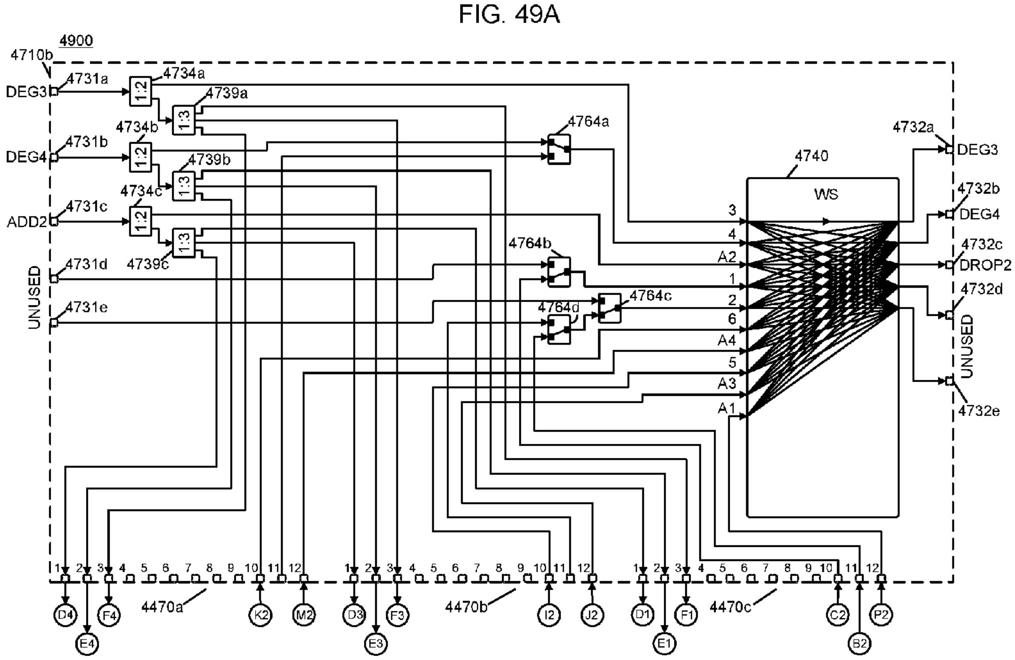
Figure 49C:
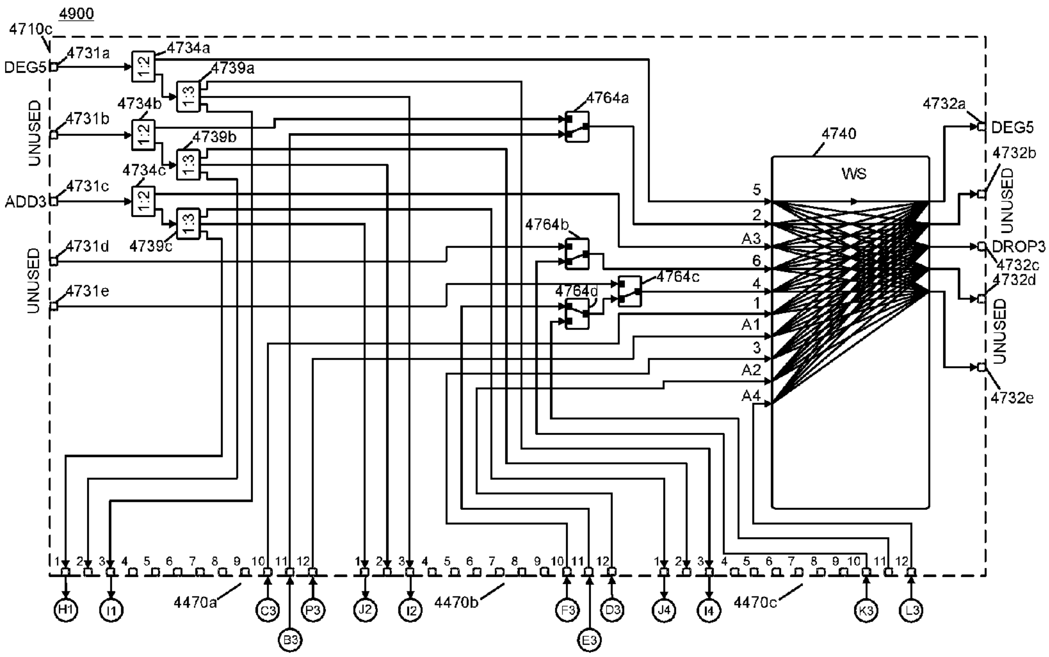
Figure 49D:
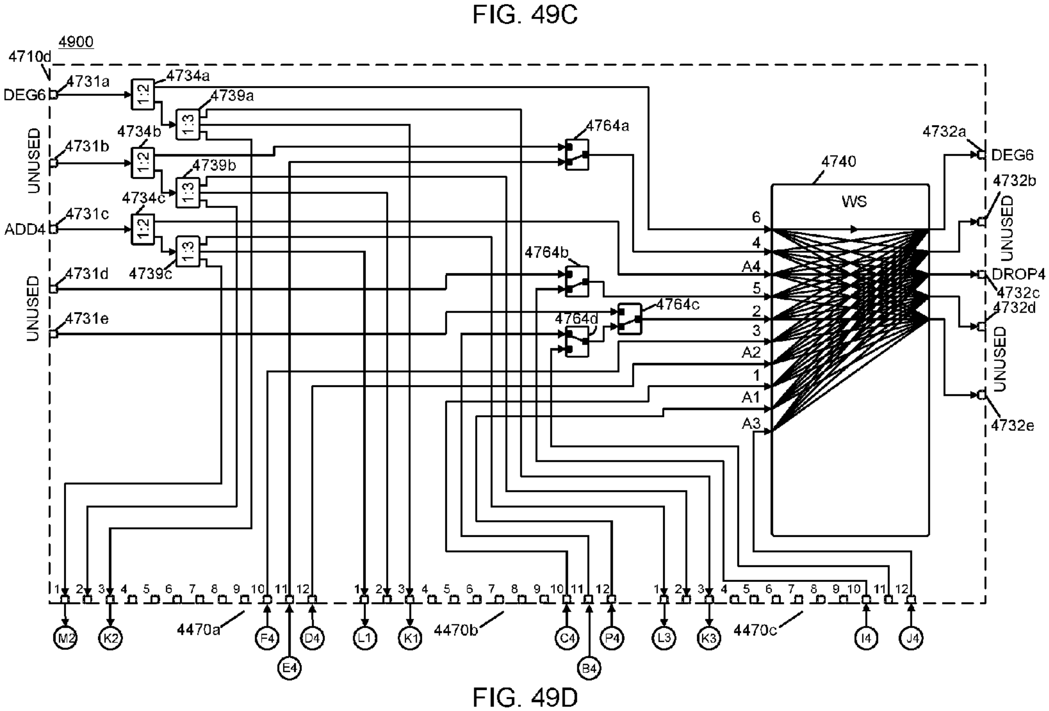

As illustrated in FIGS. 49A, 49B, 49C, and 49D, four software programmable ROADMs 4710*a-d* are used to construct a six-degree optical node having four directionless add/drop ports. ROADM 4710*a* in FIG. 49A provides bidirectional interfaces for DEG1 (Degree 1), DEG2 (Degree 2), and ADD1/DROP1 (directionless add/drop port 1), and ROADM 4710*b* in FIG. 49B provides bidirectional interfaces for DEG3 (Degree 3), DEG4 (Degree 4), and ADD2/DROP2 (directionless add/drop port 2), and ROADM 4710*c* in FIG. 49C provides bidirectional interfaces for DEG5 (Degree 5), and ADD3/DROP3 (directionless add/drop port 3), and ROADM 4710*d* in FIG. 49D provides bidirectional interfaces for DEG6 (Degree 6), and ADD4/DROP4 (directionless add/drop port 4).

In optical node 4900, six Type B MPO/MTP cables are used to connect each ROADM to all other ROADMs. More specifically, a first Type B MPO/MTP cable connects port 4470*a* of ROADM 4710*a* to port 4470*a* of ROADM 4710*c* (as illustrated by the inter-figure-sheet connection labels P3, B3, C3, G1, H1, I1), and a second Type B MPO/MTP cable connects port 4470*b* of ROADM 4710*a* to port 4470*b* of ROADM 4710*d* (as illustrated by the inter-figure-sheet connection labels P4, B4, C4, K1, L1), and a third Type B MPO/MTP cable connects port 4470*c* of ROADM 4710*a* to port 4470*c* of ROADM 4710*b* (as illustrated by the inter-figure-sheet connection labels P2, B2, C2, D1, E1, F1), and a fourth Type B MPO/MTP cable connects port 4470*a* of ROADM 4710*b* to port 4470*a* of ROADM 4710*d* (as illustrated by the inter-figure-sheet connection labels D4, E4, F4, K2, N2, M2), and a fifth Type B MPO/MTP cable connects port 4470*b* of ROADM 4710*b* to port 4470*b* of ROADM 4710*c* (as illustrated by the inter-figure-sheet connection labels D3, E3, F3, I2, J2), and a sixth Type B MPO/MTP cable connects port 4470*c* of ROADM 4710*c* to port 4470*c* of ROADM 4710*d* (as illustrated by the inter-figure-sheet connection labels J4, I4, K3, L3).

Using the first Type B MPO/MTP cable, ROADM 4710*a* forwards copies of the signals DEG1, DEG2, and ADD1 to ROADM 4710*c*, and ROADM 4710*c* forwards a copy of the signals DEG5 and ADD3 to ROADM 4710*a*. In a similar manner, using the fourth Type B MPO/MTP cable, ROADM 4710*b* forwards copies of the signals DEG3, DEG4, and ADD2 to ROADM 4710*d*, and ROADM 4710*d* forwards a copy of the signals DEG6 and ADD4 to ROADM 4710*b*.

Using the second Type B MPO/MTP cable, ROADM 4710*a* forwards copies of the signals DEG1, DEG2, and ADD1 to ROADM 4710*d*, and ROADM 4710*d* forwards copies of the signals DEG6 and ADD4 to ROADM 4710*a*. In a similar manner, using the fifth Type B MPO/MTP cable, ROADM 4710*b* forwards copies of the signals DEG3, DEG4, and ADD2 to ROADM 4410*c*, and ROADM 4710*c* forwards copies of the signals DEG5 and ADD3 to ROADM 4710*b*.

Using the third Type B MPO/MTP cable, ROADM 4710*a* forwards copies of the signals DEG1, DEG2, and ADD1 to ROADM 4710*b*, and ROADM 4710*b* forwards copies of the signals DEG3, DEG4, and ADD2 to ROADM 4710*a*. And lastly, using the sixth Type B MPO/MTP cable, ROADM 4710*c* forwards copies of the signals DEG5 and ADD3 to ROADM 4710*d*, and ROADM 4710*d* forwards copies of the signals DEG6 and ADD4 to ROADM 4710*c*.

As shown in FIG. 49A, copies of the inputted optical signals DEG1 (1), DEG2 (2), ADD1 (A1), DEG3 (3), DEG4 (4), DEG5 (5), ADD3 (A3), DEG6 (6), ADD4 (A4), and ADD2 (A2) are forwarded to the ten inputs of wavelength switch 4740 of ROADM 4710*a*. Similarly, as shown in FIG. 49B, copies of the inputted optical signals DEG3 (3), DEG4 (4), ADD2 (A2), DEG1 (1), DEG2 (2), DEG6 (6), ADD4 (A4), DEG5 (5), ADD3 (A3), and ADD1 (A1) are forwarded to the ten inputs of wavelength switch 4740 of ROADM 4710*b*. Similarly, as shown in FIG. 49C, copies of the inputted optical signals DEG5 (5), DEG2 (2), ADD3 (A3), DEG6 (6), DEG4 (4), DEG1 (1), ADD1 (A1), DEG3 (3), ADD2 (A2), and ADD4 (A4) are forwarded to the ten inputs of wavelength switch 4740 of ROADM 4710*c*. Similarly, as shown in FIG. 49D, copies of the inputted optical signals DEG6 (6), DEG4 (4), ADD4 (A4), DEG5 (5), DEG2 (2), DEG3 (3), ADD2 (A2), DEG1 (1), ADD1 (A1), and ADD3 (A3) are forwarded to the ten inputs of wavelength switch 4740 of ROADM 4710*d*. On the ROADM 4710*a* of optical node 4900, optical input ports 4731*d-e* are unused, and optical output ports 4732*d-e* are unused. Similarly, on the ROADM 4710*b* of optical node 4900, optical input ports 4731*d-e* are unused, and optical output ports 4732*d-e* are unused. On the ROADM 4710*c* of optical node 4900, optical input ports 4731*c-e* are unused, and optical output ports 4732*c-e* are unused. Similarly, on the ROADM 4710*d* of optical node 4900, optical input ports 4731*c-e* are unused, and optical output ports 4732*c-e* are unused.

Figure 50:
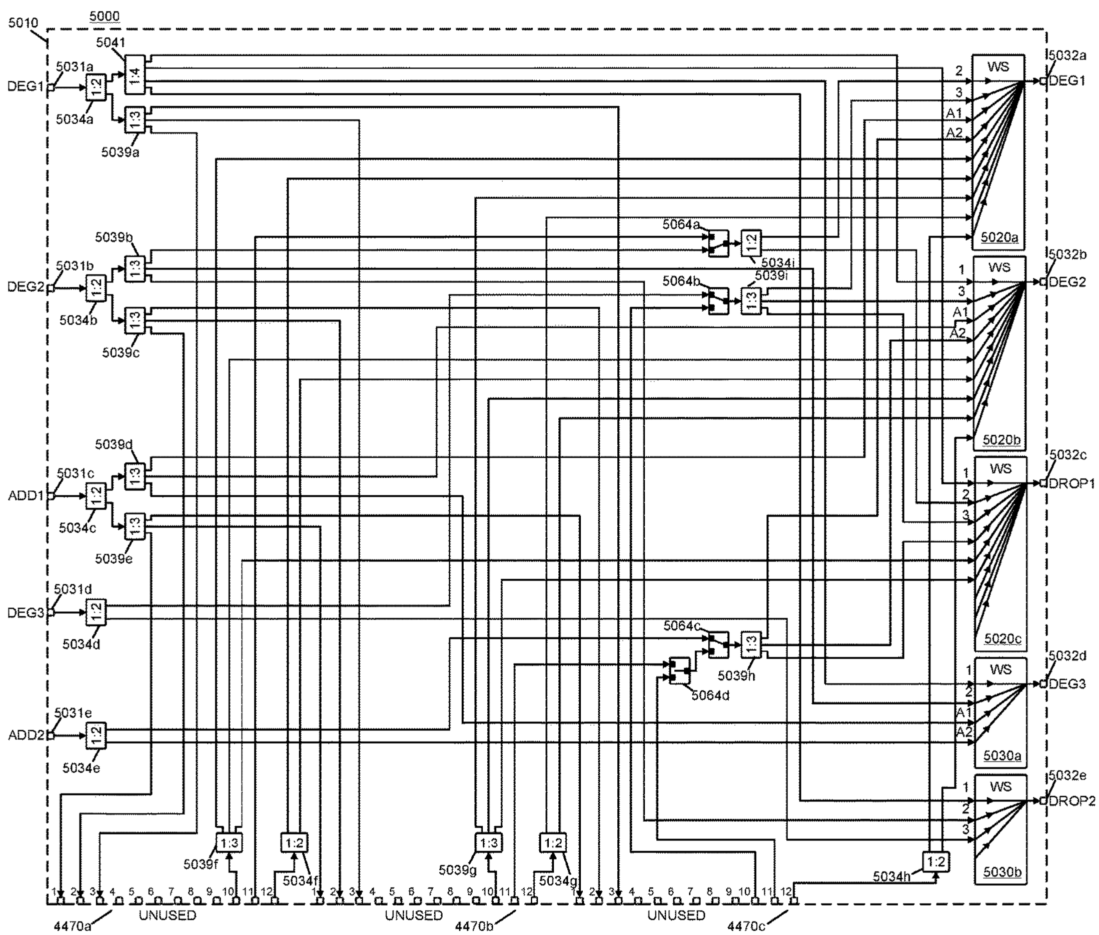
FIG. 50 is an illustration of a software programmable ROADM used to construct three, four and six-degree optical nodes, configured as a three-degree optical node.
Figure 51A:
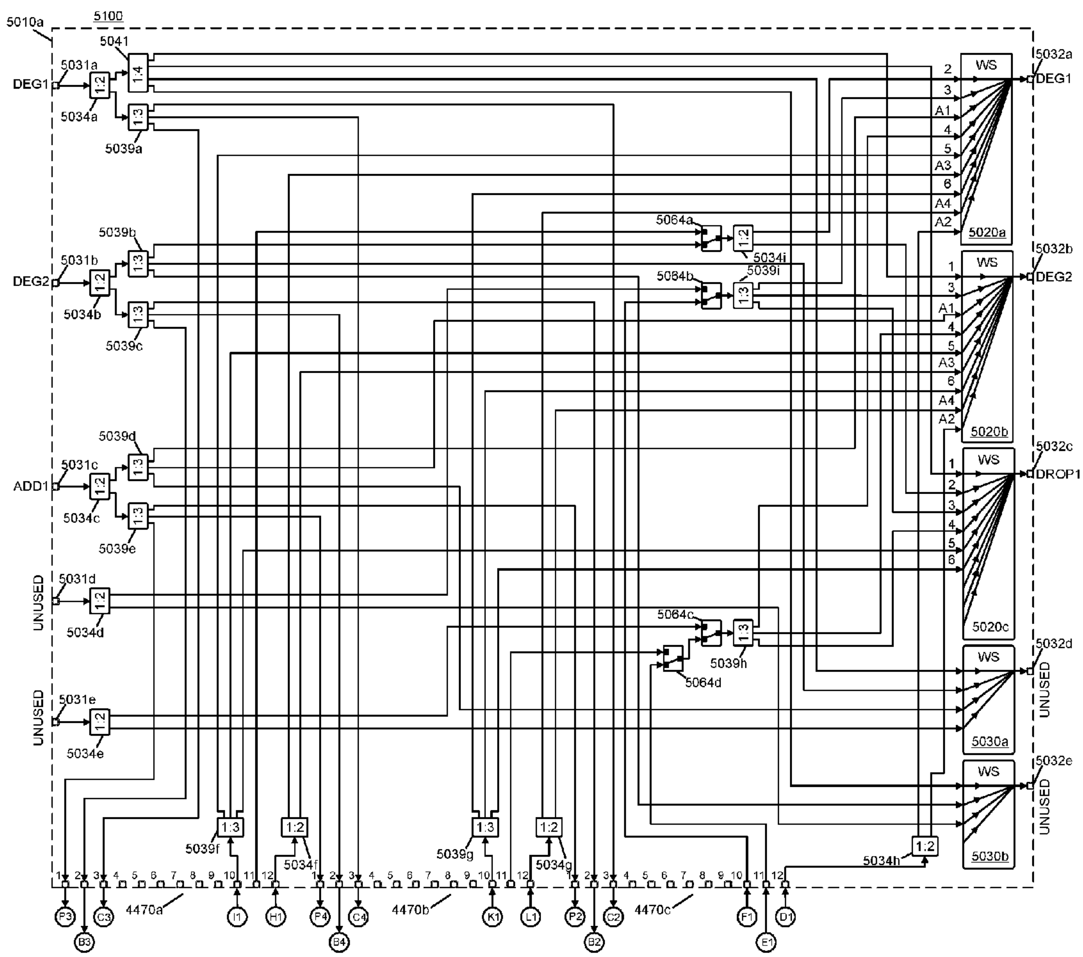
FIGS. 51A, 51B, 51C, and 51D illustrate the use of four FIG. 50 software programmable ROADMs to construct a six-degree optical node with four directionless add/drop ports.

FIG. 50 and FIG. 51ABCD, illustrate two different size optical nodes 5000 and 5100 constructed from the same software programmable ROADM 5010. The optical node 5000 of FIG. 50 supports up to three optical degrees and two directionless add/drop ports using a single software programmable ROADM 5010. The optical node 5100 of FIG. 51A, FIG. 51B, FIG. 51C, and FIG. 51D supports up to six optical degrees and four directionless add/drop ports using four software programmable ROADMs 5010*a-d*.

FIG. 50 is an illustration of a software programmable ROADM 5010 used to construct three, four and six-degree optical nodes, configured as a three-degree optical node 5000. The ROADM 5010 comprises: three 9×1 wavelength switches 5020*a-c*, two 4×1 wavelength switches 5030*a-b*, four two-by-one waveguide switches 5064*a-d*, nine one-to-two optical couplers 5034*a-i*, nine one-to-three optical couplers 4739*a-i*, one one-to-four optical coupler 5041, three parallel optical ports 4470*a-c*, five optical input ports 5031*a-e*, five optical output ports 5032*a-e*, and optical waveguides interconnecting the various optical components (illustrated with solid lines). The wavelength switches 5032*a-c*, and 5030*a-b* are operable to switch individual wavelengths from any input port of a given wavelength switch to the output of the given wavelength switch. Wavelength switch 5020*c* may be replaced with a 6×1 wavelength switch without any loss of functionality. Similarly, wavelength switch 5030*b* may be replaced with a 3×1 wavelength switch without any loss of functionality. The optical couplers 5034*a-e*, 5039*a-e*, and 5041 are used to make copies of the WDM signals DEG1, DEG2, DEG3, ADD1, and ADD2 applied to input optical ports 5031*a-e*, while optical couplers 5034*f-h* and 5039*f-g* are used to make copies of signals from the parallel optical ports 4470*a-c*. Optical couplers 5034*i* and 5039*h-i* are used to make copies of the signals from waveguide switches 5064*a-c*. The software programmable waveguide switches 5064*a-d* are used to route copies of the signals DEG1, DEG2, DEG3, ADD1, and ADD2 to the input ports of the wavelength switches 5020*a-c* and 5030*a-b*. In addition, the waveguide switches 5064*a-d* are used to route signals from the three parallel optical ports 4470*a-c* to the input ports of the wavelength switches 5020*a-c* and 5030*a-b*.

As illustrated in FIG. 50, within the optical node 5000, the optical signals DEG2, DEG3, ADD1, and ADD2 are routed to the first input, the second input, the third input, and the fourth input of the wavelength switch 5020*a*. Similarly, within the optical node 5000, the optical signals DEG1, DEG3, ADD1, and ADD2 are routed to the first input, the second input, the third input, and the fourth input of the wavelength switch 5020*b*. Similarly, within the optical node 5000, the optical signals DEG1, DEG2, and DEG3 are routed to the first input, the second input, and the third input of the wavelength switch 5020*c*. As illustrated in FIG. 50, within the optical node 5000, the optical signals DEG1, DEG2, ADD1, and ADD2 are routed to the first input, the second input, the third input, and the fourth input of the wavelength switch 5030*a*. Similarly, the optical signals DEG1, DEG2, and DEG3 are routed to the first input, the second input, and the third input of the wavelength switch 5030*b*. The wavelength switches 5020*a-c* and 5030*a-b* are used to route individual wavelengths to the output optical ports 5032*a-e*. Within the optical node 5000, the parallel optical ports 4470*a-c* are unused, and the waveguide switch 5064*d* is unused. Optical inputs five through nine of the two wavelength switches 5020*a-b* are unused, and optical inputs four through nine of the wavelength switch 5020*c* are unused, and optical input four of the wavelength switch 5030*b* is unused.

Figure 51B:
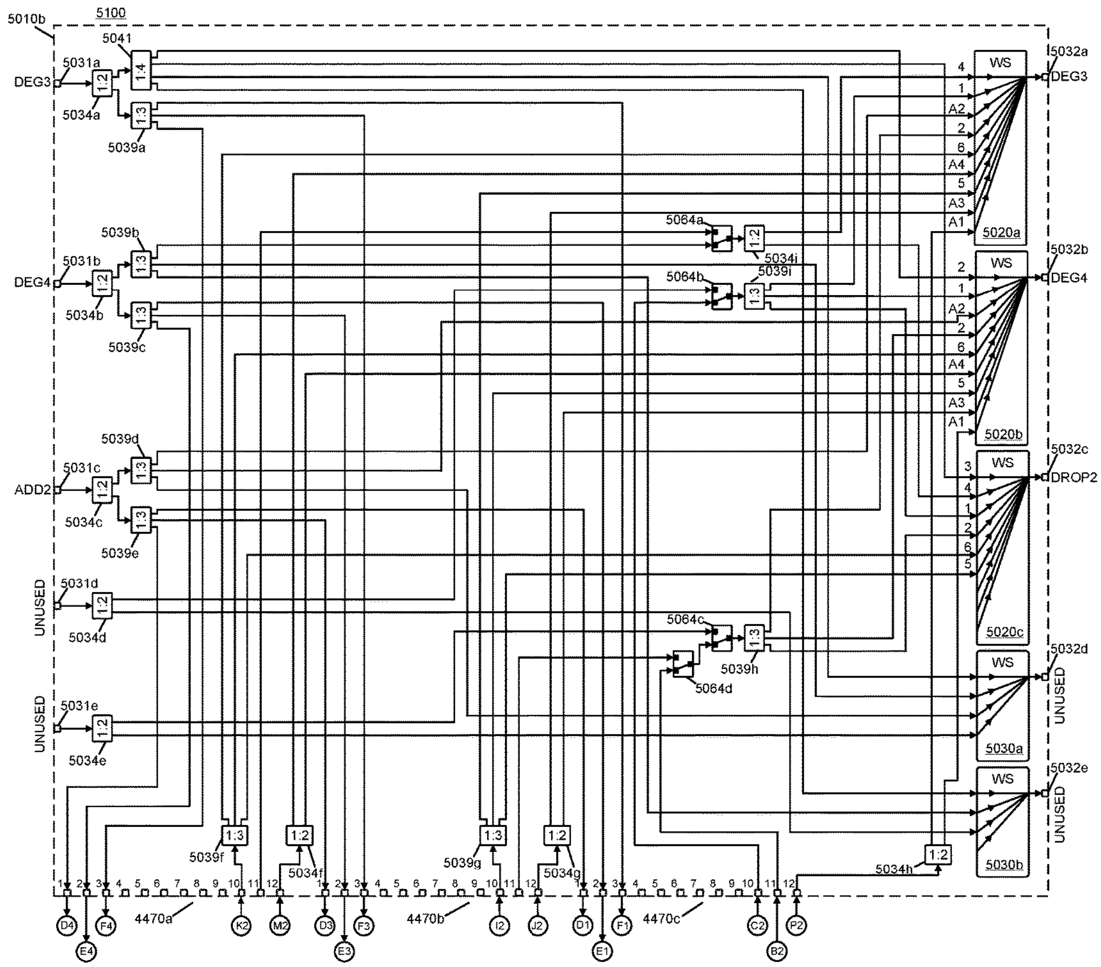
Figure 51C:
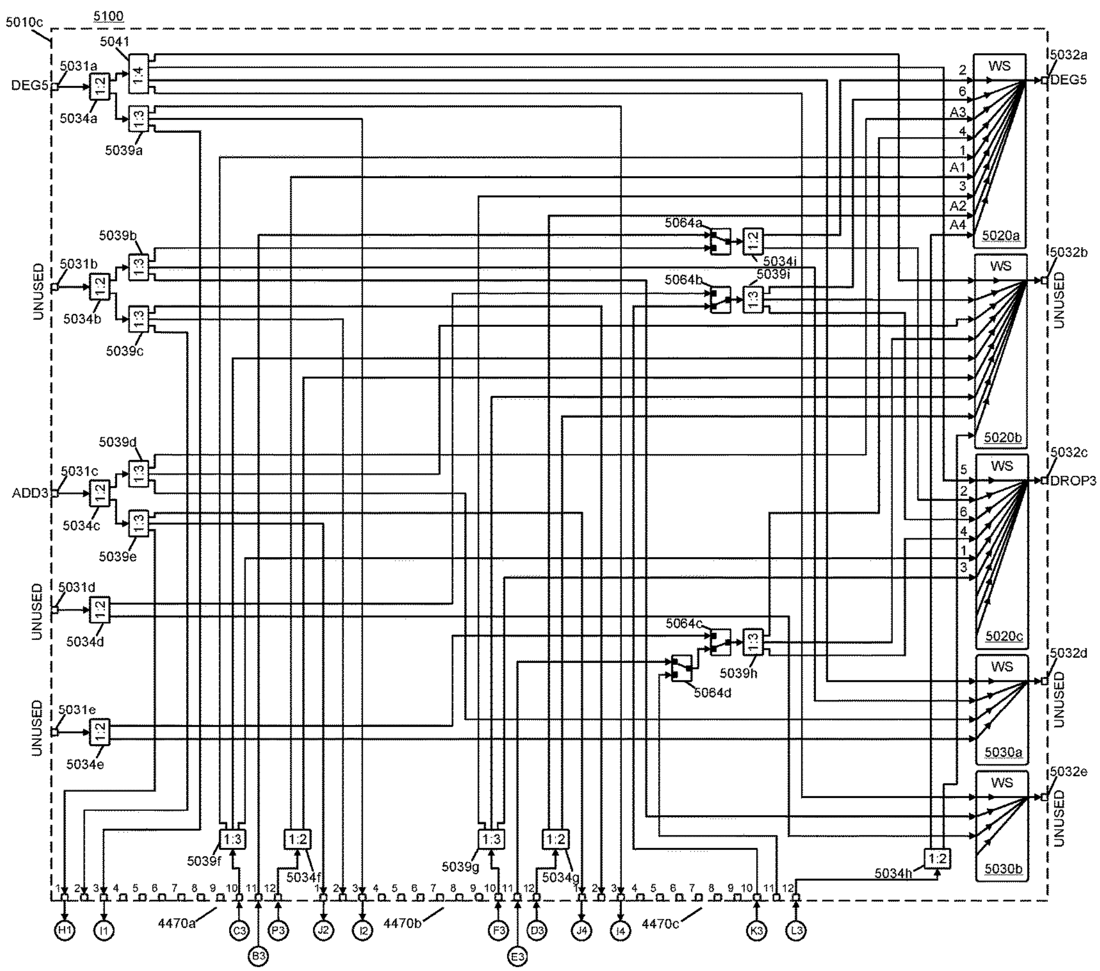
Figure 51D:
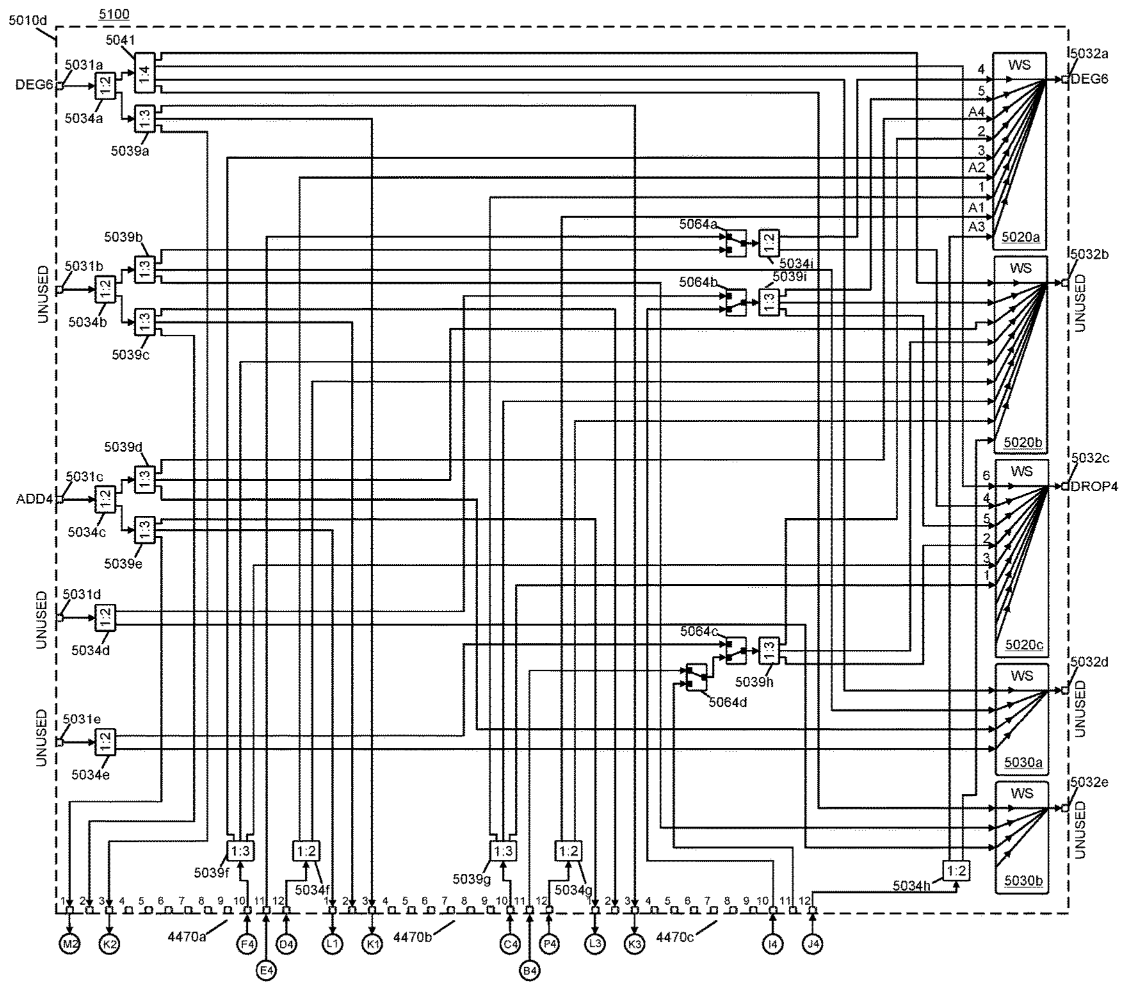

As illustrated in FIGS. 51A, 51B, 51C, and 51D, four software programmable ROADMs 5010*a-d* are used to construct a six-degree optical node having four directionless add/drop ports. ROADM 5010*a* in FIG. 51A provides bidirectional interfaces for DEG1 (Degree 1), DEG2 (Degree 2), and ADD1/DROP1 (directionless add/drop port 1), and ROADM 5010*b* in FIG. 51B provides bidirectional interfaces for DEG3 (Degree 3), DEG4 (Degree 4), and ADD2/DROP2 (directionless add/drop port 2), and ROADM 5010*c* in FIG. 51C provides bidirectional interfaces for DEG5 (Degree 5), and ADD3/DROP3 (directionless add/drop port 3), and ROADM 5010*d* in FIG. 51D provides bidirectional interfaces for DEG6 (Degree 6), and ADD4/DROP4 (directionless add/drop port 4).

In optical node 5100, six Type B MPO/MTP cables are used to connect each ROADM to all other ROADMs. More specifically, a first Type B MPO/MTP cable connects port 4470*a* of ROADM 5010*a* to port 4470*a* of ROADM 5010*c* (as illustrated by the inter-figure-sheet connection labels P3, B3, C3, G1, H1, I1), and a second Type B MPO/MTP cable connects port 4470*b* of ROADM 5010*a* to port 4470*b* of ROADM 5010*d* (as illustrated by the inter-figure-sheet connection labels P4, B4, C4, K1, L1), and a third Type B MPO/MTP cable connects port 4470*c* of ROADM 5010*a* to port 4470*c* of ROADM 5010*b* (as illustrated by the inter-figure-sheet connection labels P2, B2, C2, D1, E1, F1), and a fourth Type B MPO/MTP cable connects port 4470*a* of ROADM 5010*b* to port 4470*a* of ROADM 5010*d* (as illustrated by the inter-figure-sheet connection labels D4, E4, F4, K2, N2, M2), and a fifth Type B MPO/MTP cable connects port 4470*b* of ROADM 5010*b* to port 4470*b* of ROADM 5010*c* (as illustrated by the inter-figure-sheet connection labels D3, E3, F3, I2, J2), and a sixth Type B MPO/MTP cable connects port 4470*c* of ROADM 5010*c* to port 4470*c* of ROADM 5010*d* (as illustrated by the inter-figure-sheet connection labels J4, I4, K3, L3).

Using the first Type B MPO/MTP cable, ROADM 5010*a* forwards copies of the signals DEG1, DEG2, and ADD1 to ROADM 5010*c*, and ROADM 5010*c* forwards a copy of the signals DEG5 and ADD3 to ROADM 5010*a*. In a similar manner, using the fourth Type B MPO/MTP cable, ROADM 5010*b* forwards copies of the signals DEG3, DEG4, and ADD2 to ROADM 4710*d*, and ROADM 5010*d* forwards a copy of the signals DEG6 and ADD4 to ROADM 5010*b*.

Using the second Type B MPO/MTP cable, ROADM 5010*a* forwards copies of the signals DEG1, DEG2, and ADD1 to ROADM 5010*d*, and ROADM 5010*d* forwards copies of the signals DEG6 and ADD4 to ROADM 5010*a*. In a similar manner, using the fifth Type B MPO/MTP cable, ROADM 5010*b* forwards copies of the signals DEG3, DEG4, and ADD2 to ROADM 4410*c*, and ROADM 5010*c* forwards copies of the signals DEG5 and ADD3 to ROADM 5010*b*.

Using the third Type B MPO/MTP cable, ROADM 5010*a* forwards copies of the signals DEG1, DEG2, and ADD1 to ROADM 5010*b*, and ROADM 5010*b* forwards copies of the signals DEG3, DEG4, and ADD2 to ROADM 5010*a*. And lastly, using the sixth Type B MPO/MTP cable, ROADM 5010*c* forwards copies of the signals DEG5 and ADD3 to ROADM 4710*d*, and ROADM 5010*d* forwards copies of the signals DEG6 and ADD4 to ROADM 5010*c*.

As shown in FIG. 51A, copies of the inputted optical signals DEG2 (2), DEG3 (3), ADD1 (A1), DEG4 (4), DEG5 (5), ADD3 (A3), DEG6 (6), ADD4 (A4), and ADD2 (A2) are forwarded to the nine inputs of wavelength switch 5020*a* of ROADM 5010*a*. As shown in FIG. 51A, copies of the inputted optical signals DEG1 (1), DEG3 (3), ADD1 (A1), DEG4 (4), DEG5 (5), ADD3 (A3), DEG6 (6), ADD4 (A4), and ADD2 (A2) are forwarded to the nine inputs of wavelength switch 5020*b* of ROADM 5010*a*. As shown in FIG. 51A, copies of the inputted optical signals DEG1 (1), DEG2 (2), DEG3 (3), DEG4 (4), DEG5 (5), and DEG6 (6) are forwarded to the first six inputs of wavelength switch 5020*c* of ROADM 5010*a*.

As shown in FIG. 51B, copies of the inputted optical signals DEG4 (4), DEG1 (1), ADD2 (A2), DEG2 (2), DEG6 (6), ADD4 (A4), DEG5 (5), ADD3 (A3), and ADD1 (A1) are forwarded to the nine inputs of wavelength switch 5020*a* of ROADM 5010*b*. As shown in FIG. 51B, copies of the inputted optical signals DEG2 (2), DEG1 (1), ADD2 (A2), DEG2 (2), DEG6 (6), ADD4 (A4), DEG5 (5), ADD3 (A3), and ADD1 (A1) are forwarded to the nine inputs of wavelength switch 5020*b* of ROADM 5010*b*. As shown in FIG. 51B, copies of the inputted optical signals DEG3 (3), DEG4 (4), DEG1 (1), DEG2 (2), DEG6 (6), and DEG5 (5) are forwarded to the first six inputs of wavelength switch 5020*c* of ROADM 5010*b*.

As shown in FIG. 51C, copies of the inputted optical signals DEG2 (2), DEG6 (6), ADD3 (A3), DEG4 (4), DEG1 (1), ADD1 (A1), DEG3 (3), ADD2 (A2), and ADD4 (A4) are forwarded to the nine inputs of wavelength switch 5020*a* of ROADM 5010*c*. As shown in FIG. 51C, copies of the inputted optical signals DEG5 (5), DEG2 (2), DEG6 (6), DEG4 (4), DEG1 (1), and DEG3 (3) are forwarded to the first six inputs of wavelength switch 5020*c* of ROADM 5010*c*.

As shown in FIG. 51D, copies of the inputted optical signals DEG4 (4), DEG5 (5), ADD4 (A4), DEG2 (2), DEG3 (3), ADD2 (A2), DEG1 (1), ADD1 (A1), and ADD3 (A3) are forwarded to the nine inputs of wavelength switch 5020*a* of ROADM 5010*d*. As shown in FIG. 51D, copies of the inputted optical signals DEG6 (6), DEG4 (4), DEG5 (5), DEG2 (2), DEG3 (3), and DEG1 (1) are forwarded to the first six inputs of wavelength switch 5020*c* of ROADM 5010*d*.

On the ROADM 5010*a* of optical node 5100, optical input ports 5031*d-e* are unused, and optical output ports 5032*d-e* are unused, and optical couplers 5034*d-e* are unused, and wavelength switches 5030*a-b* are unused. Similarly, on the ROADM 5010*b* of optical node 5100, optical input ports 5031*d-e* are unused, and optical output ports 5032*d-e* are unused, and optical couplers 5034*d-e* are unused, and wavelength switches 5030*a-b* are unused. On the ROADM 5010*c* of optical node 5100, optical input ports 5031*b,d-e* are unused, and optical output ports 5032*b,d-e* are unused, and optical couplers 5034*b,d-e* and 5039*b-c* are unused, and wavelength switches 5020*b* and 5030*a-b* are unused. Similarly, on the ROADM 5010*d* of optical node 5100, optical input ports 5031*b,d-e* are unused, and optical output ports 5032*b,d-e* are unused, and optical couplers 5034*b,d-e* and 5039*b-c* are unused, and wavelength switches 5020*b* and 5030*a-b* are unused. Since, variable optical coupler 4461*b* is not used, variable optical coupler 4461*a* is programmed to direct all its inputted light to optical coupler 4434*b*, as indicated by the solid line connecting the input port of coupler 4461*a* to the output of coupler 4461*a* connected to coupler 4434*b*.

Figure 52:
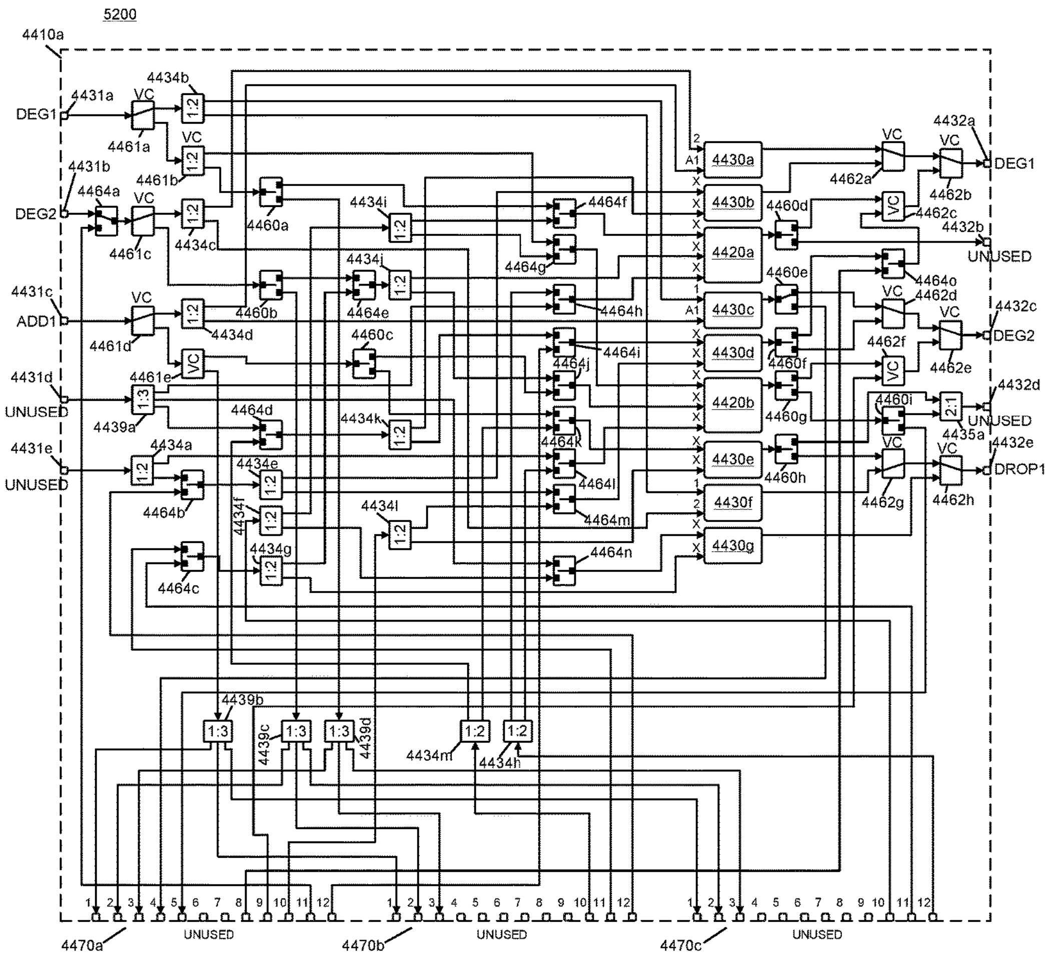
FIG. 52 illustrates the use of the FIG. 44 software programmable ROADM to construct a two-degree optical node with one directionless add/drop port.

FIG. 52 illustrates the use of the FIG. 44 software programmable ROADM 4410 to construct a two-degree optical node 5200 with one directionless add/drop port. The optical node 5200 comprises of a single software programmable ROADM 4410*a*. In the optical node 5200, optical inputs 4431*d-e* are unused, optical outputs 4432*b,d* are unused, wavelength switches 4430*b,d-e,g* and 4420*a-b* are unused, parallel optical ports 4470*a-c* are unused, and the vast majority of optical couplers and waveguide switches are not used.

As shown in FIG. 52, input signals DEG2 (2) and ADD1 (A1) are routed to wavelength switch 4430*a*, and input signals DEG1 (1) and ADD1 (A1) are routed to wavelength switch 4430*c*, and input signals DEG1 (1) and DEG2 (2) are routed to wavelength switch 4430*f* The wavelength switch 4430*a* is used to select wavelengths for optical output port 4432*a* (the DEG1 output), and the wavelength switch 4430*c* is used to select wavelengths for optical output port 4432*c* (the DEG2 output), and wavelength switch 4430*f* is used to select wavelengths for optical output port 4432*e* (the DROP1 output).

Since only wavelength switch 4430*a* is used to select wavelengths for the DEG1 output signal, variable optical coupler 4462*a* is software programmed to select all the light for its output from wavelength switch 4430*a*, and none from wavelength switch 4430*b* (as indicated in FIG. 52), and variable optical coupler 4462*b* is software programmed to select all the light for its output from variable optical coupler 4462*a*, and none from coupler 4462*c*. Similarly, since only wavelength switch 4430*c* is used to select wavelengths for the DEG2 output signal, variable optical coupler 4462*d* is software programmed to select all the light for its output from wavelength switch 4430*c*, and none from wavelength switch 4430*d* (as indicated in FIG. 52), and variable optical coupler 4462*e* is software programmed to select all the light for its output from variable optical coupler 4462*d*, and none from coupler 4462*f* (as shown in FIG. 52). Similarly, since only wavelength switch 4430*f* is used to select wavelengths for the DROP1 output signal, variable optical coupler 4462*g* is software programmed to select all the light for its output from wavelength switch 4430*f*, and none from wavelength switch 4430*e* (as indicated in FIG. 52), and variable optical coupler 4462*h* is software programmed to select all the light for its output from variable optical coupler 4462*g*, and none from wavelength switch 4430*g* (as shown in FIG. 52).

Figure 53A:
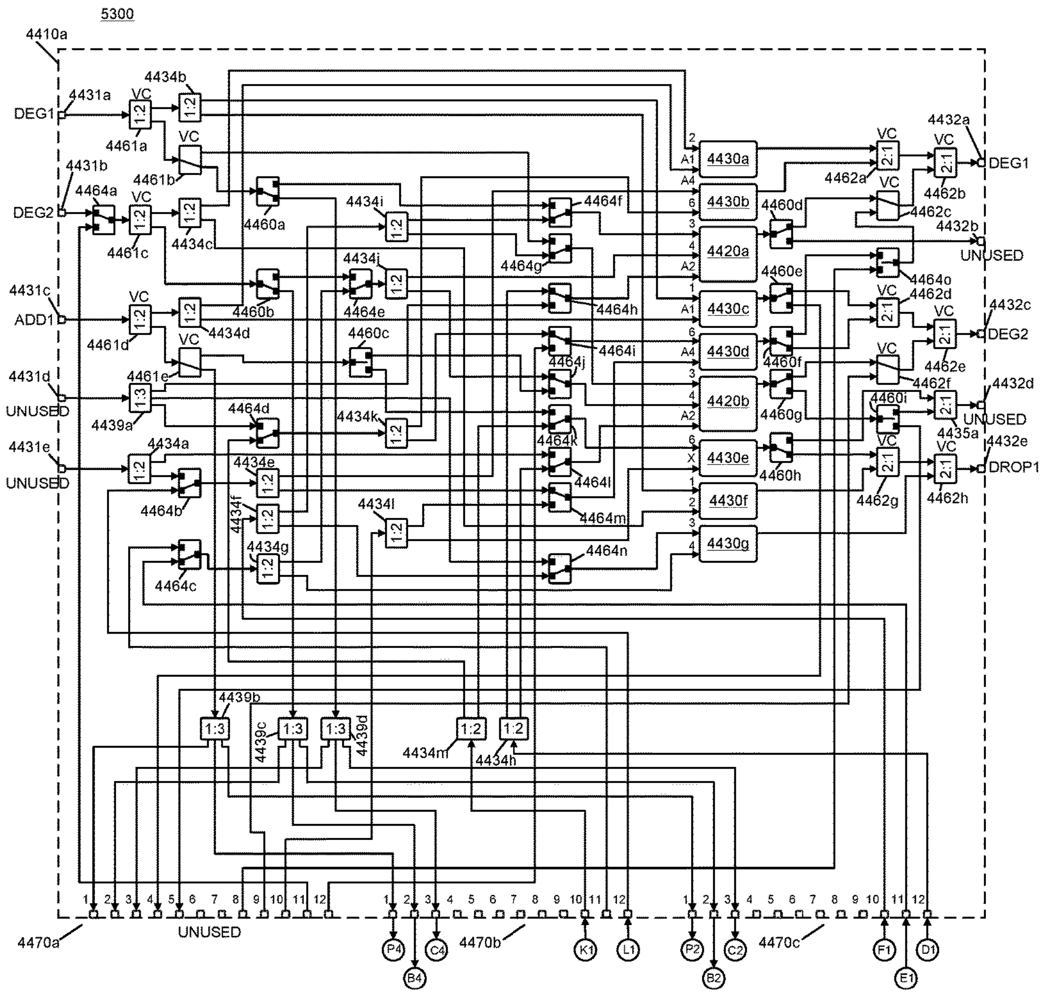
FIGS. 53A, 53B, and 53C illustrate the use of three FIG. 44 software programmable ROADMs to construct a five-degree optical node with three directionless add/drop ports.
Figure 53B:
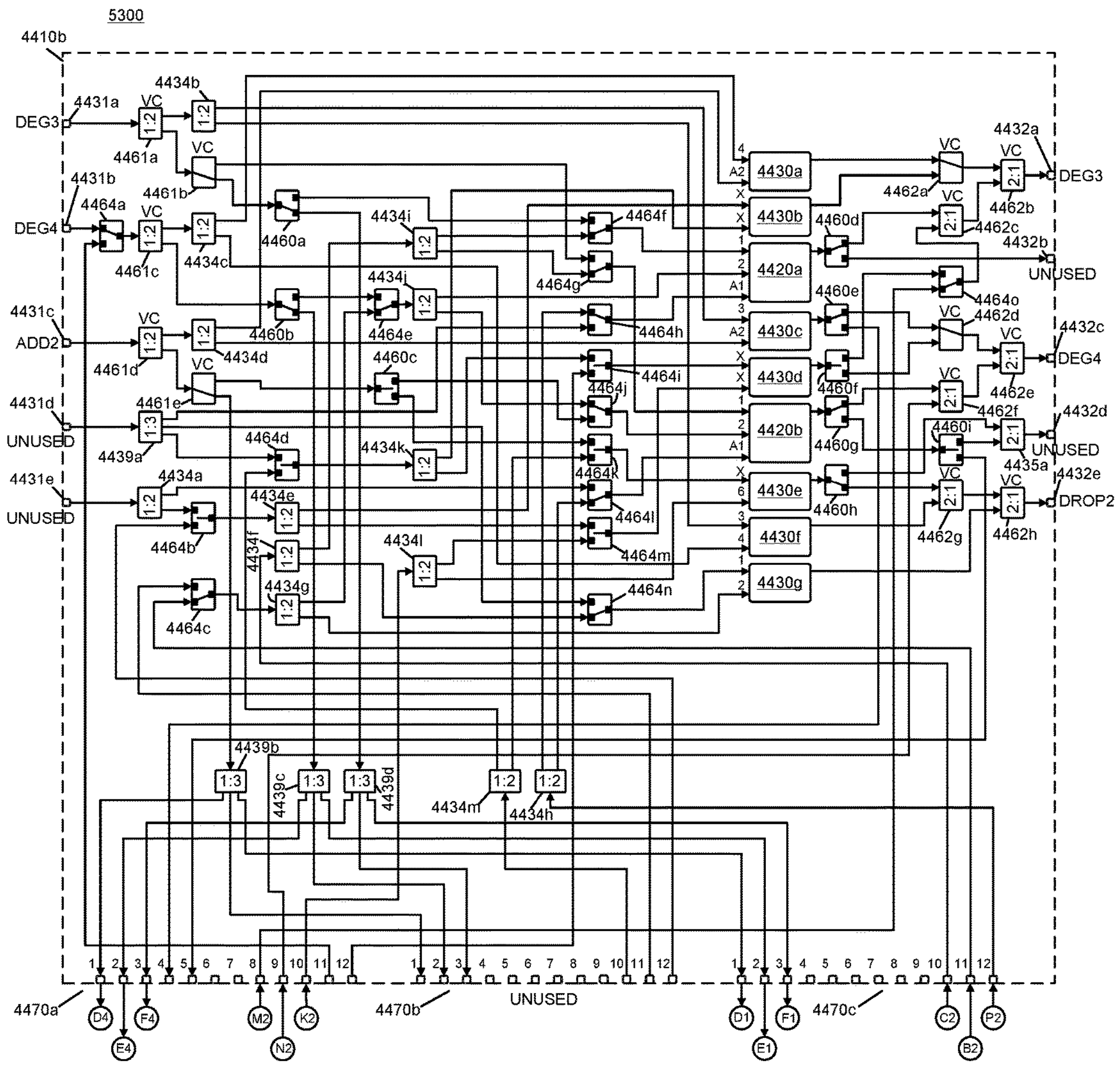
Figure 53C:
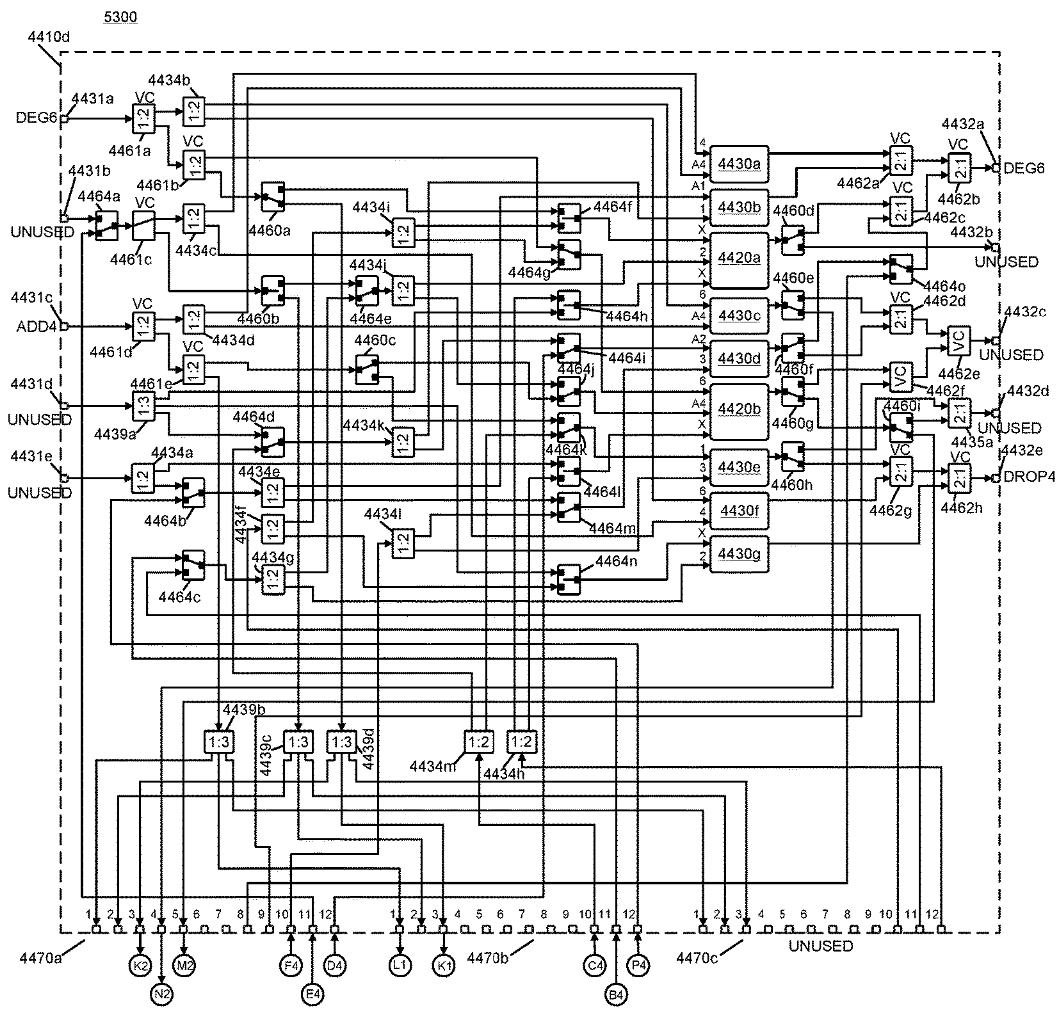

FIGS. 53A, 53B, and 53C illustrate the use of three FIG. 44 software programmable ROADMs 4410*a-b,d* to construct a five-degree optical node 5300 with three directionless add/drop ports. Optical node 5300 is similar to optical node 4600 of FIG. 46ABCD, except that optical node 4600 contains ROADM 4410*c*, and optical node 5300 does not contain ROADM 4410*c*. Since there are only three ROADMs in 5300, only three parallel optical cables are needed to interconnect the three ROADMs, and each ROADM only uses two of its three parallel optical ports 4470*a-c*. ROADM 4410*a* contains the first two degrees (DEG1, DEG2) and the first add/drop port (ADD1/DROP1), ROADM 4410*b* contains the second two degrees (DEG3, DEG4) and the second add/drop port (ADD2/DROP2), and ROADM 4410*d* contains the fifth degree (labeled DEG6) and the third add/drop port (labeled ADD4/DROP4).

In ROADM 4410*a* of optical node 5300, wavelength switches 4430*a-b* and 4420*a* are used to select wavelengths for the DEG1 output signal, while wavelength switches 4430*c-d* and 4420*b* are used to select wavelengths for the DEG2 output signal, and wavelength switches 4430*e-g* are used to select wavelengths for the DROP1 output signal. Since only wavelength switches 4430*a-b* and 4420*a* are used to select wavelengths for the DEG1 output signal, variable optical coupler 4462*c* is software programmed to only select light from waveguide switch 4460*d*, and to select no light from waveguide switch 4464*o*, as indicated by the solid line through variable optical coupler 4462*c* in FIG. 53A. Similarly, since only wavelength switches 4430*c-d* and 4420*b* are used to select wavelengths for the DEG2 output signal, variable optical coupler 4462*f* is software programmed to only select light from waveguide switch 4460*g*, and to select no light from the parallel optical port 4470*a*, as indicated by the solid line through variable optical coupler 4462*f* in FIG. 53A.

In ROADM 4410*b* of optical node 5300, wavelength switches 4430*a* and 4420*a* of ROADM 4410*b* and wavelength switch 4420*b* of ROADM 4410*d* are used to select wavelengths for the DEG3 output signal, while wavelength switches 4430*c* and 4420*b* of ROADM 4410*b* and wavelength switch 4430*c* of ROADM 4410*d* are used to select wavelengths for the DEG4 output signal, and wavelength switches 4430*e-g* are used to select wavelengths for the DROP2 output signal. Since wavelength switch 4430*b* is not used to select wavelengths for the DEG3 output signal, variable optical coupler 4462*a* is software programmed to only select light from wavelength switch 4430*a*, and to select no light from wavelength switch 4430*b*, as indicated by the solid line through variable optical coupler 4462*a* in FIG. 53B. Similalry, since wavelength switch 4430*d* is not used to select wavelengths for the DEG4 output signal, variable optical coupler 4462*d* is software programmed to only select light from wavelength switch 4430*c*, and to select no light from wavelength switch 4430*d*, as indicated by the solid line through variable optical coupler 4462*d* in FIG. 53B.

In ROADM 4410*d* of optical node 5300, wavelength switches 4430*a-b,d* and 4420*a* are used to select wavelengths for the DEG6 output signal, and wavelength switches 4430*e-g* are used to select wavelengths for the DROP4 output signal.

An apparatus may comprise: a first wavelength switch set comprising at least one wavelength switch 4430*a*, a second wavelength switch set comprising at least one wavelength switch 4420*a*, and at least one programmable waveguide optical element 4462*b*, wherein when the at least one programmable waveguide optical element 4462*b* is programmed to a first state (as shown in FIG. 52), the first wavelength switch set provides wavelength switching for one output degree (DEG1, 4432*a*) of an n-degree optical node (n=2), and wherein when the at least one programmable waveguide optical element 4462*b* is programmed to a second state (as shown in FIG. 45A), the first wavelength switch set and the second wavelength switch set provide wavelength switching for one output degree (DEG1, 4432*a*) of an m-degree optical node (m=4), wherein m>n, and wherein the second state is different from the first state. The apparatus may further comprise a second programmable waveguide optical element 4464*a* in FIG. 45A, used to forward an optical signal (DEG2) to the first wavelength switch set. The apparatus may further comprise a circuit pack 4410*a*, wherein the first wavelength switch set, the second wavelength switch set, and the at least one programmable waveguide optical element reside on the circuit pack.

Figure 54A:
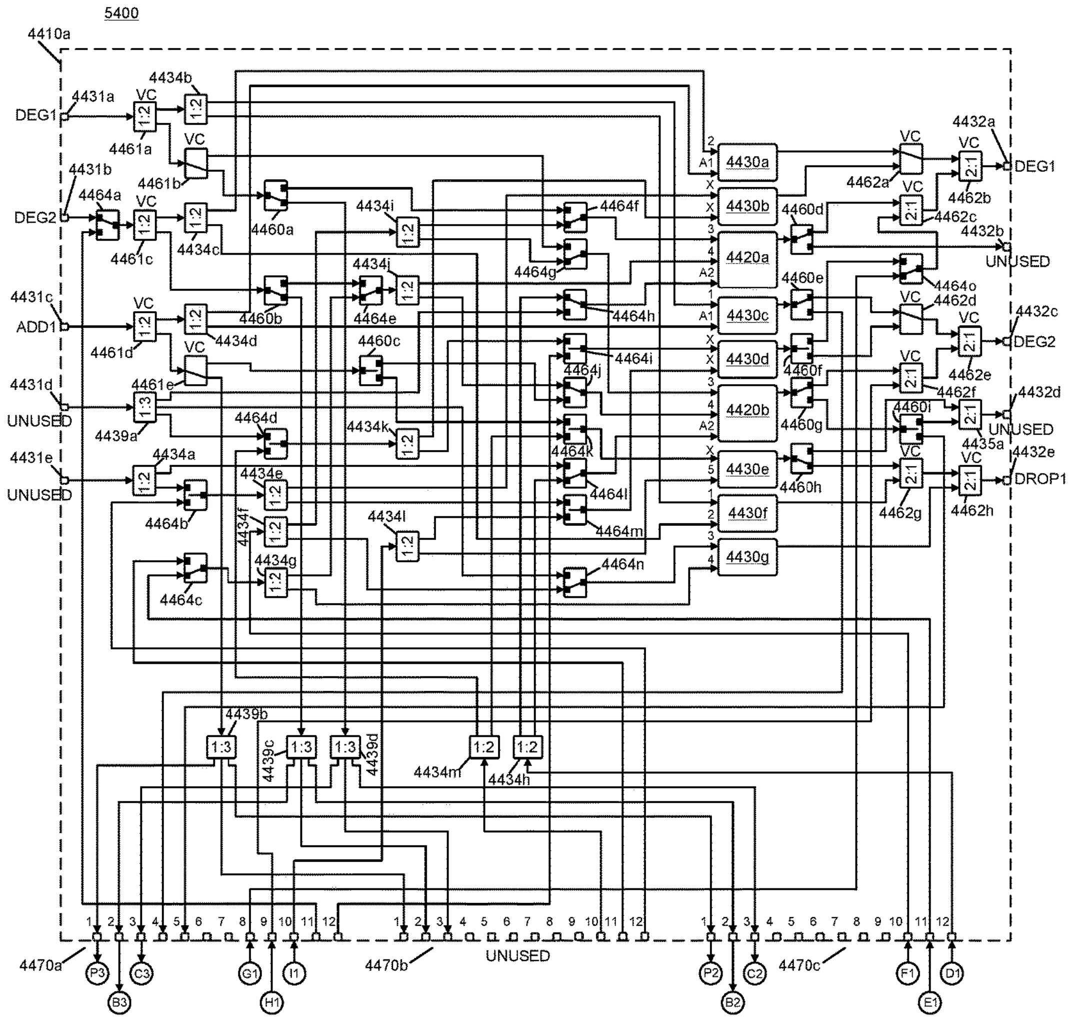
FIGS. 54A, 54B, and 54C illustrate the use of three FIG. 44 software programmable ROADMs to construct a five-degree optical node with three directionless add/drop ports.
Figure 54B:
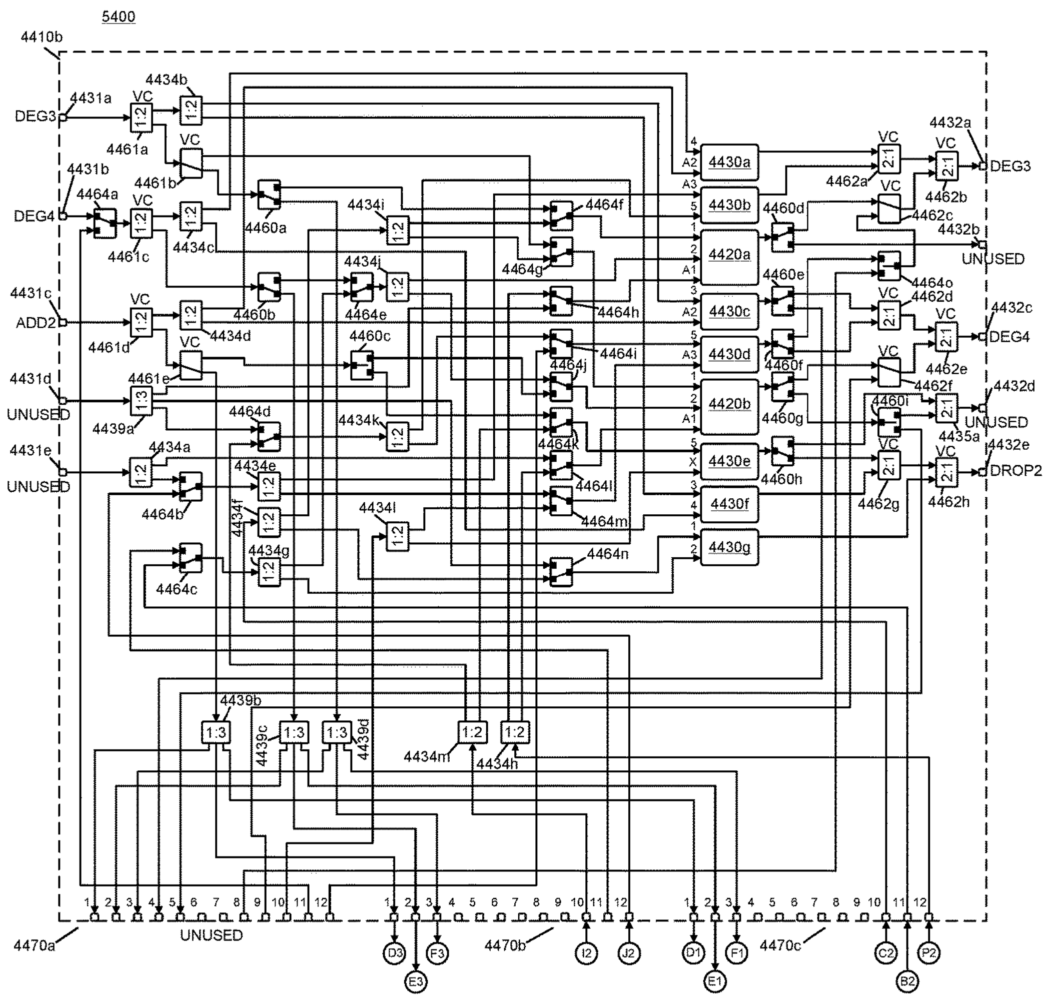
Figure 54C:
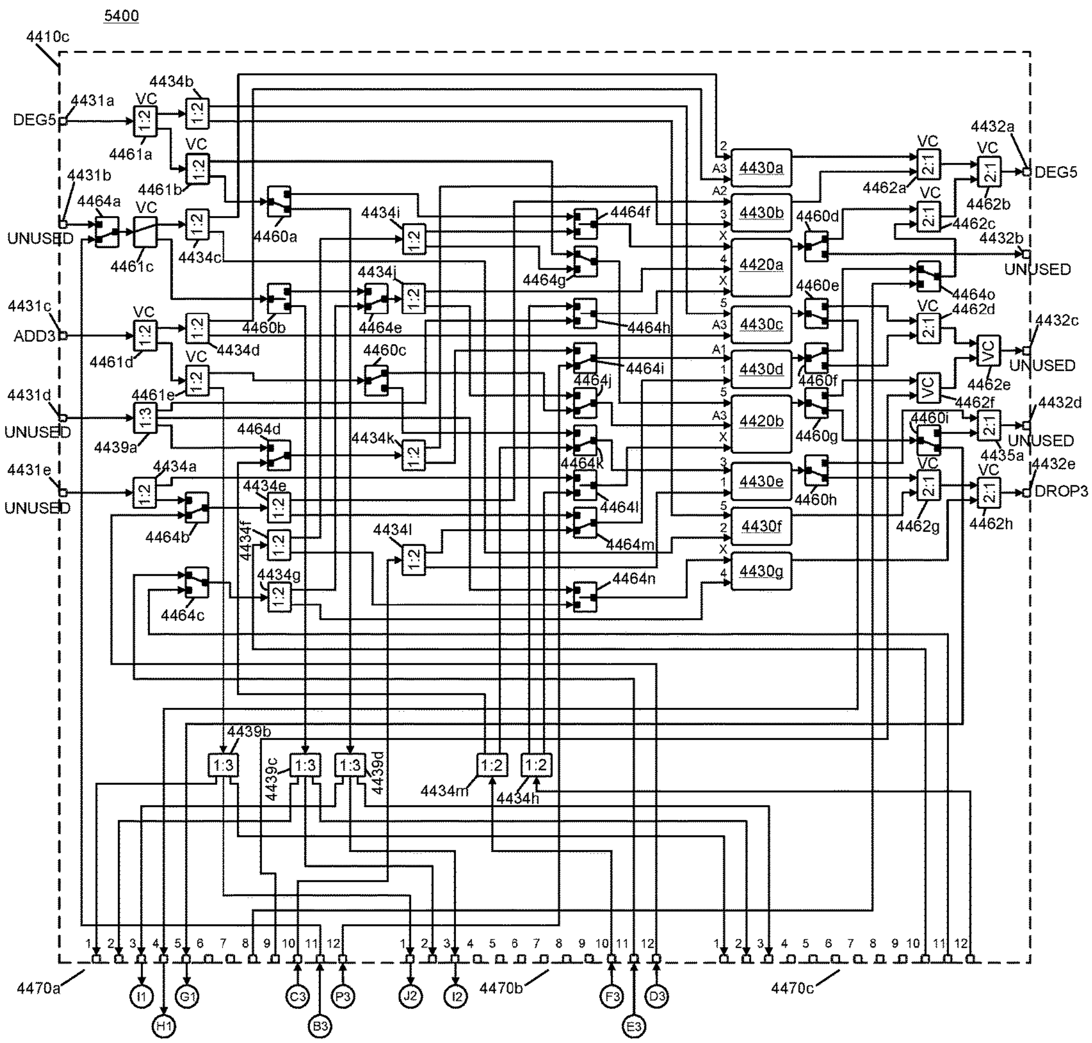

FIGS. 54A, 54B, and 54C illustrate the use of three FIG. 44 software programmable ROADMs 4410*a-c* to construct a five-degree optical node 5400 with three directionless add/drop ports. Optical node 5400 is similar to optical node 4600 of FIG. 46ABCD, except that optical node 4600 contains ROADM 4410*d*, and optical node 5400 does not contain ROADM 4410*d*. Since there are only three ROADMs in 5400, only three parallel optical cables are needed to interconnect the three ROADMs, and each ROADM only uses two of its three parallel optical ports 4470*a-c*. ROADM 4410*a* contains the first two degrees (DEG1, DEG2) and the first add/drop port (ADD1/DROP1), ROADM 4410*b* contains the second two degrees (DEG3, DEG4) and the second add/drop port (ADD2/DROP2), and ROADM 4410*c* contains the fifth degree (DEG5) and the third add/drop port (ADD3/DROP3).

In ROADM 4410*a* of optical node 5400, wavelength switches 4430*a* and 4420*a* of ROADM 4410*a* and wavelength switch 4420*b* of ROADM 4410*c* are used to select wavelengths for the DEG1 output signal, while wavelength switches 4430*c* and 4420*b* of ROADM 4410*a* and wavelength switch 4430*c* of ROADM 4410*c* are used to select wavelengths for the DEG2 output signal, and wavelength switches 4430*e-g* are used to select wavelengths for the DROP1 output signal. Since wavelength switch 4430*b* is not used to select wavelengths for the DEG1 output signal, variable optical coupler 4462*a* is software programmed to only select light from wavelength switch 4430*a* of 4410*a*, and to select no light from wavelength switch 4430*b*, as indicated by the solid line through variable optical coupler 4462*a* in FIG. 54A. Similarly, since wavelength switch 4430*d* is not used to select wavelengths for the DEG2 output signal, variable optical coupler 4462*d* is software programmed to only select light from wavelength switch 4430*c*, and to select no light from wavelength switch 4430*d*, as indicated by the solid line through variable optical coupler 4462*d* in FIG. 54A.

In ROADM 4410*b* of optical node 5400, wavelength switches 4430*a-b* and 4420*a* are used to select wavelengths for the DEG3 output signal, while wavelength switches 4430*c-d* and 4420*b* are used to select wavelengths for the DEG4 output signal, and wavelength switches 4430*e-g* are used to select wavelengths for the DROP2 output signal. Since only wavelength switches 4430*a-b* and 4420*a* are used to select wavelengths for the DEG3 output signal, variable optical coupler 4462*c* is software programmed to only select light from waveguide switch 4460*d*, and to select no light from waveguide switch 4464*o*, as indicated by the solid line through variable optical coupler 4462*c* in FIG. 54B. Similarly, since only wavelength switches 4430*c-d* and 4420*b* are used to select wavelengths for the DEG4 output signal, variable optical coupler 4462*f* is software programmed to only select light from waveguide switch 4460*g*, and to select no light from the parallel optical port 4470*a*, as indicated by the solid line through variable optical coupler 4462*f* in FIG. 54B.

In ROADM 4410*c* of optical node 5400, wavelength switches 4430*a-b,d* and 4420*a* are used to select wavelengths for the DEG5 output signal, and wavelength switches 4430*e-g* are used to select wavelengths for the DROP3 output signal.

The optical node 5200 (shown in FIG. 52) is an n-degree optical node, wherein n=2. The n-degree optical node comprises of a first ROADM 4410*a*. A second ROADM 4110*b* may be optically connected to the first ROADM 4410*a* to form an m-degree optical node, wherein m=4. Such an optical node 4500 is depicted in FIG. 45A and FIG. 45B, wherein the first ROADM 4410*a* is now optically connected to the second ROADM 4410*b* using a parallel optical cable (connecting port 4470*c* of the first ROADM 4410*a* to port 4470*c* of the second ROADM 4410*b*). The first ROADM 4410*a* comprises: a first wavelength switch set, comprising of at least one wavelength switch 4430*a*, a second wavelength switch set comprising of at least one wavelength switch 4420*a*, and at least one programmable waveguide optical element. The at least one programmable waveguide optical element may be a variable optical coupler 4462*b*, used to combine the optical outputs from the first wavelength switch set and from the second wavelength switch set.

When the first ROADM 4410*a* operates as a two-degree node (n=2), the at least one programmable waveguide optical element 4462*b* of 4410*a* is programmed to a first state, and when the first ROADM 4410*a* is connected to the second ROADM 4410*b* to form a four-degree node (m=4), the at least one programmable waveguide optical element 4462*b* is programmed to a second state. When the at least one programmable waveguide optical element 4462*b* of 4410*a* is programmed to the first state, the at least one programmable waveguide optical element 4462*b* of 4410*a* is used to forward wavelengths only from the first wavelength switch set (4430*a* of 4410*a*), as depicted in FIG. 52, which shows the variable optical coupler 4462*b* effectively configured as a waveguide switch that connects the top input port of 4462*b* to the output port of 4462*b* (as indicated by the solid diagonal line within 4462*b*). When the at least one programmable waveguide optical element 4462*b* of 4410*a* is programmed to the second state, the at least one programmable waveguide optical element 4462*b* of 4410*a* is used to forward wavelengths from both the first wavelength switch set (4430*a* of 4410*a*) and the second wavelength switch set (4420*a* of 4410*a*), as depicted in FIG. 45A, which shows the variable optical coupler 4462*b* configured as a two-to-one optical coupler that combines wavelengths from both 4430*a* of 4410*a* and 4420*a* of 4410*a*. In summary, since the output of variable optical coupler 4462*b* is connected to an output degree (4432*a*), it can be stated that when the at least one programmable waveguide optical element (4462*b* of 4410*a*) is programmed to the first state, the first wavelength switch set (4430*a* of 4410*a*) provides wavelength switching for one output degree (4432*a* of 4410*a*) of an n-degree optical node 5200 (wherein n=2), and wherein when the at least one programmable waveguide optical element (4462*b* of 4410*a*) is programmed to a second state, the first wavelength switch set (4430*a* of 4410*a*) and the second wavelength switch set (4420*a* of 4410*a*) provide wavelength switching for one output degree (4432*a* of 4410*a*) of an m-degree optical node 4500 (wherein m=4), wherein m>n, and wherein the second state is different from the first state.

A third ROADM 4110*d* may be optically connected to the first ROADM 4410*a* and the second ROADM 4410*b* to form an p-degree optical node, wherein p=5. Such an optical node 5300 is depicted in FIG. 53A, FIG. 53B, and FIG. 53C, wherein the first ROADM 4410*a* is now optically connected to the second ROADM 4410*b* using a first parallel optical cable (connecting port 4470*c* of the first ROADM 4410*a* to port 4470*c* of the second ROADM 4410*b*), and the first ROADM 4410*a* is now optically connected to the third ROADM 4410*d* using a second parallel optical cable (connecting port 4470*b* of the first ROADM 4410*a* to port 4470*b* of the third ROADM 4410*c*), and the second ROADM 4410*b* is now optically connected to the third ROADM 4410*d* using a third parallel optical cable (connecting port 4470*a* of the second ROADM 4410*b* to port 4470*a* of the third ROADM 4410*c*).

The first ROADM 4410*a* may further comprise a second programmable waveguide optical element 4462*a*, and a third wavelength switch set, comprising of at least one wavelength switch 4430*b*. The second programmable waveguide optical element 4462*a* may be programmed to a first configuration and a second configuration. The second programmable waveguide optical element 4462*a* may be a variable optical coupler that can be programmed to combine wavelengths from wavelength switch 4430*a* of the first wavelength switch set and from wavelength switch 4430*b* of the third wavelength switch set. When the second programmable waveguide optical element 4462*a* is programmed to a first configuration, the second programmable waveguide optical element may be programmed such that the second programmable waveguide optical element forwards wavelengths only from wavelength switch 4430a, and forwards no wavelengths from wavelength switch 4430b, as indicated by the solid line through 4462a in FIG. 52 and in ROADM 4410a of FIG. 45A. When second programmable waveguide optical element 4462a is programmed to a second configuration, the second programmable waveguide optical element may be programmed such that the second programmable waveguide optical element combines wavelengths from wavelength switch 4430a and from wavelength switch 4430b, as indicated by placing the "2:1" (two-to-one) text within the optical component 4462a, as shown in ROADM 4410a of FIG. 53A.

When the at least one programmable waveguide optical element 4462b of 4410a is programmed to the first state, and the second programmable waveguide optical element 4462a is programmed to the first configuration (as shown in FIG. 52), the first wavelength switch set (containing wavelength switch 4430a) provides wavelength switching for one output of a two-degree optical node, as shown in FIG. 52. When the at least one programmable waveguide optical element 4462b of 4410a is programmed to the second state, and the second programmable waveguide optical element 4462a is programmed to the first configuration (as shown in FIG. 45A), the first wavelength switch set (containing wavelength switch 4430a) and the second wavelength switch set (containing wavelength switch 4420a) provides wavelength switching for one output of a four-degree optical node, as shown in ROADM 4410a of FIG. 45A. When the at least one programmable waveguide optical element 4462b of 4410a is programmed to the second state, and the second programmable waveguide optical element 4462a is programmed to the second configuration (as shown in FIG. 53A), the first wavelength switch set (containing wavelength switch 4430a) and the second wavelength switch set (containing wavelength switch 4420a) and the third wavelength switch set (containing wavelength switch 4430b) provides wavelength switching for one output of a five-degree optical node, as shown in ROADM 4410a of FIG. 53A.

In summary, since the output of variable optical coupler 4462b is connected to an output degree (4432a), it can be stated that when an at least one programmable waveguide optical element (4462b of 4410a) is programmed to a first state and when a second programmable waveguide optical element 4462a is programmed to a first configuration, the first wavelength switch set (4430a of 4410a) provides wavelength switching for one output degree (4432a of 4410a) of an n-degree optical node 5200 (wherein n=2), and wherein when the at least one programmable waveguide optical element (4462b of 4410a) is programmed to a second state and the second programmable waveguide optical element 4462a is programmed to the first configuration, the first wavelength switch set (4430a of 4410a) and the second wavelength switch set (4420a of 4410a) provide wavelength switching for one output degree (4432a of 4410a) of an m-degree optical node 4500 (wherein m=4), wherein m>n, and wherein when the at least one programmable waveguide optical element (4462b of 4410a) is programmed to the second state and the second programmable waveguide optical element 4462a is programmed to a second configuration, the first wavelength switch set (4430a of 4410a) and the second wavelength switch set (4420a of 4410a) and a third wavelength switch set (4430b of 4410a) provide wavelength switching for one output degree (4432a of 4410a) of a p-degree optical node 5300 (wherein p=5), wherein p>m and m>n, and wherein the second state is different from the first state, and wherein the second configuration is different than the first configuration. As shown in FIG. 53A, the first wavelength switch set (comprising of 4430a), and the second wavelength switch set (comprising of 4420a), and the third wavelength switch set (comprising of 4430b), all reside on the same ROADM (4410a of FIG. 53A). In addition, the at least one programmable waveguide optical element (4462b) and the second programmable waveguide optical element (4462a) reside on the same ROADM (4410a of FIG. 53A). The optical circuitry of ROADM 4410a may be placed on a single circuit pack, so that the first wavelength switch set (comprising of 4430a), and the second wavelength switch set (comprising of 4420a), and the third wavelength switch set (comprising of 4430b), and the at least one programmable waveguide optical element (4462b), and the second programmable waveguide optical element (4462a), all reside on the same circuit pack.

Optical node 5400 shown in FIG. 54A, FIG. 54B, and FIG. 54C, is a five-degree optical node having three directionless add/drop ports. Wavelength switching for the degree 1 (DEG1) output (4432a of 4410a of FIG. 54A) is provided by wavelength switch 4430a and 4420a on ROADM 4410a, and by wavelength switch 4420b of ROADM 44120c. In optical node 5400, programmable waveguide optical element 4462c of ROADM 4410a is use to combine wavelengths from wavelength switch 4420a of ROADM 4410a and wavelength switch 4420b of ROADM 4410c. This is accomplished by programming waveguide switches 4460g and 4460i on ROADM 4410c to direct wavelengths from wavelength switch 4420b of ROADM 4410c to port number 5 of parallel optical port 4470a ROADM 4410c, and by programming waveguide switch 4464o on ROADM 4410a to direct wavelengths from port 8 of parallel optical port 4470a of ROADM 4410a to variable optical coupler 4462c of ROADM 4410a, and by programming waveguide switch 4460d on ROADM 4410a to direct wavelengths from wavelength switch 4420a of ROADM 4410a to variable optical coupler 4462c of ROADM 4410a, as shown in FIG. 54A and FIG. 54C. In optical node 5400, programmable waveguide optical element 4462b of ROADM 4410a is use to combine wavelengths from wavelength switch 4430a of ROADM 4410a and wavelength switch 4420a of ROADM 4410a and wavelength switch 4420b of ROADM 4410c.

On ROADM 4410a, a first wavelength switch set may comprise of wavelength switches 4430a and 4420a, and at least one programmable waveguide optical element may comprise of variable optical coupler 4462c. Variable optical coupler 4462c may be programmed to a first state such that only wavelengths from wavelength switch 4420a are forwarded to variable optical coupler 4462b through coupler 4462c, and no wavelengths are forwarded to variable optical coupler 4462b from waveguide switch 4464o, as indicated by the line through variable optical coupler 4462c connecting the top input port of 4462c to the output port of 4462c as shown in FIG. 45A. When variable optical coupler 4462c of ROADM 4410a is programmed as shown in FIG. 45A, the first wavelength switch set (comprising of wavelength switches 4430a and 4420a) provides wavelength switching for one output degree of an m-degree node (4500), wherein m=4. A second wavelength switch set comprises of wavelength switch 4420b of 4410c (FIG. 54C). Variable optical coupler 4462c may be programmed to a second state (as shown in FIG. 54A) such that variable optical coupler 4462c combines wavelengths from wavelength switch 4420a on ROADM 4410a of FIG. 54A with wavelengths from wavelength switch 4420b of ROADM 4410c of FIG. 54C. When variable optical coupler 4462c is programmed to this second state, the first wavelength switch set (comprising of wavelength switches 4430*a* and 4420*a* of ROADM 4410*a*) and the second wavelength switch set (comprising of wavelength switch 4420*b* of ROADM 4410*c*) provide wavelength switching for one output of an m-degree optical node 5400, wherein m=5, and wherein m>n, and wherein the second state of coupler 4462*c* is different from the first state of coupler 4462*c*. This m-degree optical node 5400, wherein m=5, is illustrated in FIG. 54A, FIG. 54B, and FIG. 54C. The optical node 5400 may comprise of a first circuit pack containing the optical circuitry of ROADM 4410*a*, and a second circuit pack containing the optical circuitry of ROADM 4410*c*, and a third circuit pack containing the optical circuitry of ROADM 4410*b*. For this case, the first circuit pack comprises the first wavelength switch set (comprising of wavelength switches 4430*a* and 4420*a* of ROADM 4410*a*) and the programmable waveguide optical element 4462*c*, and the second circuit pack comprises the second wavelength switch set (comprising of wavelength switch 4420*b* of ROADM 4410*c*). A parallel optical cable connects parallel optical port 4470*a* of ROADM 4410*a* to parallel optical port 4470*a* of ROADM 4410*c* in order to connect the second wavelength switch set to the programmable waveguide optical element 4462*c* of ROADM 4410*a*. The first circuit pack (comprising of ROADM 4410*a* of FIG. 54A) is identical to the second circuit pack (comprising of ROADM 4410*c* of FIG. 54C). And the third circuit pack (comprising of ROADM 4410*b* of FIG. 54B) is identical to the first circuit pack and the second circuit pack. A second programmable waveguide optical element 4460*i* of 4410*c* resides on the second circuit pack. The second programmable waveguide optical element 4460*i* of 4410*c* is used to connect the second wavelength switch set (comprising of 4420*b* in 4410*c*) to the parallel optical cable. A third programmable waveguide optical element 4464*o* of 4410*a* resides on the first circuit pack. The third programmable waveguide optical element 4464*o* of 4410*a* is used to connect the second wavelength switch set (comprising of 4420*b* in 4410*c*) to the first programmable waveguide optical element 4462*c* of 4410*a*. A fourth programmable waveguide optical element 4464*h* of 4410*a* is used to forward an optical signal to the first wavelength switch set (comprising of 4430*a* and 4420*a* of 4410*a*) from optical coupler 4434*h* of 4410*a*.

An apparatus may comprise: a first wavelength switch set comprising at least one wavelength switch 4430*a* and 4420*a* on 4410*a*, a second wavelength switch set comprising at least one wavelength switch 4420*b* on 4410*c*, and at least one programmable waveguide optical element 4462*c* on 4410*a*, wherein when the at least one programmable waveguide optical element 4462*c* is programmed to a first state (as shown in FIG. 45A), the first wavelength switch set provides wavelength switching for one output degree (DEG1, 4432*a*) of an n-degree optical node (n=4), and wherein when the at least one programmable waveguide optical element 4462*c* is programmed to a second state (as shown in FIG. 54A), the first wavelength switch set and the second wavelength switch set provide wavelength switching for one output degree (DEG1, 4432*a*) of an m-degree optical node (m=5), wherein m>n, and wherein the second state is different from the first state. The apparatus may further comprise a first circuit pack 4410*a* and a second circuit pack 4410*c*, wherein the first wavelength switch set, and the at least one programmable waveguide optical element reside on the first circuit pack, and wherein the second wavelength switch set resides on the second circuit pack, and wherein an optical cable is used to connect the second wavelength switch set to the at least one programmable waveguide optical element, and wherein the second circuit pack is identical to the first circuit pack. The apparatus may further comprise a second programmable waveguide optical element 4460*i* of 4410*c*, residing on the second circuit pack, and used to connect the second wavelength switch set to the optical cable. The apparatus may further comprise a third programmable waveguide optical element 4464*o* of 4410*a*, residing on the first circuit pack, and used to connect the second wavelength switch set to the at least one programmable waveguide optical element. The apparatus may further comprise a fourth programmable waveguide optical element 4464*h* of 4410*a*, used to forward an optical signal to the first wavelength switch set.

Figure 55B:
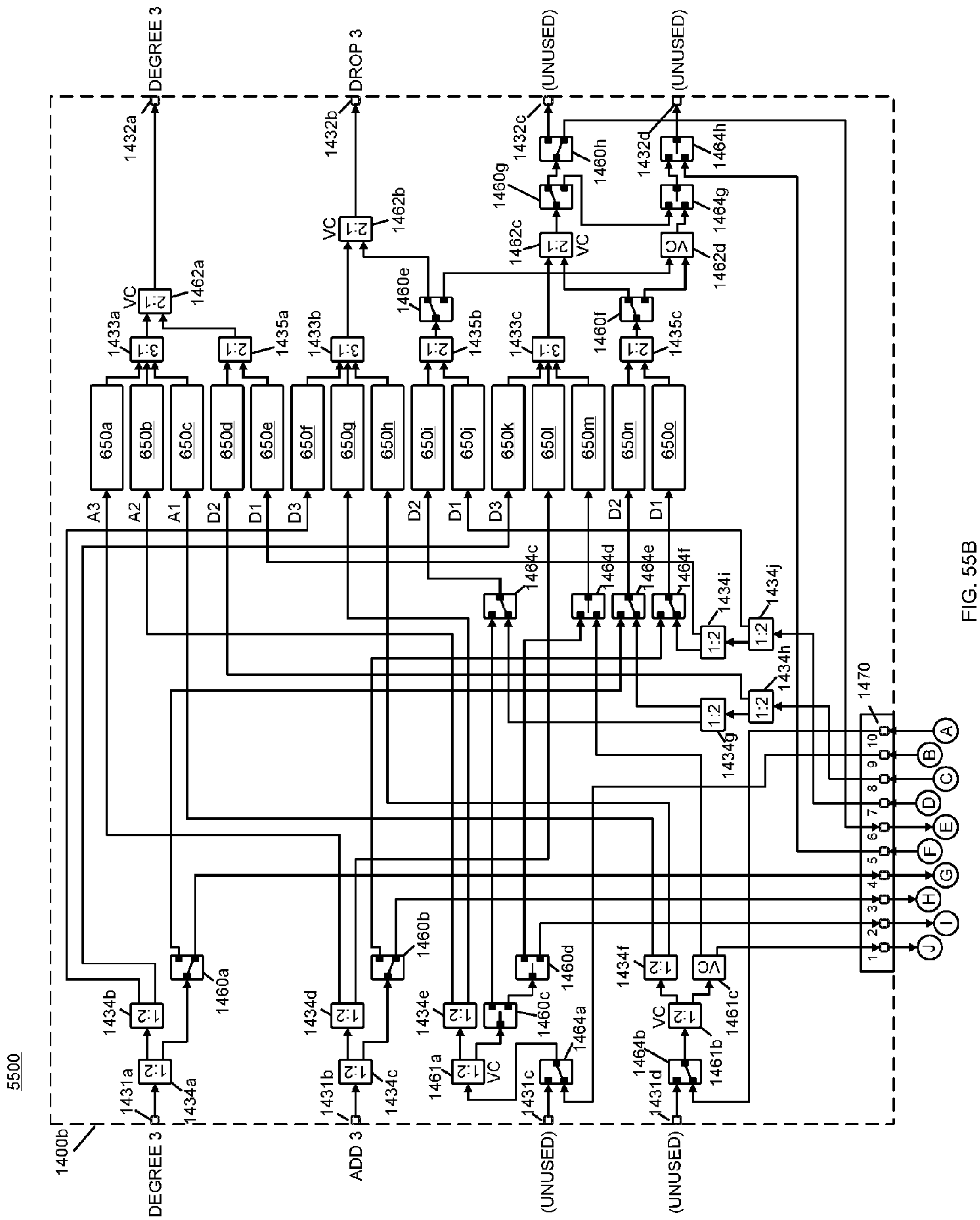

FIG. 55A and FIG. 55B illustrate the use of the software programmable ROADM 1400 (of FIG. 14) in a three-degree and three directionless add/drop ports node configuration 5500, requiring two software programmable ROADMs 1400. Software programmable ROADM 1400*a* provides interfaces for DEGREE 1, DEGREE 2, ADD/DROP port 1, and ADD/DROP port 2, while software programmable ROADM 1400*b* provides interfaces for DEGREE 3 and ADD/DROP port 3. This partitioning of resources allows for the expansion from a two-degree optical node with two add/drop ports to a three-degree optical node without the need to physically move the optical cables attached to the DEGREE 1, DEGREE 2, ADD/DROP 1, and ADD/DROP 2 optical ports of the first software programmable ROADM 1400*a*.

The waveguide switch settings and variable optical coupler settings for the three-degree node with three add/drop ports are shown in FIG. 55A and FIG. 55B.

In FIG. 55A, wavelength equalizers 650*m-n*, couplers 1462*d*, and waveguide switches 1464*d-e,g* are not used. In FIG. 55B, wavelength equalizers 650*g-h*, 6501-*m*, couplers 1461*c*,1462*d*, and waveguide switches 1464*d,g*, 1460*c-d* are not used.

Figure 56B:
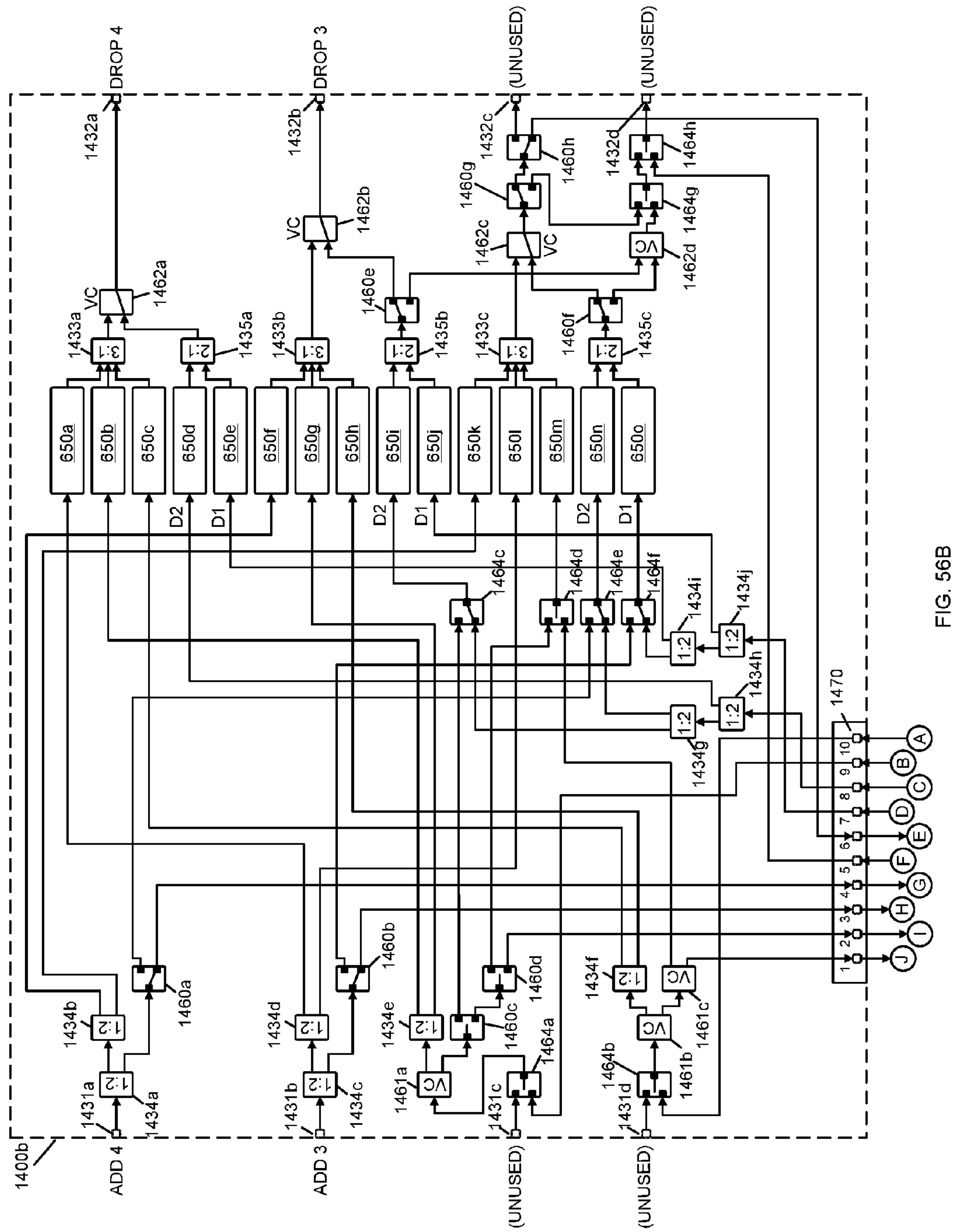

FIG. 56A and FIG. 56B illustrate the use of the software programmable ROADM 1400 (of FIG. 14) in a two-degree and four directionless add/drop ports node configuration 5600, requiring two software programmable ROADMs 1400. Software programmable ROADM 1400*a* provides interfaces for DEGREE 1, DEGREE 2, ADD/DROP port 1, and ADD/DROP port 2, while software programmable ROADM 1400*b* provides interfaces for ADD/DROP port 3 and ADD/DROP port 4. This partitioning of resources allows for the expansion from a two-degree optical node with two add/drop ports to a two-degree optical node with four add/drop ports without the need to physically move the optical cables attached to the DEGREE 1, DEGREE 2, ADD/DROP 1, and ADD/DROP 2 optical ports of the first software programmable ROADM 1400*a*.

The waveguide switch settings and variable optical coupler settings for the two-degree node with four add/drop ports are shown in FIG. 56A and FIG. 56B.

In FIG. 56A, wavelength equalizers 650*m-o*, couplers 1435*c*,1461*c*,1462*d*, and waveguide switches 1464*d-f,g*, 1460*c-d,f* are not used. In addition, variable optical coupler 1462*c* in FIG. 56A is programmed to forward only wavelengths from optical coupler 1433*c*. In FIG. 56B, wavelength equalizers 650*a-c*, 650*f-h*, 650*k-m*, couplers 1433*a-c*, 1434*b,d-f*, 1461*a-c*, 1462*d*, and waveguide switches 1460*c-d*, 1464*a-b,d,g* are not used. In addition, in FIG. 56B, variable optical coupler 1462*c* is programmed to forward only wavelengths from optical coupler 1435*c*, and variable optical coupler 1462*a* is programmed to forward only wavelengths from optical coupler 1435*a*, and variable optical coupler 1462*b* is programmed to forward only wavelengths from optical coupler 1435*b*.

FIGS. 55A&B and FIGS. 56A&B, illustrate which ROADM input signal is routed to which wavelength switch by labeling each wavelength switch input port with a ROADM input signal name. Abbreviated ROADM input signals names are used, wherein the abbreviations D1, D2, D3, A1, A2, A3, and A4 correspond to ROADM input signal names DEGREE 1, DEGREE 2, DEGREE 3, ADD 1, ADD 2,ADD 3, and ADD 4 respectively. An unused input port of a wavelength switch does not have an abbreviated ROADM input signal name on its respective wavelength switch input port.

Figure 57:
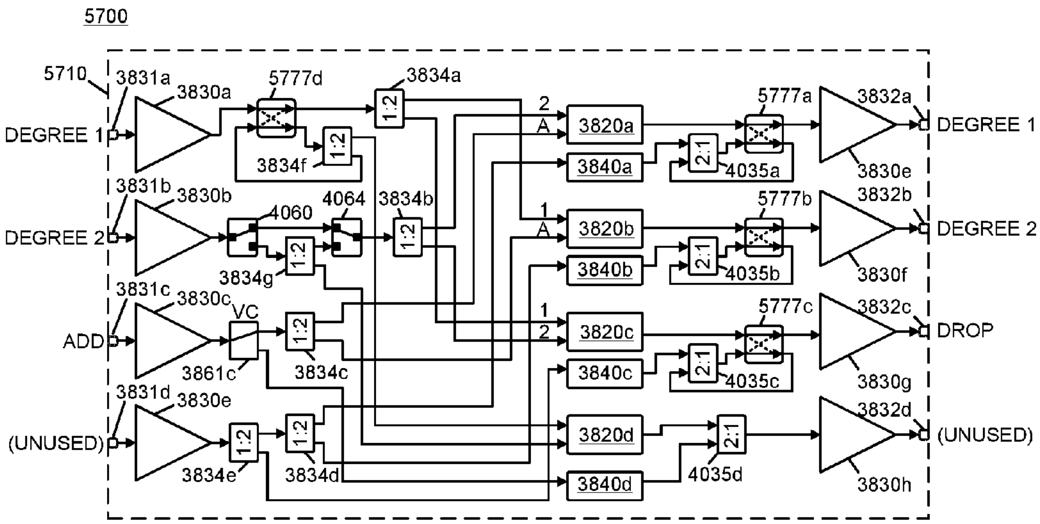
FIG. 57 is an illustration of a software programmable ROADM used to construct two and three-degree optical nodes, configured as a two-degree optical node.
Figure 58:
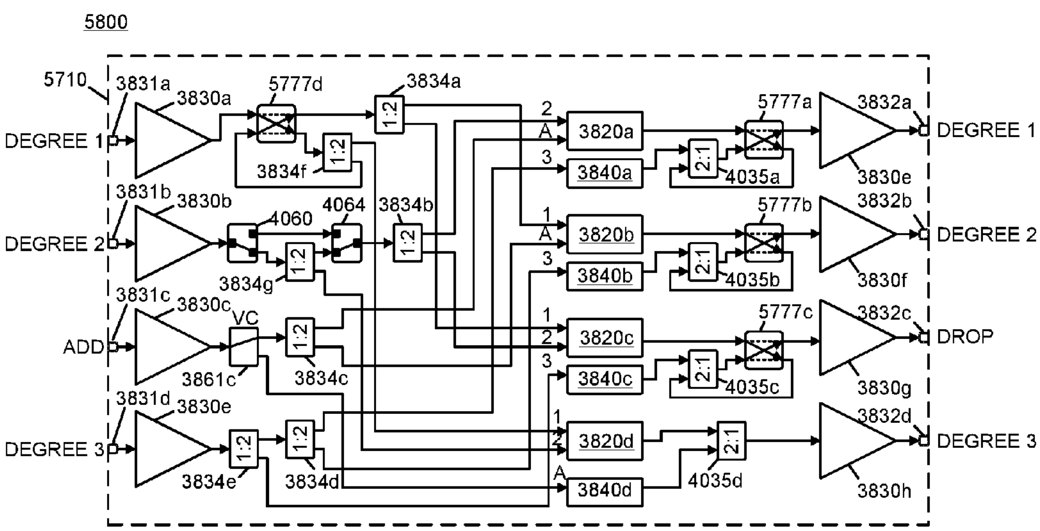
FIG. 58 is an illustration of a software programmable ROADM used to construct two and three-degree optical nodes, configured as a three-degree optical node.

FIG. 57 and FIG. 58 illustrate optical nodes 5700, 5800 using software Programmable ROADM 5710. Optical node 5700 is a two-degree optical node having one directionless add/drop port, while optical node 5800 is a three-degree optical node having one directionless add/drop port. ROADM 5710 is similar to ROADM 4010 used in the nodes 4000 and 4100 of FIG. 40 and FIG. 41, except that the one-to-two waveguide switches 4060*a-c* and 4064*a-c* are replaced with two-by-two waveguide switches 5777*a-c*, and the variable optical coupler 3861*a* is replaced by the two-by-two waveguide switch 5777*d* and optical coupler 3834*f*, and the variable optical coupler 3861*b* is replaced by the waveguide switches 4060 and 4064 and the optical coupler 3834*g*.

The two-by-two waveguide switches 5777*a-d* may be software programmed to a first state or a second state. When programmed to the first state, the top input is optically connected to the top output, and the bottom input is optically connected to the bottom output (the so called "through state" of the switch), as illustrated in FIG. 57 (by way of the solid lines in switches 5767*a-d*). When programmed to the second state, the top input is optically connected to the bottom output, and the bottom input is optically connected to the top output (the so called "cross state" of the switch), as illustrated in FIG. 58 (by way of the solid lines in switches 5767*a-d*). Therefore, for the optical node 5700, the two-by-two waveguide switches 5777*a-d* are programmed so as to optically by pass the optical couplers 4035*a-c* and 3834*f*, whereas for the optical node 5800, the two-by-two waveguide switches 5777*a-d* are programmed so as to include the optical couplers 4035*a-c* and 3834*f*. Similarly, when the waveguide switches 4060 and 4064 are programmed as shown in optical node 5700, the optical coupler 3834*g* is optically by passed, whereas when the waveguide switches 4060 and 4064 are programmed as shown in optical node 5800, the optical coupler 3834*g* is included in the optical path.

In optical node 5700, the DEGREE 1 input signal (1) is forwarded to wavelength switches 3820*b* and 3820*c*, as shown in FIG. 57, while the DEGREE 2 input signal (2) is forwarded to wavelength switches 3820*a* and 3820*c*, as shown in FIG. 57, and the ADD input signal (A) is forwarded to wavelength switches 3820*a* and 3820*b*, as shown in FIG. 57. The input signals DEGREE 1, DEGREE 2, and ADD are not forwarded to wavelength switches 3820*d* and 3840*d* because optical couplers 3834*f* and 3834*g* are optically by passed in optical node 5700. In addition, because optical couplers 4035*a-c* are optically by passed in optical node 5700, wavelengths for output signal DEGREE 1 (output port 3832*a*) are selected only from wavelength switch 3820*a*, and wavelengths for output signal DEGREE 2 (output port 3832*b*) are selected only from wavelength switch 3820*b*, and wavelengths for output signal DROP (output port 3832*c*) are selected only from wavelength switch 3820*c*.

In optical node 5800, the DEGREE 1 input signal (1) is forwarded to wavelength switches 3820*b*, 3820*c* and 3820*d*, as shown in FIG. 58, while the DEGREE 2 input signal (2) is forwarded to wavelength switches 3820*a*,3820*c*, and 3820*d*, as shown in FIG. 58, and the ADD input signal (A) is forwarded to wavelength switches 3820*a*, 3820*b*, and 3840*d*, as shown in FIG. 58, and the DEGREE 3 input signal (3) is forwarded to wavelength switches 3840*a*, 3840*b*, and 3840*c*, as shown in FIG. 58. In addition, in optical node 5800, wavelengths for output signal DEGREE 1 (output port 3832*a*) are selected from wavelength switches 3820*a* and 3840*a*, and wavelengths for output signal DEGREE 2 (output port 3832*b*) are selected from wavelength switches 3820*b* and 3840*b*, and wavelengths for output signal DROP (output port 3832*c*) are selected from wavelength switches 3820*c* and 3840*c*, and wavelengths for output signal DEGREE 3 (output port 3832*d*) are selected from wavelength switches 3820*d* and 3840*d*, as couplers 4035*a-d* are used to combine wavelengths from wavelength switches 3820*a* and 3840*a*, and to combine wavelengths from wavelength switches 3820*b* and 3840*b*, and to combine wavelengths from wavelength switches 3820*c* and 3840*c*, and to combine wavelengths from wavelength switches 3820*d* and 3840*d*, as shown in FIG. 58.

FIG. 57 and FIG. 58, illustrate which ROADM input signal is routed to which wavelength switch by labeling each wavelength switch input port with a ROADM input signal name. Abbreviated ROADM input signals names are used, wherein the abbreviations 1, 2, 3, and A, correspond to ROADM input signal names DEGREE 1, DEGREE 2, DEGREE 3, and ADD respectively. An unused input port of a wavelength switch does not have an abbreviated ROADM input signal name on its respective wavelength switch input port.

In the foregoing description, the invention is described with reference to specific example embodiments thereof. It will, however, be evident that various modifications and changes may be made thereto without departing from the broader spirit and scope of the present invention. The specification and drawings are accordingly to be regarded in an illustrative rather than restrictive sense.

What is claimed is:

1. A reconfigurable optical add drop multiplexer (ROADM) comprising:
- a first plurality of wavelength switches;
- a second plurality of wavelength switches; and
- a plurality of programmable waveguide optical elements,
- wherein when the plurality of programmable waveguide optical elements are programmed to a first state, the first plurality of wavelength switches provides wavelength switching for one output degree of an n-degree optical node, and wherein when the plurality of programmable waveguide optical elements are programmed to a second state, the first plurality of wavelength switches and the second plurality of wavelength switches provide wavelength switching for one output degree of an m-degree optical node, wherein m>n, and wherein the second state is different from the first state.

2. The ROADM of claim 1, wherein each wavelength switch of the first plurality of wavelength switches includes one optical input and one optical output, and wherein each wavelength switch of the second plurality of wavelength switches includes one optical input and one optical output.

3. The ROADM of claim 1, wherein at least one of the plurality of programmable waveguide optical elements is a variable optical coupler, wherein the variable optical coupler connects to the first plurality of wavelength switches and to the second plurality of wavelength switches.

4. The ROADM of claim 1, wherein at least one of the plurality of programmable waveguide optical elements is a waveguide switch.

5. A reconfigurable optical add drop multiplexer (ROADM) comprising:

a first plurality of wavelength switch sets comprising at least one wavelength switch;

a second plurality of wavelength switch sets comprising at least one wavelength switch; and a plurality of programmable waveguide optical elements, wherein when the plurality of programmable waveguide optical elements are programmed to a first state, the first plurality of wavelength switch sets provides wavelength switching for one output degree of an n-degree optical node, and wherein when the plurality of programmable waveguide optical elements are programmed to a second state, the first plurality of wavelength switch sets and the second plurality of wavelength switch sets provide wavelength switching for one output degree of an m-degree optical node, wherein m>n, and wherein the second state is different from the first state.

6. The ROADM of claim 5, wherein each wavelength switch within the first plurality of wavelength switch sets includes one optical input and one optical output, and wherein each wavelength switch within the second plurality of wavelength switch sets includes one optical input and one optical output.

7. The ROADM of claim 5, wherein at least one of the plurality of programmable waveguide optical elements is a variable optical coupler, wherein the variable optical coupler connects to one of the first plurality of wavelength switch sets and to one of the second plurality of wavelength switch sets.

8. The ROADM of claim 5, wherein at least one of the plurality of programmable waveguide optical elements is a waveguide switch.

9. The ROADM of claim 5, wherein at least one of the plurality of programmable waveguide optical elements comprises of a one by two waveguide switch and a two by one waveguide switch, wherein the one by two waveguide switch is connected to one of the first plurality of wavelength switch sets, and to the two by one waveguide switch, and to a first input of a two to one fixed optical coupler, and wherein one of the second plurality of wavelength switch sets is connected to a second input of the two to one fixed optical coupler, and wherein the output of the two to one fixed optical coupler is connected to the two by one waveguide switch.

10. The ROADM of claim 5, wherein at least one of the first plurality of wavelength switch sets comprises at least two wavelength switches.

11. The ROADM of claim 5, further comprising:

a third plurality of wavelength switch sets comprising at least one wavelength switch, wherein when a first programmable waveguide optical element of the plurality of programmable waveguide optical elements is programmed to the second state and a second programmable waveguide optical element of the plurality of programmable waveguide optical elements is programmed to a first configuration, a first wavelength switch set of the first plurality of wavelength switch sets and a first wavelength switch set of the second plurality of wavelength switch sets provide wavelength switching for one output degree of the m-degree optical node, and wherein when the first programmable waveguide optical element is programmed to the second state and the second programmable waveguide optical element is programmed to a second configuration, the first wavelength switch set of the first plurality of wavelength switch sets and the first wavelength switch set of the second plurality of wavelength switch sets and one of the third plurality of wavelength switch sets provide wavelength switching for one output degree of an p-degree optical node, wherein p>m, and wherein the second configuration is different from the first configuration.

12. The ROADM of claim 5, wherein one of the plurality of programmable waveguide optical elements is used to forward an optical signal to one of the first plurality of wavelength switch sets.

13. An apparatus comprising:

a first plurality of wavelength switch sets comprising at least one wavelength switch;

a second plurality of wavelength switch sets comprising at least one wavelength switch; and a plurality of programmable waveguide optical elements, wherein when the plurality of programmable waveguide optical elements are programmed to a first state, the first plurality of wavelength switch sets provides wavelength switching for one output degree of an n-degree optical node, and wherein when the plurality of programmable waveguide optical elements are programmed to a second state, the first plurality of wavelength switch sets and the second plurality of wavelength switch sets provide wavelength switching for one output degree of an m-degree optical node, wherein m>n, and wherein the second state is different from the first state.

14. The apparatus of claim 13, wherein one of the plurality of programmable waveguide optical elements is used to forward an optical signal to one of the first plurality of wavelength switch sets.

15. The apparatus of claim 13, further comprising a circuit pack, wherein the first plurality of wavelength switch sets, the second plurality of wavelength switch sets, and the plurality of programmable waveguide optical elements reside on the circuit pack.

16. The apparatus of claim 13, further comprising:

a first circuit pack, comprising a first wavelength switch set of the first plurality of wavelength switch sets and a first programmable waveguide optical element of the plurality of programmable waveguide optical elements;

a second circuit pack comprising a first wavelength switch set of the second plurality of wavelength switch sets; and an optical cable used to connect the first wavelength switch set of the second plurality of wavelength switch sets to the first programmable waveguide optical element.

17. The apparatus of claim 16, wherein the second circuit pack is identical to the first circuit pack.

18. The apparatus of claim 16, further comprising a second programmable waveguide optical element of the plurality of programmable waveguide optical elements, residing on the second circuit pack, and used to connect the first wavelength switch set of the second plurality of wavelength switch sets to the optical cable.

19. The apparatus of claim 18, further comprising a third programmable waveguide optical element of the plurality of programmable waveguide optical elements, residing on the first circuit pack, and used to connect the first wavelength switch set of the second plurality of wavelength switch sets to the first programmable waveguide optical element.

20. The apparatus of claim 19, further comprising a fourth programmable waveguide optical element of the plurality of programmable waveguide optical elements, used to forward an optical signal to the first wavelength switch set of the first plurality of wavelength switch sets.

* * * * *